US011991664B2

(12) United States Patent
Murray et al.

(10) Patent No.: US 11,991,664 B2
(45) Date of Patent: *May 21, 2024

(54) APPARATUSES FOR TRANSMISSION OF PAGING BLOCKS IN SWEPT DOWNLINK BEAMS

(71) Applicant: IPLA Holdings Inc., New York, NY (US)

(72) Inventors: Joseph M. Murray, Schwenksville, PA (US); Pascal M. Adjakple, Great Neck, NY (US); Allan Y. Tsai, Boonton, NJ (US); Qing Li, Princeton Junction, NJ (US); Lakshmi R. Iyer, King of Prussia, PA (US); Wei Chen, San Diego, CA (US); Guodong Zhang, Woodbury, NY (US); Yifan Li, Conshohocken, PA (US); Mohamed Awadin, Plymouth Meeting, PA (US)

(73) Assignee: IPLA Holdings Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/173,087

(22) Filed: Feb. 23, 2023

(65) Prior Publication Data

US 2023/0199717 A1 Jun. 22, 2023

Related U.S. Application Data

(63) Continuation of application No. 17/224,195, filed on Apr. 7, 2021, now Pat. No. 11,653,331, which is a (Continued)

(51) Int. Cl.
*H04W 68/02* (2009.01)
*H04W 52/02* (2009.01)

(52) U.S. Cl.
CPC ....... *H04W 68/02* (2013.01); *H04W 52/0229* (2013.01)

(58) Field of Classification Search
CPC ................ H04W 52/0229; H04W 68/02
(Continued)

(56) References Cited

U.S. PATENT DOCUMENTS 5,905,443 A 5/1999 Olds et al.
7,750,320 B2 * 7/2010 Ferrara ............... H01J 37/3171
250/442.11

(Continued)

FOREIGN PATENT DOCUMENTS

CN 101433119 A 5/2009
CN 104919872 A 9/2015
(Continued)

OTHER PUBLICATIONS

J. Chen, R. Shi and K. Deng, "Analysis and Monitoring of Paging Message in Mobile Communication System," 2022 5th International Conference on Information Communication and Signal Processing (ICICSP), Shenzhen, China, 2022, pp. 1-6, doi: 10.1109/ICICSP55539.2022.10050589. (Year: 2022).*
(Continued)

*Primary Examiner* — William D Cumming
(74) *Attorney, Agent, or Firm* — XSENSUS LLP

(57) ABSTRACT

New radio channel designs incorporate a synchronization signal burst series frame structure, with higher layer channels mapped to physical channels transmitted during a synchronization signal, allowing user equipment to select beams during which to listen for paging information. A physical common control channel configuration information element may be used to signal the paging configuration as part of the System Information. Paging may occur with or without user equipment assistance.

19 Claims, 136 Drawing Sheets

Related U.S. Application Data continuation of application No. 16/482,022, filed as application No. PCT/US2018/016653 on Feb. 2, 2018, now Pat. No. 11,012,974.

(60) Provisional application No. 62/586,552, filed on Nov. 15, 2017, provisional application No. 62/564,476, filed on Sep. 28, 2017, provisional application No. 62/501,547, filed on May 4, 2017, provisional application No. 62/453,880, filed on Feb. 2, 2017.

(58) Field of Classification Search
USPC .................................................... 455/458
See application file for complete search history.

(56) References Cited

U.S. PATENT DOCUMENTS

| | | | |
|---|---|---|---|
| 9,496,988 | B2 | 11/2016 | Khan et al. |
| 10,302,746 | B2 | 5/2019 | O'Keeffe |
| 10,367,677 | B2 | 7/2019 | Parkvall et al. |
| 10,455,547 | B2 | 10/2019 | Islam et al. |
| 10,484,964 | B2 | 11/2019 | Sang et al. |
| 10,548,182 | B2 | 1/2020 | Luo et al. |
| 10,578,719 | B2 | 3/2020 | O'Keeffe |
| 10,659,993 | B2 | 5/2020 | Ryoo et al. |
| 10,778,313 | B2 | 9/2020 | Venugopal et al. |
| 10,785,747 | B2 | 9/2020 | Kim et al. |
| 10,791,531 | B2 | 9/2020 | Tsai et al. |
| 11,012,974 | B2 * | 5/2021 | Murray ............. H04W 52/0229 |
| 11,025,293 | B2 | 6/2021 | Akkarakaran et al. |
| 11,653,331 | B2 * | 5/2023 | Murray ................ H04W 68/02 455/458 |
| 2008/0149857 | A1 * | 6/2008 | Ferrara ................... H01J 37/09 250/492.21 |
| 2015/0365914 | A1 | 12/2015 | Yu et al. |
| 2017/0331670 | A1 | 11/2017 | Parkvall et al. |
| 2018/0048442 | A1 | 2/2018 | Stirling-Gallacher et al. |
| 2018/0199309 | A1 | 7/2018 | Islam et al. |
| 2018/0249441 | A1 | 8/2018 | Ryoo et al. |
| 2018/0254796 | A1 | 9/2018 | Akkarakaran et al. |
| 2018/0332562 | A1 | 11/2018 | Selvaganapathy et al. |
| 2019/0045481 | A1 | 2/2019 | Sang et al. |
| 2019/0059056 | A1 | 2/2019 | Islam et al. |
| 2019/0059129 | A1 | 2/2019 | Luo et al. |
| 2019/0182784 | A1 | 6/2019 | Harada et al. |
| 2019/0200315 | A1 | 6/2019 | Tsai et al. |
| 2019/0239204 | A1 | 8/2019 | Zhang et al. |
| 2019/0289534 | A1 | 9/2019 | Ryoo et al. |
| 2019/0319686 | A1 | 10/2019 | Chen et al. |
| 2019/0327669 | A1 | 10/2019 | Liu |
| 2019/0342833 | A1 | 11/2019 | Astrom et al. |
| 2019/0380099 | A1 | 12/2019 | Hakola et al. |
| 2019/0394707 | A1 | 12/2019 | Wong et al. |
| 2020/0028745 | A1 | 1/2020 | Parkvall et al. |
| 2020/0045715 | A1 | 2/2020 | Li et al. |
| 2020/0059283 | A1 | 2/2020 | Venugopal et al. |
| 2020/0084749 | A1 | 3/2020 | Sang et al. |
| 2020/0092846 | A1 | 3/2020 | Deng et al. |
| 2020/0120634 | A1 | 4/2020 | Lee et al. |
| 2020/0120638 | A1 | 4/2020 | Liu et al. |
| 2020/0163048 | A1 | 5/2020 | Kim et al. |
| 2020/0196275 | A1 | 6/2020 | Tsai et al. |
| 2020/0229266 | A1 | 7/2020 | Luo et al. |
| 2020/0252905 | A1 | 8/2020 | Tang |
| 2020/0275409 | A1 | 8/2020 | Gonzalez et al. |
| 2020/0288348 | A1 | 9/2020 | Ryoo et al. |
| 2020/0305120 | A1 | 9/2020 | Tang |
| 2020/0404617 | A1 | 12/2020 | Murray et al. |
| 2021/0274466 | A1 | 9/2021 | Murray et al. |

FOREIGN PATENT DOCUMENTS

| | | | | |
|---|---|---|---|---|
| CN | 110301147 B | * | 11/2022 | ........... H04B 7/0695 |
| EP | 2915390 A1 | | 9/2015 | |
| JP | 2008159585 A | * | 7/2008 | .............. H01J 37/09 |
| KR | 10-2014-0103490 A | | 8/2014 | |
| KR | 102174644 B1 | | 11/2020 | |
| WO | 2014/069970 A1 | | 5/2014 | |
| WO | 2018/141981 A1 | | 8/2018 | |
| WO | 2022/151059 A1 | | 7/2022 | |

OTHER PUBLICATIONS

3GPP TR 38.913 V0.3.0, "3rd Generation Partnership Project; Technical Specification Group Radio Access Network; Study on Scenarios and Requirements for Next Generation Access Technologies; (Release 14)", Mar. 2016, 30 pages.
3GPP TS 36.213 V13.0.0, "3rd Generation Partnership Project; Technical Specification Group Radio Access Network; Evolved Universal Terrestrial Radio Access (E-UTRA); Physical layer procedures (Release 13)", Dec. 2015, 326 pages.
3GPP TS 36.300 V13.3.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 13)", Mar. 2016, 295 pages.
3GPP TS 36.304 V13.0.0, "3rd Generation Partnership Project; Technical Specification Group Radio Access Network; Evolved Universal Terrestrial Radio Access (E-UTRA); User Equipment (UE) Procedures in the Idle Mode (Release 13)", Dec. 2015, 42 pages.
3GPP TS 36.321 V13.0.0 "3rd Generation Partnership Project; Technical Specification Group Radio Access Network; Evolved Universal Terrestrial Radio Access (E-UTRA); Medium Access Control (MAC) protocol specification (Release 13)", Dec. 2015, 82 pages.
3GPP TS 36.331 V13.0.0 "3rd Generation Partnership Project; Technical Specification Group Radio Access Network; Evolved Universal Terrestrial Radio Access (E-UTRA); Radio Resource Control (RRC); Protocol Specification (Release 13)", Dec. 2015, 507 pages.
3GPP TSG RAN WG1 *85, R1-164013, Samsung, "Framework for Beamformed Access", May 2016, 4 pages.
3GPP TSG RAN WG1 AH_NR Meeting R1-1700612, NTT DOCOMO, Inc., "Discussion on paging design for NR", Jan. 2017, 4 pages.
3GPP TSG RAN WG1 NR Ad Hoc Meeting R1-1700048, Huawei, HiSilicon, "Multi-beam Paging for NR", Jan. 2017, 3 pages.
3GPP TSG-RAN WG2 NR R2-1700016, Samsung, "Paging in NR", Jan. 2017, 5 pages.
A Tutorial on Beam Management for 3GPP NR at mmWave Frequencies by Marco Giordani; Michele Palese; Amab Roy; Douglas Castor; Michele Zorzi; Consorzio Futuro Published in: IEEE Communications Surveys & Tutorials (vol. 21, Issue: 1, Firstquarter 2019), Mar. 2019 (Year: 2019).
"Paging reception; 3GPP TSG RAN WG2 NR Ad-Hoc pages.," Intel Corporation, R2-1700345, Jan. 17-19, 2017, pages 4.
S. Goyal, H. Elkotby, R. Pragada and T. Haque, "Reducing the Paging Overhead in Highly Directional Systems," 2021 IEEE 93rd Vehicular Technology Conference (VTC2021-Spring), 2021, pp. 1-7, doi: 10.1109NTC2021-Spring51267.2021.9449048. (Year: 2021).
M. Lauridsen, L. L. Sanchez, D. Laselva and J. Kaikkonen, "Study of Paging Enhancements for UE Energy Saving in 5G New Radio," 2021 IEEE 93rd Vehicular Technology Conference (VTC2021-Spring), 2021, pp. 1-6, doi: 10.1109NTC2021-Spring51267.2021.9448765. (Year: 2021).

* cited by examiner

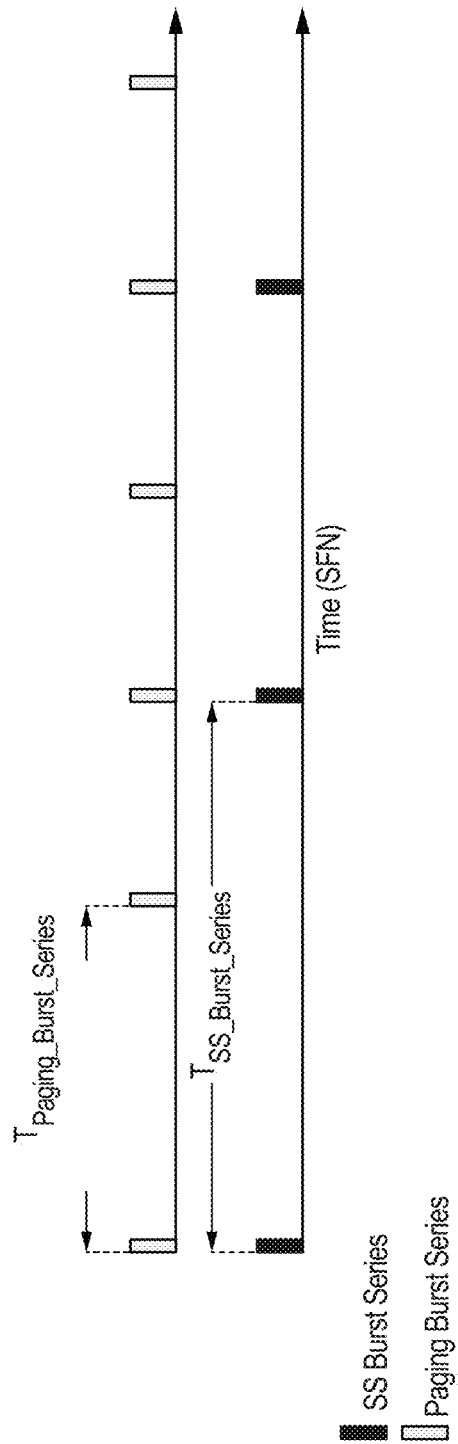

"Round" of Paging Bursts Immediately Follows the "Round" of SS Bursts

"Round" of Paging Bursts is Offset from the "Round" of SS Bursts

■ SS Burst Series
☐ Paging Burst Series

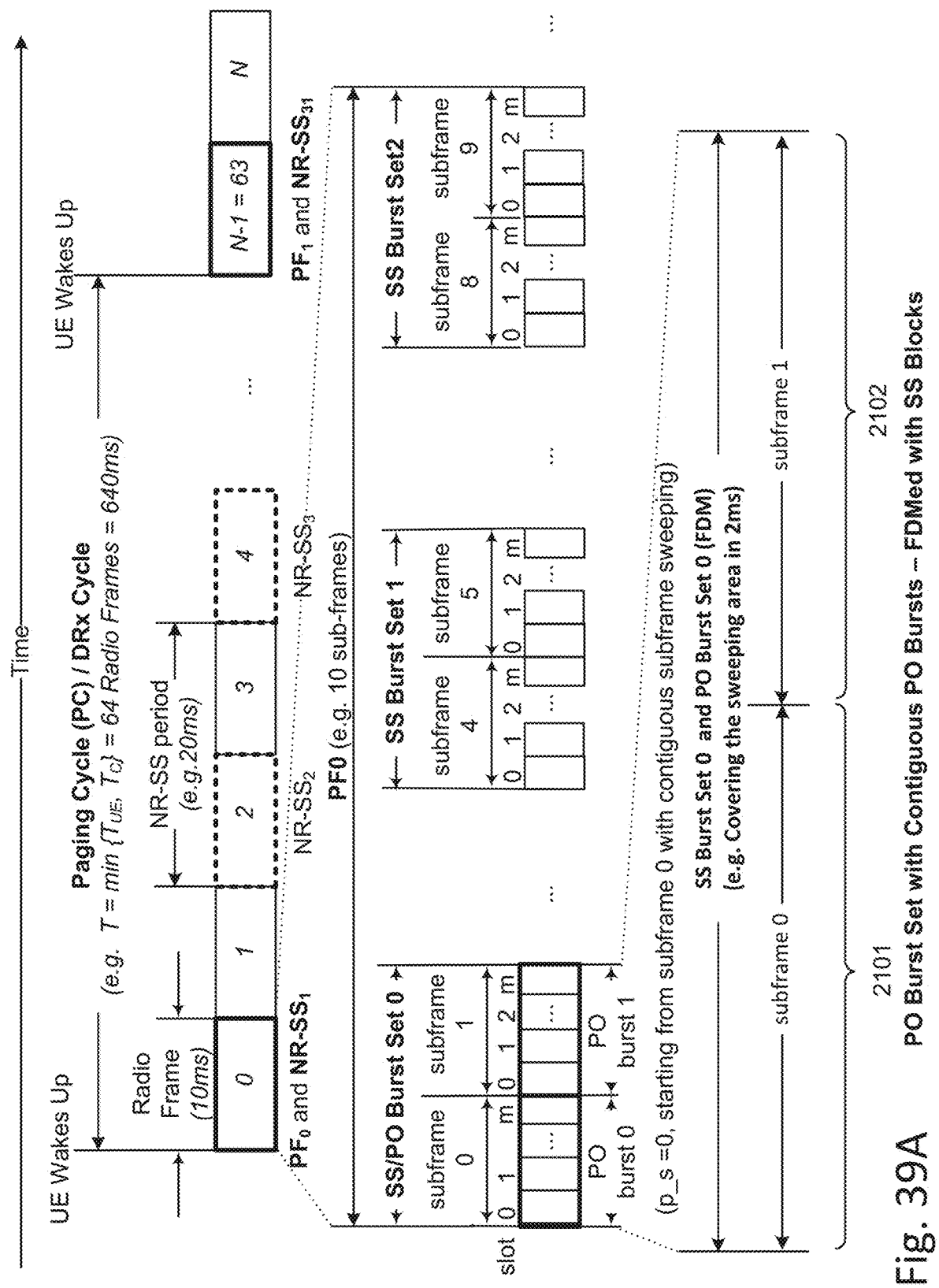
Fig. 39A  PO Burst Set with Contiguous PO Bursts – FDMed with SS Blocks

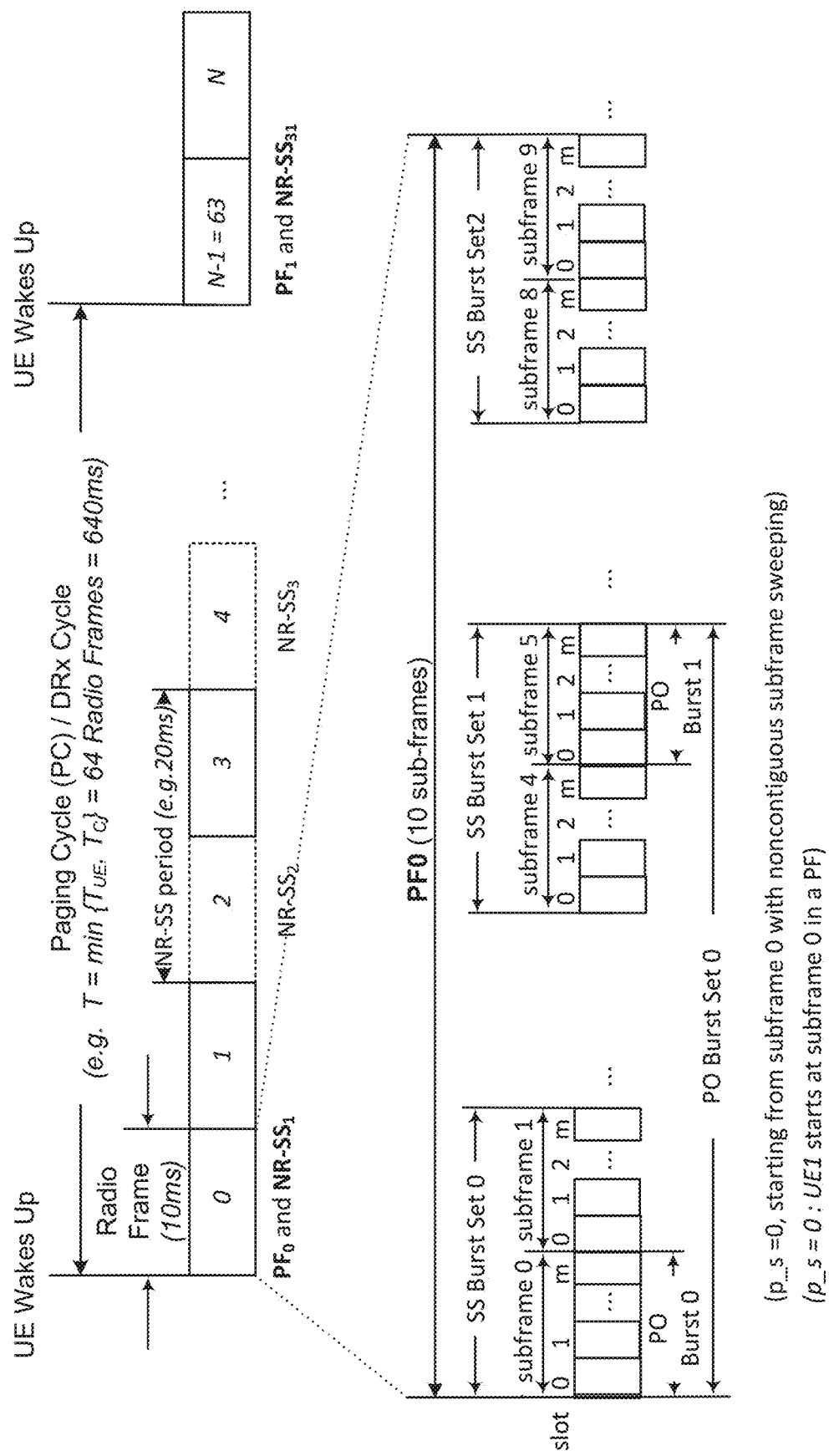
Fig. 39G  PO Burst Set with Noncontiguous PO Bursts

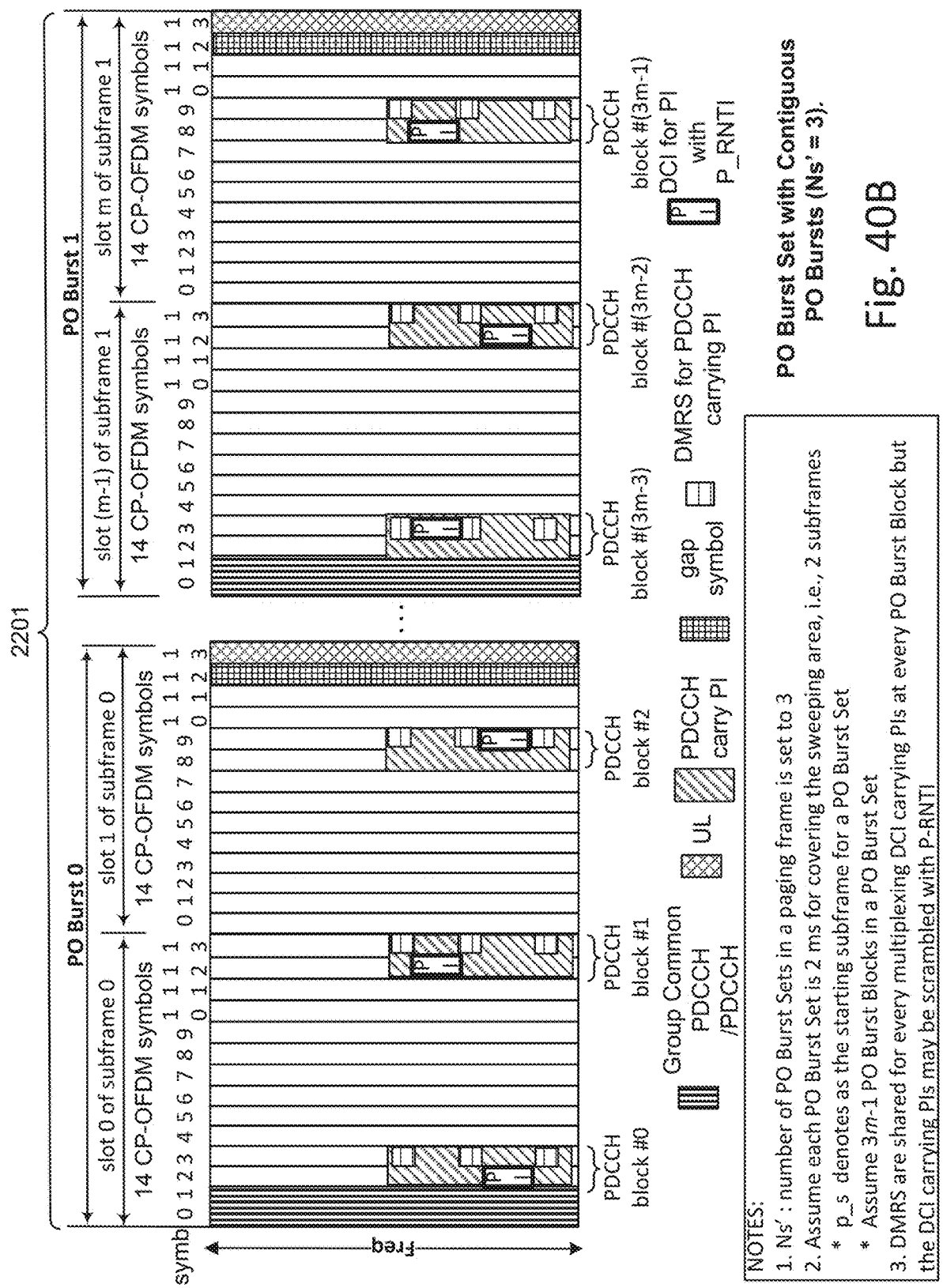

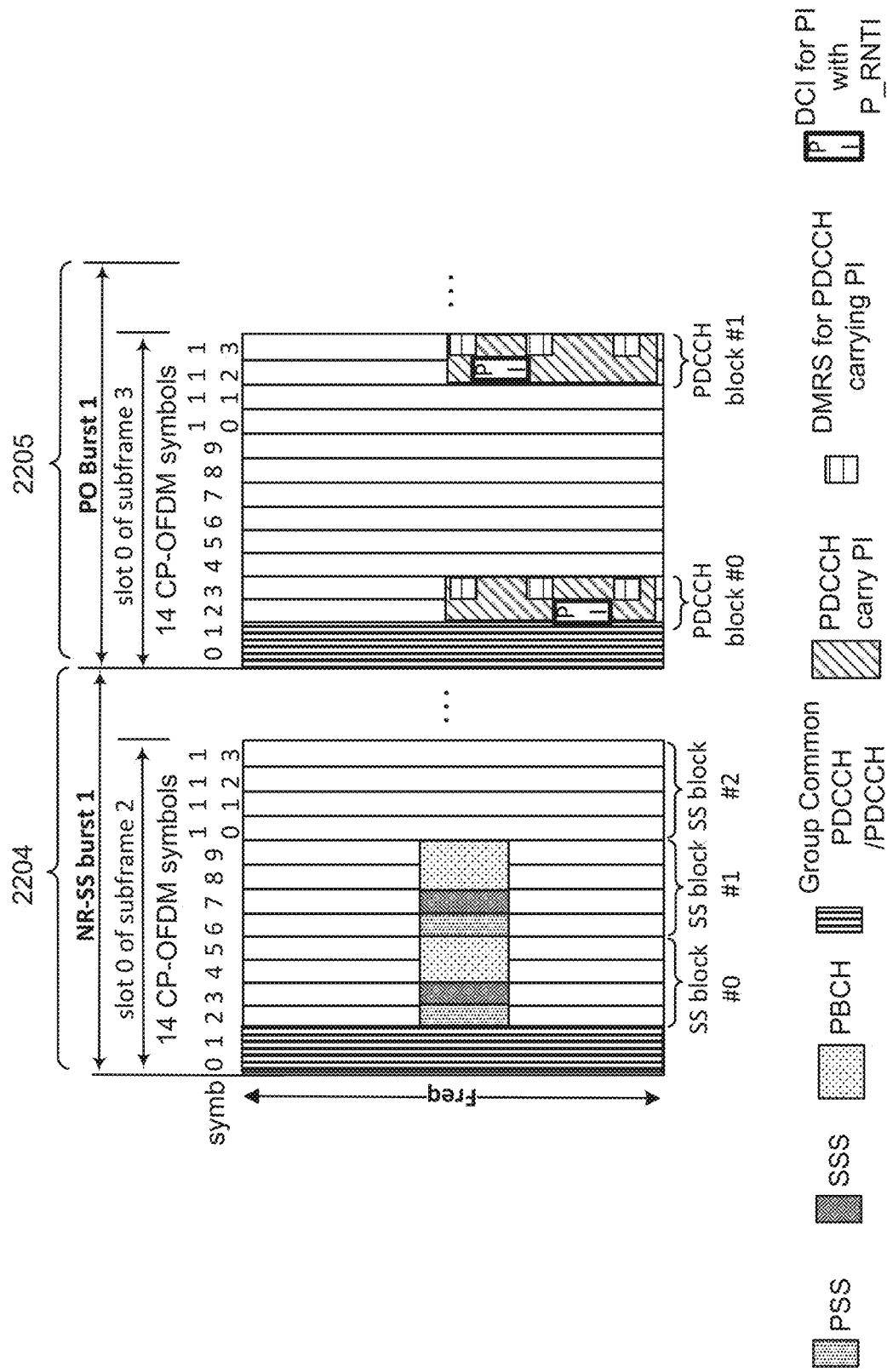
Fig. 40F PO Burst Set with non-contiguous PO Bursts interleaved with non-contiguous NR-SS Bursts.

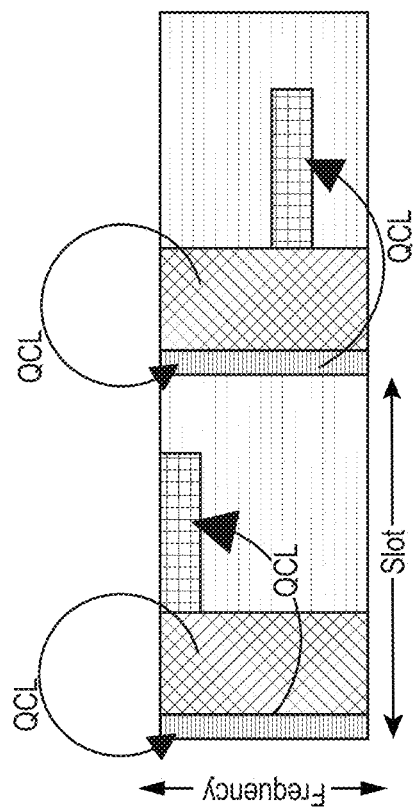
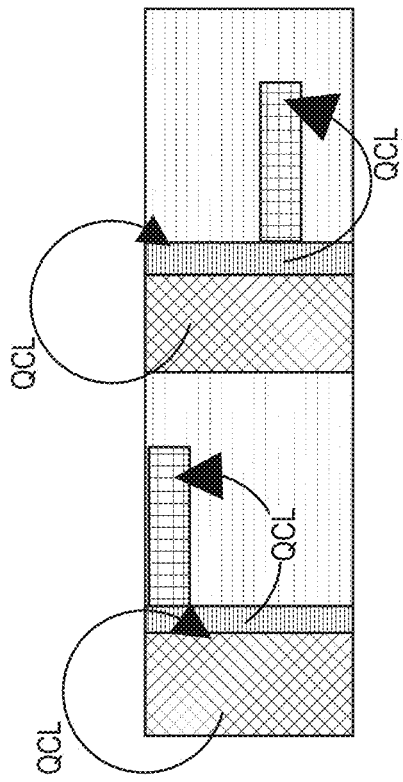
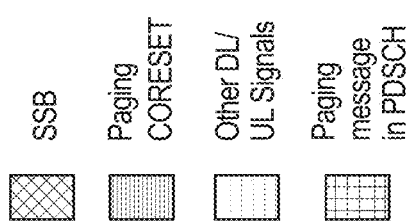
FIG. 41A
FIG. 41B

Interleaved NR-SS blocks with FDM/SDMed PO Bursts.

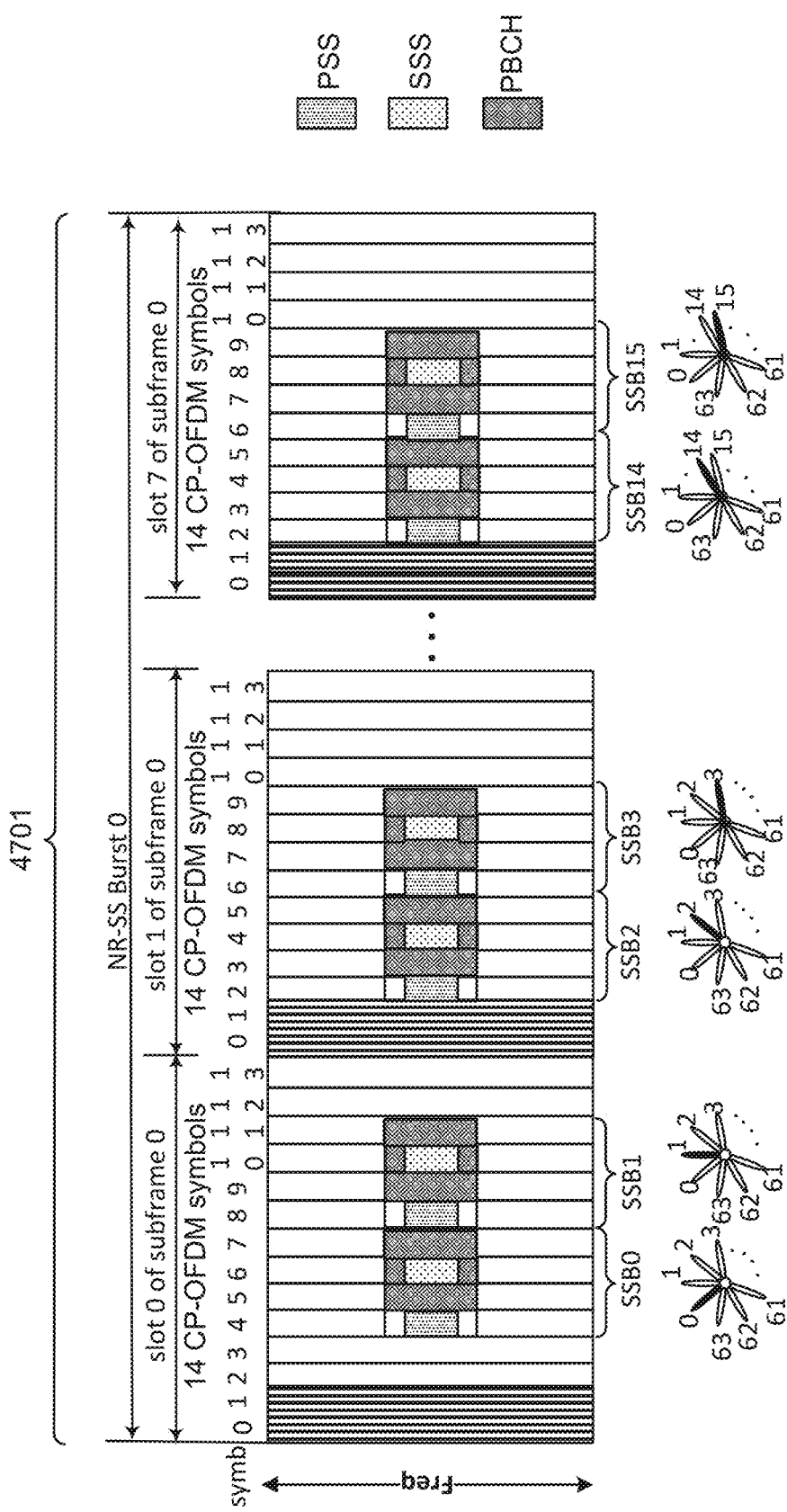
Fig. 46B Interleaved NR-SS blocks with FDM/SDMed PO Bursts.

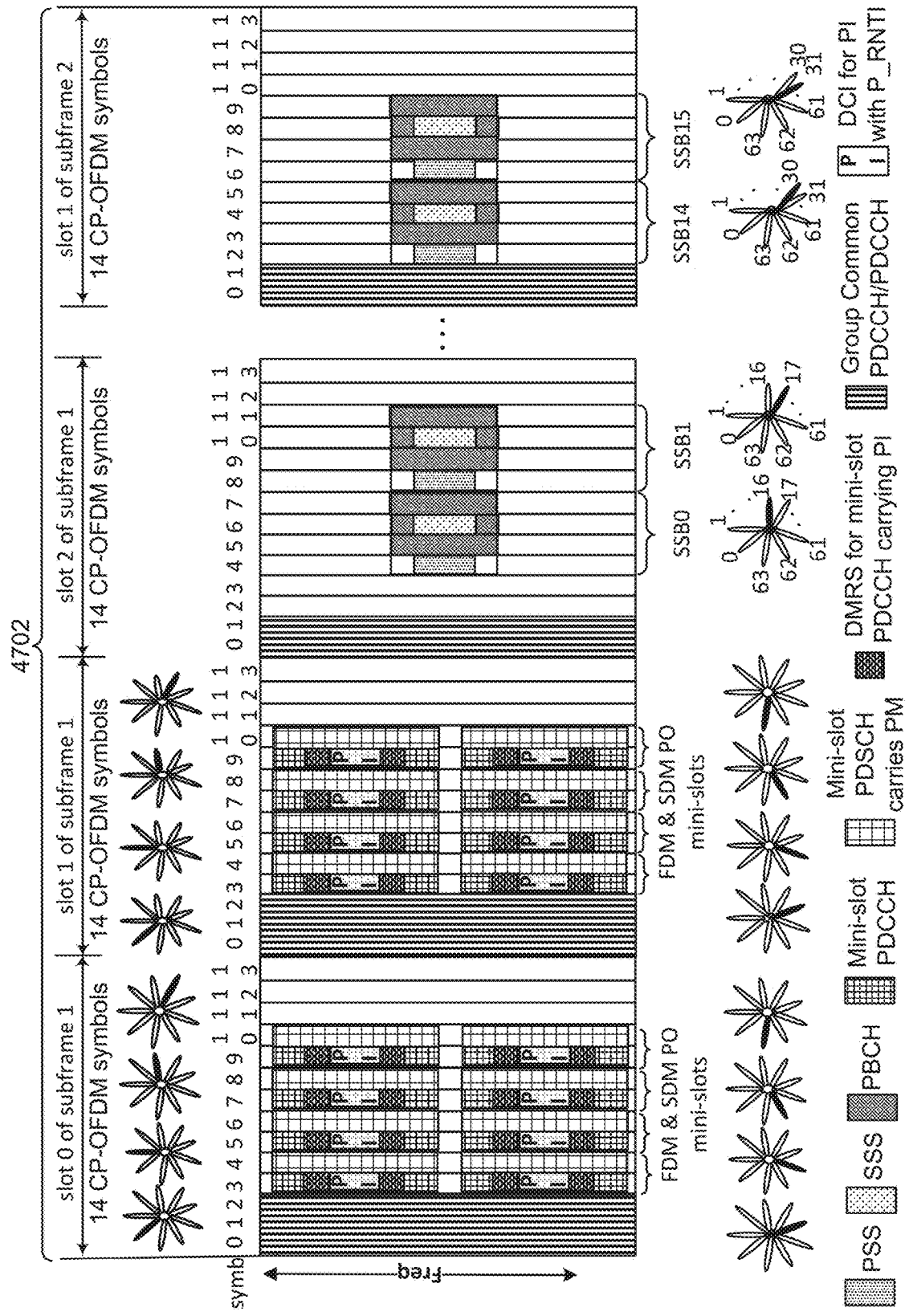
Fig. 46C Interleaved NR-SS blocks with FDM/SDMed PO Bursts.

Interleaved NR-SS blocks with non-SDMed PO Bursts.

Interleaved NR-SS blocks with non-SDMed PO Bursts.

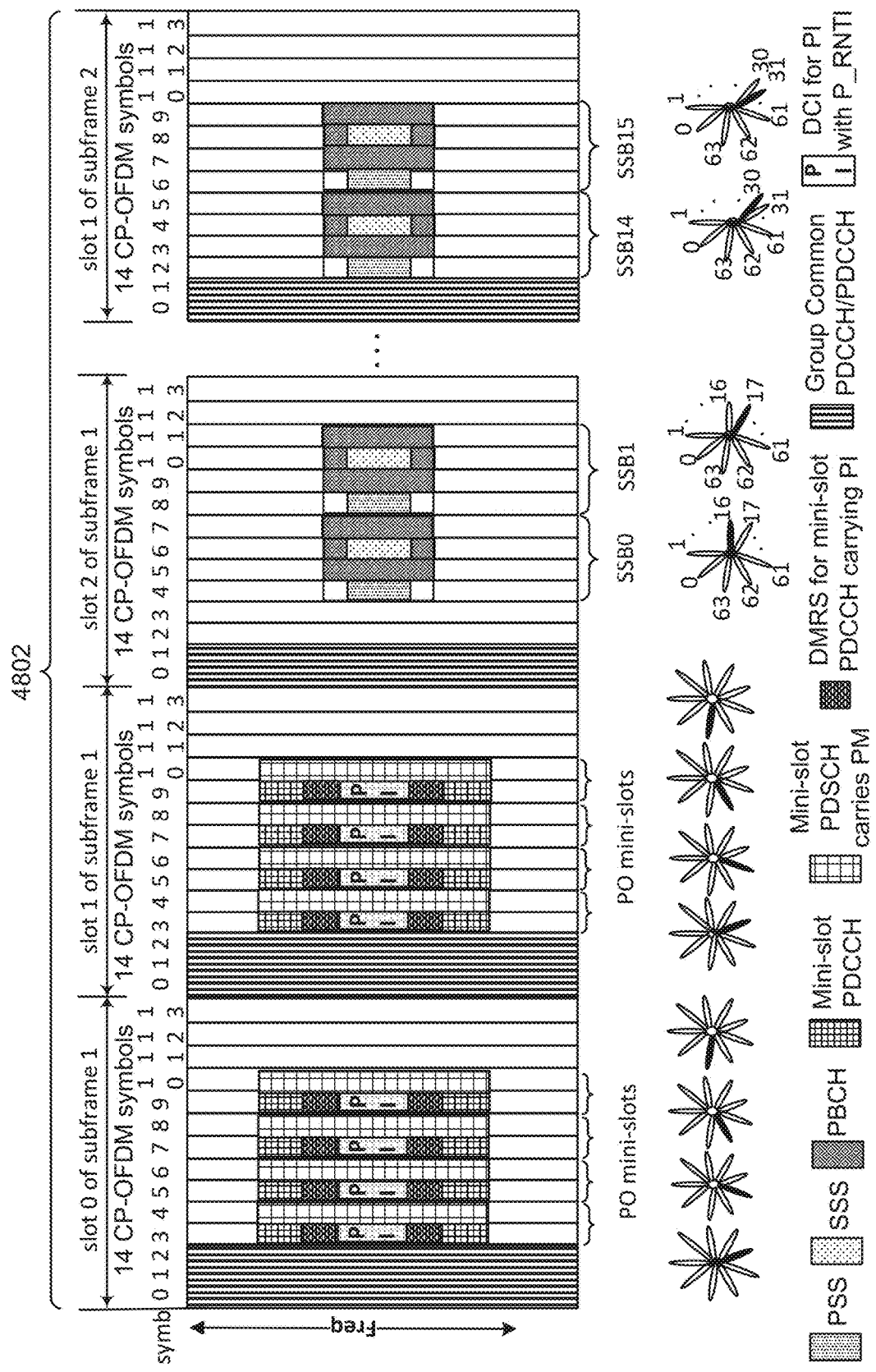
Fig. 47C  Interleaved NR-SS blocks with non-SDMed PO Bursts.

SS blocks are FDMed with PO Busrst blocks.

SS blocks are FDMed with PO Busrst blocks.

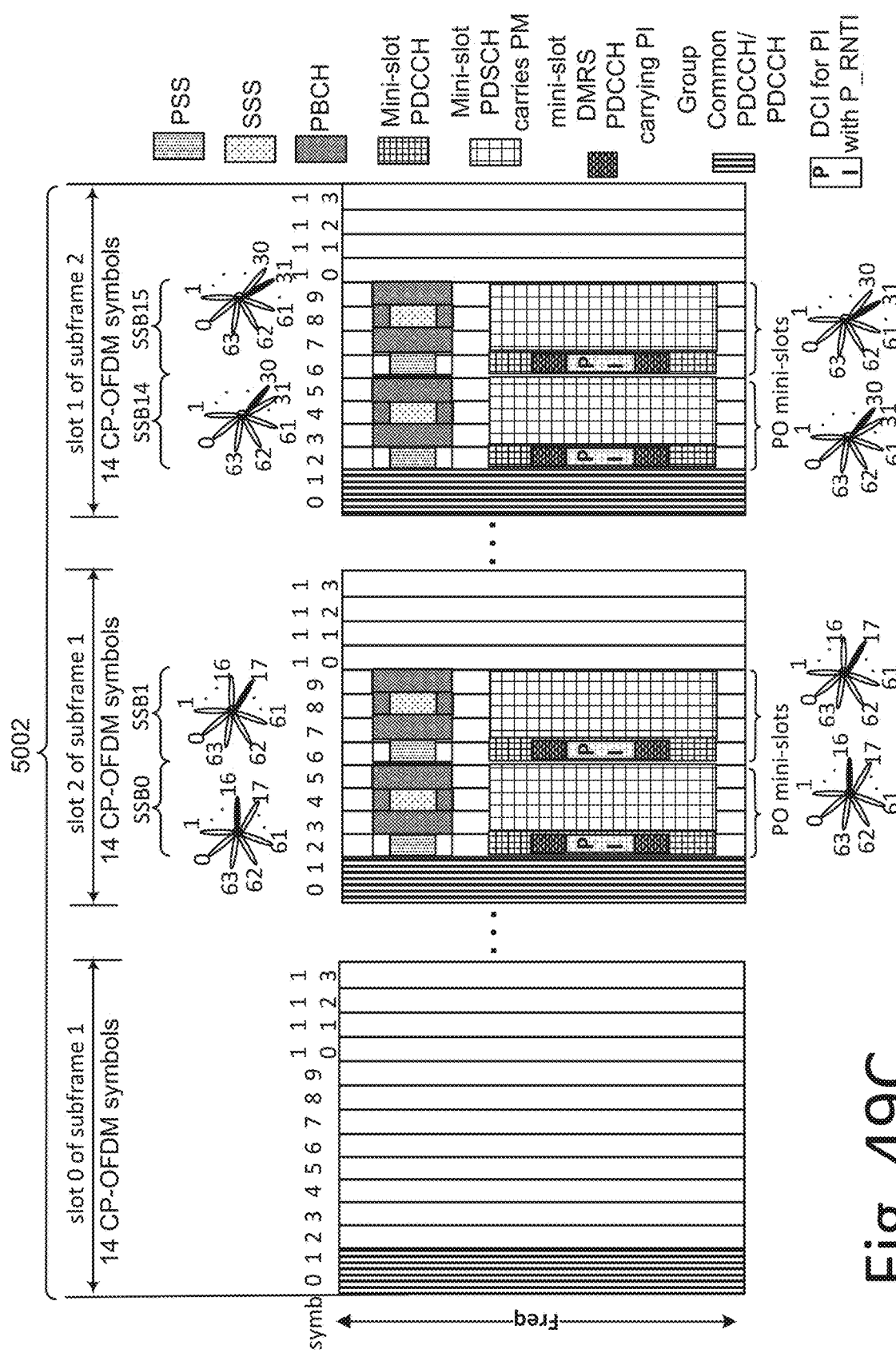

| | |
|---|---|
| UE Identity | Oct 1 |
| UE Identity | Oct 2 |
| UE Identity | Oct 3 |
| UE Identity | Oct 4 |
| UE Identity | Oct 5 |
| UE Identity | Oct 6 |
| Timing advance Command | Oct 7 |
| Timing advance Command \| C-RNTI | Oct 8 |
| C-RNTI | Oct 9 |
| Timing advance Command \| UL Grant | Oct 10 |
| UL Grant | Oct 11 |

FIG. 61

| Preamble | UE IDs |
|---|---|
| 0 (PRACH$_0$) | $b_{N-1}, b_{N-2}, \ldots b_2, 0, 0$ |
| 1 (PRACH$_1$) | $b_{N-1}, b_{N-2}, \ldots b_2, 0, 1$ |
| 2 (PRACH$_2$) | $b_{N-1}, b_{N-2}, \ldots b_2, 1, 0$ |
| 3 (PRACH$_3$) | $b_{N-1}, b_{N-2}, \ldots b_2, 1, 1$ |

| Preamble | UE IDs |
|---|---|
| 0 (PRACH$_0$) | $b_{N-1}, b_{N-2}, \ldots, 0, 0, b_1, b_0$ |
| 1 (PRACH$_1$) | $b_{N-1}, b_{N-2}, \ldots, 0, 1, b_1, b_0$ |
| 2 (PRACH$_2$) | $b_{N-1}, b_{N-2}, \ldots, 1, 0, b_1, b_0$ |
| 3 (PRACH$_3$) | $b_{N-1}, b_{N-2}, \ldots, 1, 1, b_1, b_0$ |

FIG. 65

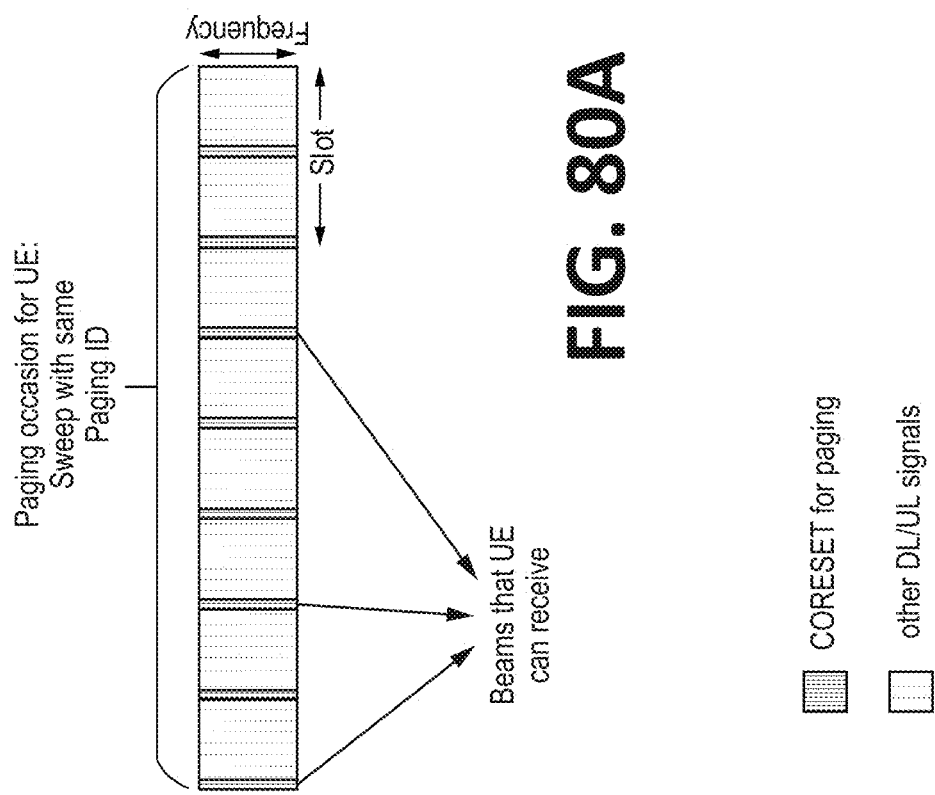

APPARATUSES FOR TRANSMISSION OF PAGING BLOCKS IN SWEPT DOWNLINK BEAMS

CROSS-REFERENCE TO RELATED APPLICATIONS

This application is a continuation of U.S. application Ser. No. 17/224,195, filed Apr. 7, 2021, which is a continuation of U.S. patent application Ser. No. 16/482,022, filed Jul. 30, 2019 (now U.S. Pat. No. 11,012,974), which is the National Stage Application of International Patent Application No. PCT/US2018/016653, filed Feb. 2, 2018, which claims the benefit of U.S. Provisional Patent Application No. 62/453,880, filed Feb. 2, 2017, U.S. Provisional Patent Application No. 62/501,547, filed May 4, 2017, U.S. Provisional Patent Application No. 62/564,476, filed Sep. 28, 2017 and U.S. Provisional Patent Application No. 62/586,552, filed Nov. 15, 2017, the disclosures of each are hereby incorporated by reference as if set forth in their entireties herein.

BACKGROUND

New Radio (NR) may adopt mechanisms similar to that in LTE for paging. Triggered mechanisms that allow user equipment (UE) to assist paging by responding to a broadcast or multicast paging indication may be used to reduce the extent of paging sweeps and control/message overhead.

SUMMARY

Paging in New Radio (NR) systems between UE, gNB, or TRP nodes, for example, may be achieved via various methods implemented on or across the PHY, MAC, and RRC layers. NR channel designs may incorporate a synchronization signal (SS) burst series frame structure. The SS burst series may be used for the transmission of synchronization signals in the NR network. Higher layer channels may be mapped to the physical channels transmitted during an SS block.

An NR paging burst series frame structure may be used for the transmission of paging messages in an NR network, e.g., in a discontinuous reception (DRX) framework for paging.

An NR physical common control channel configuration information element (PCCH-Config IE) may be used to signal the paging configuration as part of the System Information.

Paging may be enabled in a multi-beam and multi-BWP deployments without User Equipment (UE) assistance, for example, via appropriate design of paging CORESETs and their QCL relations to SSB.

Paging may also operate with UE assistance in providing beam or other information to a gNB. For example, a paging indication may trigger a UE to respond with a preamble transmission. The gNB may transmit the paging message on beams and BWPs where the preamble is received.

P-RNTI and PI-RNTI configuration may be used in paging CORESETs and paging occasions, and RACH preamble based grouping methods may be used for reducing signaling load in the cell, and for paging CORESET and paging message configuration.

A compressed UE ID may be transmitted to reduce the overhead in transmitting the paging message over multiple beams and BWPs. Multiple paging indices per UE may be used to reduce the signaling overhead further.

Non-UE assisted and UE assisted paging procedures may coexist on a network, whereby the type of paging (UE assisted/non-UE assisted) is provided through SI configuration or identification through RNTIs.

A UE may receive the same paging message from multiple beams or BWPs, e.g., using multiple preamble transmissions and single preamble transmission through low latency or high signal quality beam/BWP.

Group based paging may be implemented g, e.g., where Multiple Paging DCI or paging indication DCI may be defined in the system. A UE may map to one of the paging groups whose RNTI it monitors for its paging. This may reduce false alerts and excessive signaling in the system.

PBWP (paging BWP) for UEs may be used to enable monitoring for paging within default BWPs.

A flexible paging burst series structure that may be used to enable paging of UEs.

UEs may signal paging assistance information to the network via an RRC paging assistance message that indicates the paging blocks a UE will monitor or prefers to monitor for paging. Similarly, a MAC Control Element (CE) that may be used to indicate the paging blocks a UE will monitor or prefers to monitor for paging. Paging assistance may be signaled to the network using a random access procedure with a reserved preamble.

An NR Paging Message may be used to page a UE using a CN or RAN UE identity.

BRIEF DESCRIPTION OF THE FIGURES

The following detailed description is better understood when read in conjunction with the appended drawings. For the purposes of illustration, examples are shown in the drawings. However, the subject matter is not limited to specific elements and instrumentalities disclosed.

FIGS. 16A to 16C illustrate an example of multiplexed SS blocks and paging blocks.

FIGS. 39A to 39G illustrate an exemplary PO Burst Set with SS Bursts.

FIGS. 40A to 40F illustrate an exemplary PO Burst Set without SS Bursts.

FIG. 41A shows example Multiplexing and QCL between paging DCI/message and SSBs TDM with paging CORESET leading the SSB.

FIG. 41B shows example Multiplexing and QCL between paging DCI/message and SSBs TDM with paging CORESET following SSB.

FIGS. 46A to 46C illustrates one of the possible options of interleaved NR-SS blocks with Frequency Division Multiplexing (FDM) or Space Division Multiplexing (SDM) PO Bursts FIGS. 47A to 47C illustrate one of the possible options of interleaved NR-SS blocks with PO Busts that are not Space Division Multiplexed (SDM-ed).

FIGS. 49A to 49C illustrate SS blocks Frequency Division Multiplexed (FDM-ed) with PO Bursts blocks.

FIG. 61 shows an example configuration of a MAC PDU in response to preamble transmission from a paged UE.

FIG. 65 shows an example paging preamble configuration and time variable mapping of UEs for L=2.

FIG. 80A shows an example UE receiving multiple paging indication/paging message DCIs in multi-beam configuration.

DETAILED DESCRIPTION

Figure 1A:
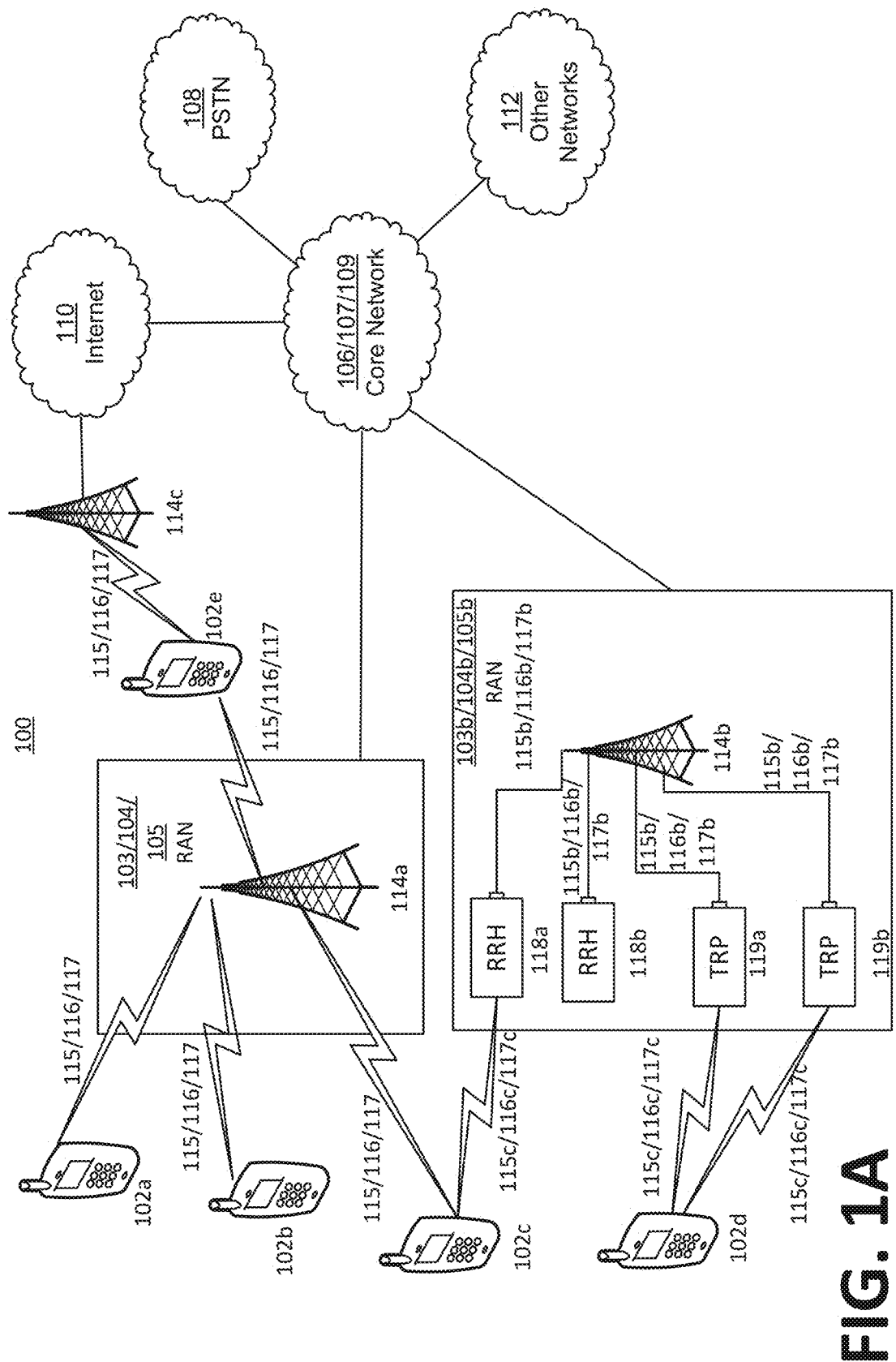
FIG. 1A illustrates an example communications system.

For future deployment of 5G the following issues/problems should be considered. With regard to the first problem, in light of the anticipated deployment of 5G in high frequency range, achieving paging coverage comparable to that of LTE will be an issue. There may be issues if beam based cell architecture paging and single frequency network (SFN) paging is considered for 5G. One problem to address in this context is therefore the design of paging schemes that is as efficient as LTE paging scheme in terms of radio resources usage for the same level of paging coverage. For example, considering a beam-based cell architecture, how to achieve the same level of paging coverage in that cell as in LTE with a comparable level of radio resource (frequency/time) usage.

With regard to a second problem, RAN2 has agreed that a UE in INACTIVE is reachable via RAN-initiated notification and CN-initiated Paging. The paging procedure and paging occasions need to be designed to allow paging of the inactive state UEs by both the RAN and the core network while avoiding or minimizing negative impacts on UE power consumption. For example, if the UE has to monitor a set of paging occasions for RAN level paging, and a completely different set of paging occasions for CN level paging, then there will be negative impact to UE power consumption. Therefore, there is a need to design solution(s) such that RAN and CN paging occasions overlap and the same paging/notification mechanism are used.

TABLE 1

| | Abbreviations |
|---|---|
| A/N | Ack/Nack |
| ARQ | Automatic Repeat Request |
| AS | Access Stratum |
| BCCH | Broadcast Control Channel |
| BCH | Broadcast Channel |
| BWP | Bandwidth Part |
| BWPTG | Bandwidth Part Tracking Group |
| CB | Code Block |
| CMAS | Commercial Mobile Alert System |
| CP | Cyclic Prefix |
| CRC | Cyclic Redundancy Check |
| C-RNTI | Cell Radio-Network Temporary Identifier |
| DL | Downlink |

TABLE 1-continued

Abbreviations

| | |
|---|---|
| DL-SCH | Downlink Shared Channel |
| DRX | Discontinuous Reception |
| EAB | Extended Access Barring |
| eMBB | enhanced Mobile Broadband |
| eNB | Evolved Node B |
| ETWS | Earthquake and Tsunami Warning System |
| E-UTRA | Evolved Universal Terrestrial Radio Access |
| E-UTRAN | Evolved Universal Terrestrial Radio Access Network |
| FDD | Frequency Division Duplex |
| FFS | For Further Study |
| GERAN | GSM EDGE Radio Access Network |
| GSM | Global System for Mobile communications |
| HARQ | Hybrid ARQ |
| HF-NR | High Frequency-New Radio |
| HNB | Home eNB |
| IE | Information Element |
| KPI | Key Performance Indicators |
| LTE | Long term Evolution |
| MAC | Medium Access Control |
| MBMS | Multimedia Broadcast Multicast Service |
| MCL | Maximum Coupling Loss |
| MIB | Master Information Block |
| mMTC | Massive Machine Type Communication |
| MTC | Machine-Type Communications |
| NAS | Non-access Stratum |
| NR | New Radio |
| OFDM | Orthogonal Frequency Division Multiplexing |
| PBCH | Physical Broadcast Channel |
| PBWP | Paging Bandwidth Part |
| PC | Paging Cycle |
| PCCH | Physical Common Control Channel |
| PDCCH | Physical Downlink Control Channel |
| PDSCH | Physical Downlink Shared Data Channel |
| PF | Paging Frame |
| PHY | Physical Layer |
| PO | Paging Occasion |
| PRACH | Physical Random Access Channel |
| PRB | Physical Resource Block |
| P-RNTI | Paging Radio-Network Temporary Identifier |
| PUCCH | Physical Uplink Control Channel |
| PUSCH | Physical Uplink Shared Channel |
| QoS | Quality of Service |
| RACH | Random Access Channel |
| RAN | Radio Access Network |
| RAR | Random Access Response |
| RAT | Radio Access Technology |
| RB | Resource block |
| RE | Resource Element |
| RNTI | Radio Network Temporary Identifier |
| RRC | Radio Resource Control |
| RV | Redundancy Version |
| SAI | Service Area Identities |
| SC-PTM | Single Cell Point to Multipoint |
| SCS | Subcarrier Spacing |
| SFN | System Frame Number |
| SI | System Information |
| SIB | System Information Block |
| SI-RNTI | System Information RNTI |
| SMARTER | Feasibility Study on New Services and Markets Technology |
| SPS-RNTI | Semi persistent scheduling RNTI |
| SR | Scheduling Request |
| sTAG | Secondary Timing Advance Group |
| TB | Transport Block |
| TBS | Transport Block Size |
| TDD | Time Division Duplex |
| TRP | Transmission and Reception Point |
| TTI | Transmission Time Interval |
| UE | User Equipment |
| UL | Uplink |
| UL-SCH | Uplink Shared Channel |
| URLLC | Ultra-Reliable and Low Latency Communications |
| UTC | Coordinated Universal Time |
| UTRAN | Universal Terrestrial Radio Access Network |

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 1A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d*, 102*e* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103*b*/104*b*/105*b* or a different RAT.

Some or all of the WTRUs 102*a*, 102*b*, 102*c*, 102*d* in the communications system 100 may include multi-mode capabilities, e.g., the WTRUs 102*a*, 102*b*, 102*c*, 102*d*, and 102*e* may include multiple transceivers for communicating with different wireless networks over different wireless links. For example, the WTRU 102*e* shown in FIG. 1A may be configured to communicate with the base station 114*a*, which may employ a cellular-based radio technology, and with the base station 114*c*, which may employ an IEEE 802 radio technology.

Figure 1B:
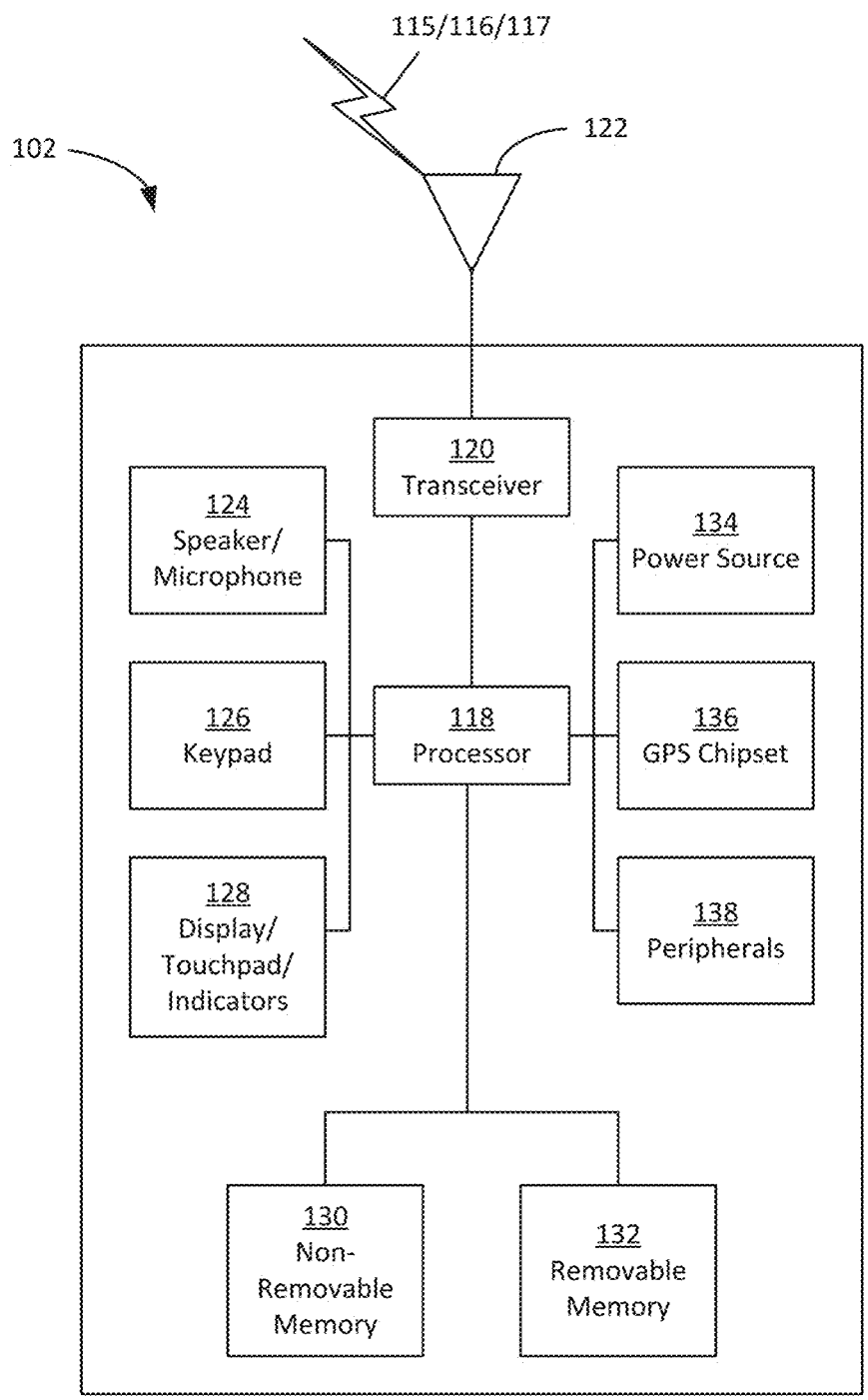
FIG. 1B is a block diagram of an example apparatus or device configured for wireless communications such as, for example, a wireless transmit/receive unit (WTRU).

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in an embodiment, the transmit/receive element 122 may be an antenna configured to transmit and/or receive RF signals. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102*a*, 102*b*, 102*c*, 102*d* in the communications system 100 may include multi-mode capabilities, e.g., the WTRUs 102*a*, 102*b*, 102*c*, and 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. The WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
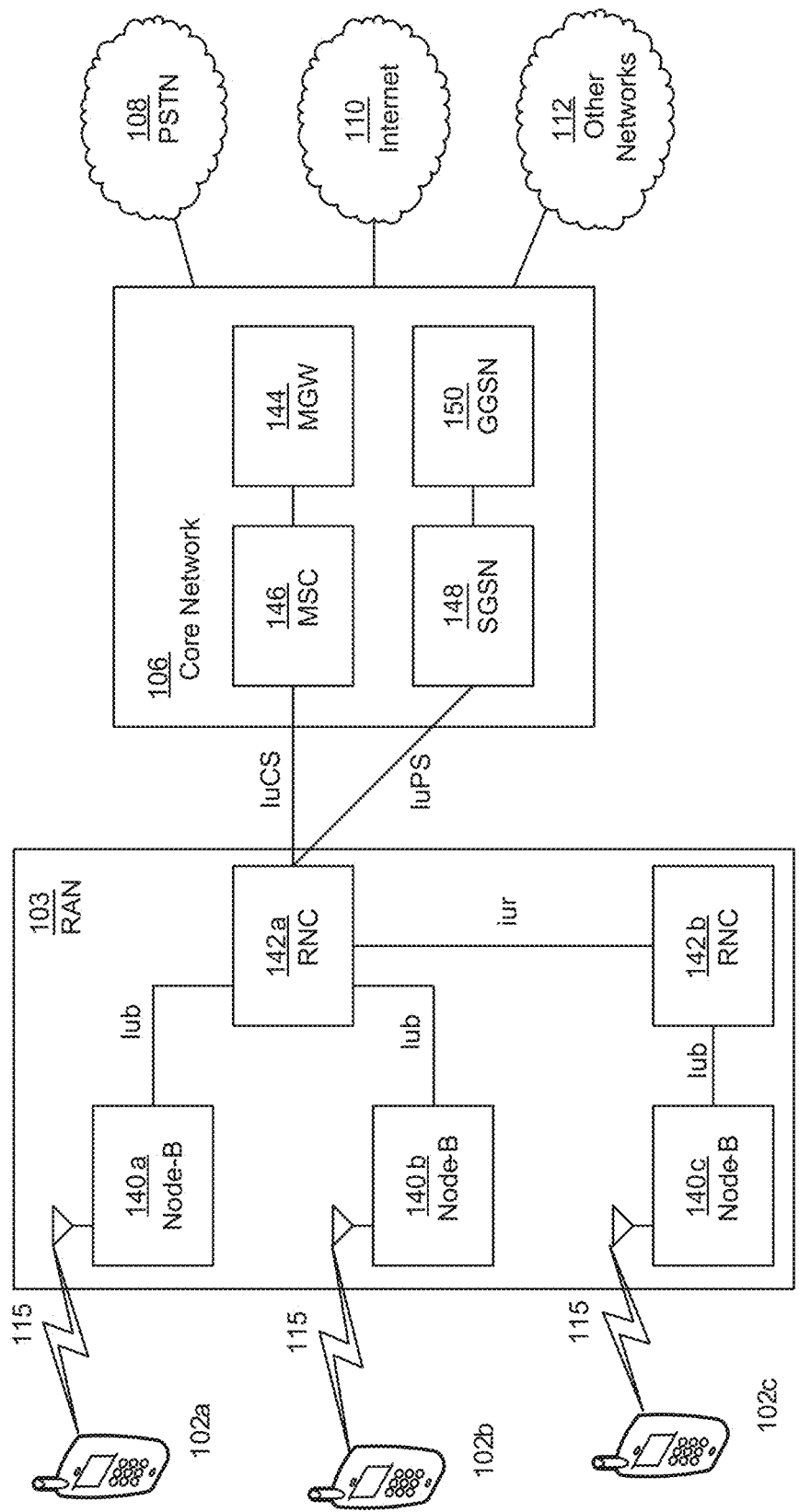
FIG. 1C is a system diagram of a first example radio access network (RAN) and core network.

FIG. 1C is a system diagram of the RAN 103 and the core network 106 according to an embodiment. The RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

The core network 106 may also be connected to the networks 112, which may include other wired or wireless networks that are owned and/or operated by other service providers.

Figure 1D:
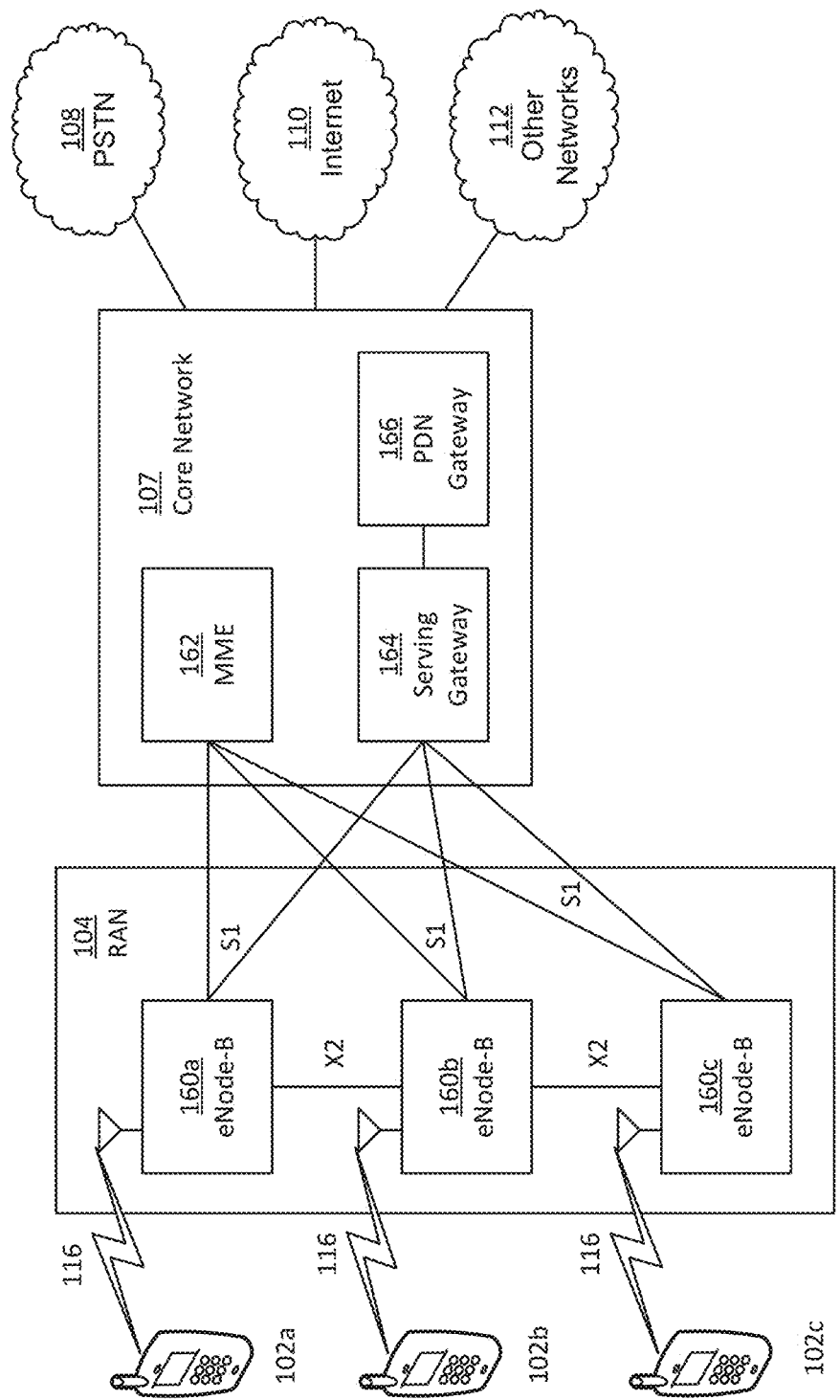
FIG. 1D is a system diagram of a second example radio access network (RAN) and core network.

FIG. 1D is a system diagram of the RAN 104 and the core network 107 according to an embodiment. The RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
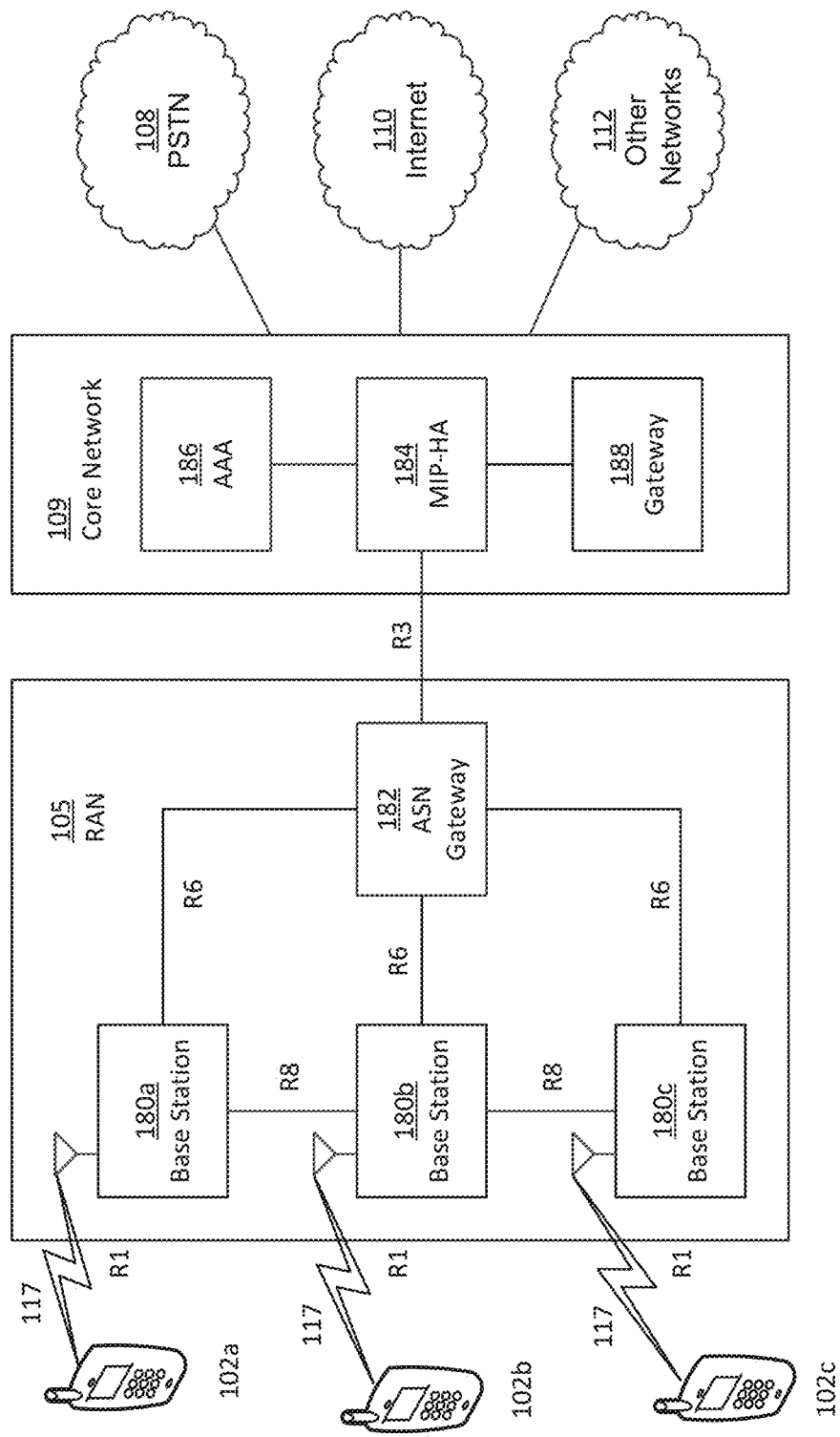
FIG. 1E is a system diagram of a third example radio access network (RAN) and core network.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. The communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
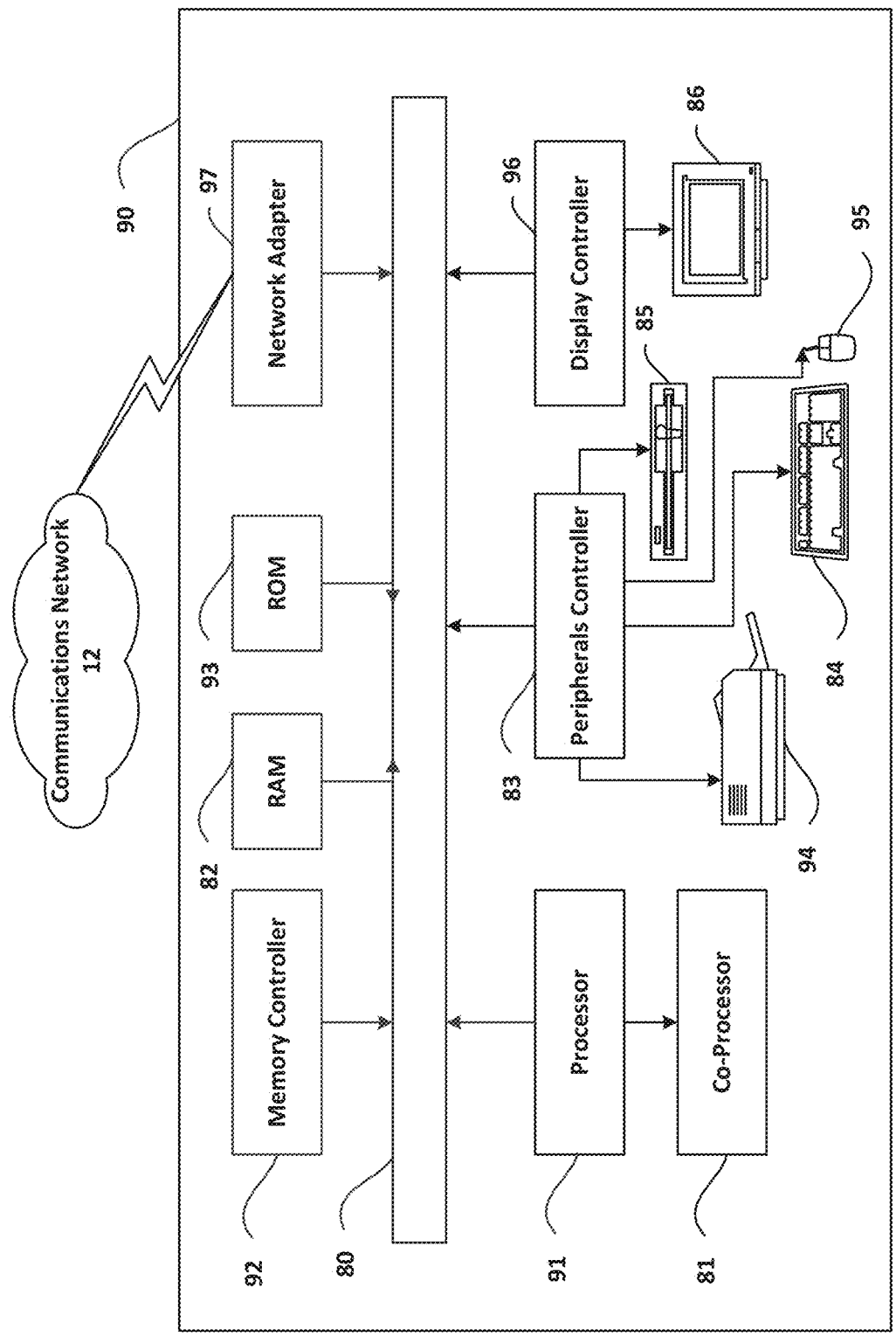
FIG. 1F is a block diagram of an example computing system in which one or more apparatuses of communications networks may be embodied, such as certain nodes or functional entities in the RAN, core network, public switched telephone network (PSTN), Internet, or other networks.

FIG. 1F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

Figure 2:
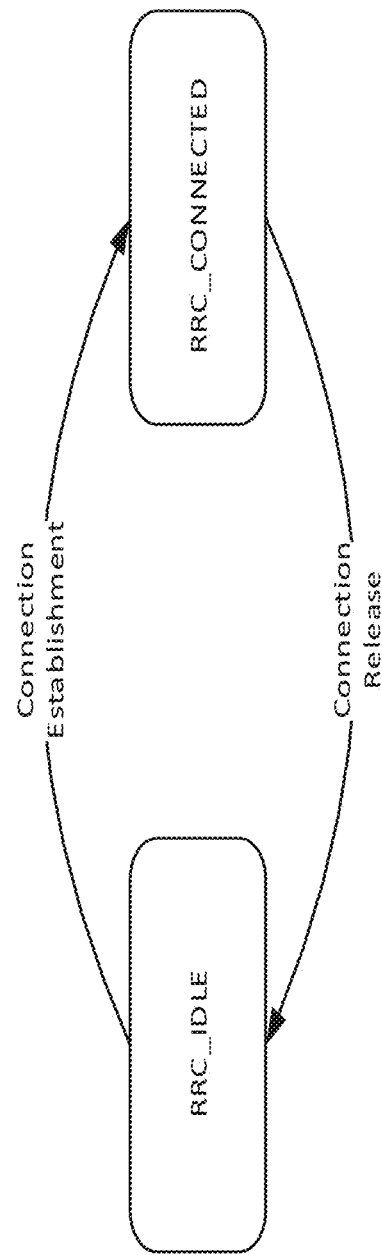
FIG. 2 illustrates an example RRC protocol state machine.

In LTE, a terminal can be in two different states, as shown in FIG. 2, RRC_CONNECTED and RRC_IDLE. See 3GPP TS 36.331, Radio Resource Control (RRC); Protocol specification (Release 13), V13.0.0.

In the RRC_CONNECTED state, there is a Radio Resource Control (RRC) context. The cell to which the User Equipment (UE) belongs is known and an identity of the UE, the Cell Radio-Network Temporary Identifier (C-RNTI), used for signaling purposes between the UE and the network, has been configured. RRC_CONNECTED is intended for data transfer to/from the UE.

In the RRC_IDLE state, there is no RRC context in the Radio Access Network (RAN) and the UE does not belong to a specific cell. No data transfer may take place in RRC_IDLE. A UE in RRC_IDLE monitors a Paging channel to detect incoming calls and changes to the system information. Discontinuous Reception (DRX) is used in to conserve UE power. When moving to RRC_CONNECTED the RRC context needs to be established in both the RAN and the UE.

System Information (SI) is the information broadcast by the Evolved Universal Terrestrial Radio Access Network (E-UTRAN) that needs to be acquired by the UE to be able to access and operate within the network. SI is divided into the MasterInformationBlock (MIB) and a number of SystemInformationBlocks (SIBs). A high level description of the MIB and SIBs is provided in 3GPP TS 36.300 Overall description; Stage 2 (Release 13), V13.3.0. Detailed descriptions are available in 3GPP TS 36.331.

The paging configuration in the system is specified in the PCCH-Config field of the RadioResourceConfigCommon IE of SIB2.

Code Example 1

| Code Example 1 |
| --- |
| PCCH-Config |

```
-- ASN1START
PCCH-Config ::=           SEQUENCE {
    defaultPagingCycle        ENUMERATED {
                                rf32, rf64, rf128, rf256},
    nB                        ENUMERATED {
                                fourT, twoT, oneT, halfT, quarterT,
                                oneEighthT, oneSixteenthT,
                                oneThirtySecondT}
}
-- ASN1STOP
```

TABLE 2

PCCH-Config Field Descriptions

| | |
| --- | --- |
| defaultPagingCycle | Default paging cycle, used to derive 'T' in TS 36.304, User Equipment (UE) procedures in idle mode (Release 13), V13.0.0. Value rf32 corresponds to 32 radio frames, rf64 corresponds to 64 radio frames and so on. |
| nB | nB is used as one of parameters to derive the Paging Frame and Paging Occasion according to TS 36.304. Value in multiples of 'T' as defined in TS 36.304. A value of fourT corresponds to 4 * T, a value of twoT corresponds to 2 * T and so on. |

Paging and Paging Frameworks

In LTE, the UE procedure for paging can be divided into the following four high level steps. In Step 1, the UE selects a paging frame. In Step 2, the UE selects a subframe or paging occasion within the paging frame. In Step 3, the UE attempts to receive paging message in the paging occasion. In Step 4, the UE sleeps during the DRX Cycle except for the paging occasion.

A UE may, for example periodically, monitor a PDCCH for a DL control information (DCI) or DL assignment on a PDCCH masked with a P-RNTI (Paging RNTI), for example in Idle Mode and/or in Connected Mode. When a UE detects or receives a DCI or DL assignment using a P-RNTI, the UE may demodulate the associated or indicated PDSCH RBs and/or may decode a Paging Channel (PCH) that may be carried on an associated or indicated PDSCH. A PDSCH which may carry PCH may be referred to as a PCH PDSCH. Paging, paging message, and PCH may be used interchangeably.

The Paging Frame (PF) and subframe within that PF, for example, the Paging Occasion (PO) that a UE may monitor for the Paging Channel, for example in Idle Mode, may be determined based on the UE ID (e.g., UE_ID) and parameters which may be specified by the network. The parameters may include the Paging Cycle (PC) length (e.g., in frames) which may be the same as a DRX cycle and another parameter, e.g., nB, which together may enable the determination of the number of PF per PC and the number of PO per PF which may be in the cell. The UE ID may be the UE IMSI mod 1024.

From the network perspective, there may be multiple PFs per paging cycle and multiple POs within a PF, for example, more than one subframe per paging cycle may carry PDCCH masked with a P-RNTI. Additionally, from the UE perspective, a UE may monitor one PO per paging cycle, and such a PO may be determined based on the parameters specified herein, which may be provided to the UE via system information, dedicated signaling information, and the like. POs may include pages for one or more specific UEs, or they may include system information change pages which may be directed to each of the UEs. In Idle Mode, a UE may receive pages for reasons such as an incoming call or system information update changes.

In Idle Mode (e.g., RRC Idle Mode and/or ECM Idle mode) a UE may monitor for or listen to the paging message to know about one or more of incoming calls, system information change, ETWS (Earthquake and Tsunami Warning Service) notification for ETWS capable UEs, CMAS (Commercial Mobile Alert System) notification, Extended Access Barring parameters modification, and perform E-UTRAN inter-frequency redistribution procedure A UE may monitor PDCCH for P-RNTI discontinuously, for example to reduce battery consumption when there may be no pages for the UE. Discontinuous Reception (DRX) may be or include the process of monitoring PDCCH discontinuously. In Idle Mode DRX may be or include the process of monitoring PDCCH discontinuously for P-RNTI, for example to monitor or listen for to paging message during RRC idle state.

Idle mode, Idle State, RRC Idle Mode, RRC Idle state, and RRC_IDLE mode or state may be used interchangeably. RRC Idle and ECM Idle may be used interchangeably. DRX can also be enabled and/or used in Connected Mode. When in Connected Mode, if DRX is configured, the MAC entity may monitor the PDCCH discontinuously, for example using DRX operation. Connected Mode, Connected State, and RRC_CONNECTED mode or state may be used interchangeably.

Idle Mode DRX

A UE may use one or more DRX parameters that may be broadcasted, for example in a system information block (SIB) such as SIB2, to determine the PF and/or PO to monitor for paging. The UE may, e.g., alternatively, use one or more UE specific DRX cycle parameters that may be signaled to the UE, for example by the MME through NAS signaling.

Table 3 provides examples of DRX parameters including example ranges and the example source of the parameter (e.g., eNB or MME).

TABLE 3

Example DRX Cycle Parameters.

| DRX parameter | Notation | Value Range | Configuring Network Node |
|---|---|---|---|
| UE Specific DRX cycle | TUE | 32, 4, 128 and 256 radio frames where each radio frame may be 10 ms | MME, e.g., via NAS signaling |
| Cell specific DRX cycle | TCELL | 32, 4, 128 and 256 radio frames | eNB, e.g., via system information such as SIB2 |
| Number of POs per DRX cycle, e.g., DRX cycle across all users in the cell | nB | 4T, 2T, T, T/2, T/4, T/8, T/16, T/32 where T may be the DRX cycle of the UE, for example, TCELL or the smaller of TUE, if provided, and TCELL | eNB, e.g., via system information such as SIB2 |

The DRX cycle T of the UE may indicate the number of radio frames in the paging cycle. A larger value of T may result in less UE battery power consumption. A smaller the value of T may increase UE battery power consumption. DRX cycle may be cell specific or UE specific.

A DRX cycle provided by the eNB may be cell specific and may be provided to at least some (e.g., all) UEs in a cell. The DRX cycle that may be provided by the eNB may be the default paging cycle. A DRX cycle provided by the MME may be UE specific. The UE may use the smaller of the default paging cycle and the UE specific DRX cycle as its DRX or paging cycle. An MME may provide a UE specific DRX cycle to a UE in NAS signaling, for example as 'UE specific DRX cycle.' An MME may provide a UE specific DRX cycle to an eNB in a PAGING S1 AP message as 'Paging DRX', for example for an MME initiated paging message that may be intended for the UE.

The UE and/or eNB may use the minimum of the default and specific DRX cycle. For example, T=Min (TUE, TCELL) in radio frames. A UE with DRX cycle of N (e.g., 128) radio frames may need to wake up every N×frame time (e.g., 1.28 sec for frame time of 10 ms) and look for a paging message.

The parameter nB may indicate the number of Paging occasions in a cell specific DRX cycle. The parameter may be cell specific. Configuration of the nB value may depend on the paging capacity that may be desired or used in a cell. A larger the value of nB may be used, for example to increase paging capacity. A smaller value of nB may be used, for example for a smaller paging capacity.

The eNB and/or UE may calculate the UE's PFs according to the following relation: PF=SFN mod T=(T div N)* (UE_ID mod N) where N=min (T, nB). The UE specific PO within the PF may be determined from a set of paging subframes. The set may be a function of predefined allowed subframes for paging and/or the number of POs per PF which may be a function of at least nB and/or T. SFN (System Frame Number) may have a range of values such as 0 through 1023. In LTE, the index is pointing to PO from subframe pattern defined in Table 4 and Table 5 is derived from following calculation: i_s=floor(UE ID/N) mod Ns where Ns=max (1,nB/T).

TABLE 4

Subframe Patterns for FDD

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 5

Subframe Patters for TDD (all UL/DL configurations)

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

In LTE, the network initiates the paging procedure by transmitting the Paging message at the UE's paging occasion. The network may address multiple UEs within a Paging message by including one paging record for each UE. Each paging record includes the UE identity and the type of the Core Network (CN) domain e.g., Packet Switch (PS) domain or Circuit Switch (CS) domain.

Figure 3:
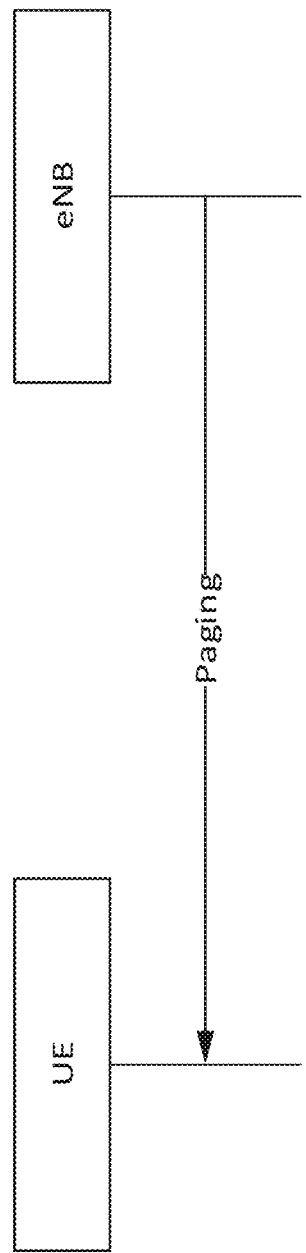
FIG. 3 illustrates an example paging method.

E-UTRAN initiates the paging procedure by transmitting the Paging message at the UE's paging occasion as specified in 3GPP TS 36.304. E-UTRAN may address multiple UEs within a Paging message by including one PagingRecord for each UE. An example paging procedure is shown in FIG. 3.

NR Beamformed Access

Currently, 3GPP standardization's efforts are underway to design the framework for beamformed access. The characteristics of the wireless channel at higher frequencies are significantly different from the sub-6 GHz channel that LTE is currently deployed on. The key challenge of designing the new Radio Access Technology (RAT) for higher frequencies will be in overcoming the larger path-loss at higher frequency bands. In addition to this larger path-loss, the higher frequencies are subject to an unfavorable scattering environment due to blockage caused by poor diffraction. Therefore, MIMO/beamforming is essential in guaranteeing sufficient signal level at the receiver end.

Relying solely on MIMO digital precoding used by digital BF to compensate for the additional path-loss in higher frequencies seems not enough to provide similar coverage as below 6 GHz. Thus, the use of analog beamforming for achieving additional gain can be an alternative in conjunction with digital beamforming. A sufficiently narrow beam should be formed with lots of antenna elements, which is likely to be quite different from the one assumed for the LTE evaluations. For large beamforming gain, the beam-width correspondingly tends to be reduced, and hence the beam with the large directional antenna gain cannot cover the whole horizontal sector area specifically in a 3-sector configuration. The limiting factors of the number of concurrent high gain beams include the cost and complexity of the transceiver architecture.

Figure 4:
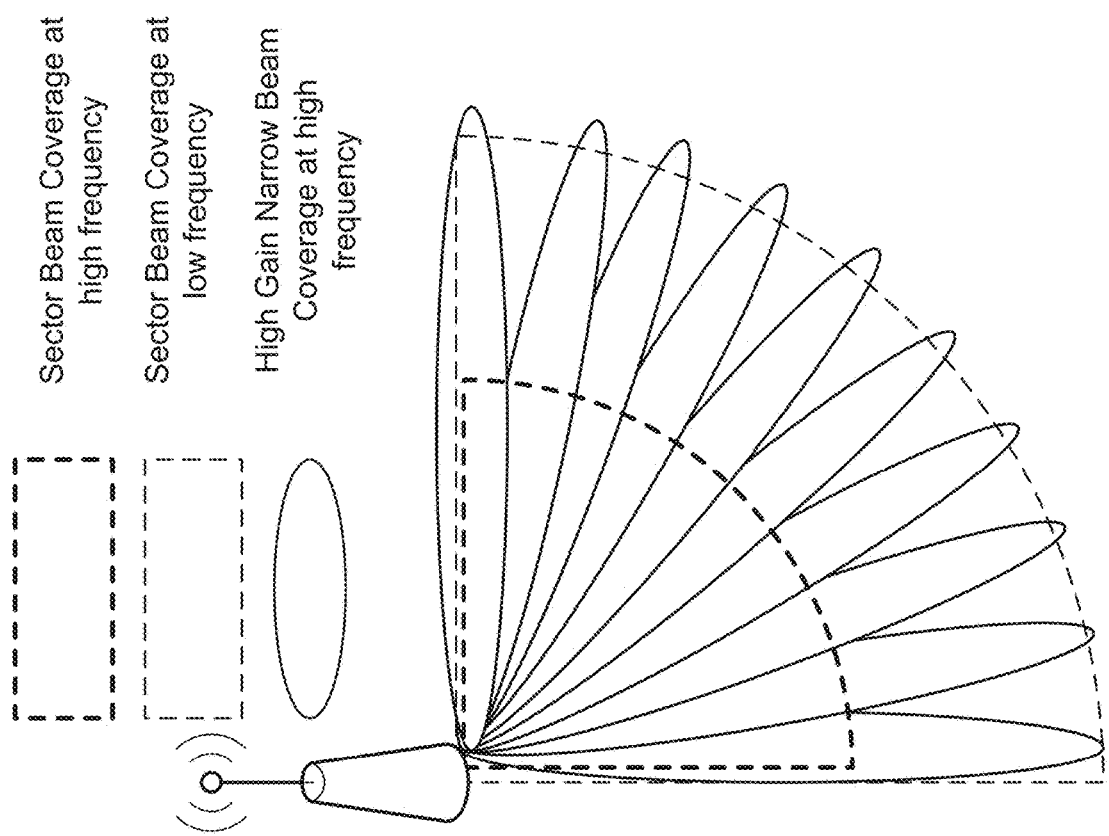
FIG. 4 illustrates an example of cell coverage with sector beams and multiple high gain narrow beams.

Therefore, multiple transmissions in time domain with narrow coverage beams steered to cover different serving areas are necessary. Inherently, the analog beam of a subarray can be steered toward a single direction at the time resolution of an OFDM symbol or any appropriate time interval unit defined for the purpose of beam steering across different serving areas within the cell, and hence the number of subarrays determines the number of beam directions and the corresponding coverage on each OFDM symbol or time interval unit defined for the purpose of beams steering. In some literature, the provision of multiple narrow coverage beams for this purpose has been called "beam sweeping". For analog and hybrid beamforming, the beam sweeping seems to be essential to provide the basic coverage in NR. This concept is illustrated in FIG. 4 where the coverage of a sector level cell is achieved with sectors beams and multiple high gain narrow beams. Also, for analog and hybrid beamforming with massive MIMO, multiple transmissions in time domain with narrow coverage beams steered to cover different serving areas is essential to cover the whole coverage areas within a serving cell in NR.

One concept closely related to beam sweeping is the concept of beam pairing which is used to select the best beam pair between a UE and its serving cell, which can be used for control signaling or data transmission. For the downlink transmission, a beam pair will consist of UE RX beam and NR-Node TX beam while for uplink transmission, a beam pair will consist of UE TX beam and NR-Node RX beam.

Another related concept is the concept of beam training which is used for beam refinement. For example, as illustrated in FIG. 4, a coarser sector beamforming may be applied during the beam sweeping and sector beam pairing procedure. A beam training may then follow where for example the antenna weights vector are refined, followed by the pairing of high gain narrow beams between the UE and NR-Node.

Frame Structure

Figure 5:
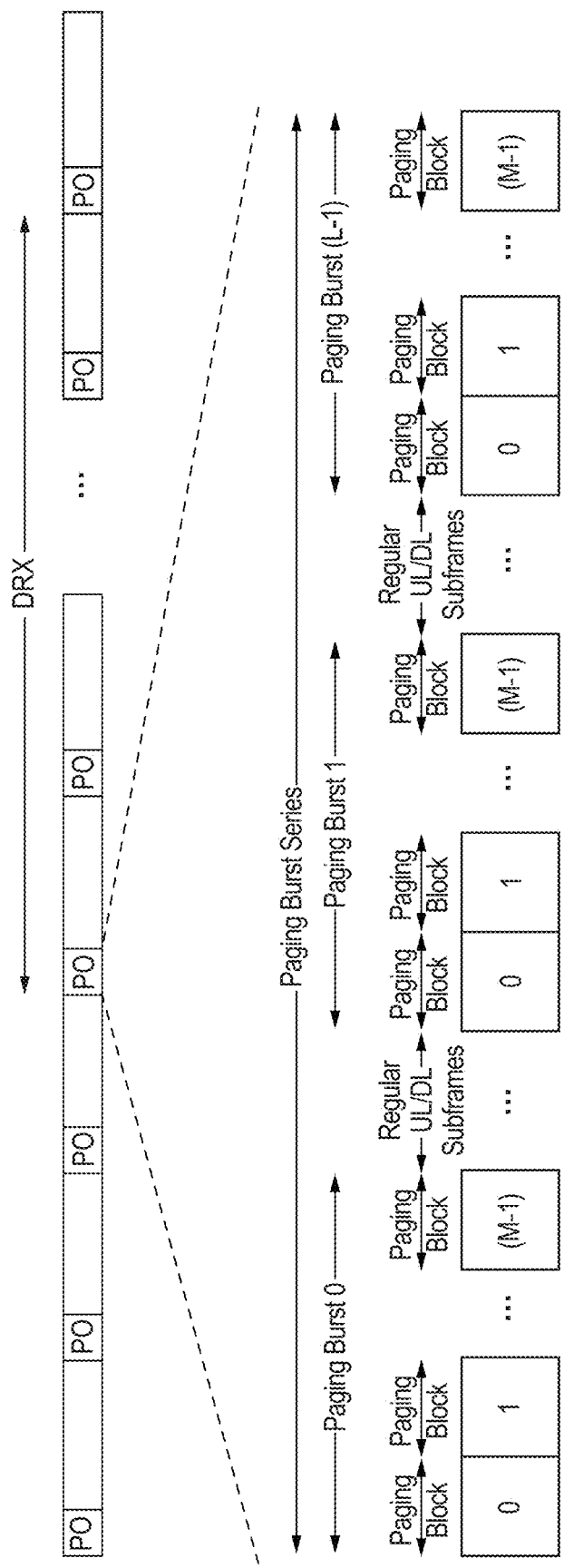
FIG. 5 illustrates an exemplary Paging Burst Series.

Paging Burst Series. A UE in a low power state (e.g., RRC_IDLE or RRC_INACTIVE) may use Discontinuous Reception (DRX) to conserve power. A DRX cycle may include one or more Paging Occasions (PO), where a PO is defined as the time interval over which a paging message may be transmitted by the network. The PO may consist of multiple time slots, which are defined herein as paging blocks. A paging block may be composed of 1 or more Orthogonal Frequency Division Multiplexing (OFDM) symbols, which may correspond to one or more mini-slots, slots, subframes, etc. A paging burst may be defined as a set of one or more paging blocks, which may or may not be contiguous, and a paging burst series as a set of one or more paging bursts, where the paging bursts may be separated by one or more OFDM symbols, mini-slots, slots, subframes, etc. An exemplary paging burst series with L paging bursts and M paging blocks per paging burst is shown in FIG. 5.

Figure 6:
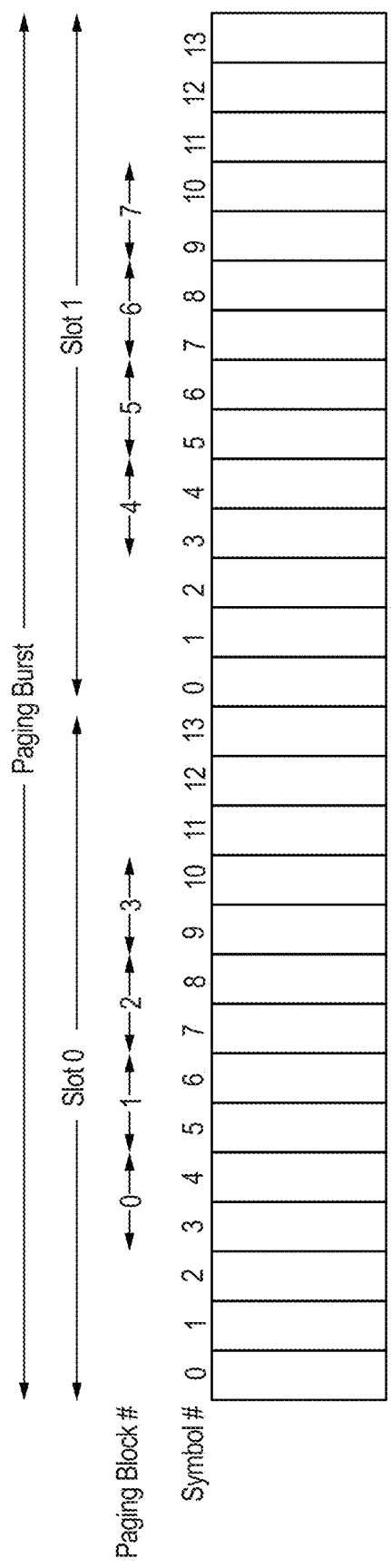
FIG. 6 is an example of Paging Burst where the Paging Blocks occupy symbols 3 to 10 of two contiguous slots.

The total number of beams swept during each paging burst series is denoted as $N_B$ and is calculated as: $N_B = L*M$ The Paging Blocks of a Paging Burst may or may not be contiguous. FIG. 6 is an example of Paging Burst where the Paging Blocks occupy symbols 3 to 10 of two contiguous slots. Such a configuration may be used for scenarios where the first and last three symbols of the slot are reserved for other purposes; e.g., symbols 0 to 2 for PDCCH, symbol 11 for a gap between Down Link (DL) and Up Link (UL) and symbols 12 and 13 for UL in a TDD slot.

Figure 7:
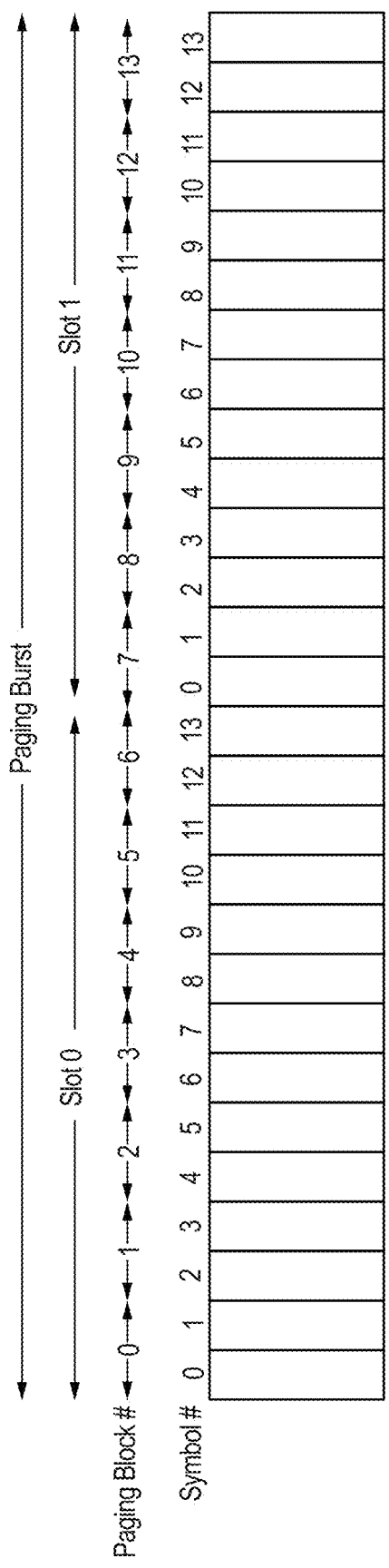
FIG. 7 is example of a Paging Burst where the Paging Blocks occupy all the symbols of two contiguous slots.

FIG. 7 is example of a Paging Burst where the Paging Blocks occupy all the symbols of two contiguous all DL slots.

To provide reliable paging coverage in the cell, different downlink (DL) transmission alternatives may be used for paging depending on the deployment. A different set of DL beams may be transmitted during each paging block, where the full set of beams may be swept one or more times over the length of the paging burst series.

Figure 8:
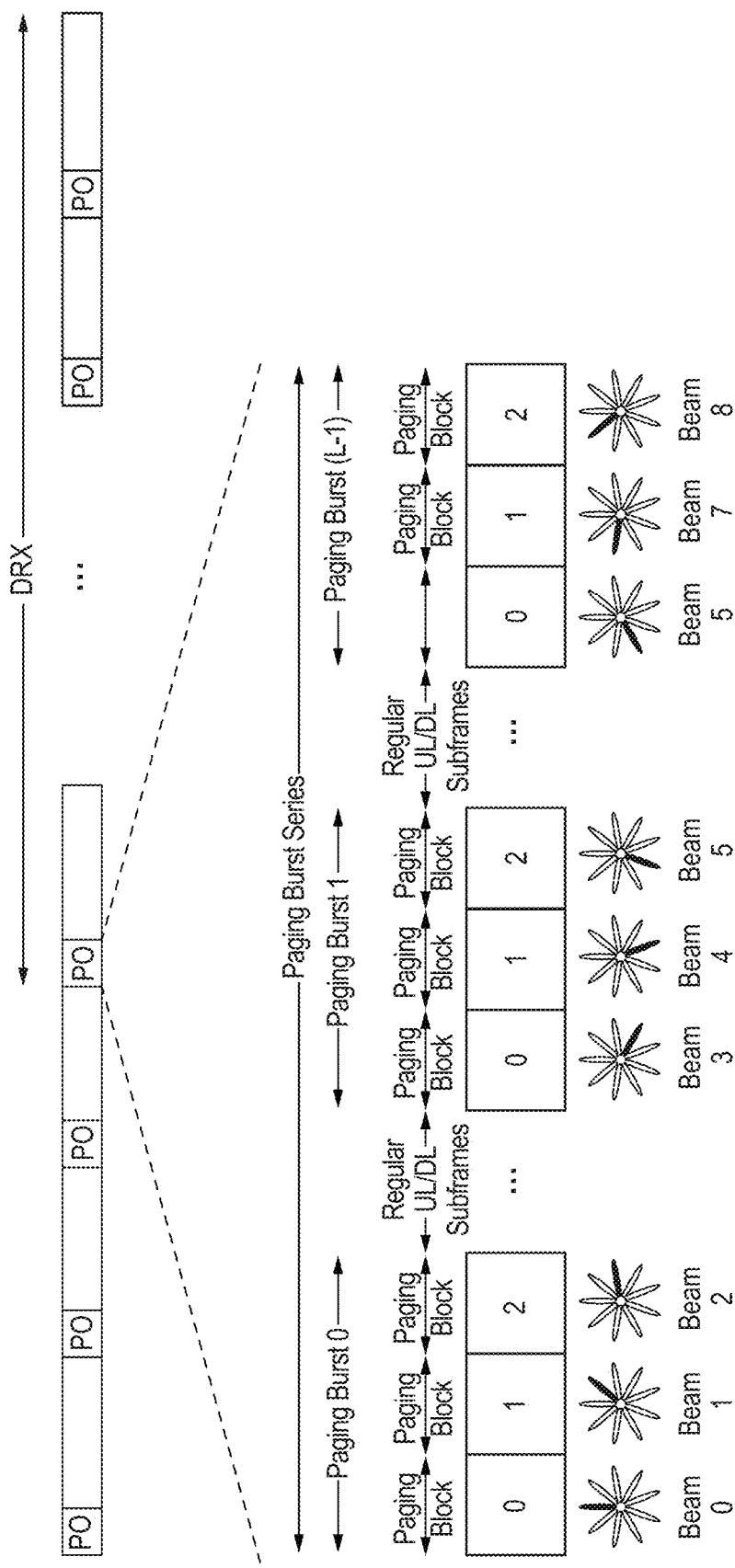
FIG. 8 illustrates an exemplary Paging Burst Series with Single Beam Transmission.

For example, High Frequency NR (HF-NR) deployments may use beam sweeping of many high gain narrow beams for transmission of the paging message. FIG. 8 is an exemplary paging burst series configuration for a system with nine beams, where one beam is transmitted during each paging block and the full set of beams is swept once over the length of the paging burst series.

Figure 9:
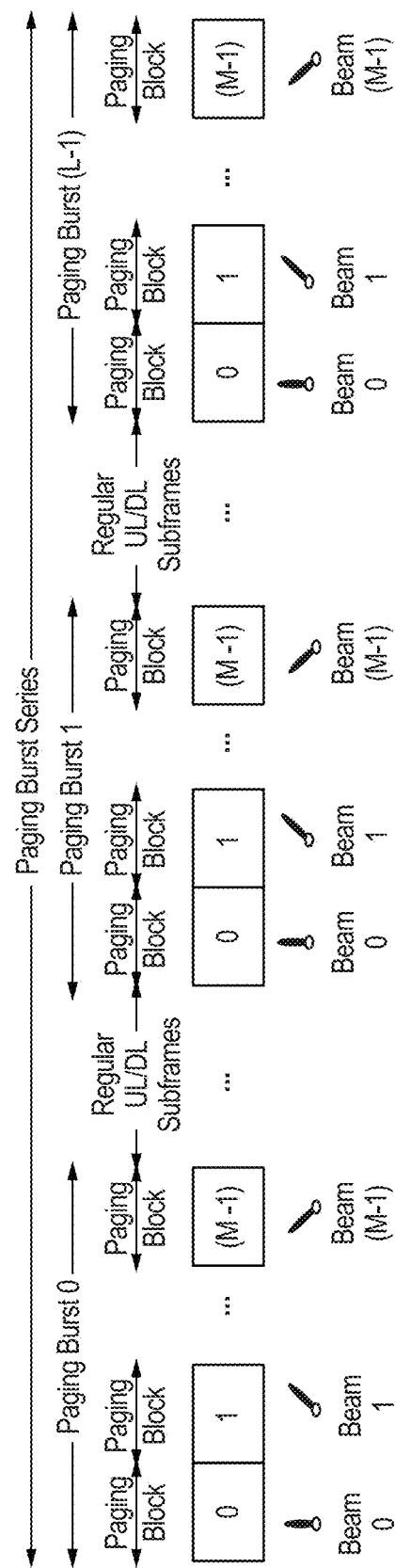
FIG. 9 illustrates an example paging burst series with a single beam transmitted during each paging block and a full sweep completed during each paging burst.

Alternatively, the network may sweep the full set of beams in a single paging burst and then repeat the full sweep in subsequent paging bursts in the series as shown in FIG. 9.

Alternatively, the system may be configured to transmit multiple beams during each paging block, depending on the capabilities of the transmission and reception point (TRP).

The term $N_{B,Group}$ may be defined to represent the number of beams transmitted during each paging block. In this case, $N_B$ is calculated as $N_B=N_{B,Group}*L*M$.

Figure 10:
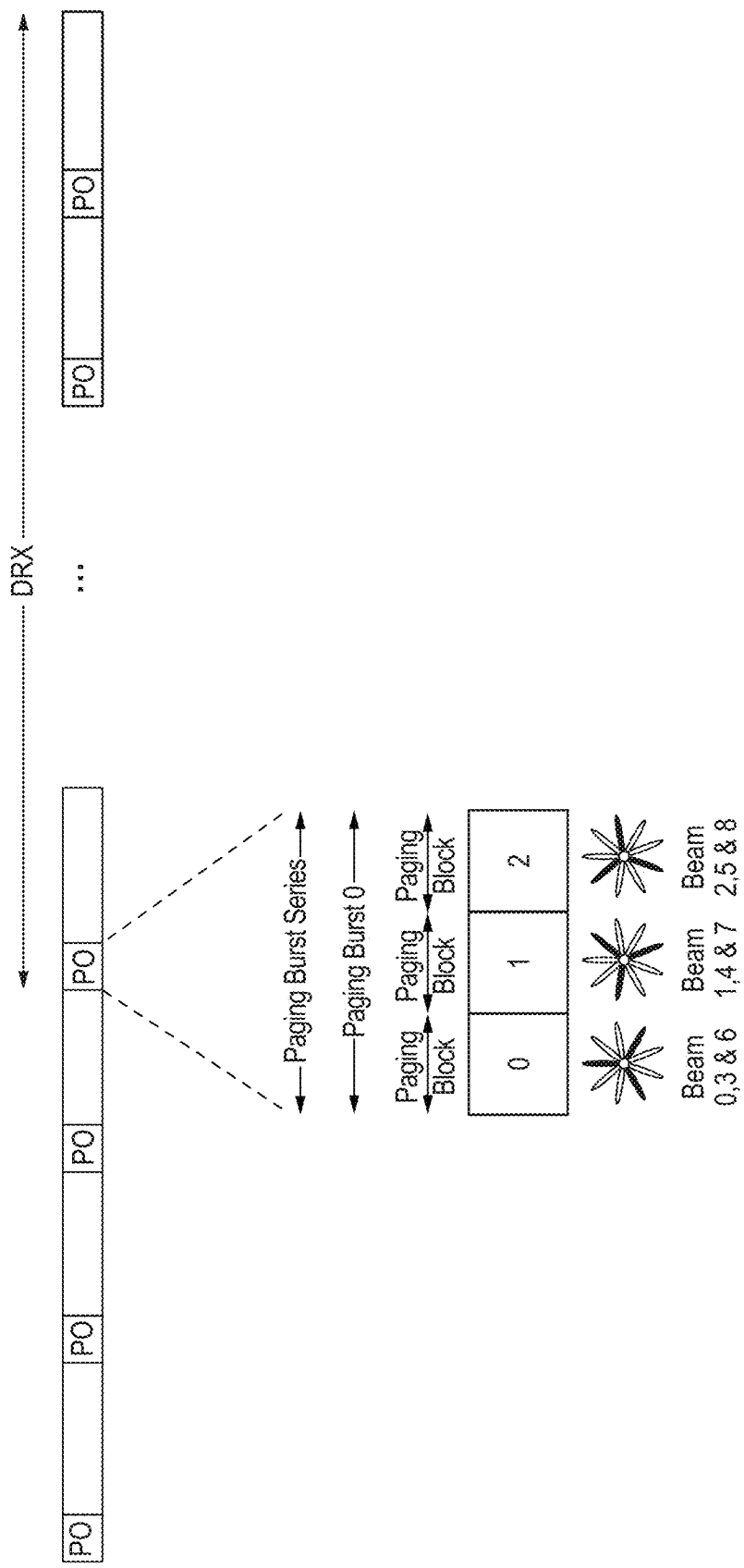
FIG. 10 illustrates an exemplary Paging Burst Series with Multi-Beam Transmission.

FIG. 10 is an exemplary paging burst series configuration for a system with nine beams, where three beams are transmitted during each paging block and the full set of beams is swept once over the length of the paging burst series. In this configuration, only one paging burst is needed to sweep the full set of beams.

Figure 11:
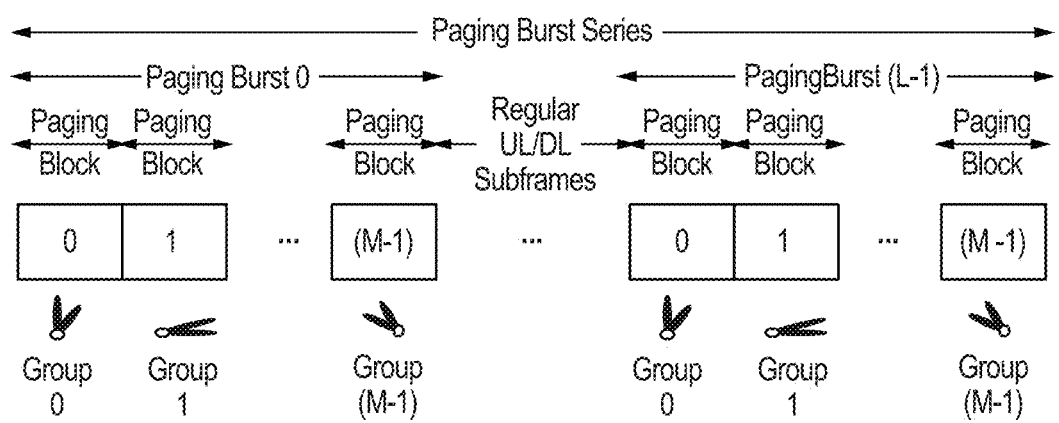
FIG. 11 illustrates an example paging burst series with multiple beams transmitted during each paging block and a full sweep completed during each paging burst.

In another alternative, the system may repeat the full sweep in subsequent paging bursts in the series as shown in FIG. 11.

Figure 12:
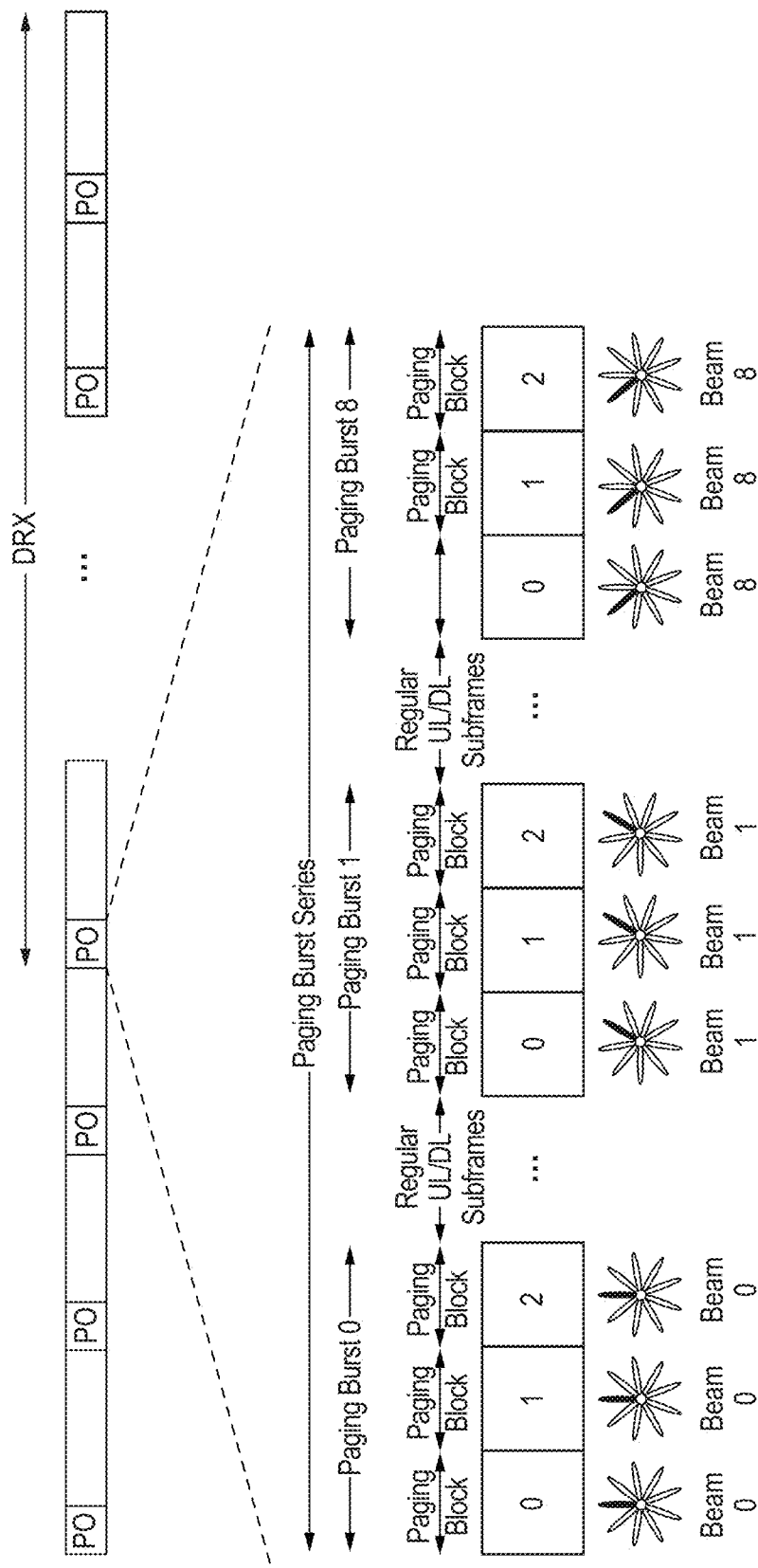
FIG. 12 illustrates an exemplary Paging Burst Series with Single Beam Transmission and Repetition.
Figure 13:
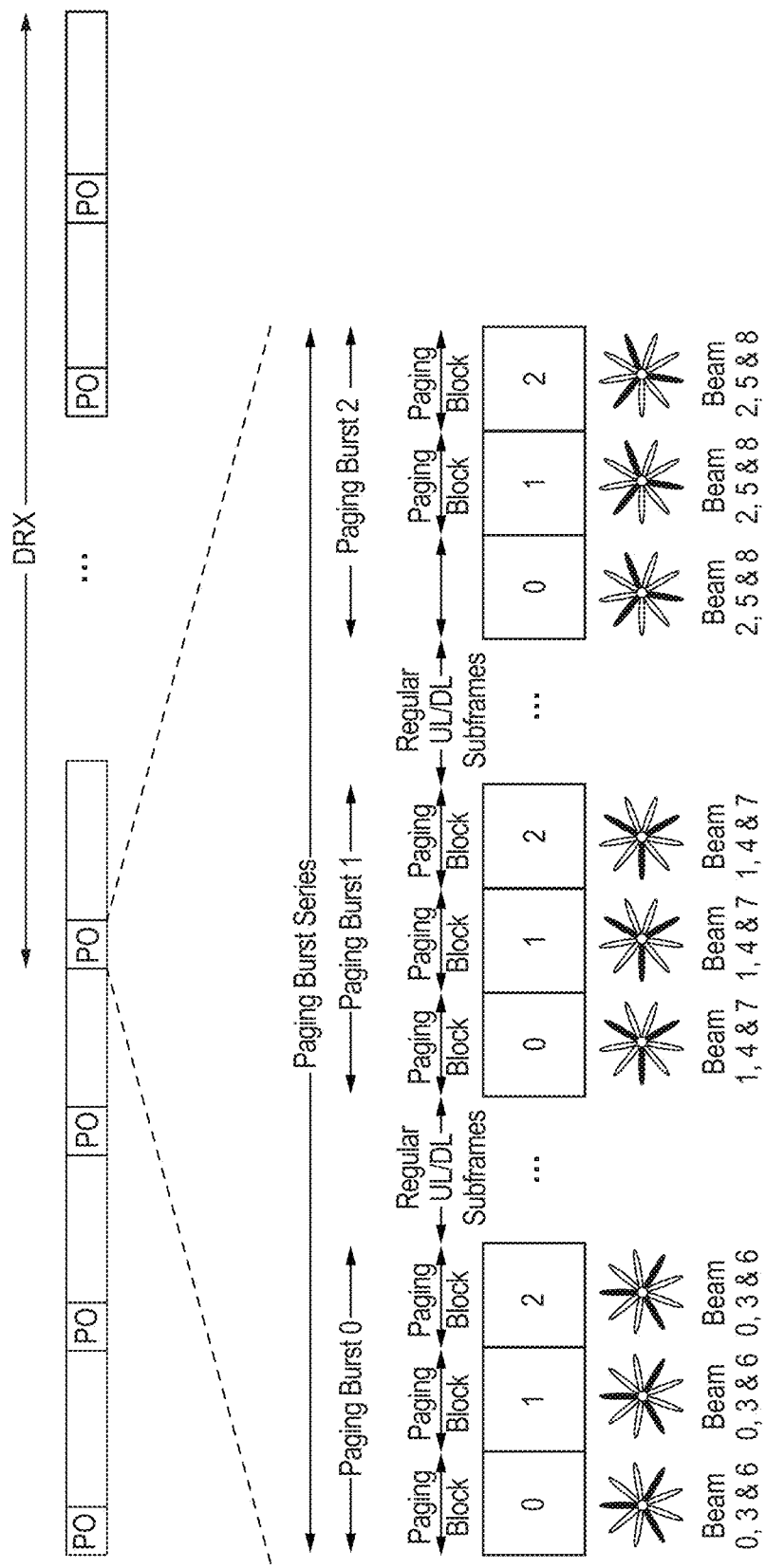
FIG. 13 illustrates an exemplary Paging Burst Series with Multi-Beam Transmission and Repetition.

To improve the paging reliability, the network may repeat the paging transmission in multiple paging blocks, thereby allowing the UE to combine the received symbols before performing the decoding. FIG. 12 and FIG. 13 are exemplary configurations for a system with 9 beams, using single beam and multi-beam transmission respectively, where the paging transmission is repeated for 3 paging blocks and the full set of beams is swept once over the length of the paging burst series. For scenarios where the same paging message is transmitted in multiple beams, the UE may also combine symbols received from multiple beams before the decoding.

Single frequency network (SFN) transmission from multiple synchronized TRPs may be used for paging transmission in NR networks. Omnidirectional or wide beams (e.g., sector beams) may then be used for transmission of the paging message during each paging block. An advantage of this approach compared to the beam sweeping scenario is a reduction in the number of paging blocks required to perform the paging transmission. This results in decreased overhead since fewer radio resources are needed for the paging transmission and also reduces the DRX active/awake time since fewer paging blocks need to be monitored by the UE for paging. The TRPs may be configured to transmit a single beam or multiple beams during each paging block, with or without repetition.

Figure 14:
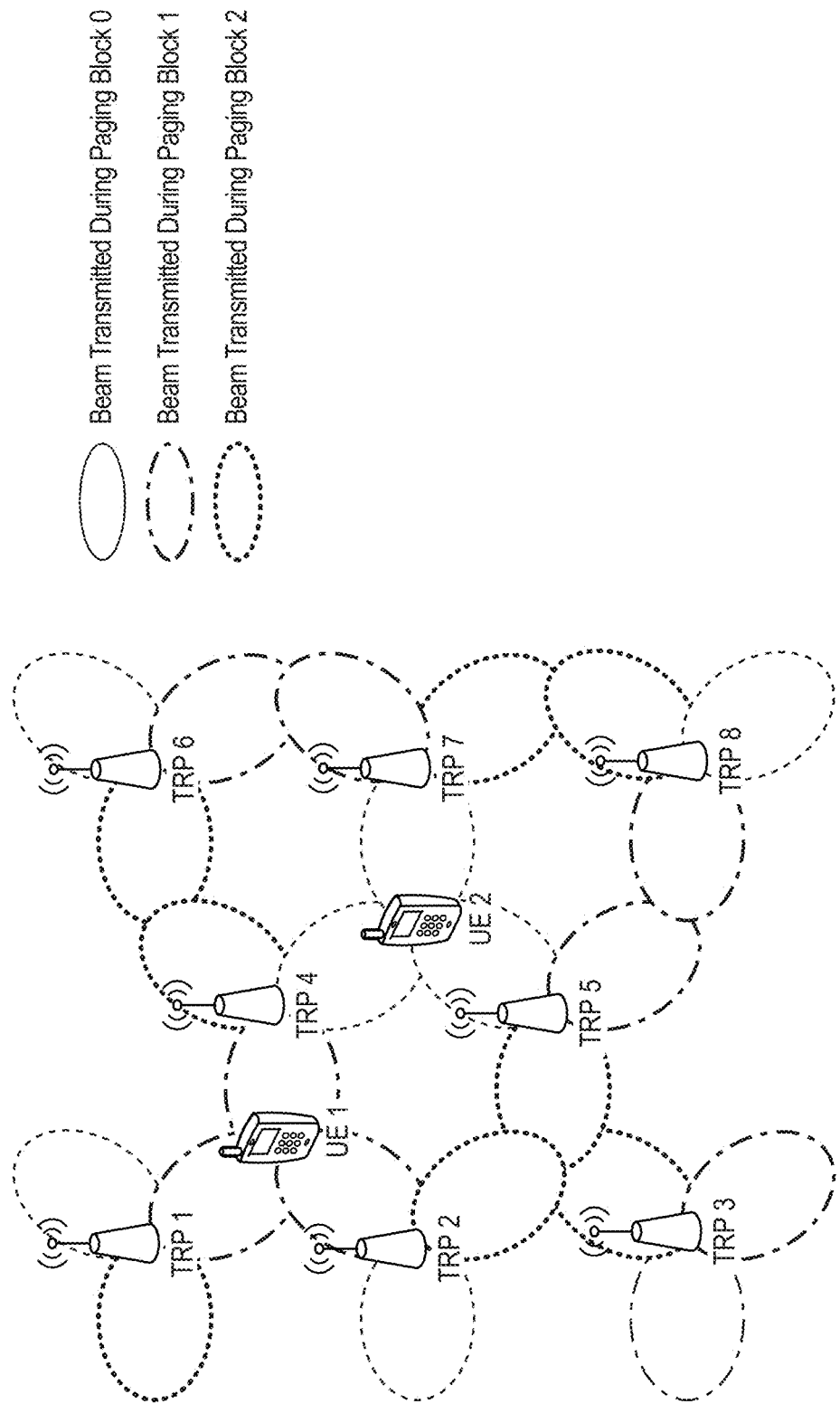
FIG. 14 illustrates an exemplary Sector Beam Deployment with SFN and Single Beam Transmission.
Figure 15:
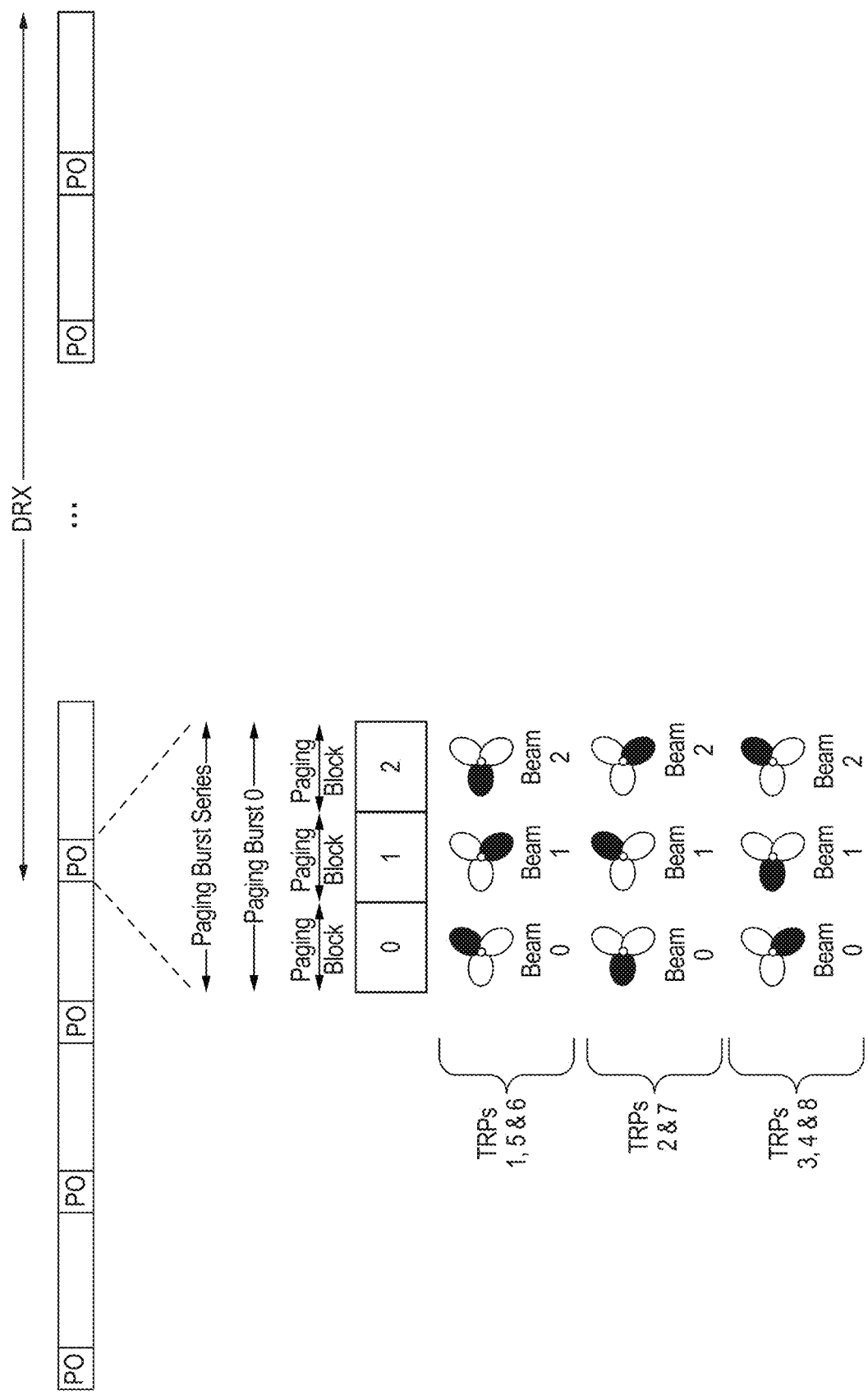
FIG. 15 illustrates an exemplary Paging Burst Series for Sector Beam Deployment with SFN and Single Beam Transmission.

FIG. 14 illustrates an exemplary deployment where SFN transmission techniques may be used for transmission of the paging message using sector beams. Each TRP transmits one beam per paging block and the transmissions are coordinated such that beams with overlapping coverage are transmitted simultaneously. In this example, the paging burst series may be configured with a single paging burst consisting of three paging blocks as shown in FIG. 15. The UEs would monitor for paging during all paging blocks, but would only receive paging transmissions during paging blocks where beams providing coverage in the area of the UE are transmitted. In this example, UE1 would receive paging transmissions from TRPs 1, 2 and 4 during paging block 1 and UE2 would receive paging transmissions from TRPs 4, 5 and 7 during paging block 0. For deployments where the TRPs are capable of transmitting on all sector beams simultaneously, the paging burst series may be configured with a single paging burst that consists of a single paging block. Repetition may also be used in this scenario to increase the paging reliability.

From network perspective, the time instances of paging burst series correspond to an opportunity in time domain for the network to transmit paging. How frequently these time instances occur is referred to as the period of the paging burst series, $T_{Paging\_Burst\_Series}$. The DRX cycle is the individual time interval between monitoring paging occasion for a specific UE.

Figure 16A:
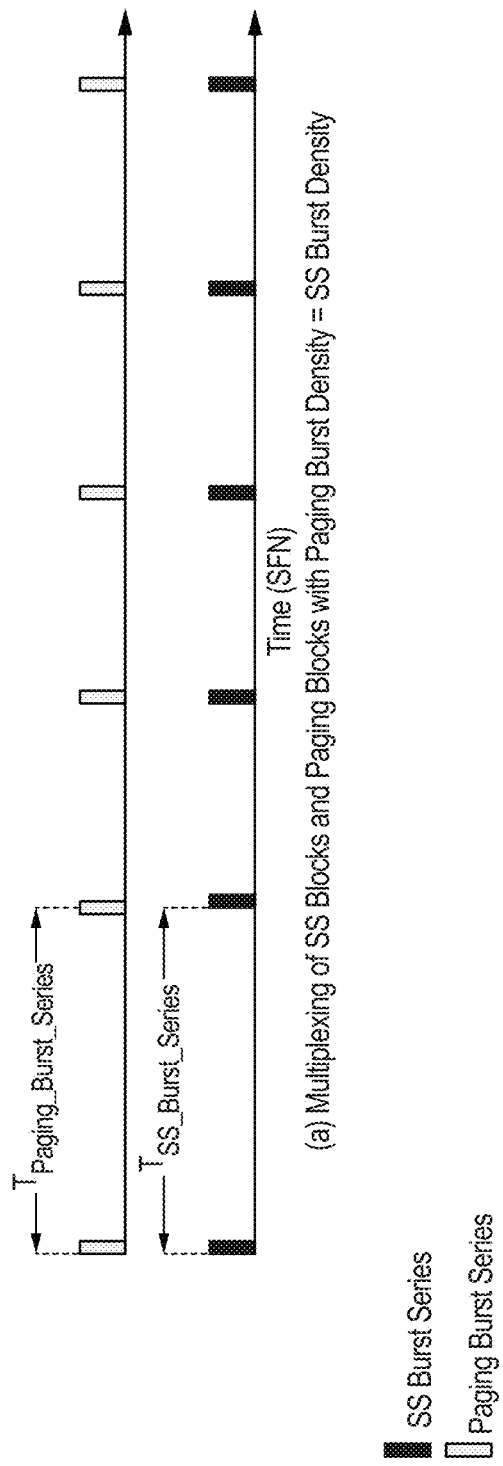
Figure 16B:
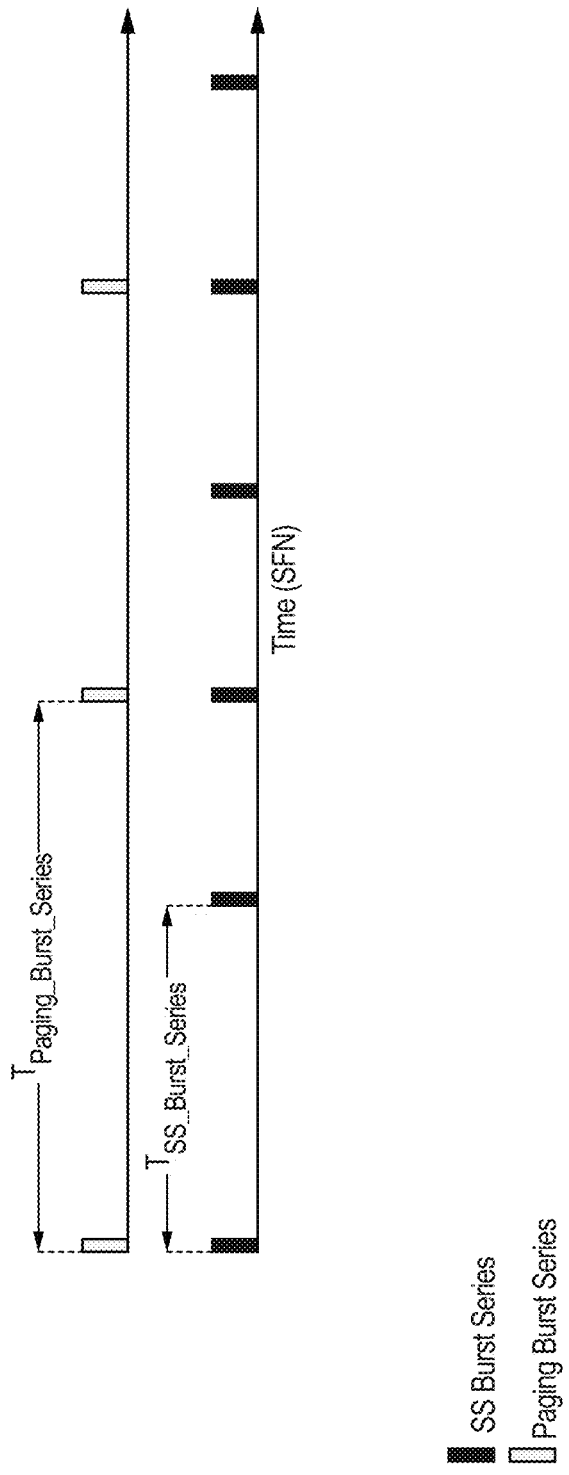

The paging blocks may be multiplexed with the SS blocks using the channel designs described herein or any other mechanisms that supports multiplexing of the SS blocks with the signals and/or channels used for paging. For example, the paging bursts series density may be less than or equal to the SS burst density, where the period of the paging burst series is equal to an integer multiple of the period of the SS burst series. Exemplary embodiments with $T_{Paging\_Burst\_Series}=T_{SS\_Burst\_series}$ and $T_{Paging\_Burst\_Series}=2*T_{SS\_Burst\_series}$ are shown in FIG. 16A and FIG. 16B respectively. Alternatively, the system may be configured with a paging burst series density that is greater than the SS burst series density. The paging blocks and SS blocks may be multiplexed when the bursts occur at the same time. An exemplary embodiment with $T_{Paging\_Burst\_Series}=\frac{1}{2}*T_{SS\_Burst\_series}$ is shown in FIG. 16C.

Figure 17A:
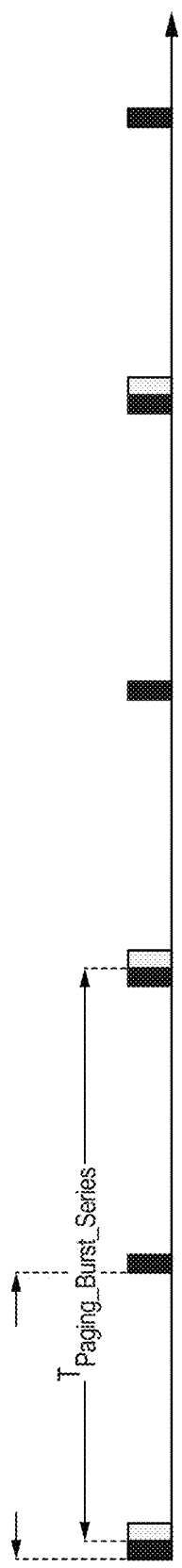
FIGS. 17A and 17B illustrate examples of separate "rounds" of sweeping for paging blocks.
Figure 17B:
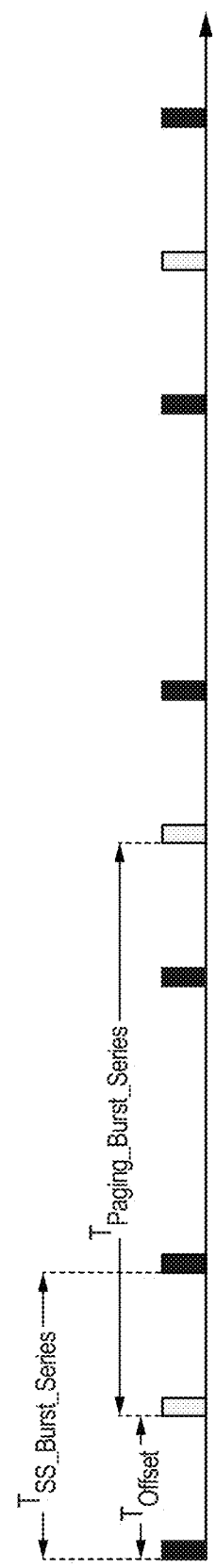

Alternatively, the SS burst series and paging burst series may be configured such that the SS blocks and paging blocks occur at different times. A system configured in this way would use one "round" of beam sweeping for synchronization and another "round" of beam sweeping for paging. An exemplary embodiment where the "round" of paging bursts immediately follows the "round" of SS bursts is shown in FIG. 17A, and an exemplary embodiment where and the "round" of paging bursts is offset from the "round" of SS bursts is shown FIG. 17B. The offset between the SS burst series and paging burst series may be specified as $T_{Offset}$ and signaled to the UE via the System Information or dedicated RRC signaling.

In the connected-mode, if there is a connected-mode SS burst set has been configured for a UE. The paging burst may be multiplexed with the connected-mode SS burst for a UE.

If paging channel indication has its own paging burst set definition, then the paging burst configuration can be signaled via RRC configuration. The paging burst set definition may not use the same subcarrier spacing as regular data and its periodicity can be configured by the gNB. For example, a paging channel burst can be configured to support minislots or short TTI.

The paging channel burst may be multiplexed with common PDCCH or common broadcast channel. For example, the common broadcast channel may be used for carrying the remaining system information for supporting initial access where PBCH doesn't carry. The common PDCCH carries not only system information but also the RAR (RACH response).

If a UE receives multiple paging indications due to the multi-beam coordinated setting from multiple cells, then these paging indications might not come from the same cell. In this case, the UE can ignore other coordinated cell paging indication. If the UE receives multiple paging indication from different TRPs but those TRPs are belonging to a same cell, then the UE can assume one of them as for the paging indication.

Frame Structure—Transmitting Paging Indicators During the Paging Occasion.

Figure 18:
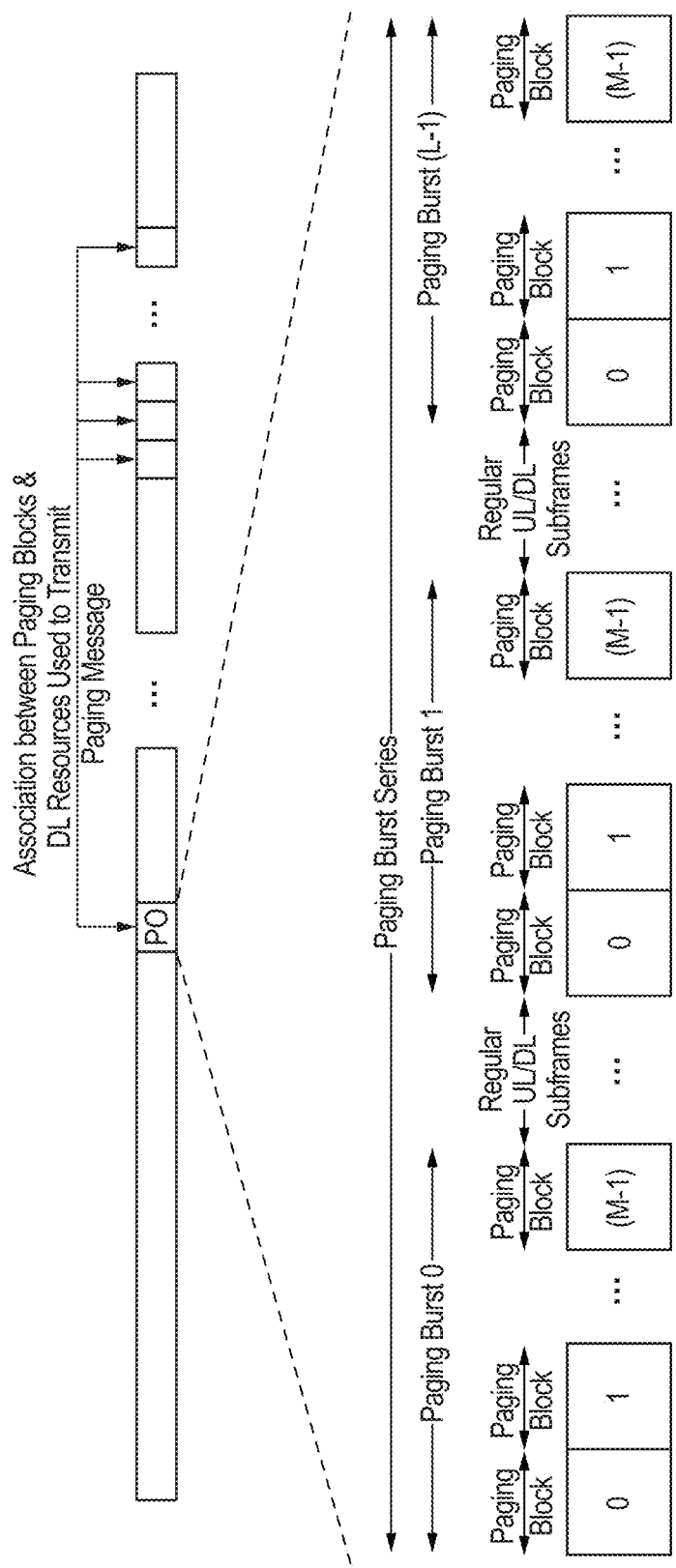
FIG. 18 illustrates an exemplary Time-Domain Structure for Transmitting the Paging Message Using DL resources associated with the Paging Blocks of the Paging Occasion.

For NR, a Paging Indicator may be transmitted during the PO followed by transmission of the Paging Message using DL resources that are associated with the paging block or DL TX beam used to transmit the physical channel that signaled the PI(s) received by the UE during the PO. FIG. 18 illustrates a time-domain structure when PIs are signaled during the PO and the paging message is transmitted using DL resources associated with the Paging Blocks of the PO.

Paging Frame and Paging Occasion Calculation.

An NR Paging Occasion (NR-PO) may be defined as a set of one or more paging blocks occurring during a paging burst series; and an NR Paging Frame (NR-PF) as a frame in which a paging burst series may start. When DRX is used the UE only needs to monitor one NR-PO per DRX cycle.

Figure 19:
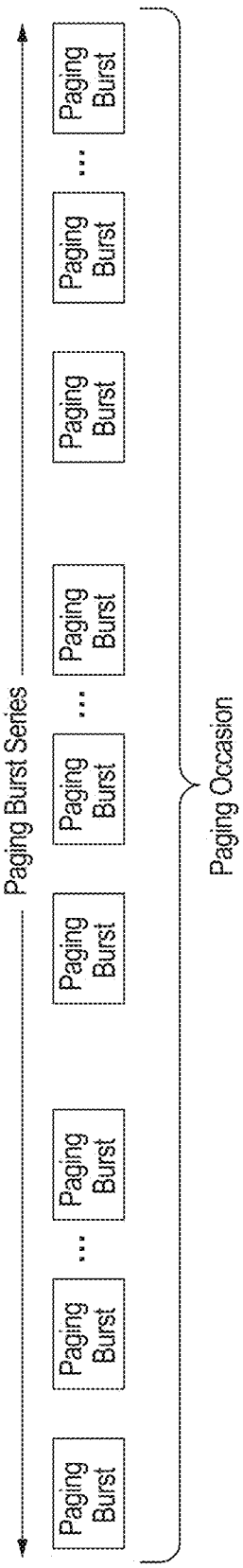
FIG. 19 illustrates an exemplary Paging Occasion Mapped to Paging Burst Series.
Figure 20:
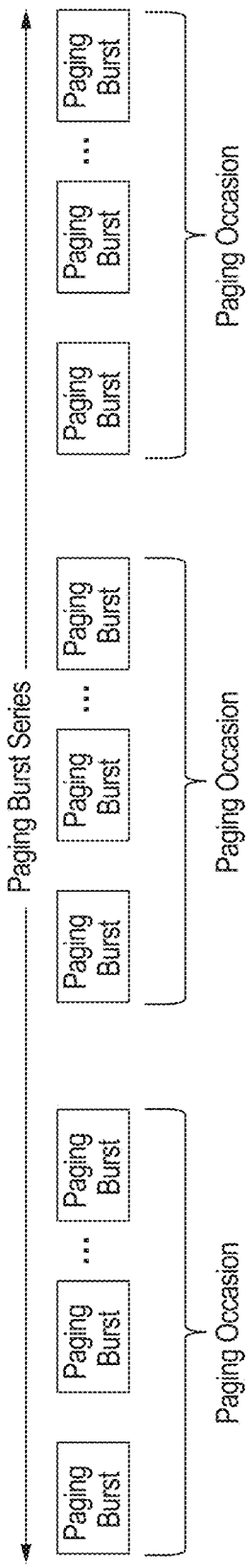
FIG. 20 illustrates an exemplary Paging Occasion Mapped to Subset of Paging Bursts in Paging Burst Series.
Figure 21:
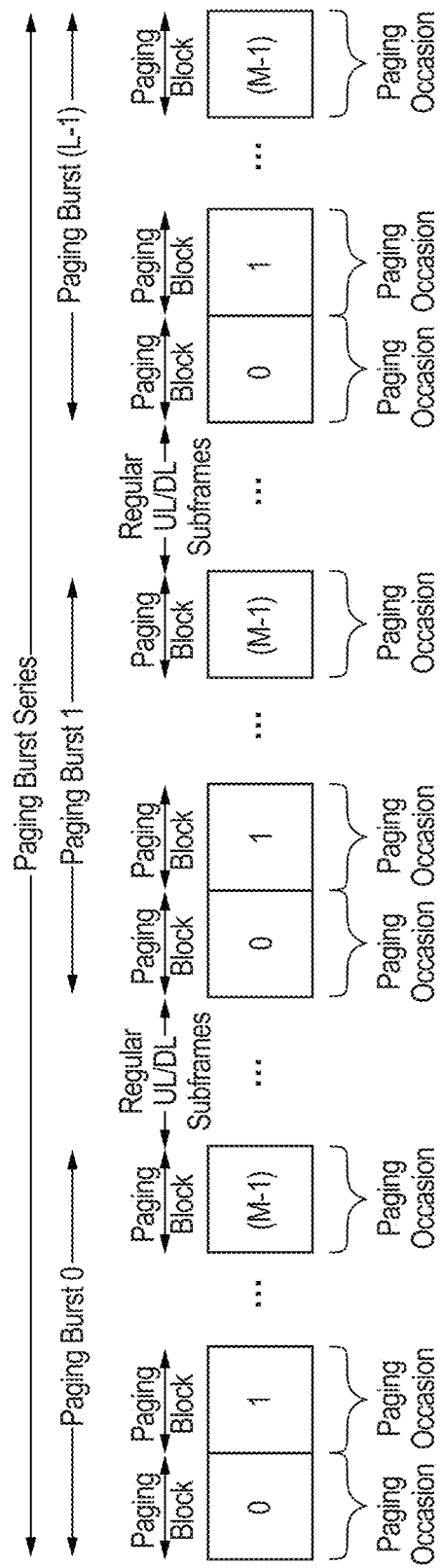
FIG. 21 illustrates an exemplary Paging Occasion Mapped to Subset of Paging Blocks in Paging Burst Series.

The following mappings options between the PO and paging burst series may be used for the subject matter described herein. In a first option, PO may map to the paging burst series, e.g., for covering the sweeping area within a Paging Frame. In a second option, PO may map to or one more paging bursts in the paging burst series, e.g., multiple subframes within a Paging Frame. In a third option, PO may map to one or more paging blocks in a paging burst, e.g., carrying the Paging Indication on a physical channel. Exemplary mappings for the different options are shown in FIGS. 19 to 21. FIG. 19 illustrates an exemplary PO mapped to paging burst series within a Paging Frame (PF). FIG. 20 illustrates an exemplary paging occasion mapped to subset of paging bursts in paging burst series. FIG. 21 illustrates an exemplary paging occasion mapped to subset of paging blocks in paging bursts.

The following parameters are used for the calculation of the NR-PO and NR-PF:

T is the DRX cycle of the UE. T is determined by the shortest of the UE specific DRX value, if allocated by upper layers, and a default DRX value broadcast in system information. If UE specific DRX is not configured by upper layers, the default value is applied.

nB is used to indicate the number of NR-POs in a DRX cycle. Configuration of the nB value may depend on the paging capacity that may be desired or used in a cell. A larger value of nB may be used, for example to increase paging capacity. A smaller value of nB may be used, for example for a smaller paging capacity.

N is the min(T,nB). The parameter N is the number of paging bursts series occurring in a DRX cycle.

Ns is the max(1,nB/T). The parameter Ns is the number of NR-POs that occur in a paging burst series.

UE_ID is the: IMSI mod 1024. The UE_ID parameter is used to randomize the distribution of the UEs to the NR-POs.

Example Multi-Beam Scenario

For example, an NR-PO may correspond to all the paging blocks occurring during the paging burst series. Such a configuration may be applicable for scenarios where a small number of beams are needed to provide coverage. One can also envision such a configuration being used in a multi-beam scenario where the network does not have knowledge of the UE's location at the beam-level and therefore needs to page the UE using all of the swept beams.

In this example, the value of the parameter T in radio frames may be selected from a set of predefined values; e.g., {32, 64, 128, 256}. The nB may be selected from a set of predefined values that are equal to the quotient of the T divided by a positive integer value; e.g., {T, T/2, T/4, T/8, T/16, T/32} and the parameters N and Ns are defined as min(T, nB)=nB and max(1,nB/T)=1 respectively. A summary of the DRX parameters for the multi-beam scenario is provided in Table 6.

TABLE 6

Exemplary DRX Parameters for Multi-Beam Scenario

| Parameter | Description | Values |
|---|---|---|
| T | DRX cycle | {32, 64, 128, 256} |
| nB | # of NR-POs in a DRX cycle | {T, T/2, T/4, T/8, T/16, T/32} |
| N | # of paging burst series in a DRX cycle | min(T,nB) = nB |
| Ns | # of NR-POs in a paging burst series | max(1,nB/T) = 1 |

The NR-PF may be determined from the following formula using the DRX parameters provided in the System Information:

$$\text{SFN mod } T = (T \text{ div } N) * (\text{UE\_ID mod } N);$$

and the NR-PO is assumed to be all the paging blocks occurring during the paging burst series starting in the radio frame satisfying the NR-PF calculation.

The set of DRX cycle values may be specified such that they are integer multiples of $T_{SS\_Burst\_Series}$, thereby allowing the paging blocks to be multiplexed with the SS blocks using mechanisms described herein in reference to channel design, or any other mechanism that supports multiplexing of the signals and/or channels used for paging with the SS blocks. For example, the DRX cycle value may be determined by selecting a multiplier $N_{DRX\_Multipler}$ from a set of predefined values; e.g., {1, 2, 4, . . . , 256} and then computing the product of the $N_{DRX\_Multipler}$ and $T_{SS\_Burst\_Series}$. To constrain the NR-PFs to only occur in frames where an SS burst series starts, nB may be selected from a set of predefined integer values where the maximum value in the set is $N_{DRX\_Multipler}$. (For scenarios where a paging burst density greater than the SS burst density is desired, this constraint would not be applied and the maximum value allowed in the set would be T.) A summary of the DRX parameters for the multi-beam scenario constrained such that the NR-PFs only occur in frames where an SS burst series starts is provided in Table 7.

TABLE 7

Exemplary DRX Parameters for Multi-Beam Scenario with Multiplexing of SS Blocks and Paging Blocks

| Parameter | Description | Values |
|---|---|---|
| T | DRX cycle | $N_{DRX\_Multipler} * T_{SS\_Burst\_Series}$ where $N_{DRX\_Multipler} \in$ {1, 2, 4, . . . , 256} |
| nB | # of NR-POs in a DRX cycle | {1} for $N_{DRX\_Multipler} = 1$, {1, 2} for $N_{DRX\_Multipler} = 2$, . . . {1, 2, 4, . . . , 256} for $N_{DRX\_Multipler} = 256$ |
| N | # of paging burst series in a DRX cycle | min(T,nB) = nB |
| Ns | # of NR-POs in a paging burst series | max(1,nB/T) = 1 |

Alternatively, the NR-PO may correspond to a subset of the paging blocks occurring during the paging burst series. For example, if the network has knowledge of the UE's location at the beam level, then the NR-PO may correspond to the paging blocks used to transmit the beams that will most likely be received by the UE; e.g., the "best" DL TX beam, the "best" DL TX beam and 1 or more adjacent beams, all beams transmitted during the paging burst that includes the "best" DL TX beam, etc.

The network may determine the "best" DL TX beam implicitly. For example, the network may determine the "best" DL TX beam from the resource on which the random access preamble was received during a previous execution of the random access procedure. Alternatively, the UE may signal the "best" DL TX beam to the network.

To ensure the network and the UE are using the same subset of paging blocks for the PO, the network may signal the subset of paging blocks that make up the PO to the UE. For example, the network may signal the indices of the set of paging blocks of the PO. Alternatively, the network may signal the indices of the first and last paging blocks of the PO. Alternatively, the network signals the "best" DL TX beam to the UE and a predefined rule is then used to determine the rest of the paging blocks belonging to the PO; e.g., 1 or more adjacent beams, all beams transmitted during the paging burst that includes the DL TX beam, etc.

The number of paging blocks belonging to the PO may be UE specific. For example, stationary or low mobility UEs may have a smaller number of paging blocks in their PO compared to UE's with medium or high mobility. The size of the PO may also be service specific; e.g., UEs with UR/LL services may be configured with a larger number of paging blocks in their POs to decrease the probability of missing a page.

The configuration of the PO for a specific UE may be updated periodically or based on events occurring in the network; e.g., upon a change in the UEs mobility state, when the UE can no longer receive one or more beams transmitted during the PO, after a failed page, after starting/stopping a service.

Exemplary Definition for Single Beam Scenario

In this example, the values of the parameters L (number of paging bursts) and M (number of paging blocks) used to configure the paging burst series can be considered to be equal to 1. The paging burst series can then be viewed as a single paging burst composed of a single paging block. The paging block may be defined as a set of one or more contiguous subframes; e.g., 10, where a single subframe is defined as the unit of time during which a UE may be paged.

In this example, the value of the parameter T in radio frames may be selected from a set of predefined values; e.g., {32, 64, 128, 256, 512, . . . }. nB may be selected from a set of predefined values that is composed of a subset of values that are equal to integer multiples of the parameter T and another subset of values that are equal to the quotients of the parameter T divided by an integer value. The parameters N and Ns may be defined as min(T,nB) and max(1,nB/T) respectively. A summary of exemplary DRX parameters for the single-beam scenario is provided in Table 8.

TABLE 8

Exemplary DRX Parameters for Single Beam Scenario

| Parameter | Description | Values |
|---|---|---|
| T | DRX cycle | {32, 64, 128, 256, 512} |
| nB | # of NR-POs in a DRX cycle | {4T, 2T, T, T/2, T/4, T/8, T/16, T/32} |
| N | # of paging burst series in a DRX cycle | min(T, nB) |

TABLE 8-continued

Exemplary DRX Parameters for Single Beam Scenario

| Parameter | Description | Values |
|---|---|---|
| Ns | # of NR-POs in a paging burst series | max(1, nB/T) |

The NR-PF and NR-PO may be determined from the following formulas using the DRX parameters provided in the System Information:

The NR-PF is given by following equation:

$$SFN \bmod T = (T \text{ div } N)*(UE\_ID \bmod N)$$

The Index is pointing to the NR-PO from the subframe pattern defined in Table 9 and Table 10 may be derived from the following calculation:

$$i\_s = \text{floor}(UE\_ID/N) \bmod Ns$$

TABLE 9

Subframe Patterns for FDD

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 10

Subframe Patterns for TDD (all UL/DL configurations)

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

NR PCCH-Config

The paging configuration in the system may signaled as part of the SI. Code Example 2 illustrates the use of NR PCCH-Config IEs.

Code Example 2
NR PCCH-Config Information Element (Option 1)

```
-- ASN1START
PCCH-Config ::=          SEQUENCE {
   defaultPagingCycle         ENUMERATED {
                                 rf32, rf64, rf128, rf256},
   nB                        ENUMERATED {
                                 oneT, halfT, quarterT, oneEighthT,
                                 oneSixteenthT, oneThirtySecondT}
}
-- ASN1STOP
```

TABLE 11

PCCH-Config Field Descriptions (Option 1)

defaultPagingCycle
Default paging cycle, used to derive 'T']. Value rf32 corresponds to 32 radio frames, rf64
corresponds to 64 radio frames and so on.
nB
Parameter: nB is used as one of parameters to derive the Paging Frame and Paging Occasion. Value in
multiples of 'T'. A value of oneT corresponds to T, a value of halfT corresponds to ½ * T and so on.

Code Example 3
NR PCCH-Config Information Element (Option 2)

```
-- ASN1START
PCCH-Config ::=        SEQUENCE {
   N-DRX-Multiplier       ENUMERATED {
                             n1, n2, n4, n8, n16, n32,
                             n128, n256
},
   nB                     ENUMERATED {
                             n1, n2, n4, n8, n16, n32, n128,
                             n256
}
-- ASN1STOP
```

TABLE 12

PCCH-Config Field Descriptions (Option 2)

N-DRX-Multiplier

Multiplier used to compute DRX cycle; e.g.,
DRX cycle = $N_{DRX\_Multiplier} * T_{SS\_Burst\_Series}$.

nB

Parameter: nB is used as one of parameters to
derive the Paging Frame and Paging Occasion.
Value in multiples of 'T'. Note: The maximum
valid value in the set is ≤ $N_{DRX\_Multiplier}$.

Slot-Based NR-PO Calculation

For NR, downlink and uplink transmissions are organized into radio frames with a 10 ms duration, consisting of 10 subframes of 1 ms duration each. If only one NR-Paging Occasion (NR-PO) is supported per subframe, the maximum number of NR-POs per NR-Paging Frame (NR-PF) would be 10. This may not provide sufficient paging capacity in some scenarios. Furthermore, for deployments where larger SCS's are used, the network may be able to sweep the beams very fast, resulting in a paging burst set duration that is significantly less than the duration of a subframe. Restricting the network to only support one NR-PO per subframe for such deployments is an unnecessary constraint. Therefore, disclosed herein is an example of the NR-PO calculations that allows the starting position of the NR-PO to be defined at the slot level, thereby allowing multiple NR-POs to be defined per subframe.

The following parameters may be used for the calculation of the NR-PO and NR-PF:

T is the DRX cycle of the UE. T is determined by the shortest of the UE specific DRX value, if allocated by upper layers, and a default DRX value broadcast in system information. If UE specific DRX is not configured by upper layers, the default value is applied.

nB is used to indicate the number of NR-POs in a DRX cycle. Configuration of the nB value may depend on the paging capacity desired or used in a cell. A larger value of nB may be used, for example to increase paging capacity. A smaller value of nB may be used, for example for a smaller paging capacity.

MAX_PSF is the parameter MAX_PSF is the maximum number of NR paging subframes frames (NR-PSF) in an NR-PF, where an NR-PSF is defined as a subframe in which a paging burst set transmission may start. This parameter may be dependent on numerology, beam sweeping configuration, paging burst set duration, etc. The parameter may be signaled via higher layer signaling, e.g., RRC. Alternatively, a set of values may be predefined per the standard (e.g., per numerology, beam sweeping configuration, paging burst set duration, etc.).

N is the min(T,nB). The parameter N is the number of NR-PFs in a DRX cycle.

Ns is the max(1,nB/T). The parameter Ns is the number of NR-POs in an NR-PF.

Ns_psf is the min(MAX_PSF, Ns). The parameter Ns_psf is the number of NR Paging Subframes (NR-PSFs) in an NR-PF, where an NR-PSF slot is defined as a subframe in which a paging burst set transmission may start.

Ns_ps is the 1+floor((Ns−1)/MAX_PSF). The parameter Ns_ps is the number of NR Paging Slots (NR-PS) in an NR-PSF, where an (NR-PS) is defined as a slot in which a paging burst set transmission may start.

UE_ID or Group_ID is the UE_ID mod 1024 for UE based POs, and Group_ID mod 2^M (where M is selected based on the granularity of groups and the distribution of the POs) for group based POs. The UE_ID (e.g., IMSI) or Group_ID parameter is used to randomize the distribution of the UEs to the NR-POs.

NR-PF is given by the following equation:

SFN mod T=(T div N)*(UE_ID mod N)

Index i_sf pointing to the subframe containing the start of the NR-PO from a predefined subframe pattern is given by the following equation:

i_sf=floor(UE_ID/N)mod Ns_psf

Index i_slot pointing to the slot containing the start of the NR-PO from pre-defined slot pattern is given by the following equation:

i_slot=floor(UE_ID/Ns_psf)mod Ns_ps

Exemplary sets of subframe a slot patterns are shown in Table 21 and Table 22 respectively.

A number of DRX configurations that support a variety of paging capacities are possible. In Examples 1-4, we assume the numerology μ=3, which is defined to have 8 slots per subframe, is used for illustrative purposes, but the NR-PO calculations are applicable for any numerology.

Example 1

Figure 22:
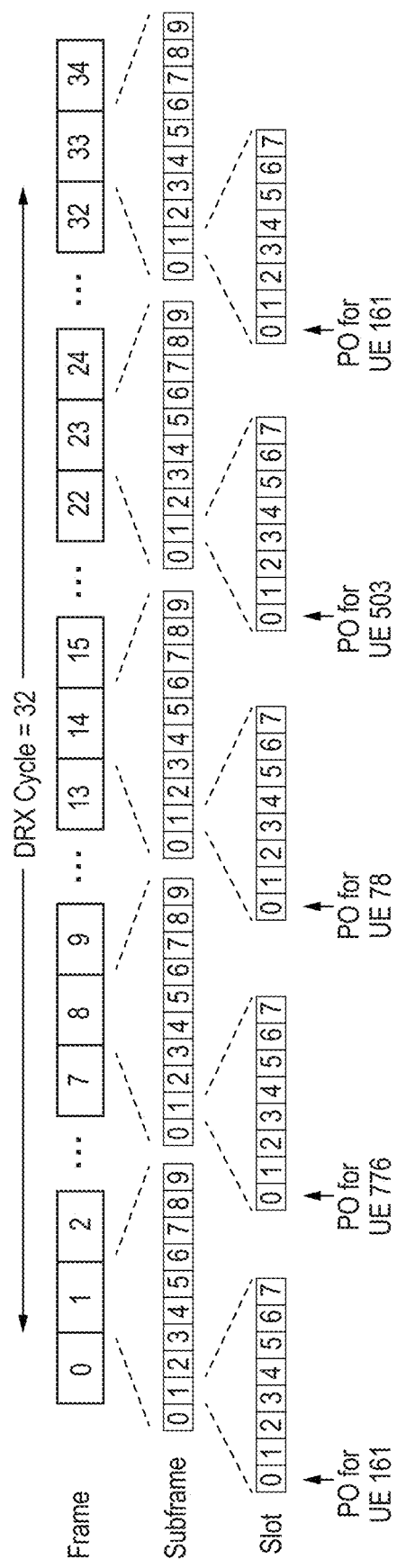
FIG. 22 is an illustration of the results of the NR-PO calculations for a DRX configuration that may be used to support a paging capacity of 1 NR-PO per NR Paging Frame.

In Table 13 we provide set of DRX parameters that may be used to support a paging capacity of 1 NR-PO per NR-PF. With this set of DRX parameters, the NR-PO starts in slot 0 of subframe 1. Table 14 provides the results of the PO calculations for different UE_IDs. The results of these calculations are also illustrated in FIG. 22.

TABLE 13

DRX Parameters for Example 1

| Parameter | Description | Values |
|---|---|---|
| T | DRX cycle | 32 |
| nB | # of NR-POs per DRX cycle | T = 32 |
| MAX_PSF | Max # of NR-PSF per NR-PF | 4 |
| N | # of NR-PFs per DRX cycle | 32 |
| Ns | # of NR-POs per NR-PF | 1 |
| Ns_psf | # of NR-PSFs per NR-PF | 1 |
| Ns_ps | # of NR-PSs per NR-PSF | 1 |

TABLE 14

PO Calculations for Example 1

| UE_ID | PF | i_sf | i_slot |
|---|---|---|---|
| 78 | 14 | 0 | 0 |
| 161 | 1 | 0 | 0 |
| 503 | 23 | 0 | 0 |
| 776 | 8 | 0 | 0 |

Example 2

Figure 23:
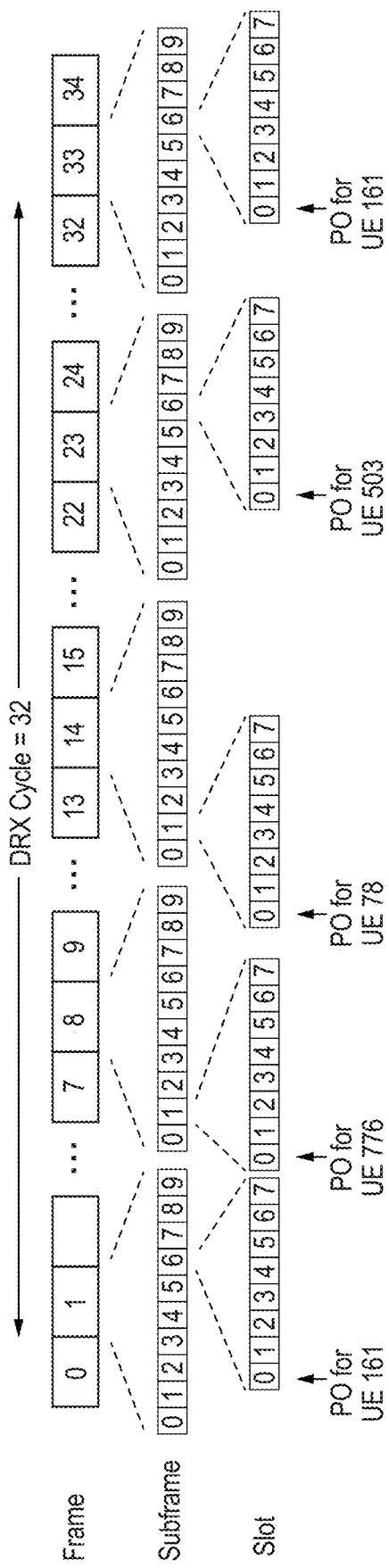
FIG. 23 is an illustration of the results of the NR-PO calculations for a DRX configuration that may be used to support a paging capacity of 2 NR-POs per NR Paging Frame.

In Table 15 we provide a set of DRX parameters that may be used to support a paging capacity of 2 NR-POs per NR-PF. With this set of DRX parameters, the NR-PO may start in slot 0 of subframes 1 or 6. Table 16 provides the results of the PO calculations for different UE IDs. The results of these calculations are also illustrated in FIG. 23.

TABLE 15

DRX Parameters for Example 2

| Parameter | Description | Values |
|---|---|---|
| T | DRX cycle | 32 |
| nB | # of NR-POs per DRX cycle | 2T = 64 |
| MAX_PSF | Max # of NR-PSF per NR-PF | 4 |
| N | # of NR-PFs per DRX cycle | 32 |
| Ns | # of NR-POs per NR-PF | 2 |
| Ns_psf | # of NR-PSFs per NR-PF | 2 |
| Ns_ps | # of NR-PSs per NR-PSF | 1 |

TABLE 16

PO Calculations for Example 2

| UE_ID | PF | i_sf | i_slot |
|---|---|---|---|
| 78 | 14 | 0 | 0 |
| 161 | 1 | 1 | 0 |
| 503 | 23 | 1 | 0 |
| 776 | 8 | 0 | 0 |

Example 3

Figure 24:
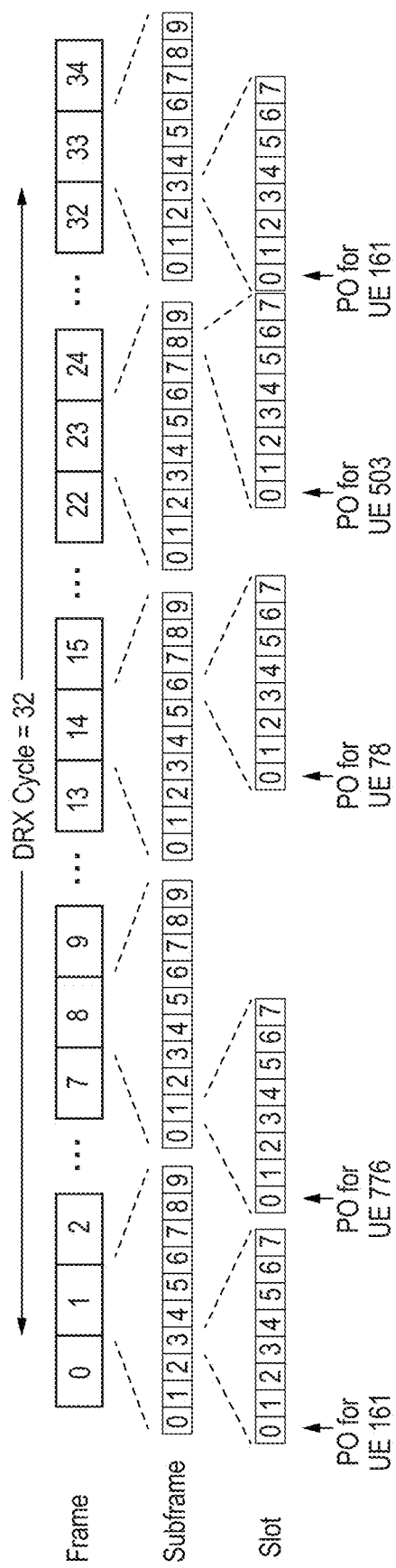
FIG. 24 is an illustration of the results of the NR-PO calculations for a DRX configuration that may be used to support a paging capacity of 4 NR-POs per NR Paging Frame.

In Table 17 we provide a set of DRX parameters that may be used to support a paging capacity of 4 NR-POs per NR-PF. With this set of DRX parameters, the NR-PO may start in slot 0 of subframes 1, 3, 6 or 8. Table 18 provides the results of the PO calculations for different UE IDs. The results of these calculations are also illustrated in FIG. 24.

TABLE 17

DRX Parameters for Example 3

| Parameter | Description | Values |
|---|---|---|
| T | DRX cycle | 32 |
| nB | # of NR-POs per DRX cycle | 4T = 128 |
| MAX_PSF | Max # of NR-PSF per NR-PF | 4 |
| N | # of NR-PFs per DRX cycle | 32 |
| Ns | # of NR-POs per NR-PF | 4 |
| Ns_psf | # of NR-PSFs per NR-PF | 4 |
| Ns_ps | # of NR-PSs per NR-PSF | 1 |

TABLE 18

PO Calculations for Example 3

| UE_ID | PF | i_sf | i_slot |
|---|---|---|---|
| 78 | 14 | 2 | 0 |
| 161 | 1 | 1 | 0 |
| 503 | 23 | 3 | 0 |
| 776 | 8 | 0 | 0 |

Example 4

Figure 25:
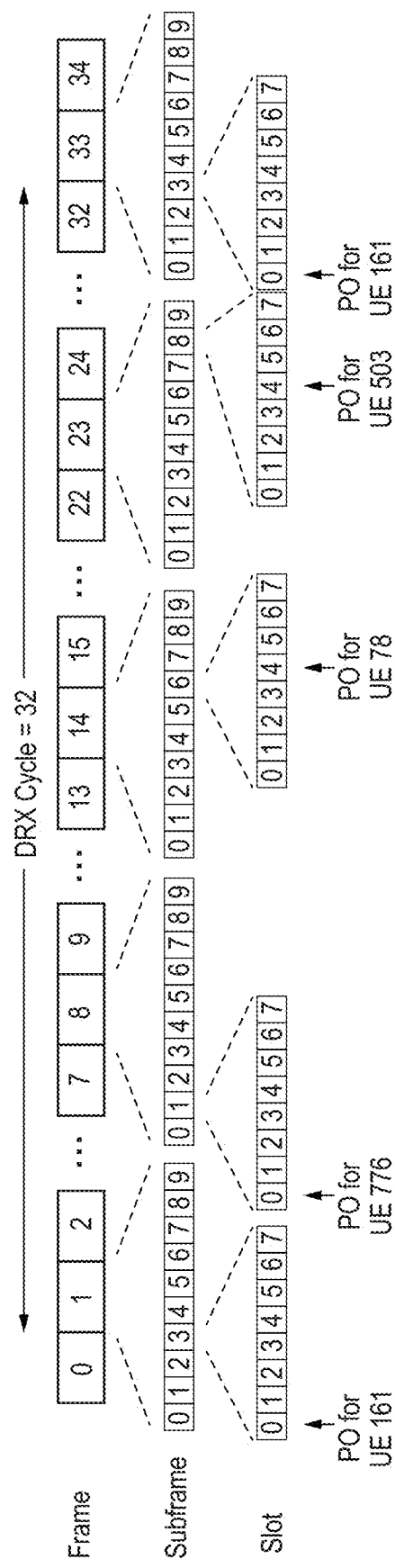
FIG. 25 is an illustration of the results of the NR-PO calculations for a DRX configuration that may be used to support a paging capacity of 8 NR-POs per NR Paging Frame.

In Table 19 we provide a set of DRX parameters that may be used to support a paging capacity of 8 NR-POs per NR-PF. With this set of DRX parameters, the NR-PO may start in slots 0 or 4 of subframes 1, 3, 6 or 8. Table 20 provides the results of the PO calculations for different UE IDs. The results of these calculations are also illustrated in FIG. 25.

TABLE 19

DRX Parameters for Example 4

| Parameter | Description | Values |
|---|---|---|
| T | DRX cycle | 32 |
| nB | # of NR-POs per DRX cycle | 8T = 256 |
| MAX_PSF | Max # of NR-PSF per NR-PF | 4 |
| N | # of NR-PFs per DRX cycle | 32 |
| Ns | # of NR-POs per NR-PF | 8 |
| Ns_psf | # of NR-PSFs per NR-PF | 4 |
| Ns_ps | # of NR-PSs per NR-PSF | 2 |

TABLE 20

PO Calculations for Example 4

| UE_ID | PF | i_sf | i_slot |
|---|---|---|---|
| 78 | 14 | 2 | 1 |
| 161 | 1 | 1 | 0 |
| 503 | 23 | 3 | 1 |
| 776 | 8 | 0 | 0 |

Subframe and Slot Patterns

Exemplary subframe and slot patterns are shown in Table 21 and Table 22. The configurations for the subframe and slot patterns may be predefined, configured in SI, or signaled via higher layer signaling (e.g., RRC). The number of subframes in a radio frame is not dependent on numerology, therefore there aren't any restrictions on what subframe patterns can be used with a given numerology. The number of slots per subframe is dependent on numerology, therefore there are restrictions on what slot patterns can be used with a given numerology; e.g., the slot pattern in a given row of Table 22 can only be used with a given numerology if the number of slots in a subframe is ≥Ns_ps in that row of the table. For example, a system using the numerology µ=3, which is defined to have 8 slots per subframe, would be able to use any of the slot patterns defined in Table 22, but a system using the numerology µ=0, which is defined to have 1 slot per subframe, would be able to use the slot pattern defined in row 1 of Table 22. As a result, a system using the numerology µ=0 could be configured with a paging capacity of 1, 2 or 4 NR-POs per NR-PF, and a system using the numerology µ=3 could be configured with a paging capacity of 1, 2, 4, 8 or 16 NR-POs per NR-PF.

TABLE 21

Subframe Patterns

| Ns_psf | i_sf | | | |
|---|---|---|---|---|
| | 0 | 1 | 2 | 3 |
| 1 | 1 | NA | NA | NA |
| 2 | 1 | 6 | NA | NA |
| 4 | 1 | 3 | 6 | 8 |

TABLE 22

Slot Patterns

| Ns_ps | i_slot | | | |
|---|---|---|---|---|
| | 0 | 1 | 2 | 3 |
| 1 | 0 | NA | NA | NA |
| 2 | 0 | 4 | NA | NA |
| 4 | 0 | 2 | 4 | 6 |

Channel Design—Synchronization Signal (SS) Burst Series

The System may transmit Synchronization Signal (SS) burst Series on a single beam, or a distinct set of beams or group of beams within an SS block. SS blocks and SS bursts are used to perform spatial division multiplexing of the paging transmission. SS blocks and SS bursts may also be used to perform time division multiplexing of paging transmission in addition to spatial division multiplexing.

Figure 26:
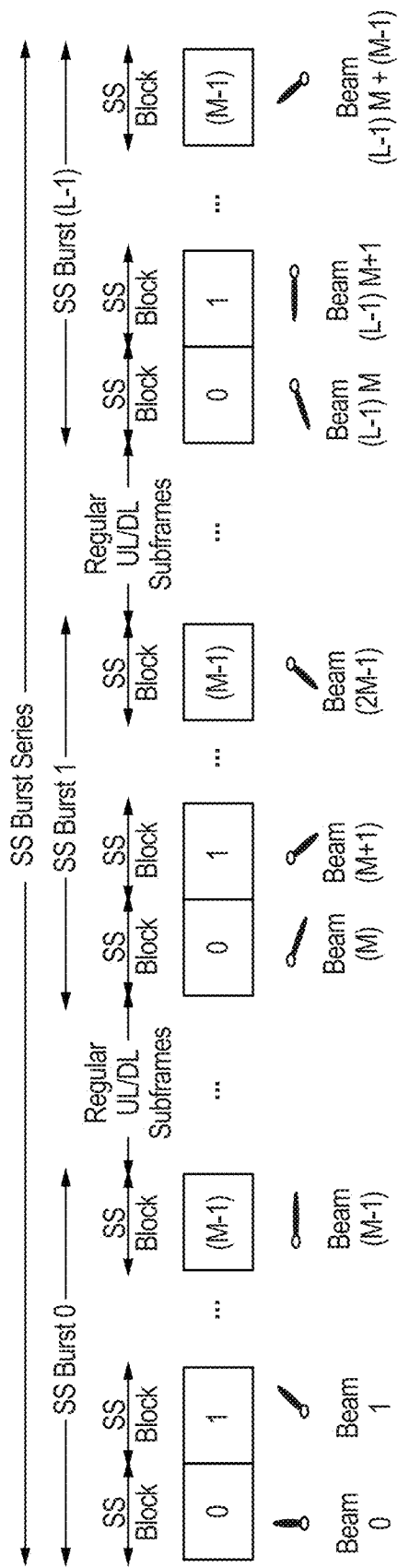
FIG. 26 illustrates an example SS burst series with a single beam transmitted during each SS block.

An exemplary Synchronization Signal (SS) Burst Series is shown in FIG. 26. In this example, the system transmits on one beam during each SS block. There are M SS blocks in each SS burst and L SS bursts in the SS burst series. The total number of SS blocks in a SS burst series is the product L*M. The total number of beams swept during each SS burst series is denoted as $N_B$ and is calculated as: $N_B=L*M$.

Figure 27:
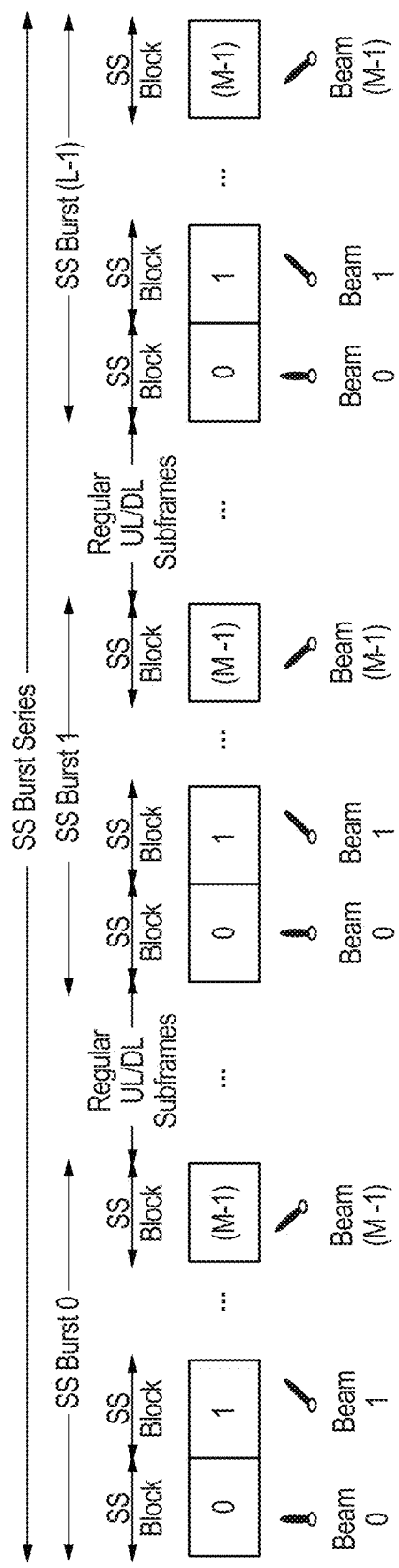
FIG. 27 illustrates an example SS burst series with a single beam transmitted during each SS block and a full sweep completed during each SS burst.

Alternatively, the network may sweep the full set of beams in a single SS burst and then repeat the full sweep in subsequent SS bursts in the series as shown in FIG. 27.

Figure 28:
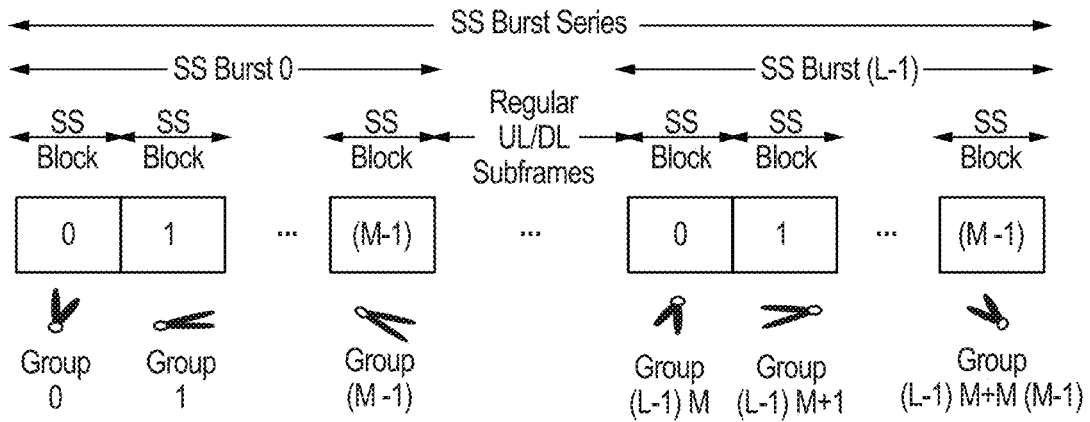
FIG. 28 illustrates an example SS burst series with multiple beams transmitted during each SS block.

The system may also transmit a group of beams during each SS block. For example, the system may transmit $N_{B,Group}=2$ beams during each SS block as shown in FIG. 28. In this case, $N_B$ is calculated as $N_B=N_{B,Group}*L*M$.

Figure 29:
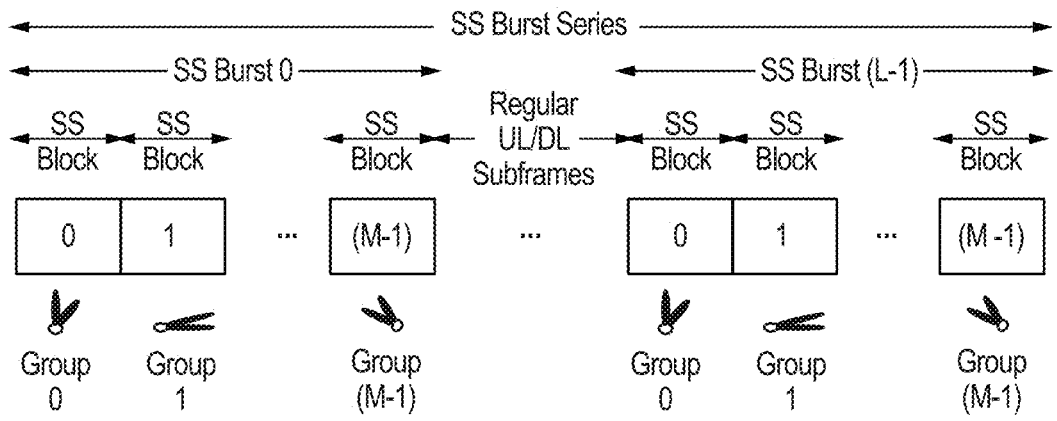
FIG. 29 illustrates an example SS burst series with multiple beams transmitted during each SS block and a full sweep completed during each SS burst.

The system may transmit a group of beams during each SS block and may sweep the full set of beams in a single SS burst and then repeat the full sweep in subsequent SS bursts in the series as shown in FIG. 29.

The NR-PSS, NR-SSS and NR-PBCH are transmitted during the SS blocks. Additional physical channels may also be transmitted during the SS blocks. For example, a physical data channel may be transmitted during an SS block. Such a channel may be referred to as the NR Physical Sweeping Downlink Shared Data Channel (NR-PSDSCH), e.g., a beam sweeping based shared data channel.

The NR-PSDSCH may be used for broadcast, unicast and/or multicast transmissions. The NR-PSDSCH may be scheduled or non-scheduled.

Dynamic scheduling of the NR-PSDSCH may be via Downlink Control Information (DCI), which may be transmitted on a separate physical control channel, e.g., the NR Physical Sweeping Downlink Control Channel (NR-PSDCCH) that is a beam sweeping based control channel transmitted during the SS block.

Figure 30:
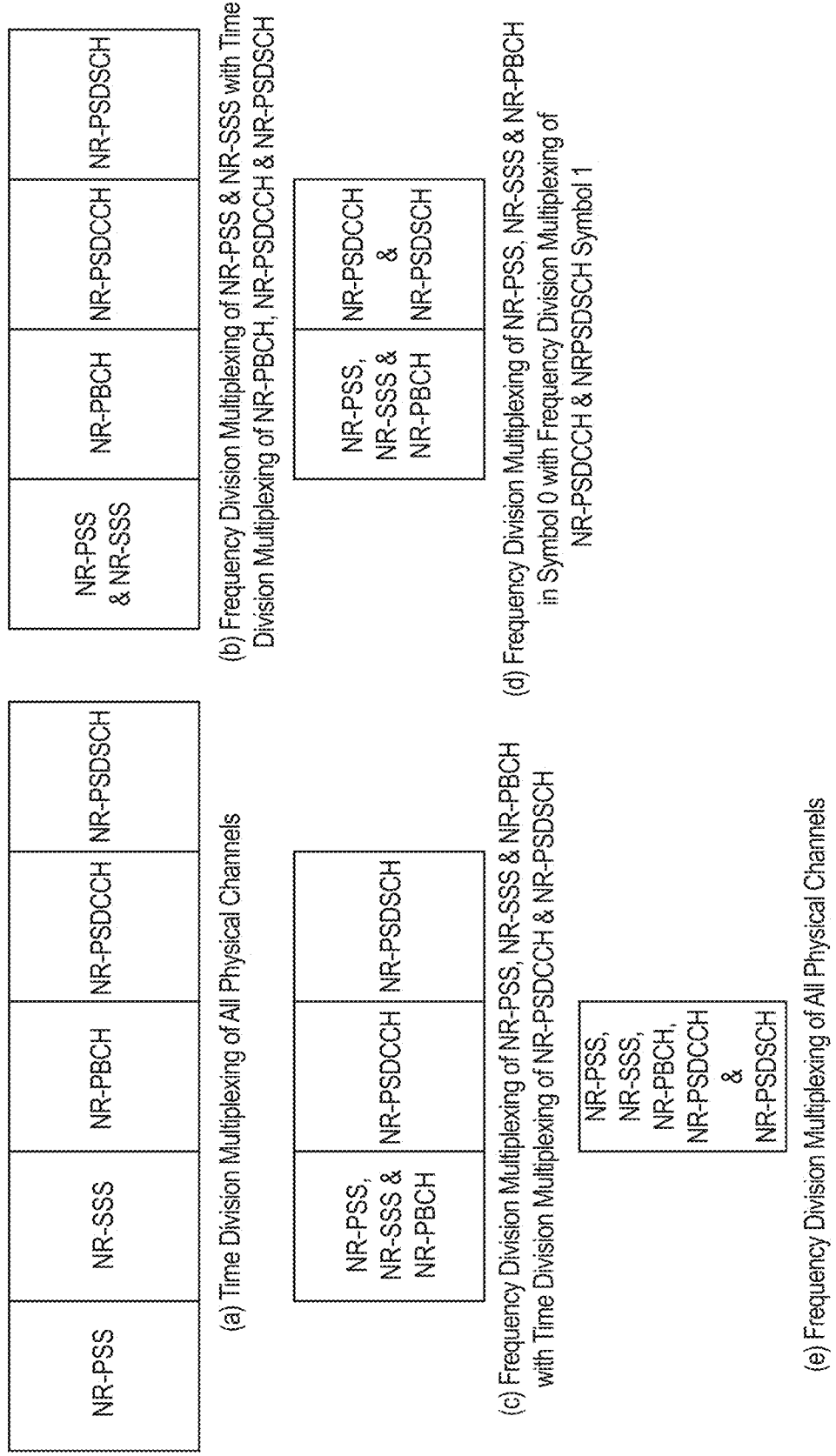
FIG. 30 illustrates examples of ways of multiplexing physical channels transmitted during an SS block.

The DCI may include a downlink assignment for the Paging Message, Paging Indicators (PI), and/or SI modification/PWS indicators. The NR-PSDCCH and NR-PSDSCH may be time multiplexed or frequency multiplexed with the other physical channels that are transmitted during the SS blocks. The PRBs allocated to the NR-PSDCCH and/or NR-PSDSCH may be continuous or discontinuous in frequency. FIG. 30 shows some examples of how the NR-PSDCCH and NR-PSDSCH may be multiplexed with the other physical channels transmitted during the SS blocks. Additional multiplexing combinations are supported by the solution but are not explicitly shown in FIG. 30.

Channel Design—Paging Indicator

An NR Paging Indicator, e.g., a P-RNTI or P-RNTI radio identifier, or the like, is herein denoted as NR-PRNTI. NR-PRNTI, and may be signaled as part of DCI or via NR-PBCH. The NR Paging Indicator may be used to indicate the group(s) from which one or more UEs were page. The NR Paging Group may be based on UE ID; e.g., group is defined as the N MSBs of the UE ID, may be based on "best" DL Tx beam; e.g., group corresponds to the paging block number that corresponds to the "best" DL Tx beam, or may be determined dynamically by gNB and explicitly signaled to UE.

A paging occasion monitoring indicator may be defined. The paging monitoring indicator may be used by the network to indicate to the UE to start monitoring paging occasions. The paging monitoring indicator may also be used by the network to indicate to the UE to stop monitoring paging occasions. The paging occasion monitoring indicator may be UE specific, or specific to a group of UEs. The paging monitoring indicator may be transmitted on a non-scheduled channel for e.g., an NR-PBCH channel. The UE after successfully decoding the paging monitoring indicator instructing the UE to start monitoring POs, the UE starts monitoring future POs that follows the paging monitoring occasion.

Five paging design options are being considered by RAN1.

In a first option, a paging message is scheduled by DCI carried by NR-PDCCH and is transmitted over PCH carried by NR-PDSCH.

In a second option, a paging message is transmitted in a non-scheduled physical channel, where the paging indication may be carried by NR-PBCH or some other channel(s).

In a third option, a paging message is transmitted over PCH carried by NR-PDSCH without DCI. The resource is semi-statically configured.

In a fourth option, a paging message (e.g., only for SI change indication) is transmitted over NR-PDCCH without NR-PDSCH.

In a fifth option, a paging message is transmitted by PDSCH and paging indication is transmitted non-scheduled physical channel.

Paging indication may be understood as the presence of P-RNTI or similar paging radio identifier to notify a UE or group UE of the existence of paging message intended for UEs whose paging occasion matches the paging occasion where the paging identifier is transmitted.

In the case of second, if paging indication is carried by NR-PBCH, such indication may address all UEs or likely a very large group of UEs. However, only a limited number of paging records can practically be included in a paging occasion. In such case, many UEs will unnecessarily attempt to read the paging records in a paging occasion. To avoid this drawback, the network transmits a paging monitoring indicator (on NR-PBCH, NR-MCH e.g., NR multicast channel or other channels) to alert individual UEs or group of UEs to monitor Paging occasion. Once a paging occasion monitoring indicator is detected by a UE, the UE shall start monitoring its paging occasions.

Similarly, the network may transmit the paging monitoring indicator (on NR-PBCH, NR-MCH e.g., NR multicast channel or other channels) to alert individual UEs or group of UEs to stop monitor Paging occasion. Once a paging occasion monitoring stop indicator is detected by a UE, the UE shall stop monitoring its paging occasions.

A timer or a number of paging occasions to monitor may also be specified. Once a paging occasion monitoring indicator is detected by a UE, the UE shall start monitoring its paging occasions until the expiry of the timer or after the UE has monitored the predefined number of paging occasions. The timer or number of paging occasions to monitor may be signaled to the UE through RRC configuration or MAC Control Element (CE).

In the case of third, the P-RNTI or paging radio identifier which indicates the presence of paging message may also be used. The paging radio identifier may be signaled in semi-statically configured resources. The semi-statically configured resources may be UE specific or specific to a group of UE. The UE may read these semi-statically configured resources in response to paging on demand for e.g., in response to a request from the UE to the network for transmission of paging message intended for the UE.

In the case of fifth option, a paging indication will be on non-scheduled channel as opposed to being on the PDCCH. The non-scheduled channel may be physical broadcast channel or physical multicast channel. The paging indication may also be in response to on-demand paging.

Channel Design—Paging Group

NR may divide UEs into M groups in a PO and assign a unique X-RNTI to each group. For the case with paging indication in a UE assisted paging procedure, 'X' is 'PI' (paging indicator), so PI-RNTI is used. For the case of non-UE assisted paging procedure, the 'X' is replaced by 'P', so the X-RNTI is the P-RNTI. The M X-RNTIs ($X\text{-RNTI}_1, X\text{-RNTI}_2, \ldots X\text{-RNTI}_M$) may be defined in one of the following ways: 1) Configured in the specification; 2) Configured through system information such as RMSI (Remaining Minimum System Information).

A UE may unambiguously map to one of the groups based on one or more of the following: 1) UE ID such as S-TMSI or IMSI; 2) Use case such as URLLC or eMBB; 3) UE capability such as the maximum subcarrier spacing it can support; 4) Carrier frequency/bandwidth of wideband carrier/number of supported BWPs.

The UE to X-RNTI mapping rule may be defined in a number of ways. For example, the UE to X-RNTI mapping rule may be configured in the specification; configured through system information such as RMSI (Remaining Minimum System Information); or a UE-specific configuration established through RRC signaling.

For example, a UE may be mapped to a X-RNTI in the following way. UEs that can support 60 KHz SCS and above may use X-RNTIs $X\text{-RNTI}_1$ through $P\text{-RNTI}_N$. Further, the N MSBs of its ID may map to a specific $X\text{-RNTI}_n$.

The advantage of grouping the UEs is that not all UEs have to respond to a paging message (unlike LTE where all UEs in a PO may detect the common P-RNTI and monitor the paging message). Especially if the paging procedure involves UE assisted response, the UL overhead can be significant. P-RNTI based grouping reduces this overhead.

Similar to LTE, a $X\text{-RNTI}_P$ is embedded in the paging DCI, for example, by scrambling the CRC or scrambling the entire encoded and rate matched DCI with a sequence initialized using the $X\text{-RNTI}_P$. If a UE is mapped to group P, it looks for PDCCHs with $P\text{-RNTI}_p$. Multiple X-RNTIs may be signaled in the same PO.

Figure 31:
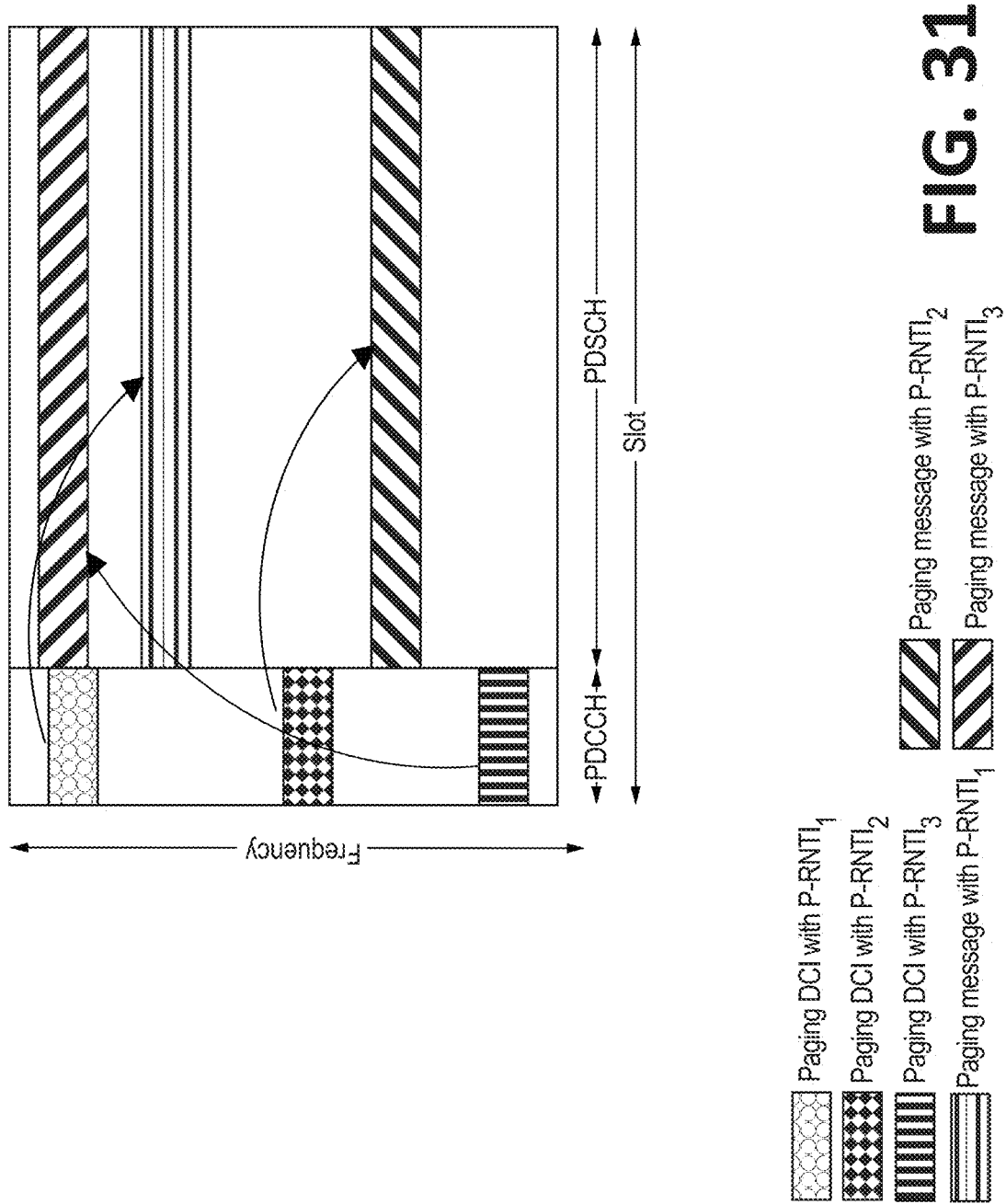
FIG. 31 shows an example for paging multiple groups of UEs with different P-RNTIs.
Figure 32:
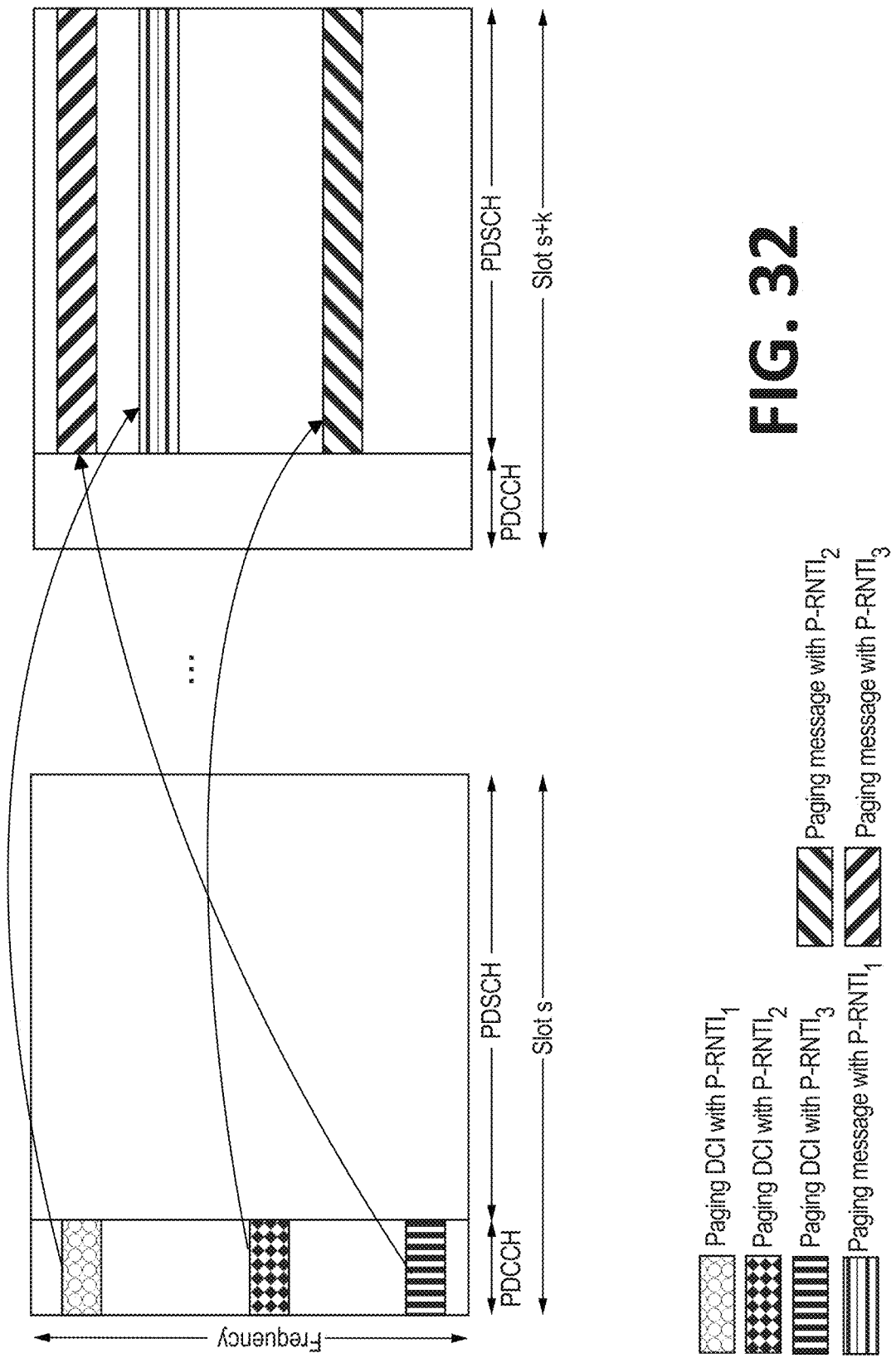
FIG. 32 shows an example paging indication to multiple groups of UEs with different PI-RNTIs.

The paging message may be transmitted such that each paging indication or paging message DCI with $X\text{-RNTI}_p$ corresponds to a distinct paging message signaled through the PDSCH. In this case, the paging message may be scrambled based on a sequence initialized with the $X\text{-RNTI}_p$. In FIG. 31 the case of non-UE assisted paging is considered; the paging DCI and paging message occur in the same slot in a PO. Another example is shown in FIG. 32 for the case of UE-assisted paging where the paging message occurs in a slot different from that of the paging DCI; in this case UE-assisted PRACH response occurs between the DCI and the message depending on the type of paging procedure.

Alternatively, $X\text{-RNTI}_p$ occurring in one PO may map to a common paging message in the PDSCH. The message may contain all the UE-IDs corresponding to the all the paged X-RNTIs in the PO. Thus, all the DCIs indicate the same PDSCH resources for the paging message.

Figure 33:
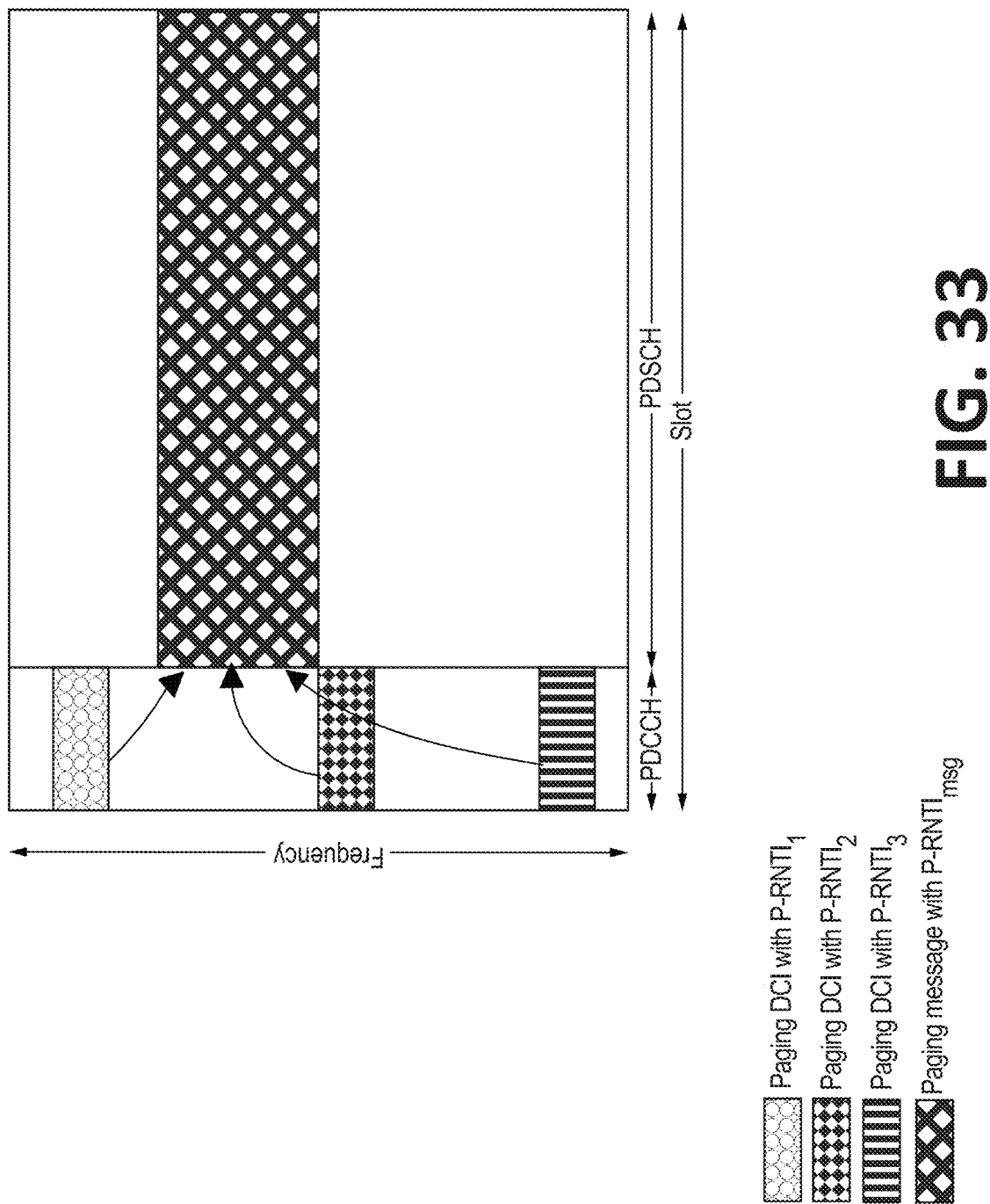
FIG. 33 shows an example of multiple P-RNTIs for groups of PDCCH.
Figure 34:
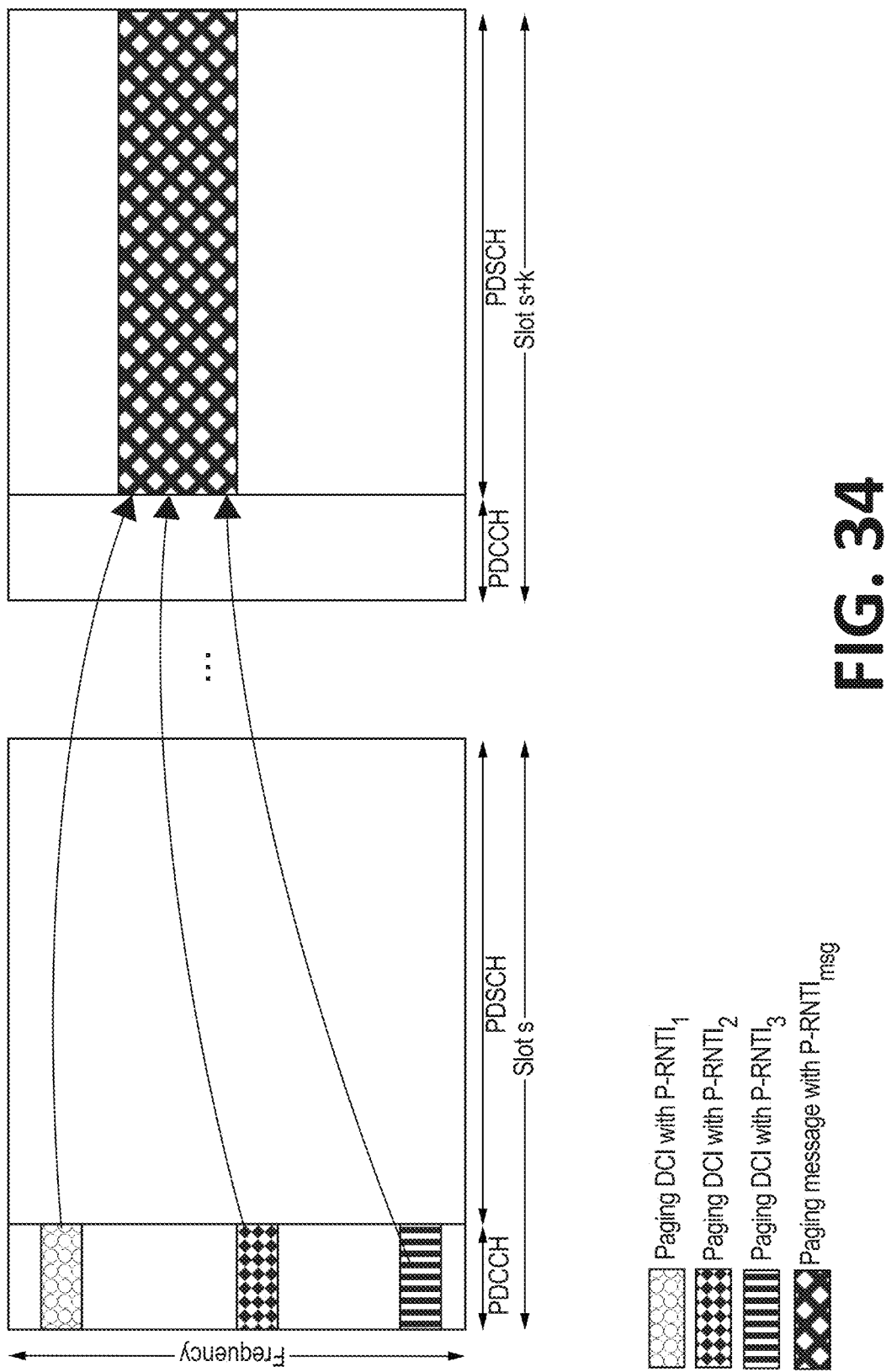
FIG. 34 shows an example of multiple PI-RNTIs for groups of PDCCH.

This paging message on PDSCH may be scrambled with a sequence initialized with $P\text{-RNTI}_{msg}$ which is different from the M P-RNTIs defined for the paging DCI. This is shown in FIG. 33 for a case where the paging message DCI and message occur in the same slot for the non-UE assisted case. The $P\text{-RNTI}_{msg}$ may be specified in the specification or configured through RMSI. Another example is shown in FIG. 34 for the UE-assisted case where the paging indicators in a PO indicate a common PDSCH though respective paging message DCIs.

Channel Design—Non-Scheduled Physical Channel with Paging Indicators.

A non-scheduled physical channel, e.g., the New Radio-Physical Broadcast Channel (NR-PBCH) carrying the main system information, or NR-Secondary Physical Broadcast Channel (NR-SPBCH) carrying the remaining system information, transmitted during a PO may be used to signal paging indicators (PI) that are used to indicate when a UE or group of UEs are paged e.g., to indicate when the NR-PSDSCH/NR-PDSCH is carrying a paging message. The non-scheduled physical channel may signal a single PI, which may be monitored by all UEs during the PO, e.g., for SI change or broadcast warning message. Alternatively, the non-scheduled physical channel may signal multiple PIs, where each PI may be monitored by a subset of the UEs during the PO, thereby allowing a subset of the UEs to be paged during the PO (e.g., a paging group) where the group(s) to which a UE belongs may be predetermined (e.g., based on the device type, service, etc.) or dynamically configured by the network. The PI(s) may be included in the NR-MIB, which is mapped to the BCH and transmitted by the NR-PBCH. Alternatively, the PI(s) may be included in an NR-SIB that is mapped to the DL-SCH and transmitted by the NR-SBCH.

Alternatively, an NR Paging Indicator Channel (NR-PICH) may be defined to signal the PIs. For paging in a multi-beam system, the NR-PICH may be transmitted during an SS block or another "round" of sweeping may be used for transmission of the NR-PICH. For scenarios where the NR-PICH is transmitted during an SS block, the NR-PICH may be time multiplexed or frequency multiplexed with the other physical channels transmitted during the SS block.

Figure 35:
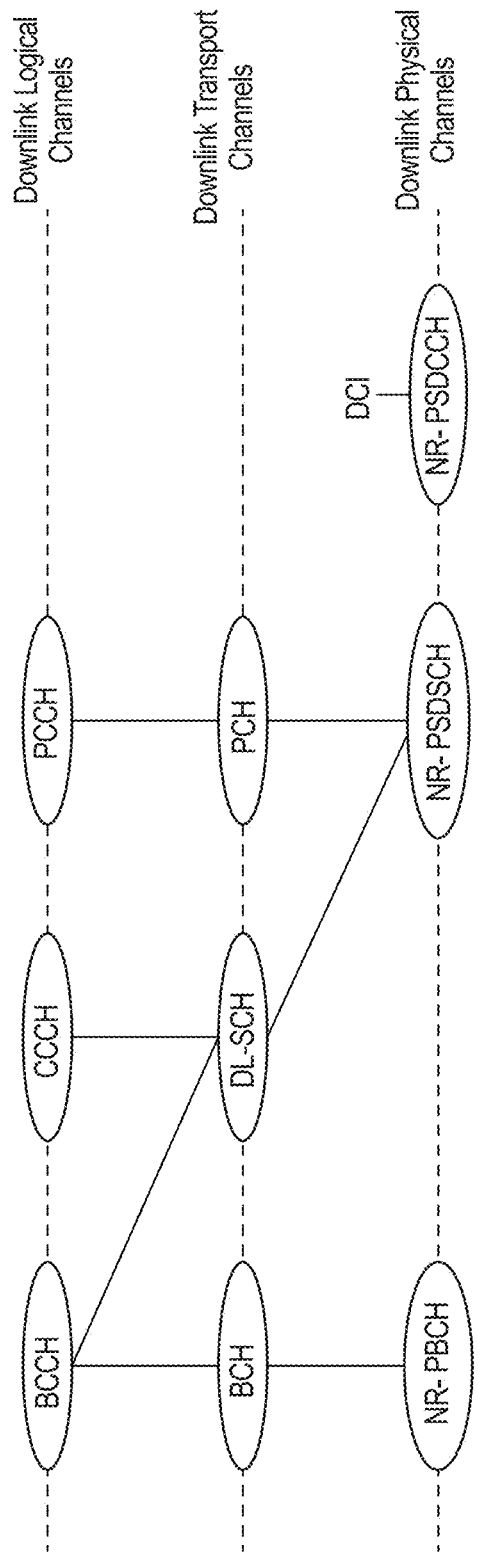
FIG. 35 illustrates an example mapping for channels transmitted during SS blocks.

The higher layer signaling that is performed during an SS block is mapped to the physical channels that are transmitted during the SS block. FIG. 35 shows an example where the BCCH is mapped to the NR-PBCH and/or the NR-PSDSCH; the CCCH is mapped to the NR-PSDSCH; and the PCCH is mapped to the NR-PSDSCH. Here, for example, the Minimum SI may be mapped to the BCH transport channel, which is then mapped to the NR-PBCH; and the Other SI may be mapped to the DL-SCH, which is then mapped to the NR-PSDSCH. Signaling carried via the CCCH and PCCH; e.g., Random Access Response (RAR) Message, PagingMessage, is mapped to the DL-SCH, which is then mapped to the NR-PSDSCH.

Figure 36:
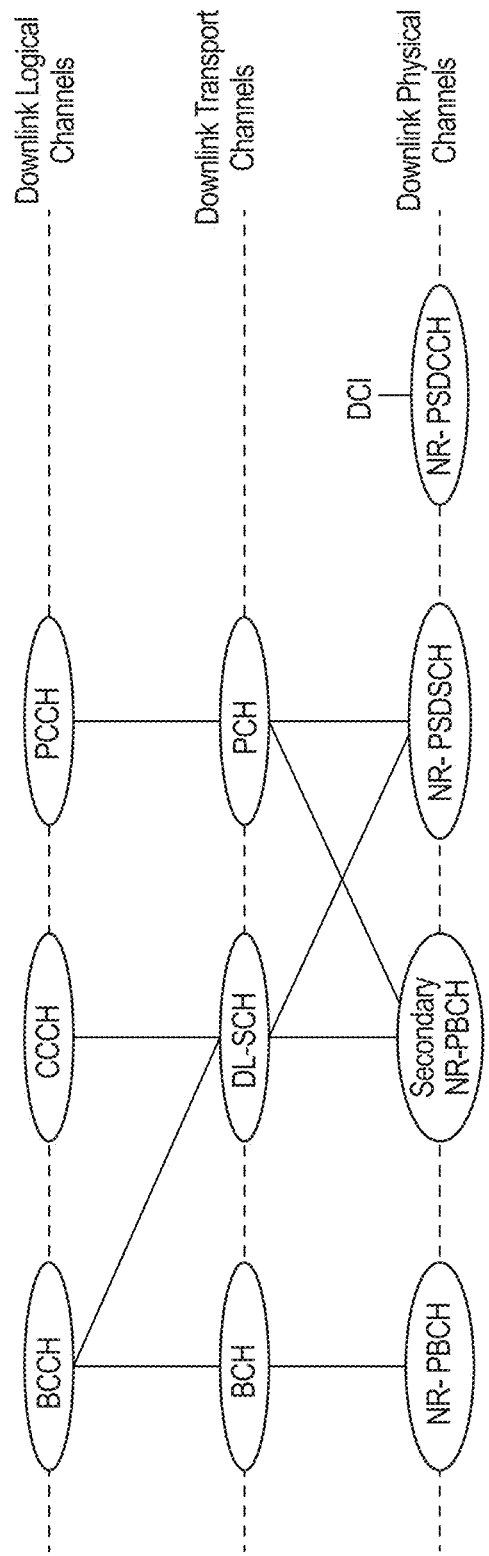
FIG. 36 illustrates an example mapping for channels transmitted during SS blocks with secondary NR-PBCH.
Figure 37:
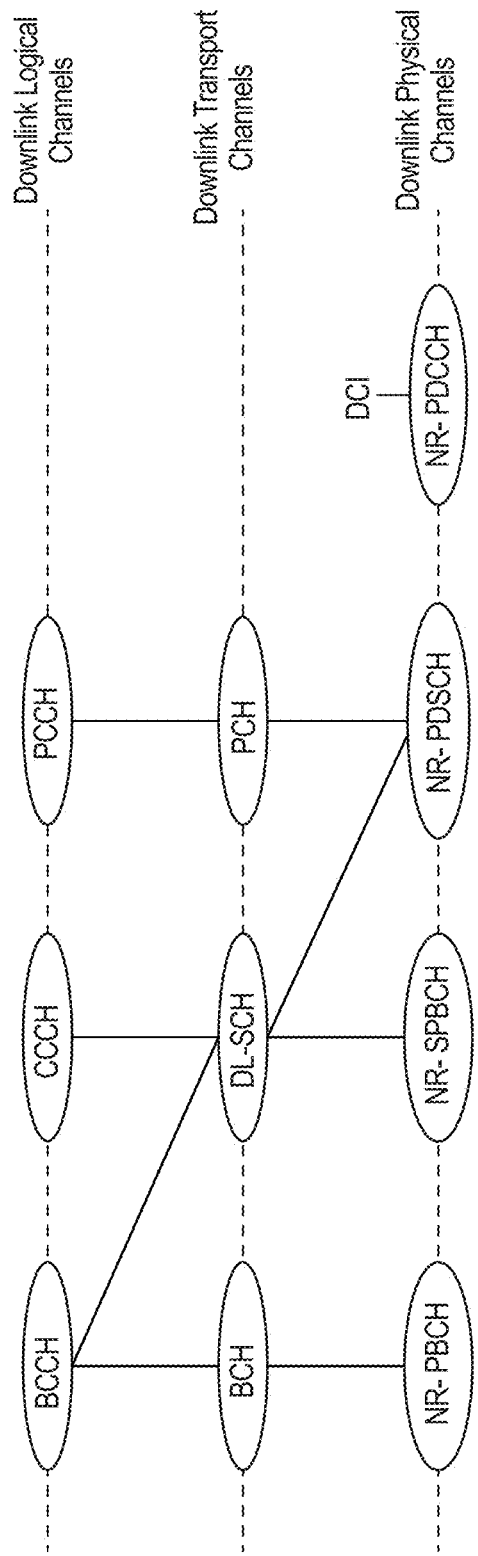
FIG. 37 illustrates an exemplary NR Channel Mapping.
Figure 38:
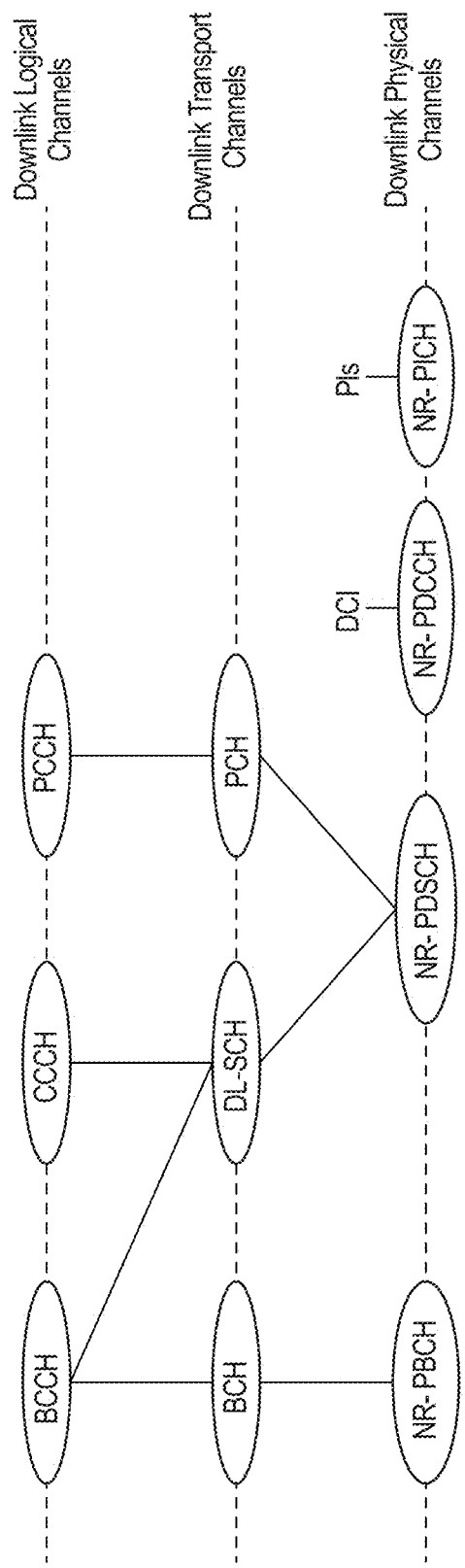
FIG. 38 illustrates an exemplary NR Channel Mapping with NR-PICH.

FIG. 36 shows an example mapping that includes a secondary PBCH that may be used to carry some or all of the higher layer signaling mapped to the DL-SCH and PCH transport channels;

FIG. 37 shows an example mapping that includes a secondary PBCH that may be used to carry some or all of the higher layer signaling mapped to the DL-SCH transport channel and an NR-PDSCH that may be used to carry the higher layer signaling mapped to the PCH transport channel, and FIG. 38 shows an example mapping that includes an NR-PICH that may be used to carry the higher layer signaling mapped to the PCH transport channel.

Other alternatives for scheduling the NR-PSDSCH/NR-PDSCH include but are not limited to semi-static scheduling via higher layers (e.g., RRC) or static configuration per the specification.

After a UE is paged, it monitors for the Paging Message on a scheduled physical channel (e.g., the NR-PDSCH), where the DL time resource to monitor for scheduling of the scheduled physical channel, e.g., NR-PDSCH, may be based on an association with the DL time resource used to transmit the non-scheduled physical channel that carried the PI(s) (e.g., NR-PBCH, NR-SPBCH, or NR-PICH), as shown in FIG. 18. The association may be predetermined (e.g., based on the specification), configured as a cell parameter that is signaled via System Information (SI), or configured as a UE specific parameter that is signaled via dedicated signaling. The frequency resources used for transmission of the Paging Message may be dynamically configured using Downlink Link Information (DCI) that is signaled on a DL control channel (e.g., the NR-PDCCH) transmitted during the DL time resource monitored by the UE. The DCI may be addressed to UEs using a radio identifier reserved for paging (e.g., NR-PRNTI). Alternatively, multiple radio identifiers reserved for paging may be defined, thereby allowing the Paging Message to be addressed to a subset of the UEs that share the PO (e.g., a paging group), where the group(s) to which a UE belongs may be predetermined (e.g., based on the device type, service, etc.) or dynamically configured by the network.

Channel Design—PO Burst Set Design.

In a NR system, a UE wakes up after DRX cycle and checks its Paging Occasion (PO) within a Paging Frame (PF) where the Paging Cycle is associated with the DRX cycle, e.g., Paging Cycle=DRX Cycle. For above 6 GHz, beam sweeping is adopted for paging coverage. A PO Burst Set is defined as including a set of PO bursts to cover a sweeping area for a PO within a PF. Similarly, a NR-SS Burst Set is a set of NR-SS bursts to cover a sweeping area. Therefore, the number of PO within a PF Ns is the same as the number of PO Burst Set Ns', e.g., Ns=Ns'. PO Burst Set designs are disclosed herein with or without SS bursts.

Channel Design—PO Burst Set with SS Bursts

The resource of NR-PDCCH carrying PI(s) information in a PO (e.g., PO allocated within a PF) may be indicated implicitly or explicitly by NR-PBCH (e.g., carrying the main system information) or NR-SPBCH (e.g., carrying the remaining system information) in a SS burst. If the NR-PDCCH carrying PI(s) information in a PO is associated with SS beam sweeping block in a SS burst set, then each resource of NR-PDCCH carrying PI(s) in a PO may share the same beam or may be associated with the beam for sweeping the NR-SS bursts. For example, if a NR-SS Burst Set periodicity is set 20 ms and each NR-SS Burst Set use $N_b$ blocks then $N_b$ NR-PDCCH blocks may carry PI(s) to form a PO Burst Set aligned with the NR-SS Burst Set. The DMRS (demodulation reference signals) configuration for NR-PDCCH carrying PI(s) or paging message may be derived from $N_{ID}^{(1)}$ or $N_{ID}^{(1)}$ where $N_{ID}^{(1)}$ is the NR-SSS ID and $N_{ID}^{(2)}$ is the NR-PSS ID (new radio-primary synchronization signal). The DMRS for NR-PBCH may be extended to the NR-PDCCH carrying PIs in this case as an example. The PF periodicity could be n multiple of NR-SS Burst Set periodicity where n=1, . . . , N, and N is configurable and it may be dependent with DRX cycle, e.g., T=min {Cell DRX cycle, UE DRX cycle}.

An example of PF with 640 ms periodicity (e.g., 64 radio frames for paging cycle) is depicted in FIGS. 39A to 39G. In this example, UE may monitor NR-PBCH (e.g., carrying the main system information) or NR-SPBCH (e.g., carrying the remaining system information) for the resource allocation for NR-PDCCH carrying PI(s) in a PO. The parameters used for calculating the PO allocation with the NR-PDCCH are also exampled in FIGS. 39A to 39G. The numerology of NR-PDCCH carrying PI(s) may be set to be same as NR-PBCH or NR-SPBCH in this example for simplifying the illustration purpose.

If PO Burst Set duration is same as NR-SS Burst Set for covering the same sweeping area, as illustrated in FIG. 39A to FIG. 39F, then the PO Burst Set configuration only needs to indicate where the NR-PDCCHs carrying PIs are allocated, or where the POs are allocated. If the NR-SS Burst Set duration has been altered by system configuration, then UE may accordingly use NR-SS Burst Set duration as the burst duration for PO containing PIs if PO Burst Set duration is same as NR-SS Burst Set. Since each NR PO Burst Set period may be across multiple subframes for covering the sweeping area, let p_s denote the starting subframe in a paging burst set for a PO, e.g., a PO Burst Set. If a paging burst set is aligned with NR-SS burst set as shown in the figures for illustration purpose, then we may design PO Burst Set with the following features.

The number of paging subframe (denoted as $N_s$) in a paging frame may be set as $N_s \in \{1, 2, \ldots, K\}$.

The paging block, e.g., PO Burst Block, spans the same or less than the OFDM symbols used by a NR-SS block, but with the same burst block time interval as NR-SS block.

Figure 39B:
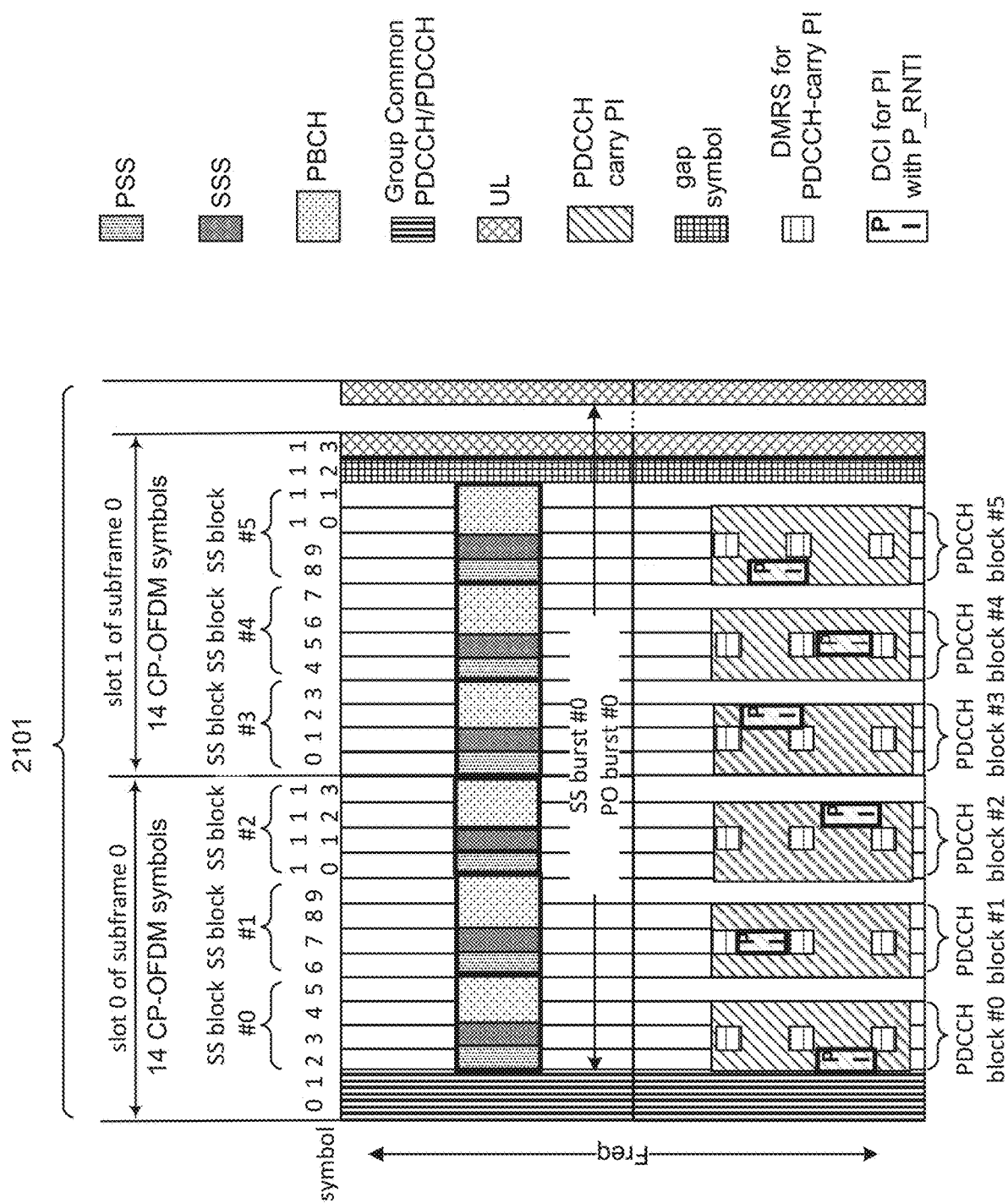
Figure 39C:
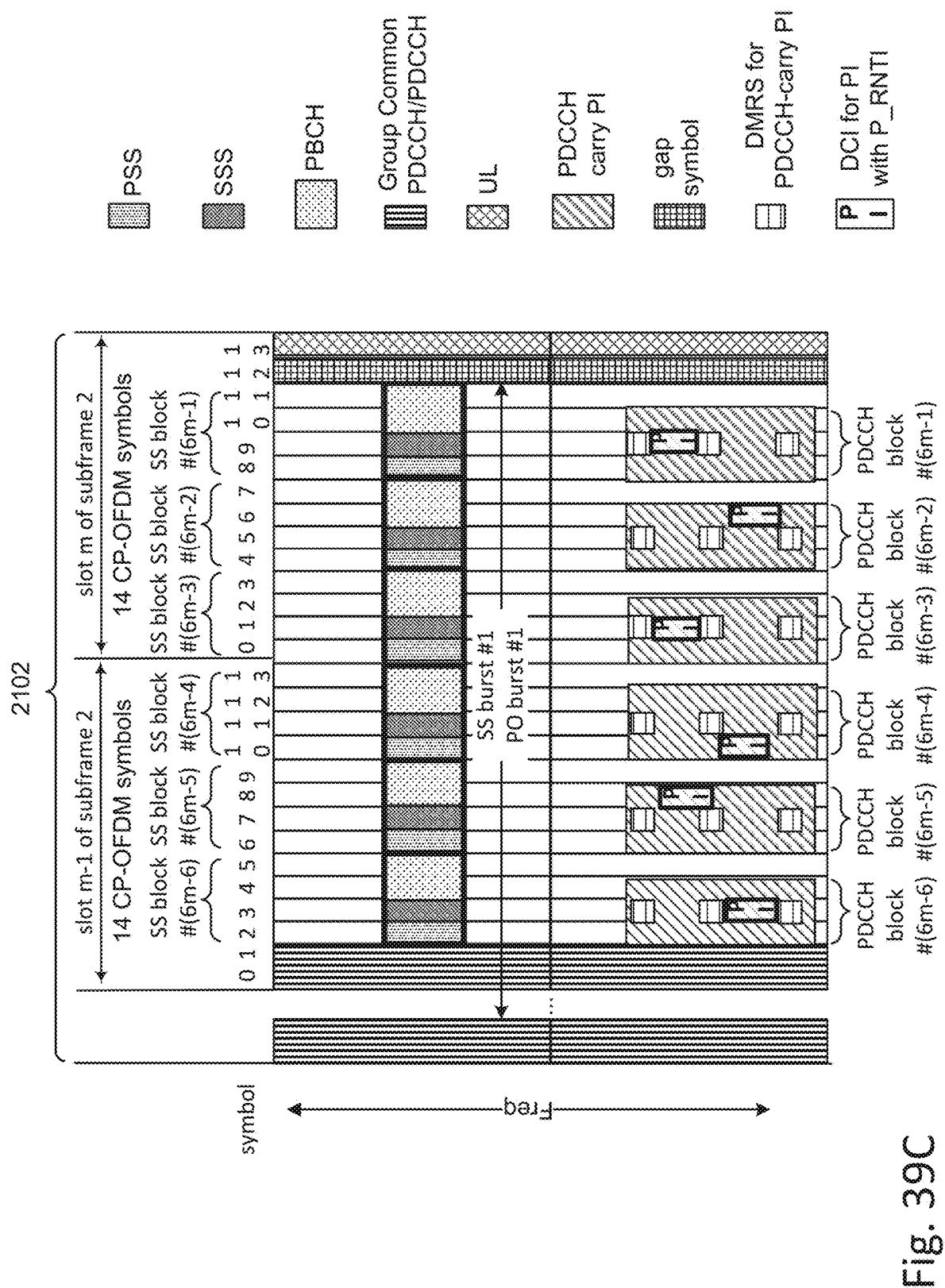

The paging burst set periodicity, e.g., PO Burst Set periodicity, is aligned with NR-SS Burst Set periodicity if sweeping through corresponding burst blocks. For example, contiguous subframes as shown in FIGS. 39A to 39C with SS Blocks FDMed (Frequency Division Multiplexed) with PO Burst Blocks, and FIGS. 39D to 39F with SS Blocks TDMed (Time Division Multiplexed) with PO Burst Blocks.

The paging burst set periodicity, e.g., PO Burst Set periodicity, may also be multiple of NR-SS Burst Set periodicity if sweeping through different bursts of NR-SS burst sets, e.g., noncontiguous subframe sweeping for a PO as shown in FIG. 39G.

The DMRS may be designed for all the DCIs of a PDCCH, and the DCI carrying a PI maybe scrambled with a paging ID such as P-RNTI.

In FIGS. 39A to 39G, the NR-SS Burst Set periodicity may be assumed to be equal to 20 ms and PF periodicity of 640 ms as an exemplar to simplify the illustration. The NR-SS Burst Set duration may be assumed to be 2 ms for covering the sweeping area as an exemplar and PO Burst Set duration may be the same as NR-SS Burst Set duration as illustrated in FIGS. 39A to 39F. Also, is set to 1 (e.g., UE only needs to monitor 1 PO in a PF) as an exemplar and the starting indication of a PO p_s is exemplified with the value of 0 (e.g., the starting subframe for UE to monitor for PO with PI by the UE is subframe 0).

Notes regarding FIGS. 39A to 39C are shown in Table 23.

TABLE 23

Example Parameter Values

| Parameter | Description | Example Value |
|---|---|---|
| T | Paging Cycle or DRx Cycle | T = 64 Radio Frames, e.g., T = 64 |
| nB | number of POs within T | nB = T = 64 |
| UE_ID | e.g., UE IMSI | UE_ID = IMSI mod 1024 = 0 |
| N | number of PFs | N = min {T, nB} = 64 |
| Ns | number of PO in a paging frame | Ns = max {1, nB/T} = 1 |
| Ns' | number of PO Burst Set | Ns' = Ns |
| p_s | PO start index | p_s = floor (UE_ID/N) mod Ns = 0 |

In the example of Table 23, the subframe may be with p_s=0. It is assumed that each contiguous sweeping burst set is 2 ms for covering the whole area, e.g., 2 subframes. For full coverage, number of PO Burst Set=number of PO in a PF (e.g., Ns'=Ns=1). It is assumed that each burst is aligned with a subframe. There are 2 sweeping bursts with a total 6*m blocks in a sweeping burst set. DMRS' port(s) is shared with PBCH within the SSB for every multiplexing DCIs carrying PIs at every paging block and the DCI carrying PIs may be scrambled with P-RNTI.

Figure 39D:
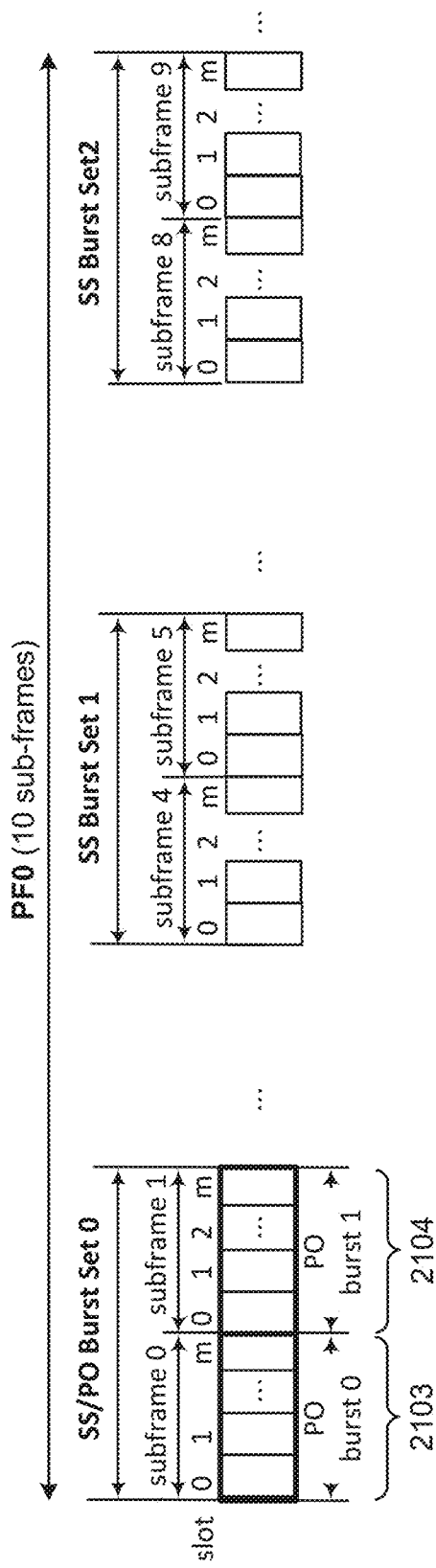
Figure 39E:
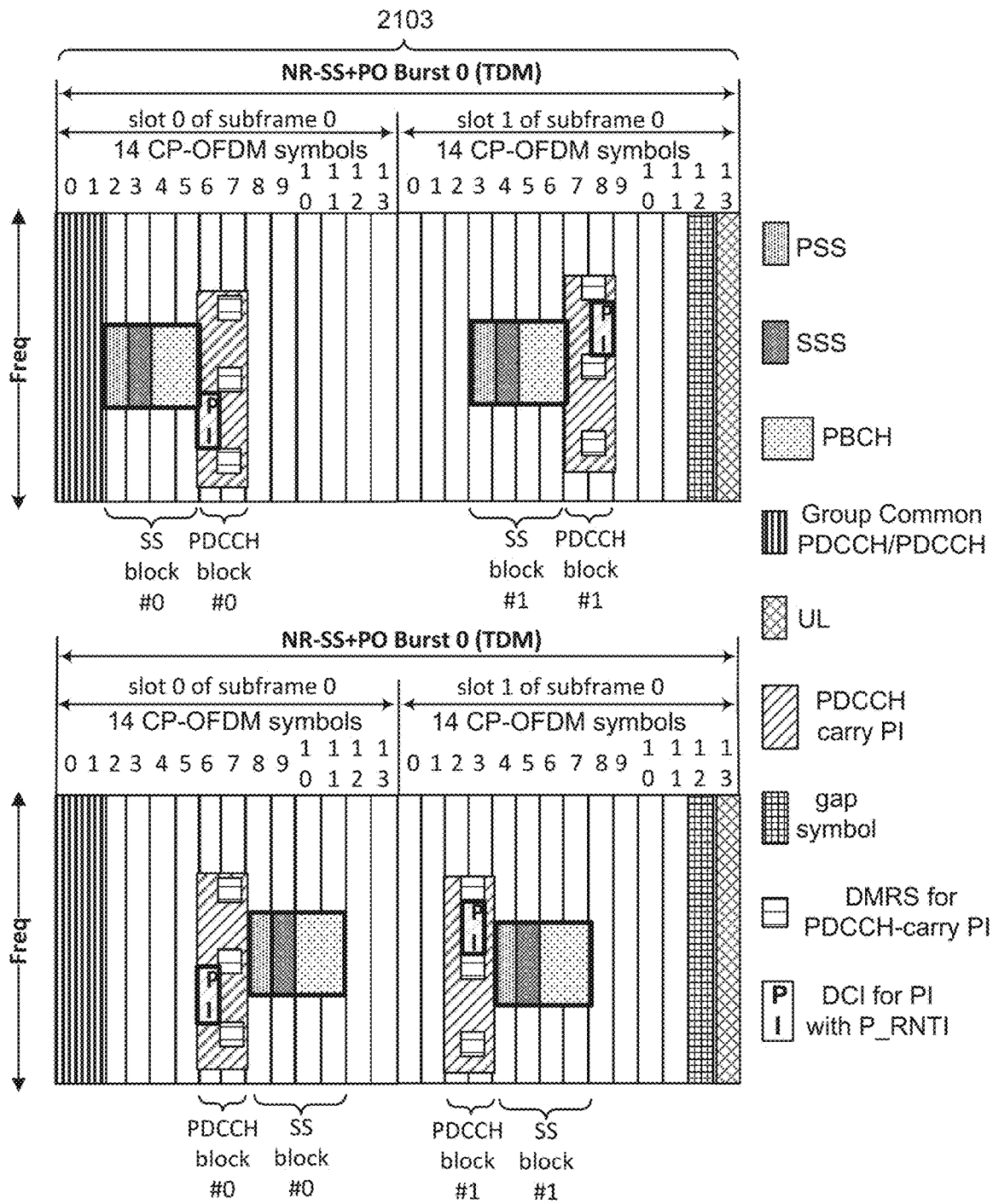
Figure 39F:
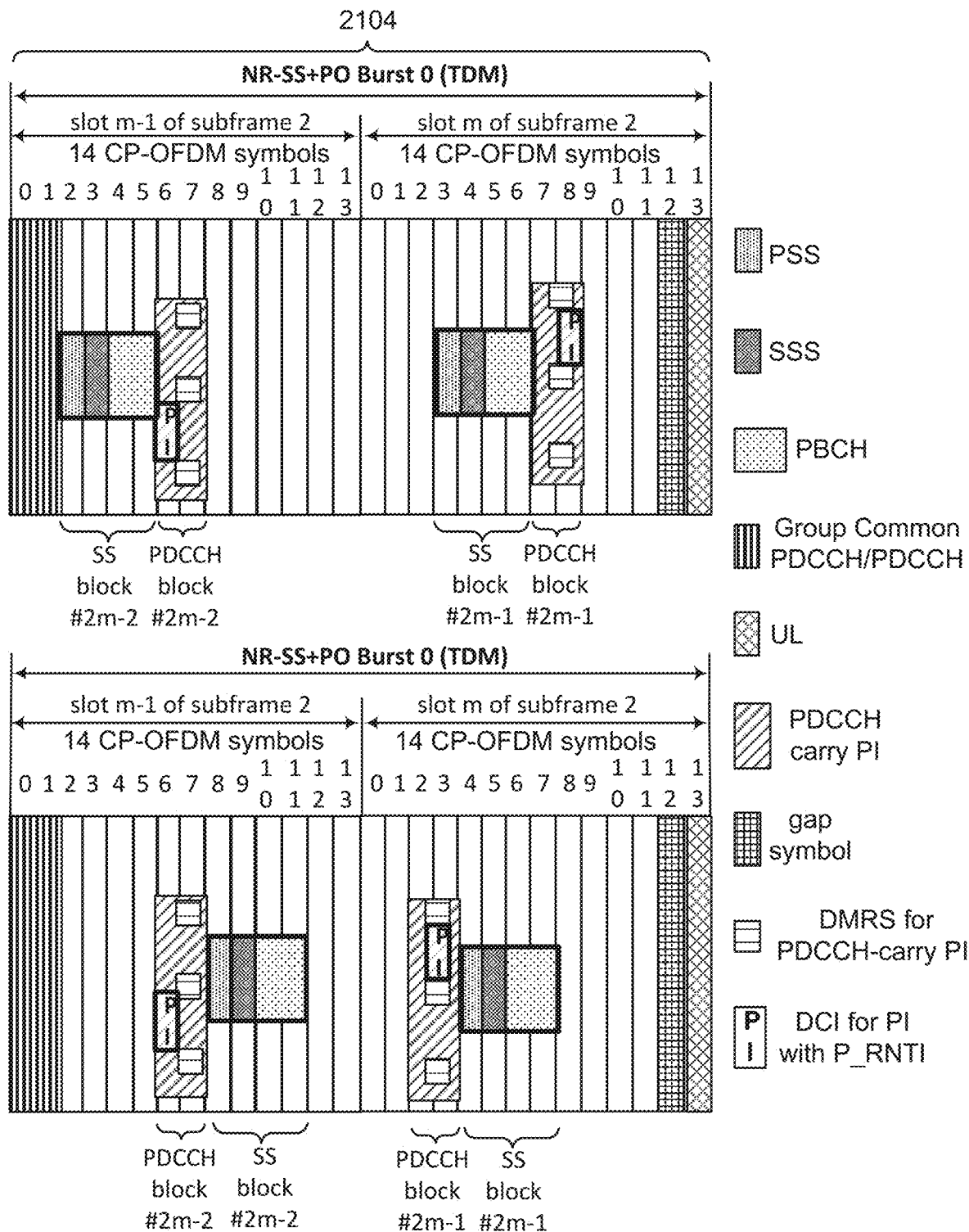

As shown in FIGS. 39D to 39F, the NR-PDCCH carrying PIs may be TDMed (Time Division Multiplexed) with a NR-SS block. If NR-PDCCH carrying PIs for a PO is TDMed with a NR-SS block then UE may assume that the NR-PDCCH carrying PIs may be associated with the same NR-SS block, e.g., same beam or associated beam. This may help UE to quickly identify the NR-PDCCH without further searching beams in another PO Burst Set and hence it may reduce UE PO searching time and thus save battery power. In addition, the DMRS' port(s) for NR-PBCH may be shared with NR-PDCCH carrying PIs. The following is a summary:

NR-PDCCH carrying PIs for a PO may be FDMed with a NR-SS block as shown in FIGS. 39A to 39C or TDMed with a NR-SS block as shown in FIGS. 39D to 39F to save UE searching time and power based on the association between SSB and NR-PDCCH carrying PIs.

If the NR-PDCCH carrying PIs for a PO is FDMed or TDMed with a NR-SS block as shown in FIGS. 39A to 39C or FIGS. 39D to 39F then the DMRS' port(s) for NR-PBCH may be shared with NR-PDCCH carrying PIs because they may share the same beam if FDMed or same or different beams if TDMed. SSB beam of a SSB and PI beams of a paging block may be associated with QCL (Quasi-co-allocate) property if TDMed. The DMRS' port(s) for NR-PBCH may be shared with NR-PDCCH carrying PIs if NR-PDCCH carrying PIs and NR-PBCH are interleaved within a slot.

Channel Design—PO Burst Set without SS Bursts

The beam sweeping burst set for NR-PDCCH carrying PI(s) may be independent with NR-SS bursts, i.e. paging burst blocks are not one-to-one mapped with SS blocks in time. The beam sweeping burst set for NR-PDCCH carrying PI(s) and its allocated resource may be configured by system information (SI). The SI may be carried by NR-PBCH carrying the main system information or NR-SPBCH carrying the remaining system information. If PO Burst Set is independent with NR-SS bursts, e.g., not one-to-one aligned in time as shown in FIGS. 39A to 39C, or FIGS. 39D to 39F, then PO Burst Set may have its own configuration such as number of OFDM symbols, burst set structure and periodicity, etc. FIGS. 40A to 40F illustrate an example that PO Burst Set may be independent with NR-SS Burst Set. In FIGS. 40A to 40F, the PO blocks in a PO Burst Set may be contiguous or non-contiguous, e.g., there is at least one OFDM symbol between each paging block as shown in FIGS. 40C to 40F.

The PO Burst Set may be designed with one or more of the following features, as an example:

The starting indication p_s defines the starting subframe for a PO Burst Set. The minimum distance between the starting subframe of adjacent PO Burst Set is greater than PO burst set duration. For example, if a PO Burst Set duration is set to x ms then $|p\_s(i)-p\_s(j)| \geq nx$, $\forall i \neq j$, n is a positive integer, and x is PO Burst Set duration.

Number of OFDM symbols per PO block may be one or more than one, and PO blocks may be contiguous or non-contiguous.

The number of paging subframe (denote as Ns) in a paging frame may be set greater than 1. For example, $N\_s \in \{1, 2, \ldots, K\}$. The Ns value is configurable and could be dependent on the PO Burst Set structure. For example, if a PO Burst Set duration is set to x ms for covering the sweeping area (e.g., x=2 ms as exemplified in FIGS. 39A to 39G and FIGS. 40A to 40F, then $N\_s \leq [T\_PF/x]$, where TPF is paging frame duration (e.g., TPF=10 ms as exemplified in FIGS. 40A to 40F.)

The number of DL, guard and UL symbols are configurable in a slot.

DMRS configuration parameters such as port number(s).

Figure 40A:
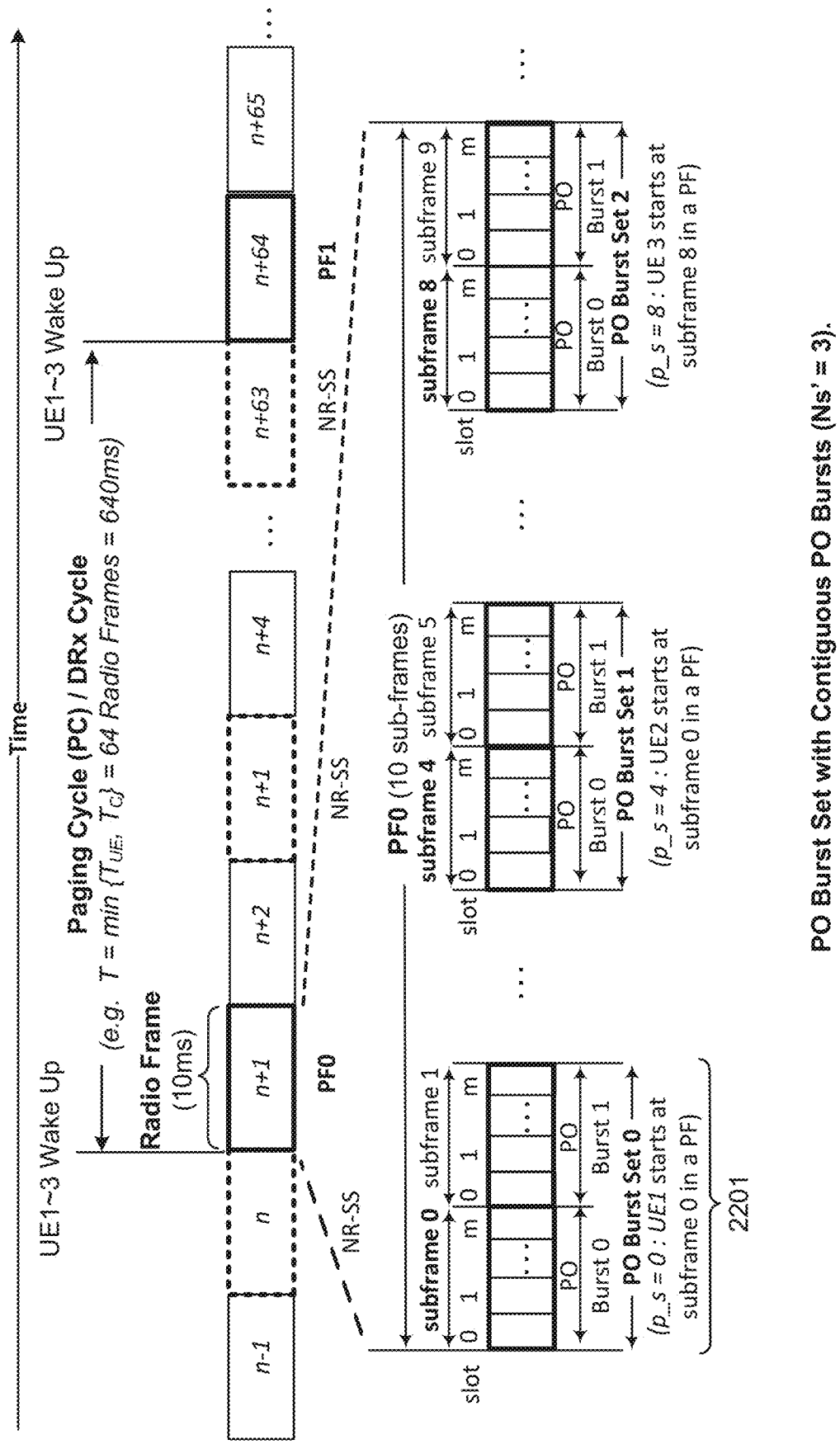
Figure 40C:
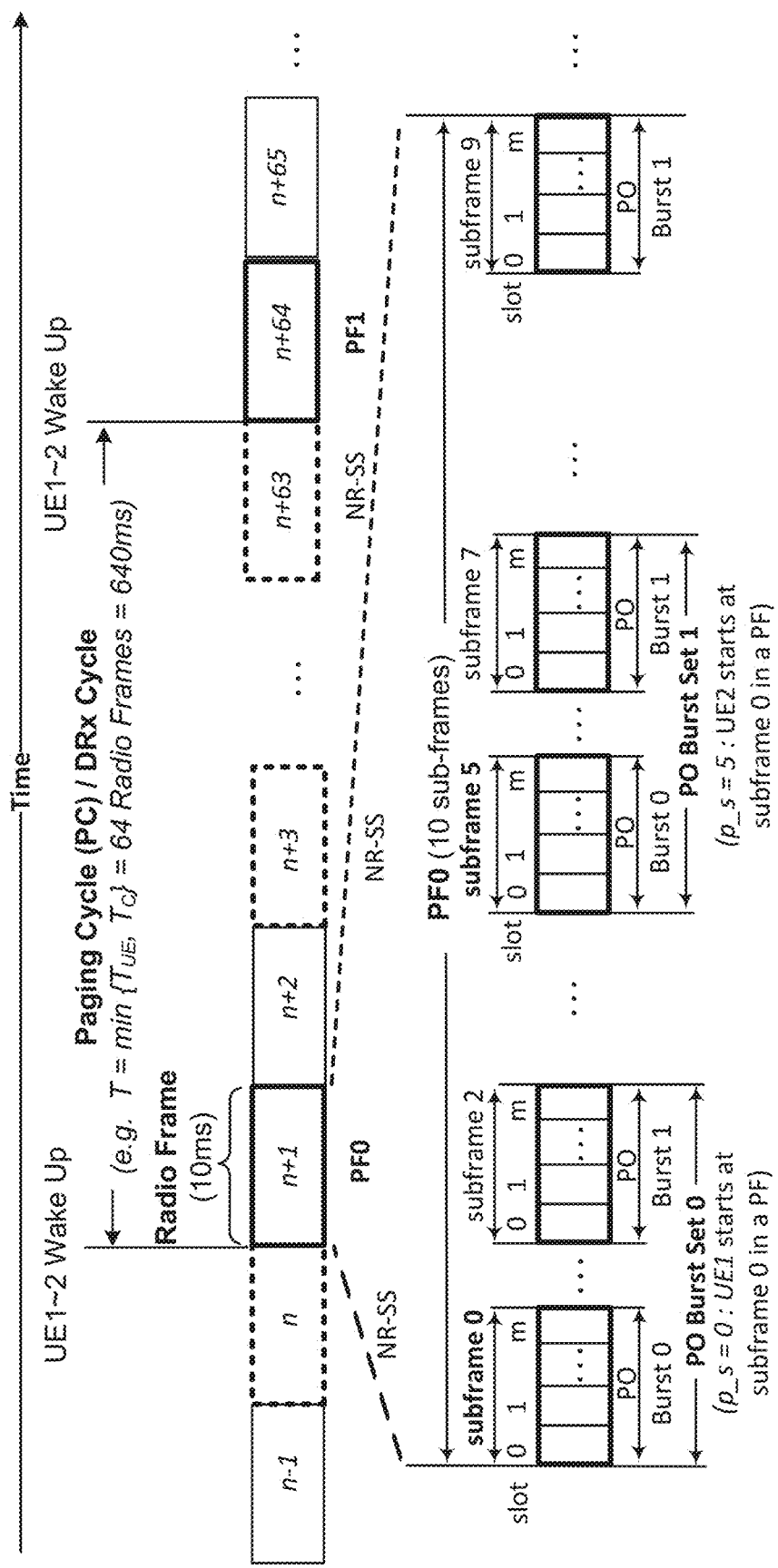

In FIG. 40A to 40F, the NR-SS Burst Set periodicity may be assumed to be equal to 20 ms and PF periodicity of 640 ms for simplifying the illustration purpose. The PO Burst Set duration may be set to 2 ms with contiguous subframe sweeping as exemplified in 46A, or 3 ms with noncontiguous subframe sweeping as shown in FIG. 40C. The Ns may be set to 3 as exemplified in FIGS. 40A and 40B, e.g., there are 3 POs in a PF. The POs' starting indication p_s is exemplified with 0, 4, or 8, e.g., the starting subframe to search PI of a PO is subframe 0, 4, or 8 in this example. The Ns is set to 2 in FIG. 40C, e.g., there are 2 POs in a PF. The starting indication of a PO p_s is set to 0 and 5, e.g., the starting subframe for a UE to search PI of its PO is subframe 0 or 5 in this example.

As discussed before that when a UE wakes up to start searching the NR-PDCCH carrying PI of a PO after a long DRX cycle, the UE may lose the beam pair link established before the DRX cycle. It may be required to perform beam training via NR-SS Burst Set, e.g., detecting or selecting the best beam carrying the SSB. If those NR-PDCCH carrying PIs during a PO Burst Set can be indicated by a NR-SS block in a SS Burst Set then it may help UE to save NR-PDCCH searching time and thus to save power, i.e. the association between SS blocks and paging blocks.

Figure 40D:
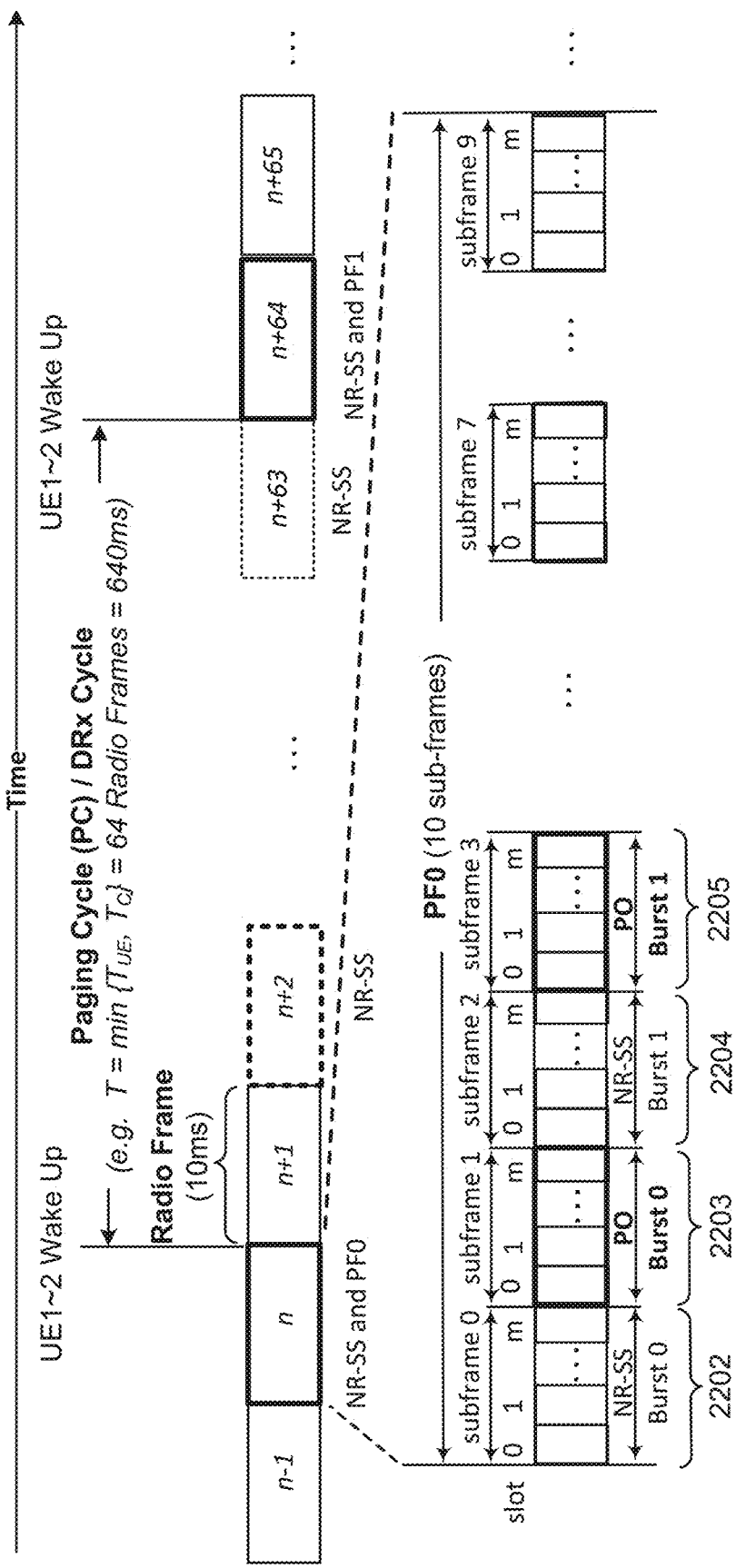
Figure 40E:
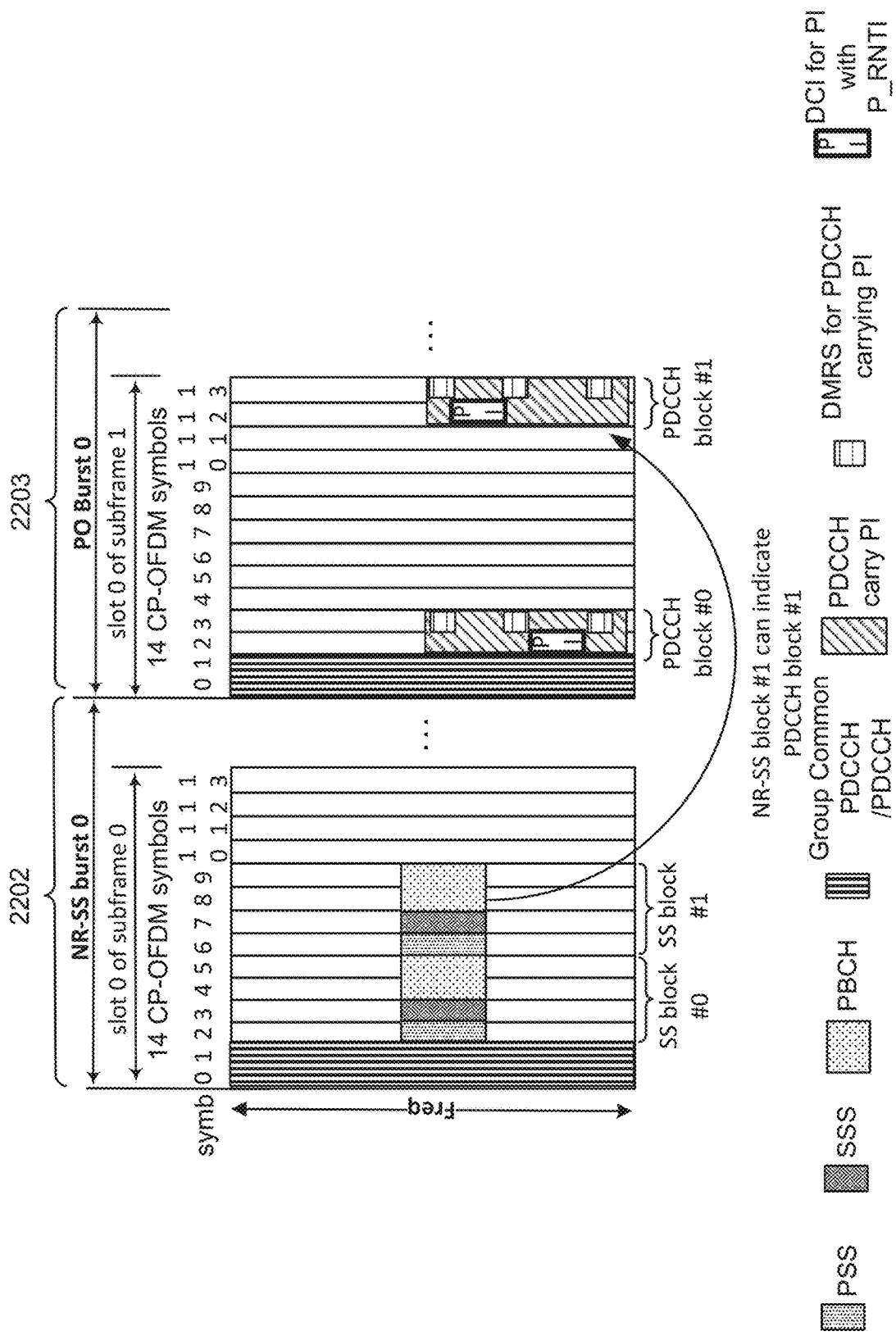

As shown in FIGS. 40D to 40F, NR-SS block may indicate where the corresponding NR-PDCCH carrying PIs. For an example, if TSS (Third Synchronization Signal, e.g., a third signal in addition to PSS and SSS) is used in NR-SS to carry timing information then the TSS may be used as one of indications to indicate where NR-PDCCH carrying PIs. This may help UE to quickly identify the NR-PDCCH without searching the whole PO Burst Set and hence it may save UE searching time and battery power. Another embodiment of indication of the associated NR-PDCCH carrying PIs may be designed with NR-PBCH (e.g., the first physical broadcast channel carrying the main system information) or NR-SPBCH (e.g., the second physical broadcast channel carrying the remaining system information), where the NR-PBCH or NR-SPBCH indicates the associated beam and time allocation for the NR-PDCCH carrying the PIs.

Paging without UE Assistance

The paging may occur in the form of beam sweeping within a PO for a UE. The gNB may sweep the paging DCI carrying the paging indication (PI) across beams and each DCI may schedule the paging message with the paged UE IDs.

Figure 41C:
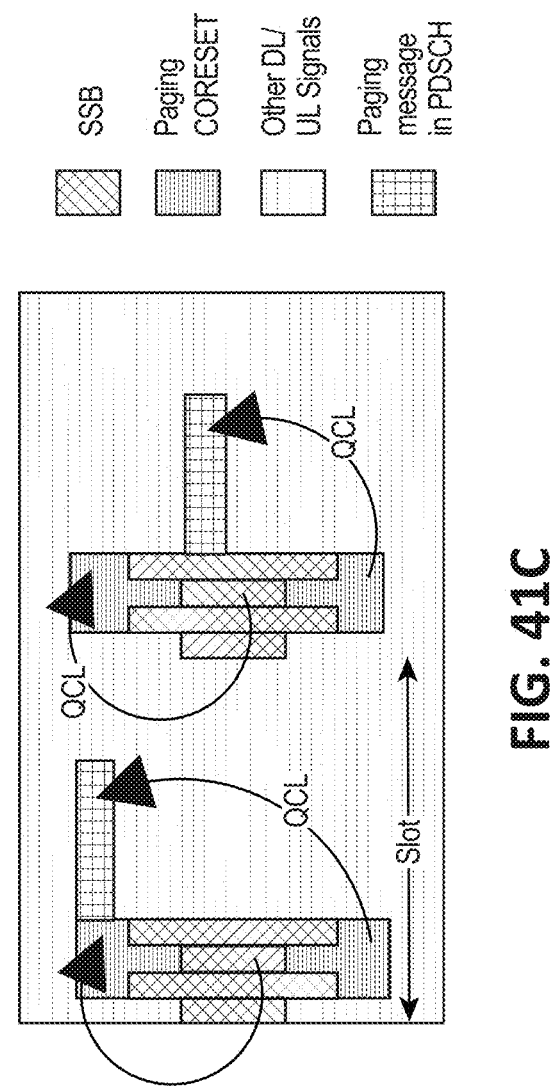
FIG. 41C shows example Multiplexing and QCL between paging DCI/message and SSBs FDM with paging CORESET occupying resources adjacent to SSS.
Figure 41D:
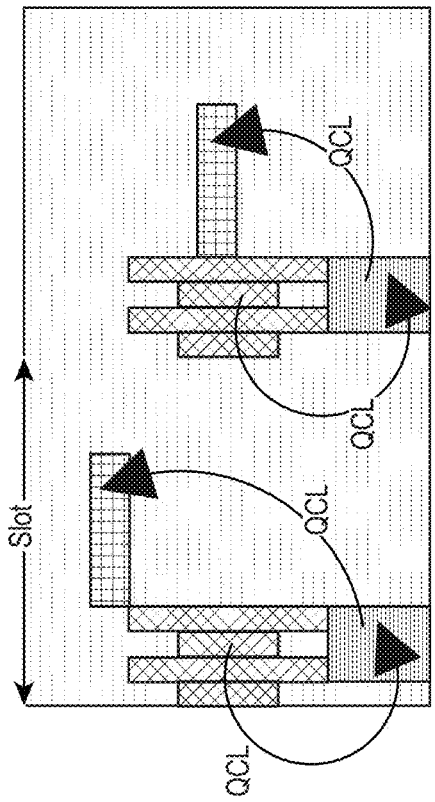
FIG. 41D shows example Multiplexing and QCL between paging DCI/message and SSBs FDM with paging CORESET in different PRBs.
Figure 41E:
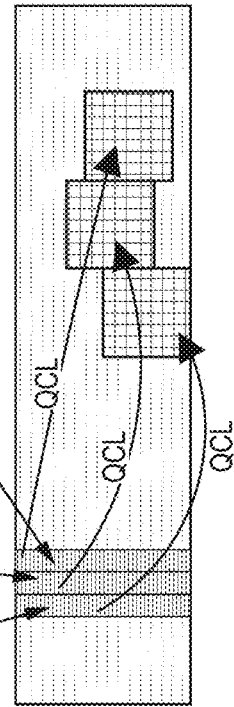
FIG. 41E shows example Multiplexing and QCL between paging DCI/message and SSBs Paging DCI sweep followed by respective PDSCH allocations.
Figure 41E:

FIGS. 41A to 41E show examples of multiplexing and QCL between paging DCI/message and SSBs: in FIG. 41A TDM with paging CORESET leading the SSB; in FIG. 41B TDM with paging CORESET following SSB; in FIG. 41C FDM with paging CORESET occupying resources adjacent to SSS; in FIG. 41D FDM with paging CORESET in different PRBs; and in FIG. 41E Paging DCI sweep followed by respective PDSCH allocations.

The paging DCI may be transmitted in at least two ways, for example. First, in the CORESETs configured for the RMSI through the PBCH. UE may assume QCL between the SSB and paging CORESET. FIG. 41A and FIG. 41B illustrate a sweep through the beams that are transmitted in TDM with the SSBs where the paging CORESET precedes or follows the SSB that it is QCLed with. FIG. 41C and FIG. 41D illustrate a sweep through the beams that are transmitted in FDM with the SSBs where the paging CORESET resources are distributed around the edges of the SSS and in separate FDMed PRBs respectively.

Second, to transmits the paging DCI, in another CORESET (different from the CORESET for RMSI) configured by SI. In this case the SI may also provide the QCL relations of this paging CORESET to other signals such as SSBs. A CORESET sweep may occur followed by a sweep through the PDSCH carrying the paging message as shown in FIG. 41E. The numerology for the CORESET may be explicitly configured through SI or may be the same as the configuring SI.

Indication of spatial QCL may be sufficient for receiving the paging PDCCH.

The paging message may be scheduled in at least three ways, for example. FIGS. 41A to 41E and FIG. 42 illustrate the concept of scheduling the paging message. First, every paging DCI may schedule its own resources for the paging message. FIG. 41A through 26E show examples where the PDSCH is QCL with the paging DCI.

Figure 42:
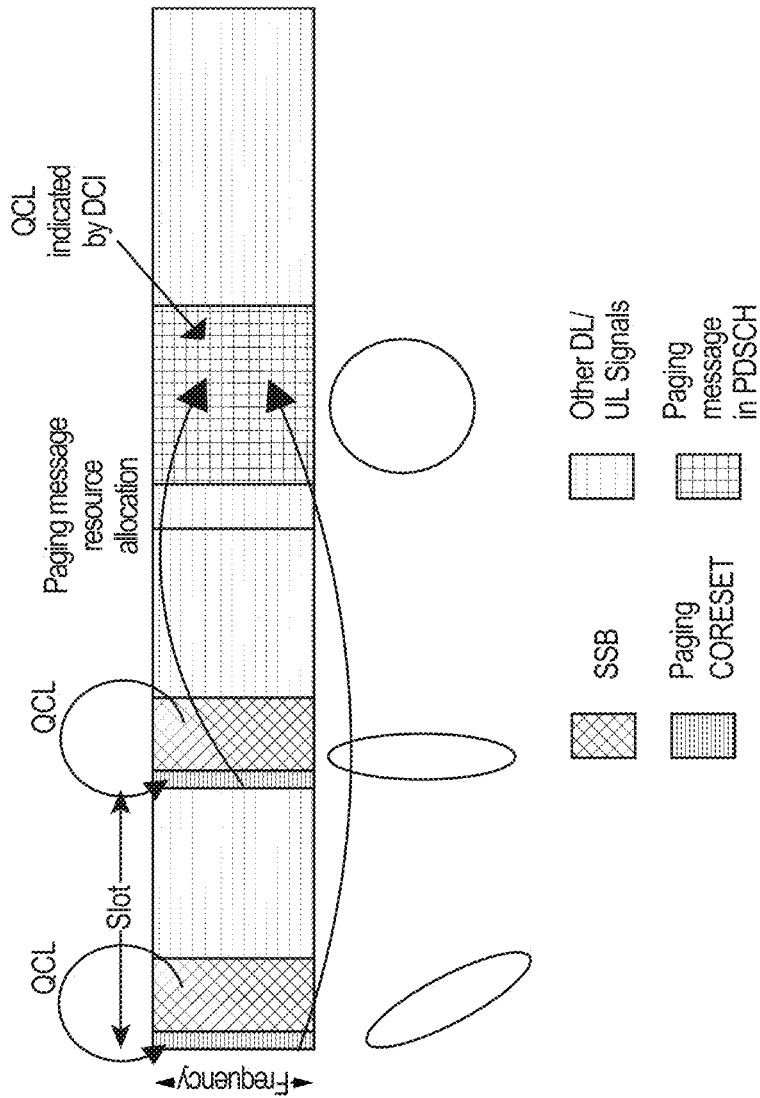
FIG. 42 shows an example Paging DCI on multiple beams but a paging message in a single wider beam.

Second, multiple paging DCIs in a sweep may indicate a common set of resources for the paging message. The paging message may be transmitted in a multicast manner and with a sufficiently low coding rate (high rate matching) so that cell edge UEs can receive it. FIG. 42 shows an example where the DCIs indicate the QCL relation of the PDSCH to an SSB or a paging CORESET.

A third way to schedule a paging message is where the paging message is scheduled within a PO or in a resource outside the PO e.g., a paging message DCI may do a cross slot scheduling of paging message outside the slot in which UE monitors its paging DCI.

In LTE, the P-RNTI is a fixed value 0xFFFE which is used to scramble the DCIs to identify a DCI carrying a paging indication (PI). To reduce the overhead of paging sweep, multiple P-RNTI values may be adapted so that a Paging Indication (PI) CORESET may constrain more than one PI DCIs with different P-RNTI values for different UEs. The UEs may be mapped to different P-RNTI with: P-RNTIx, where x=US-ID mod n (n=2, 3, 4, etc.).

For example with n=2, there are 4 different P-RNTI values such as P-RANTI0=0xFFFA, P-RANTI1=0xFFFB, P-RANTI2=0xFFFC, and P-RANTI3=0xFFFD as reserved by specification or statically configures by the SI or RRC signaling. UEs with its ID end with "00" use P-RANTI0, UEs with "01" use P-RNTI1, UEs with "10" use P-RNTI2, and UEs with "11" use P_RNTI3. If one PI CORESET is allocated in the common search space or paging common search space, there are PI DCIs scrambled with P-RNTI0, P-RNTI1, P-RNTI2, and P-RNTI3 for different UEs respectively. If multiple PI CORESETs are allocated in the common search space or paging common search space, one or more than one P-RNTI may form a PI CORESET for reducing UE's blind searching overhead. For example, one PI CORESET contains the PI DCIs scrambled by P-RNTIi and P-RNTIj, and the other PI-CORESET contains PI DCIs scrambled by P-RNTIk and P-RNTIl, where i≠j≠k≠l. With 4 P-RNTIs, the PI sweeping may be reduced by 4 times, since each PI DCI symbol may contain 4 times PI DCIs scrambled with 4 different P-RNTI values respectively.

Paging CORESET Configuration

The UE may assume spatial QCL relationship between the selected NR-SS block and the CORESET for paging DCI, e.g., DMRS of the CORESET, and DMRS for paging messages, unless otherwise explicitly indicated. The UE may reuse the Rx antenna beam which is used for receiving the beam carrying the selected NR-SS block to receive the paging DCI CORESET (e.g., paging CORESET herein) and paging message. The UE may assume the paging CORESET and paging messages are QCL-ed with the selected NR-SS block, in addition with one or more of the large scale parameters such as average gain, average delay, delay spread, Doppler shift and Doppler spread, etc.

Figure 43A:
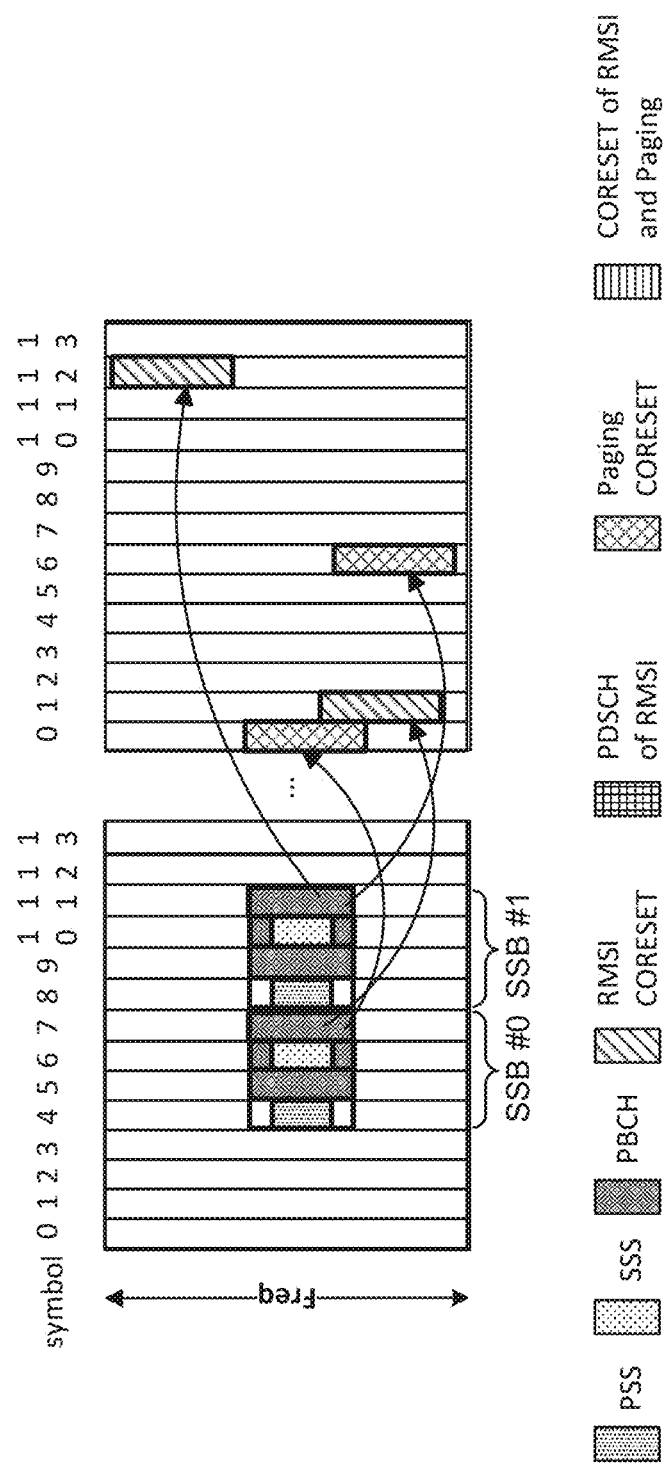
FIGS. 43A to 43C illustrate exemplary associations of paging CORESET.
Figure 43B:
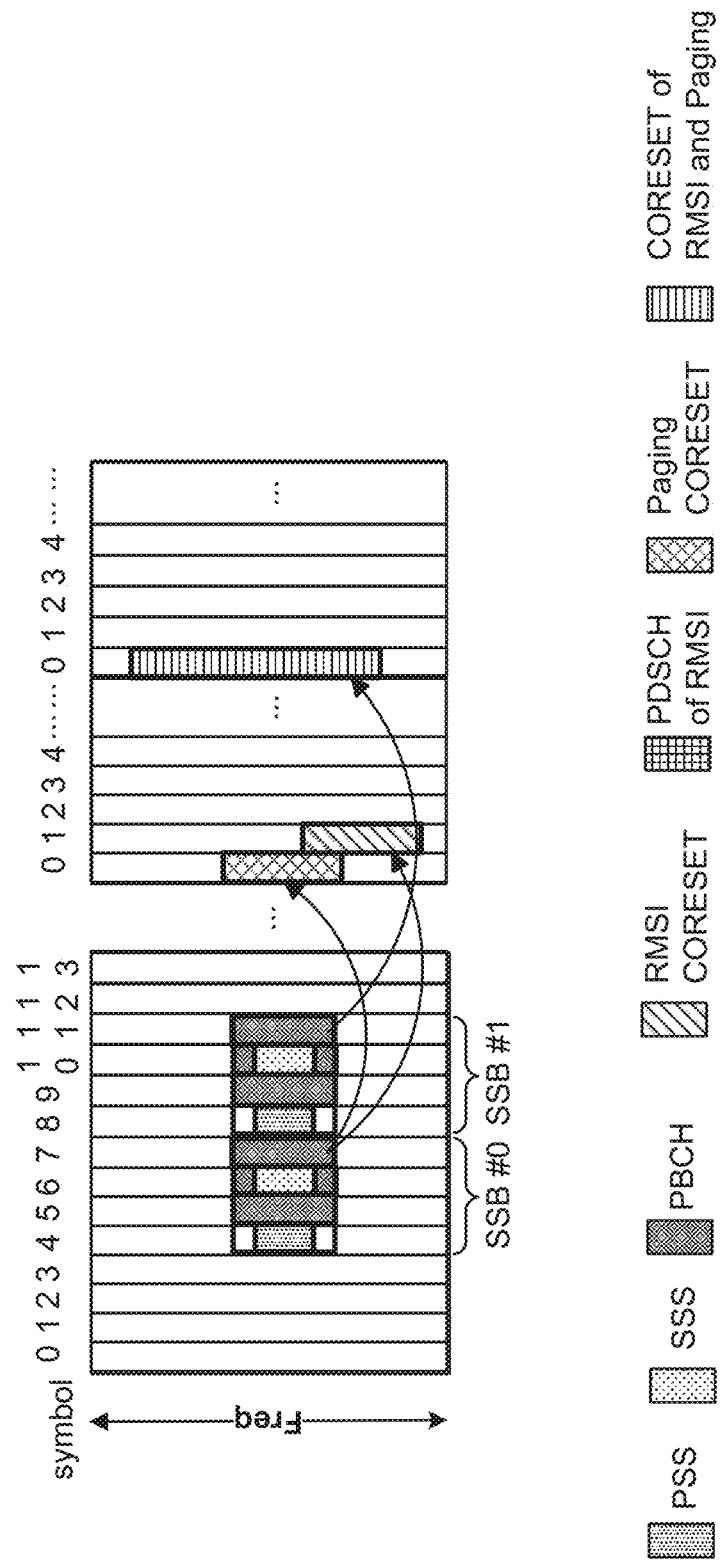
Figure 43C:
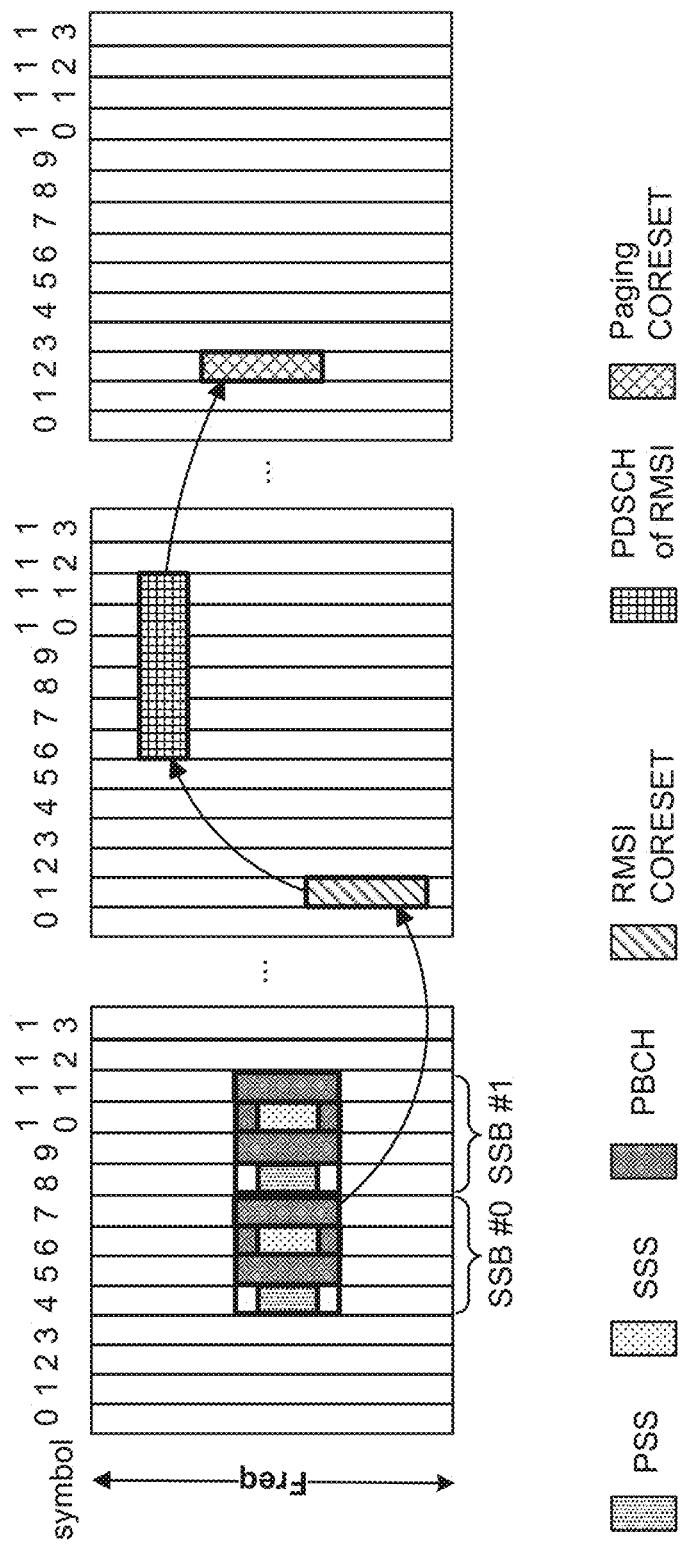

The association of the paging DCI CORESET with the selected NR-SS block may be pre-defined in the specification or indicated by the network via SI or RRC signaling. The association of the paging DCI CORESET with the selected NR-SS block may be indicated with one of the following options as shown in FIGS. 43A-43C.

In a first approach, the paging DCI CORESET may be indicated by the PBCH of the NR-SS block. UE may get the configuration of the paging DCI CORESET by decoding the PBCH of the selected NR-SS block with following alternatives:

In one embodiment, gNB may indicate the associated paging DCI CORESET in the PBCH. An example of the association is shown in FIG. 43A.

In another embodiment, gNB may jointly indicate the associated paging DCI CORESET and RMSI (Remaining Minimum System Information) DCI CORESET. An example of the association is shown in FIG. 43B with following alternatives. According to one aspect, gNB may jointly configure two CORESETs for RMSI DCI and paging DCI respectively, e.g., the association with SS block #0 as exemplified in FIG. 43B. According to yet another aspect, gNB may jointly configure one CORESET for both RMSI DCI and paging DCI, e.g., the association with SS block #1 as exemplified in FIG. 43B.

In a second approach, the paging CORESET may be indicated by the RMSI. gNB uses PBCH to indicate the associated RMSI DCI CORESET which points the PDSCH carrying the RMSI payload. The UE may obtain the configuration of the paging DCI CORESET associated with the selected NR-SS block by decoding the PDSCH carrying the RMSI. An example is shown in FIG. 43C.

Note the paging DCI CORESET may be in the control region of a slot, e.g., the first 1~3 symbols. The paging DCI CORESET may also be allocated in the 4th-14th symbols of a 14-symbol slot as an example, which is outside the first 1~3 symbol control region in a slot. When the paging DCI CORESET is scheduled outside the control region, it may be DCI piggybacked on a NR-PDSCH like an ePDCCH in LTE or be a DCI CORESET in a mini slot containing both PDCCH and PDSCH for paging. The paging DCI CORESET may be TDM-ed (Time Division Multiplexed, e.g., at different symbols), or SDM-ed (Space Division Multiplexed, e.g., on different beams) with the SS block with same or different frequency location, but the paging DCI CORESET may also be FDM-ed (Frequency Division Multiplexed, e.g., at different physical resource blocks in frequency), with or without combination of SDM-ed at different frequency location.

The indication of the paging DCI CORESET may include one or more of the following properties: (i) The frequency resource allocation of the paging DCI CORESET, e.g., number of PRBs (Physical Resource Blocks) or number of Res (Resource Elements) etc. (ii) The frequency position of the paging DCI CORESET, e.g., the frequency offset of the paging DCI CORESET corresponding to the associated NR-SS block or corresponding to the starting PRB (e.g., system reference PRB 0). (iii) Symbol location of the paging DCI CORESET, e.g., a set of consecutive or non-consecutive OFDM symbol indices in a slot corresponding to the CORESET or the index of the starting symbol of the CORESET and the time length of the CORESET in the number of symbols. (iv) Slot location of the paging DCI CORESET within a UE's PO. e.g., the time offset of the paging DCI CORESET corresponding to the selected SS block or to the starting slot of the PO in number of slots.

Within its PO location (e.g., paging indication monitoring window), a UE may determine the exact time and frequency location of the paging DCI CORESET via the paging DCI CORESET configuration in the selected SS block, e.g., the association with the SSB. The paging DCI CORESET may be configured with one of the following methods:

In a first option, a look up table may be applied with a list of configuration indices. Each index represents a set of pre-defined configurations of the paging DCI CORESET allocation properties.

In a second option, gNB may configure each paging DCI CORESET allocation individually. E.g., each paging DCI CORESET allocation property may have an independent table of configuration indices list.

In a third option, gNB may configure some paging DCI CORESET allocations properties jointly, while others are configured individually. E.g., gNB may configure the bandwidth and frequency properties together with one look up table while others, such as slot and symbol, are configured separately.

Note, the allocation properties of the paging DCI CORESET may be configured explicitly or implicitly. E.g., some properties may be explicitly configured by the paging DCI CORESET indication carried by the PBCH in the SS block, others may be derived from the properties indicated with certain relationship with PBCH which is pre-defined in the specification or pre-configured, e.g., the QCL property with the DMRS' port.

Figure 44A:
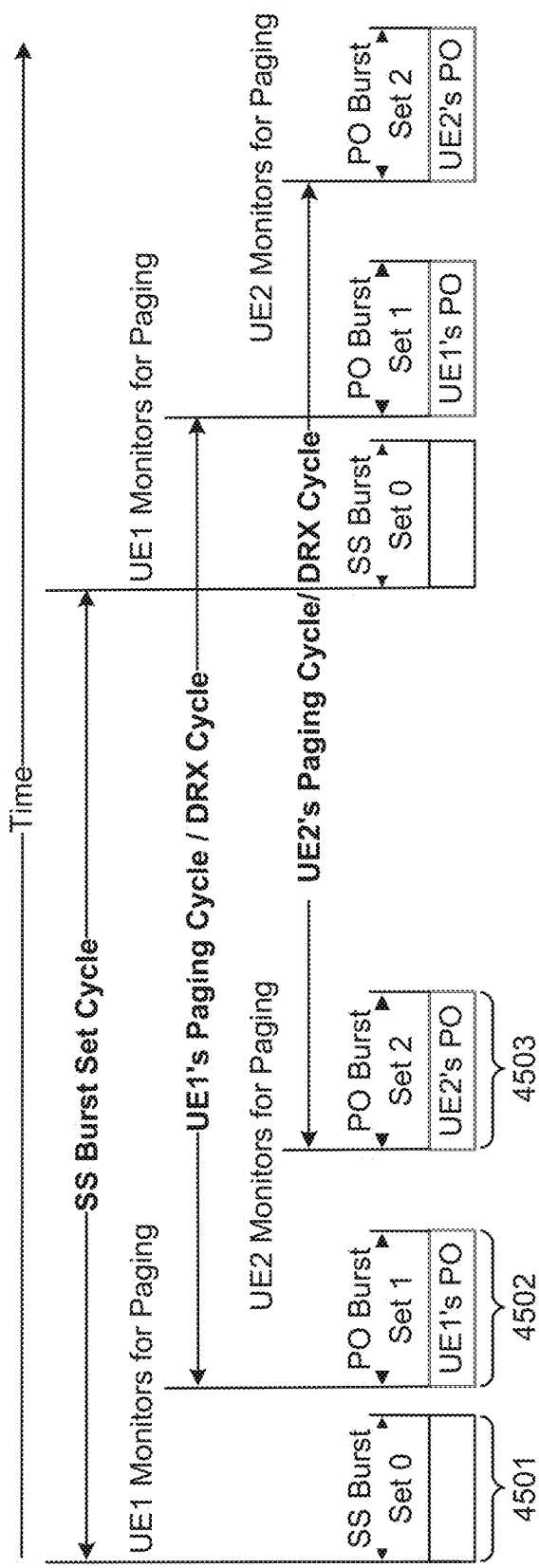
FIGS. 44A to 44C illustrate an exemplary association of paging CORESET Configuration with Multiple PO Burst Sets.
Figure 44B:
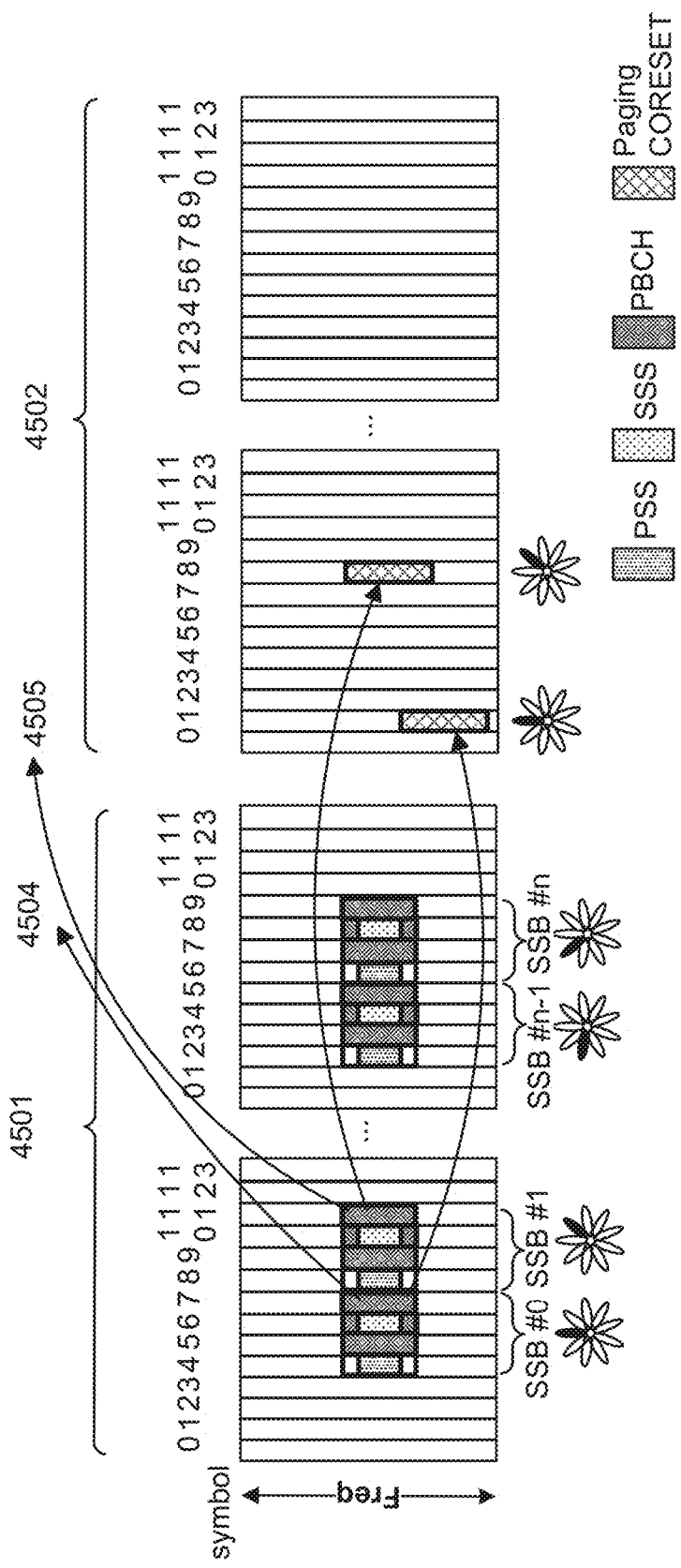
Figure 44C:
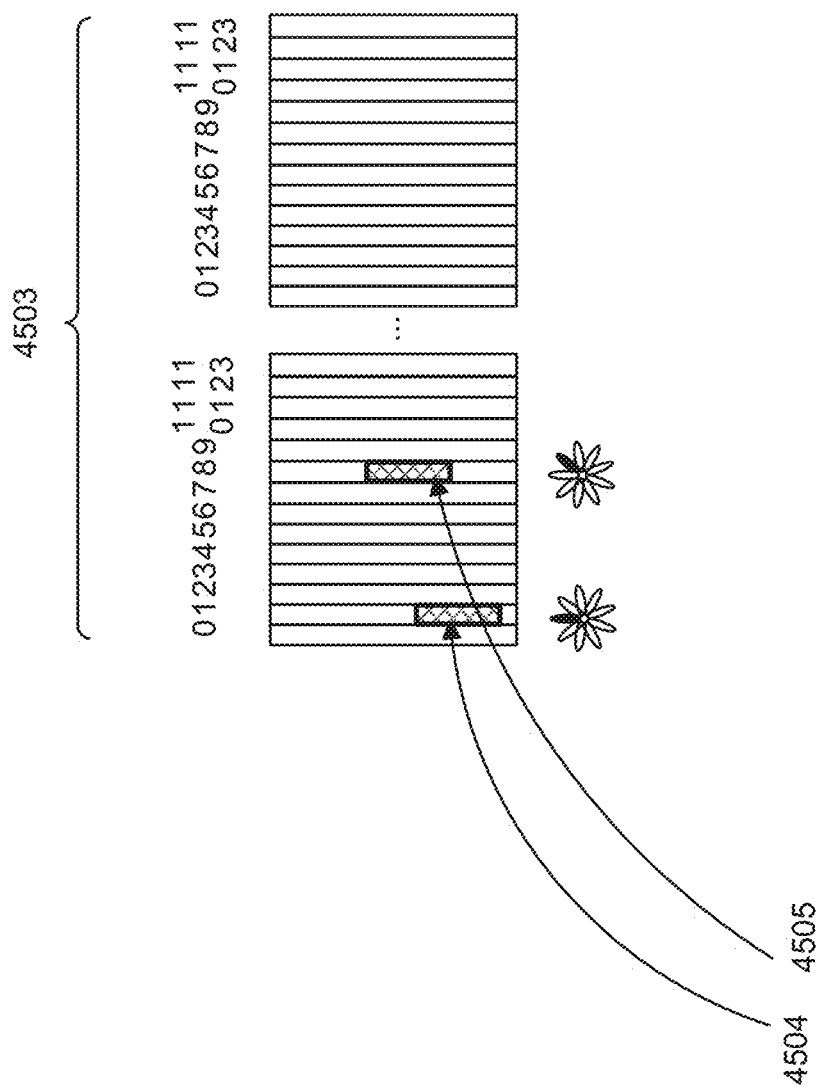

The paging DCI CORESET indicated by one SS block may apply to all the UEs selected the same SS block with different DRX wake up timer and different PO burst sets (e.g., each UE's PO allocation). An example is shown in FIGS. 44A to 44C, where both UE1 and UE2 select the beam carrying SS block #0 as the best beam. The UE1 and UE2 may decode the same paging CORESET configuration from the PBCH in SS block #0 for example, then based on different starting points of the PO burst set for each UE, UE1 and UE2 may determine the associated paging DCI CORESET with different time and frequency location in different PO burst sets.

Figure 45A:
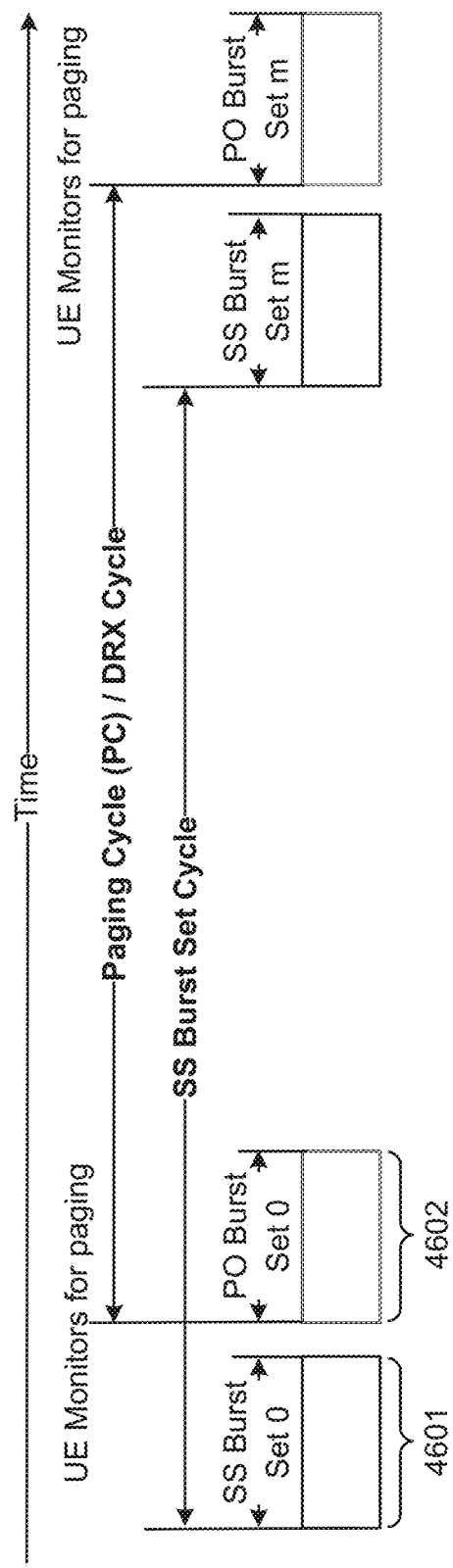
FIGS. 45A to 45H illustrate exemplary associations Between SSB and Paging CORESET.
Figure 45B:
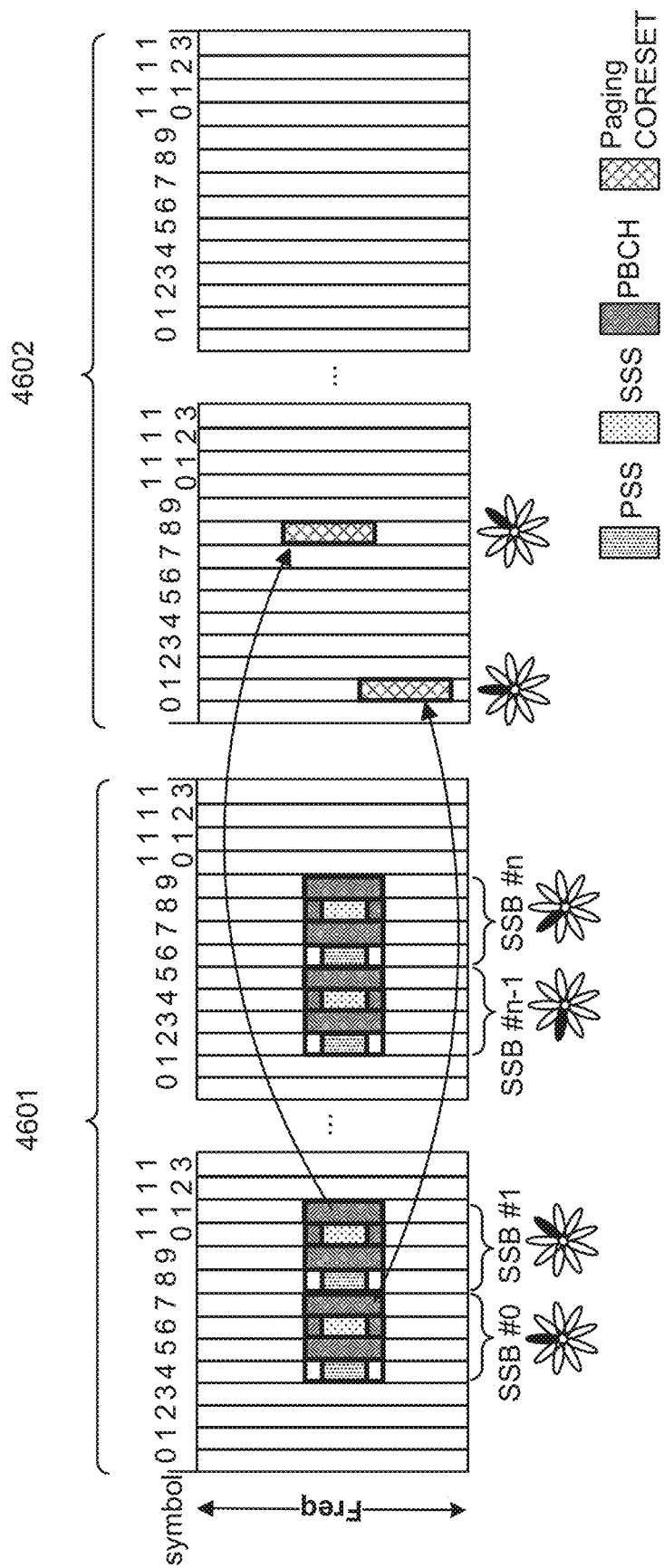

From a UE's perspective, with different SS burst set periodicity and PO burst set periodicity, the SS block and paging DCI CORESET may have different association mapping. The association between the SS block and paging DCI CORESET may be in one of the following options:

In one embodiment, One to One Mapping. One paging DCI CORESET is associated with one SS block for one UE. This may apply to the scenario when SS burst set and PO burst set have the same periodicity. An example is shown in FIGS. 45A and 45B where the SS burst set and PO burst set are TDM-ed or interleaved in time. The SS burst set and PO burst set may also be FDM-ed or interleaved in frequency.

Figure 45C:
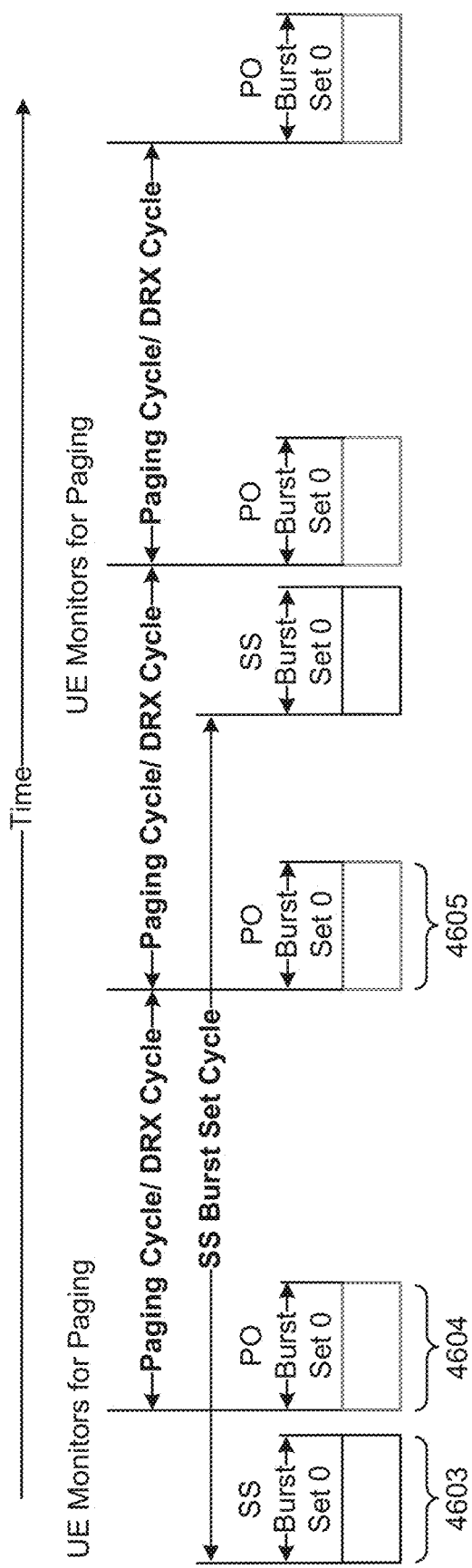
Figure 45D:
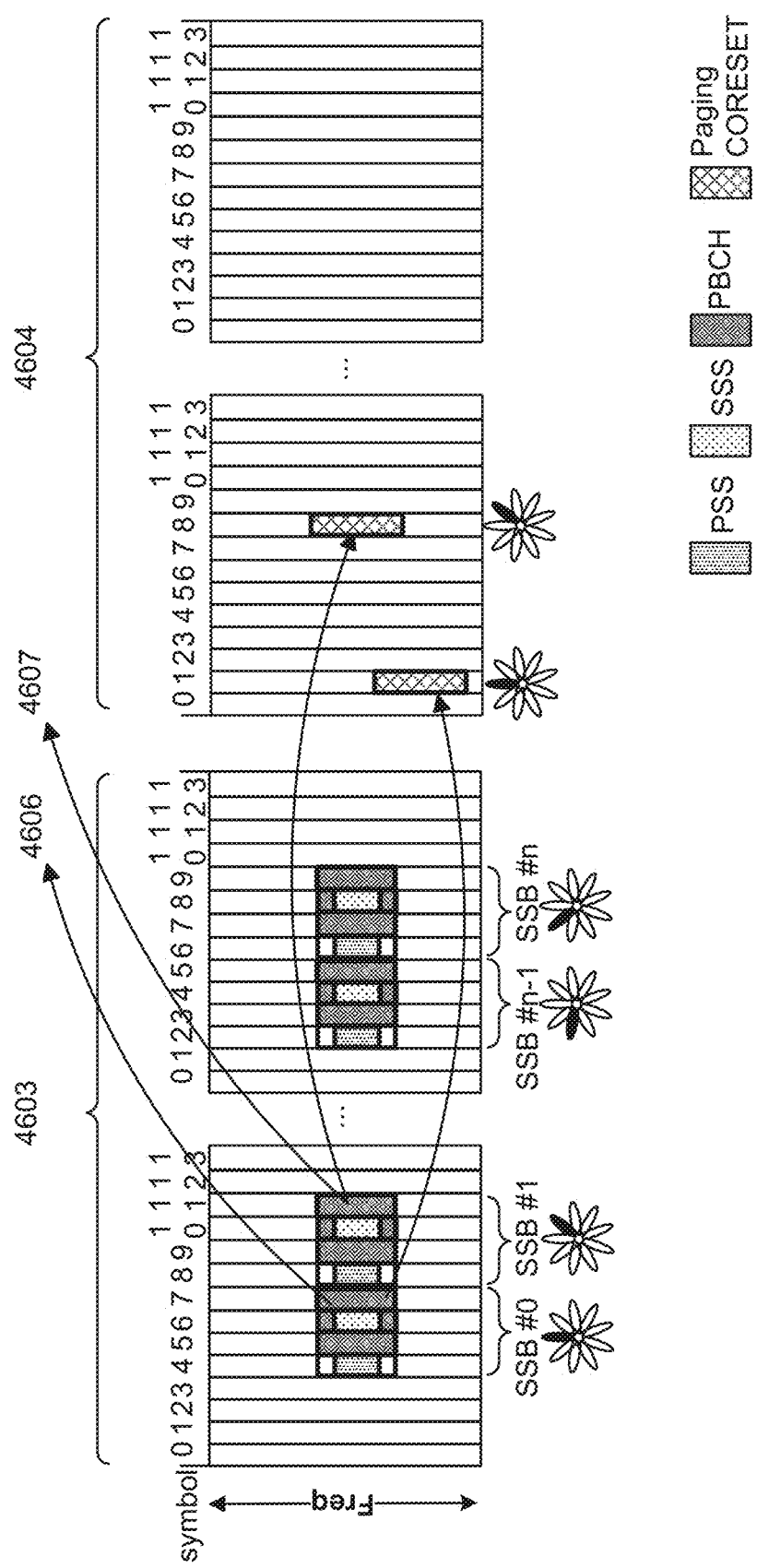
Figure 45E:
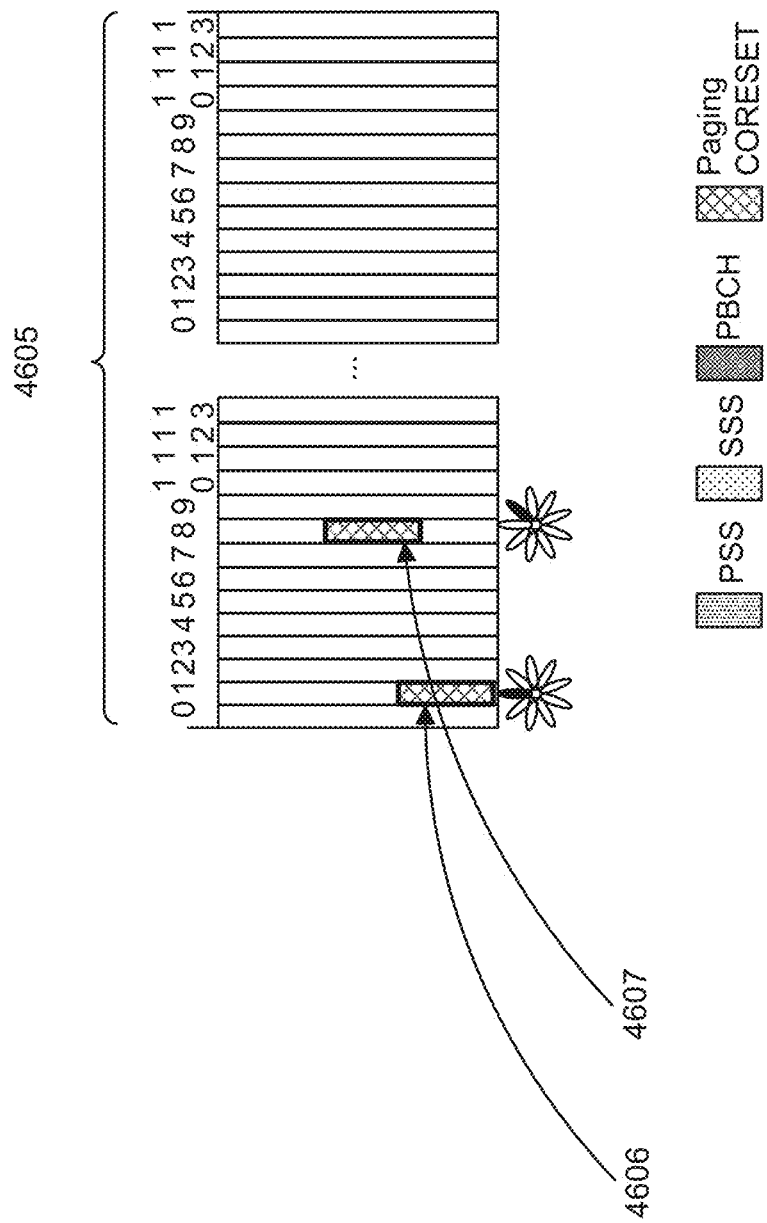

In another embodiment, One to Multiple Mapping. Multiple paging DCI CORESETs are associated with one SS block for one UE. This may apply to the scenario when SS burst set periodicity is larger than the PO burst set periodicity. In this scenario, the SS block may indicate the configuration of the associated paging DCI CORESET carried on the same beam in different PO sweeping. An example is shown in FIGS. 45C to 45E.

Figure 45F:
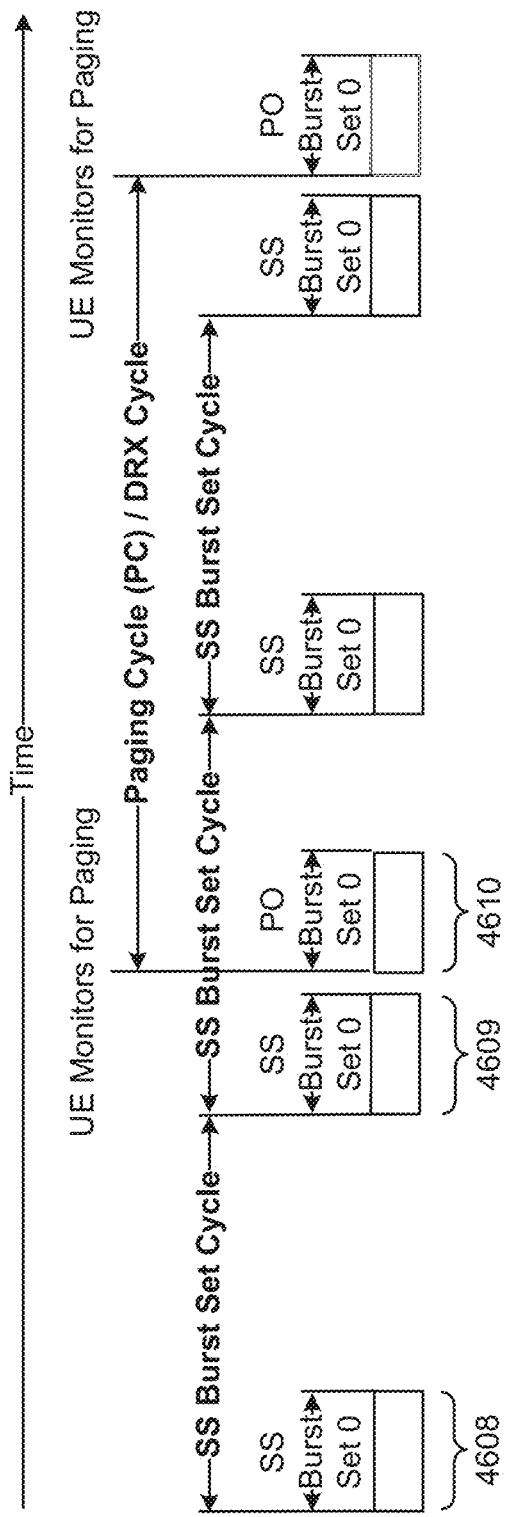
Figure 45G:
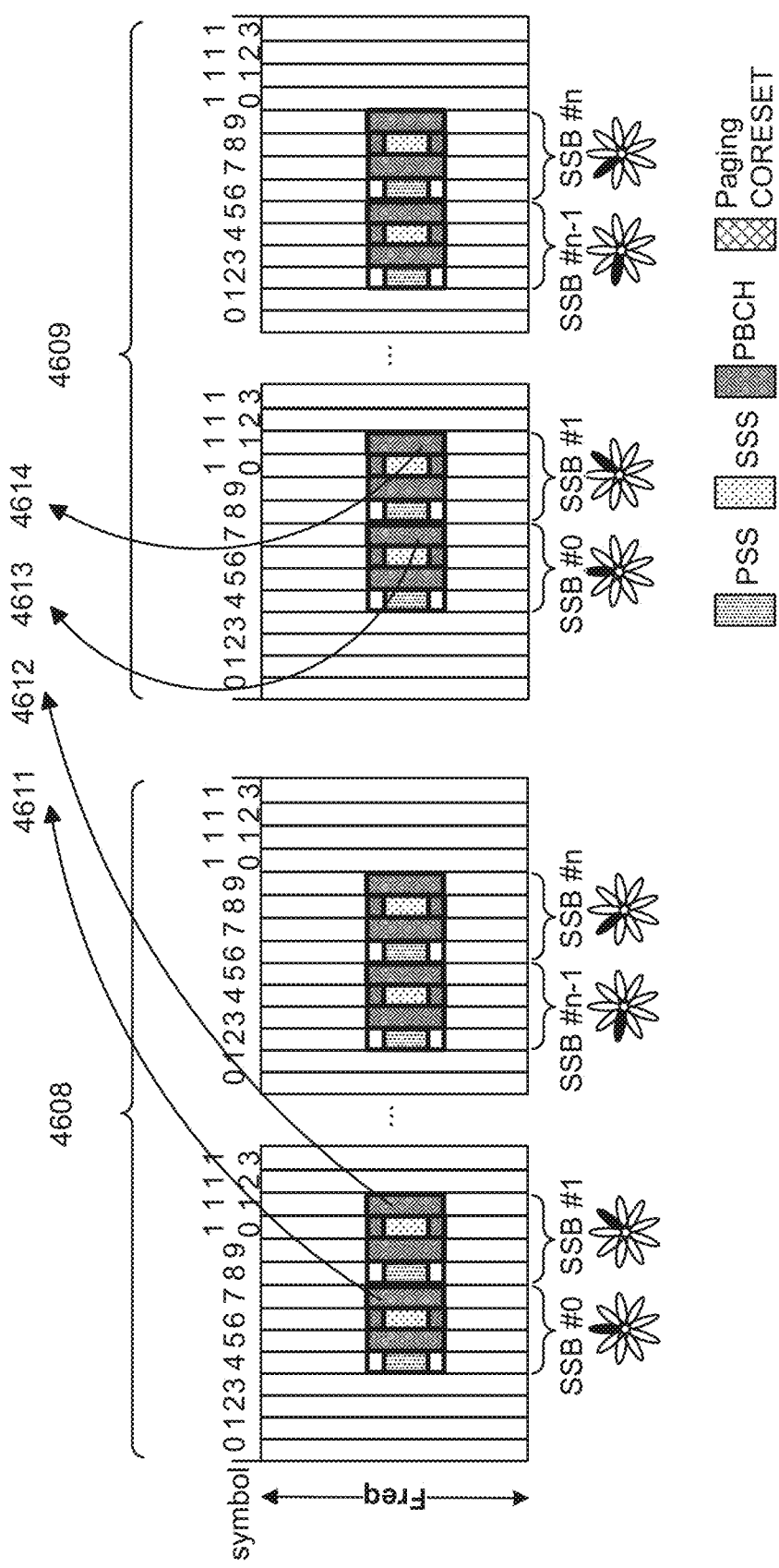
Figure 45H:
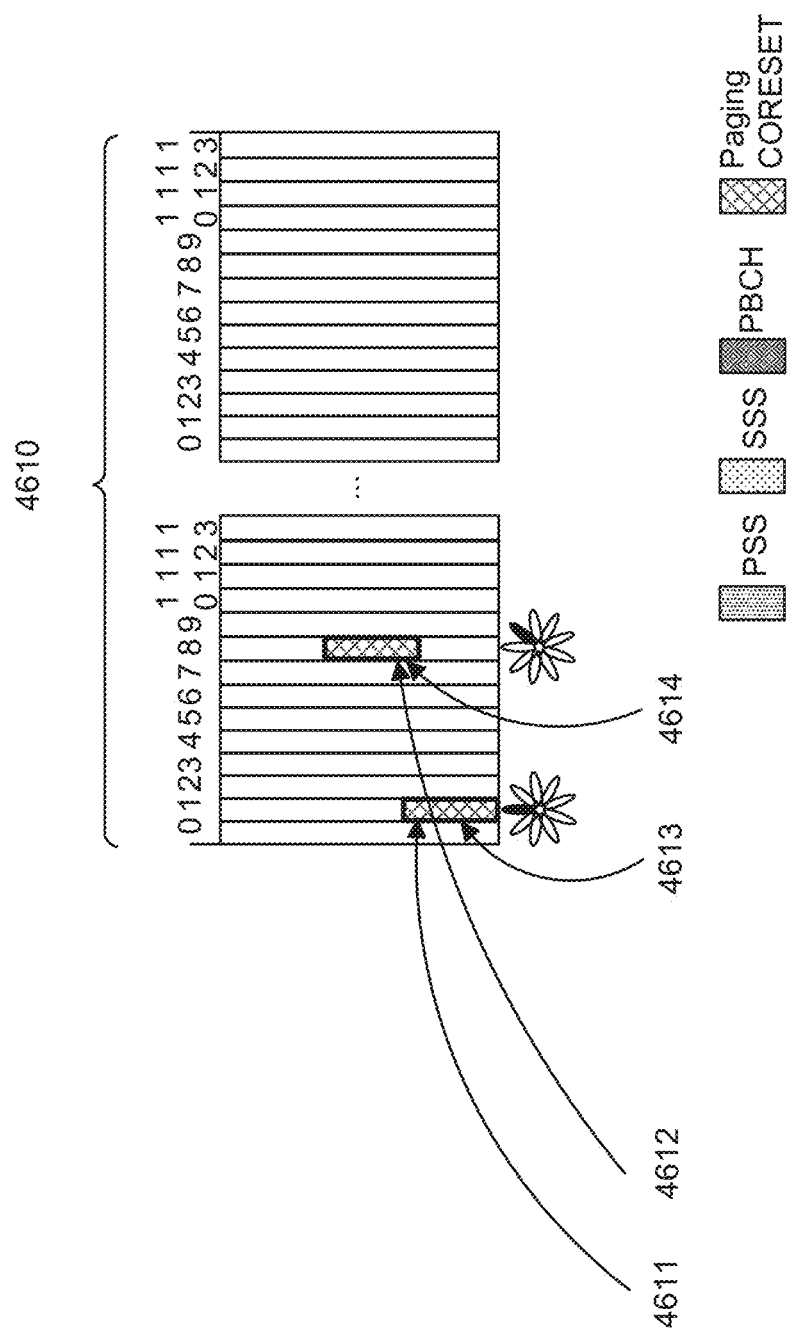

In another embodiment, Multiple to One mapping. One paging DCI CORESET is associated with multiple SS blocks for one UE. This may apply to the scenario where the SS burst set periodicity is less than the PO burst set periodicity. In this scenario, the same SS block carried by the same beam in different SS burst set may indicate the same paging DCI CORESET configuration. An example is shown in FIGS. 45F to 45H. If the configuration indicated in the later SS block is different from the earlier one, the later one is used by the UE for decoding the paging DCI CORESET.

Mini-Slot Based PO Burst

To further enhance the NR paging capacity, e.g., accomplishing the beam sweeping rounds with fewer OFDM symbols compared to the case when slot-based sweeping is used, packing more Paging Occasion (PO) Burst Sets within the radio frames, etc., and to efficiently utilize the available resource elements according to paging message size, mini-slot based paging may be used. In NR, a slot consists of 14 symbols while mini-slots can consist of 2, 4, or 7 symbols as an example. With mini-slot based sweeping, beams may be swept more frequently, e.g., more symbol allocations for beam sweeping. In one of the disclosed examples herein, the beams are swept every 2 symbols, which decreases the PO burst set duration compared to the case when slot-based sweeping is used.

For mini-slot based paging, the UE may monitor Paging Indication (PI) DCI over the group-common PDCCH, NR-PDCCH, or the mini-slot PDCCH based on the following two options. The first option is for non-self-indicated mini-slot in which the mini-slot resources carry Paging Message (PM) only; these resources are indicated by PI (e.g., paging DCI) which is carried in the group-common PDCCH or NR PDCCH of a slot. In this option, DMRS may be configured within the mini-slot PDSCH for channel estimation and data decoding. Also, the DMRS may be QCLed with the detected SSB (the UE may use the same Rx beam of the selected SSB for receiving the PM if spatial QCLed), and the UE may also find the mini-slot carrying the PM based on the DMRS QCL property, e.g., the QCL'ed DMRS port by specification or pre-configuration. While in the second option, which is called self-indicated mini-slot, the mini-slot contains paging DCI for PI followed by the scheduled paging message in the PDSCH. This option may be used in several scenarios such as a single mini-slot is used to page multiple UEs, e.g., group based PO, in which the paging DCI points different UEs to the allocated time or frequency resources to carry their messages. Also, in the case of paging a single UE, e.g., UE based PO, and its paging message is small compared to the mini-slot PDSCH size, then the paging DCI directly indicates to the message location within mini-slot's PDSCH to avoid complicated blind decoding.

The paging mini-slot structure within a slot, e.g., its size, location and pattern, whether it is self-indicated or not, etc., may be configured by one or more of the following four options. In the first option, we may use the NR-PBCH of the associated NR-SS block implicitly via DMRS' port(s) QCL'ed or explicitly in NR-PBCH payload. Using SI such as RMSI or OSI is our second option. Moreover, in the third option, a dedicated RRC message may be used. Alternatively, as a fourth option, group-common PDCCH or UE's PDCCH may be adopted.

The time domain PDSCH allocated resources (e.g., the paging message) with a mini-slot may be configured by determining its starting and ending symbols according to any of the following options.

Starting symbol may be determined by reference to the starting symbol of a mini-slot within the slot and the UE is informed which slot it applies to. Alternatively, the reference may be the symbol number from the start of the group-common PDCCH or NR-PDCCH for paging message where it is included.

Ending symbol may be determined by reference to the ending symbol of the mini-slot within the slot and the UE is informed which slot it applies to. Alternatively, the ending symbol may be defined by the symbols number or length in symbols from its starting symbol or from mini-slot's starting symbol.

For mmwave frequency bands, different mini-slots configurations may be supported to enable PO Bursts to cover the sweeping area in a way faster than slot-based PO Bursts. For illustration, configurations for OFDM numerology $\mu=3$, e.g., subcarrier spacing is equal to 120 kHz, is exemplified. But the following three options can also be easily extended to other subcarrier spacing, such as 240, 480 kHz for examples.

In Option 1, the PO Bursts are interleaved with NR-SS Bursts. Such interleaving may take the form of any of the following three possible alternatives.

Figure 46A:
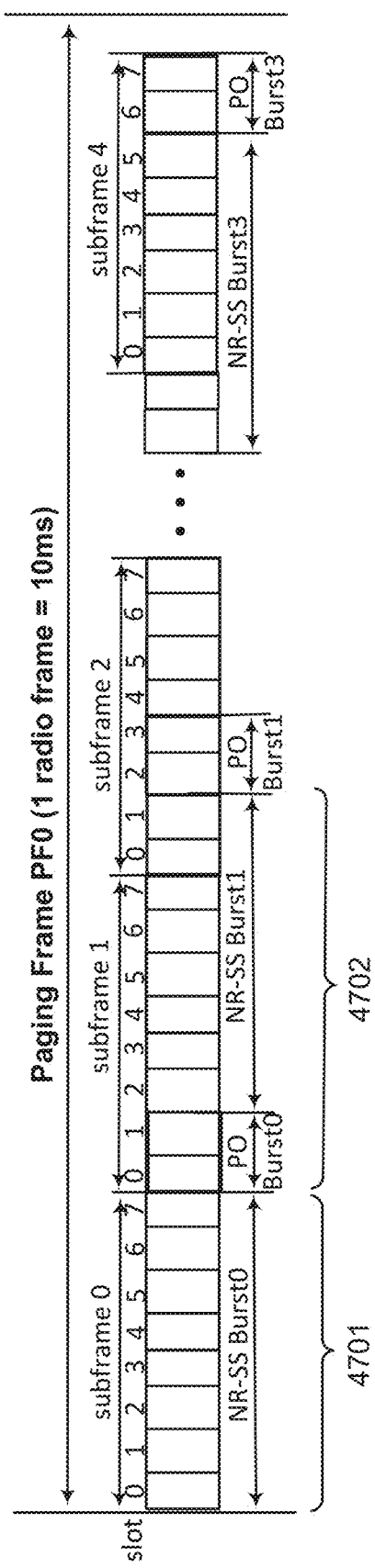

In Alt. 1, spatial division multiplexed (SDM) PO Bursts may be adopted in which multiple beams are paged over the same or different time/frequency resources to fasten the paging sweep. As shown in FIGS. 46A to 46C, for $\mu=3$, we exploit the NR-SS block free slots for paging mini-slot insertion as an example. For example, the PI/PM of eight different beams may be carried in eight mini-slots. The width of each mini-slot is set to minimum two OFDM symbols which leaves free resources for group-common PDCCH or PDCCH with three OFDM symbols width, in addition to any granted uplink transmission. Here, by setting the group-common PDCCH and/or PDCCH to equal three, we present the most restrictive scenario in terms of the available resources for the PO mini-slots. If the group-common PDCCH and/or PDCCH occupies less than three OFDM symbols, more PO mini-slots may be packed to sweep more beams. As illustrated in FIGS. 46A to 46C, the PO Bursts are multiplexed in time, frequency and space, they may be multiplexed over time and space only or frequency and space only depending on the network configurations and the available BW. As an example, with Alt 1, full NR-SS and PO Bursts Sets sweep over 64 beams, for coverage area as an example, can be realized in half Radio Frame period, e.g., five milliseconds.

Figure 47A:
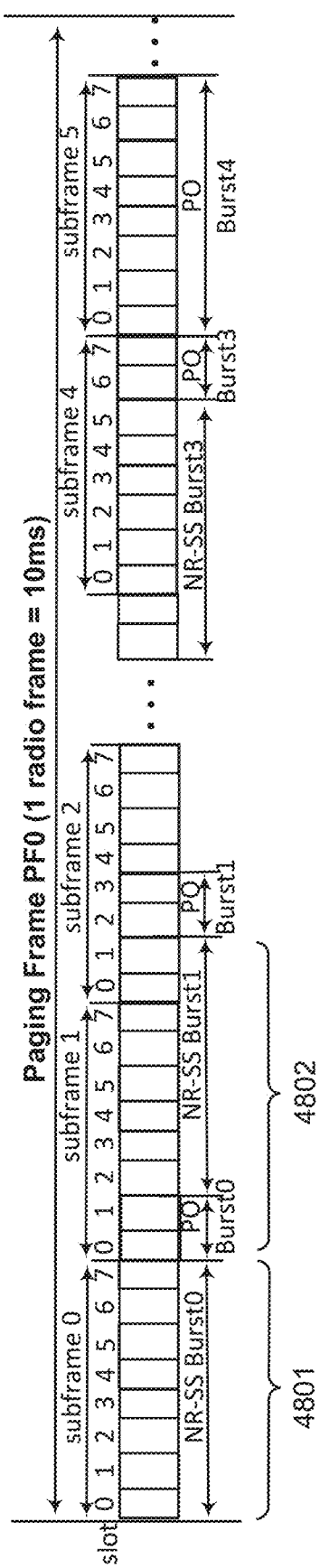
Figure 47B:
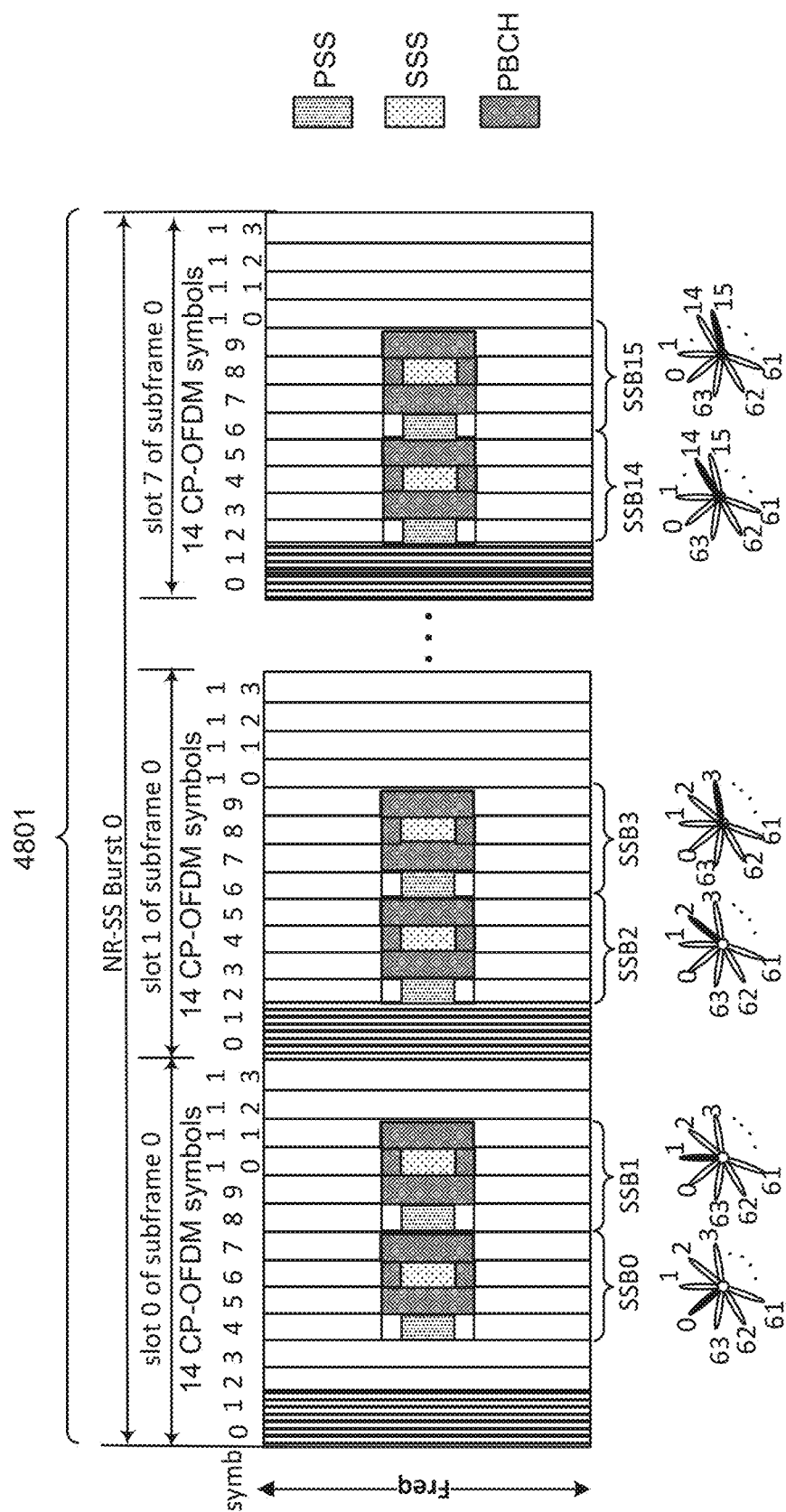

In Alt 2, Non-SDM PO Bursts indicating that PI/PM are sent over the same beams in which a NR-SS block is sent over. As illustrated in FIGS. 47A to 47C as an example, PI/PM are sent over a single beam as same as SS blocks. Consequently, each NR-SS block free slot can carry less than four two-OFDM symbols mini-slot covering PO Burst of four beams while leaving enough resources for three OFDM symbols group-common PDCCH or PDCCH and uplink transmission. To complete the PO Burst Set and sweep the PO over 64 beams for coverage area as an example, one of the following examples may be applied. Example 1 is for NR-SS Burst Set with periodicity greater than 5 milliseconds, as shown in FIGS. 47A to 47C, the remaining PO beams may fit into the subframe after NR-SS Burst 4. Moreover, Example 2 illustrates SS-Burst Set with periodicity is equal to 5 milliseconds, then one PO Burst set at most can be realized for two consecutive SS-Burst Set. Specifically, PO Burst will be distributed across the NR-SS block free slots in the consecutive NR-SS Burst Sets. Also, in Example 3, we show that for SS-Burst Set with periodicity greater than or equal 10 milliseconds, two OFDM symbols mini-slot based PO Burst Set can take place in slots indexed by $\{0, 1\}+8*n+2(n-1)$ where n=1, 2, 3, 4, 5, 6, 7, 8 to cover the whole 64 beams.

In Alt 3, SS blocks and PO are SDMed allowing that PO Bursts to take place over the same time/frequency resources of NR-SS Bursts, but distinct beams are allocated to different NR-SS and PO Bursts.

Figure 48A:
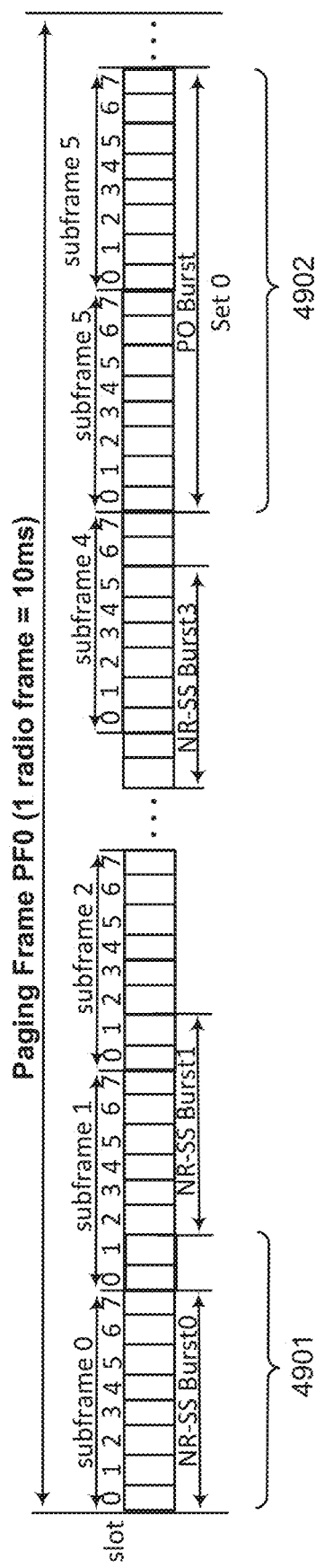
FIGS. 48A to 48C illustrate exemplary non-interleaved NR-SS and PO Bursts.
Figure 48B:
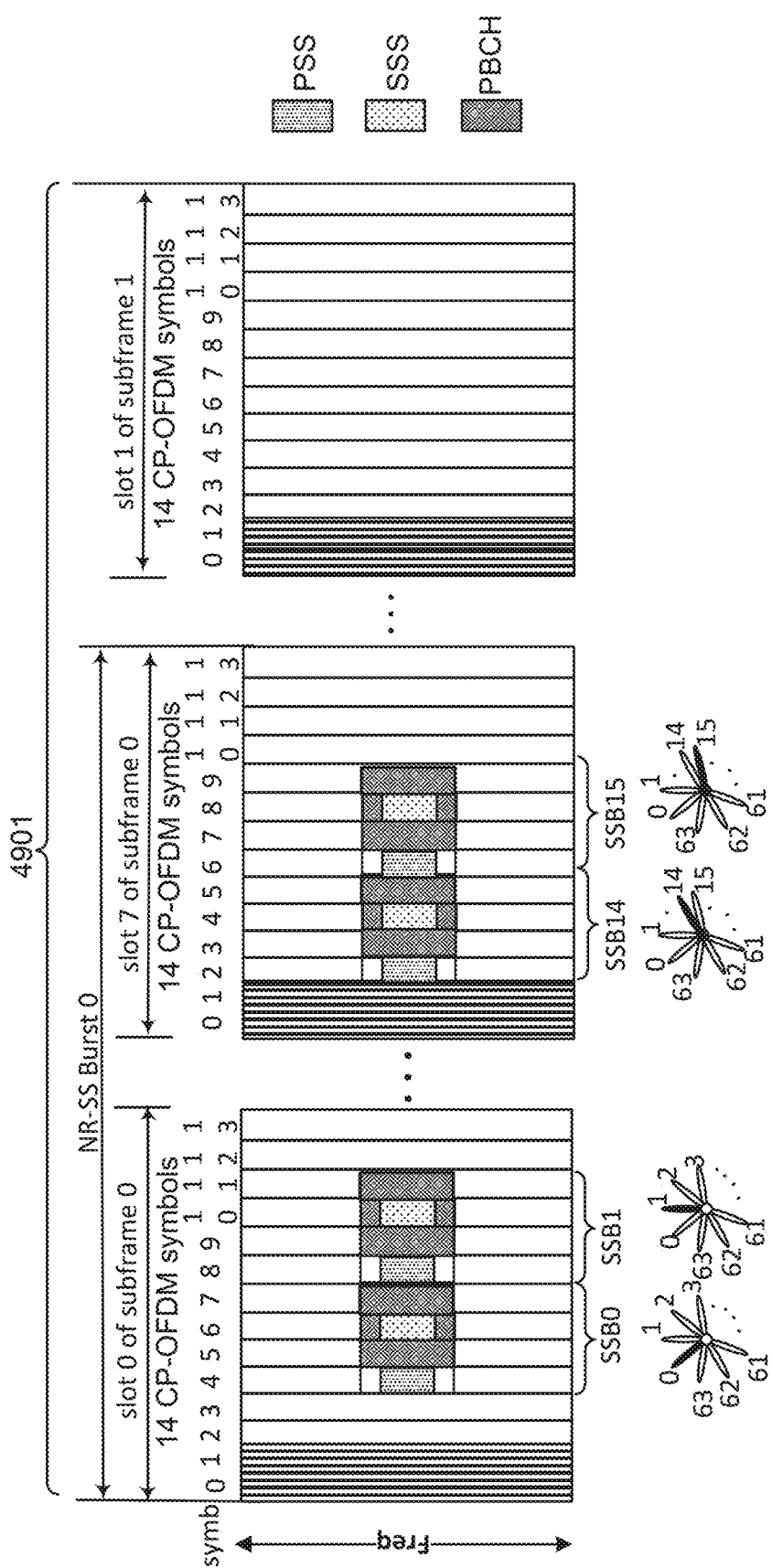
Figure 48C:
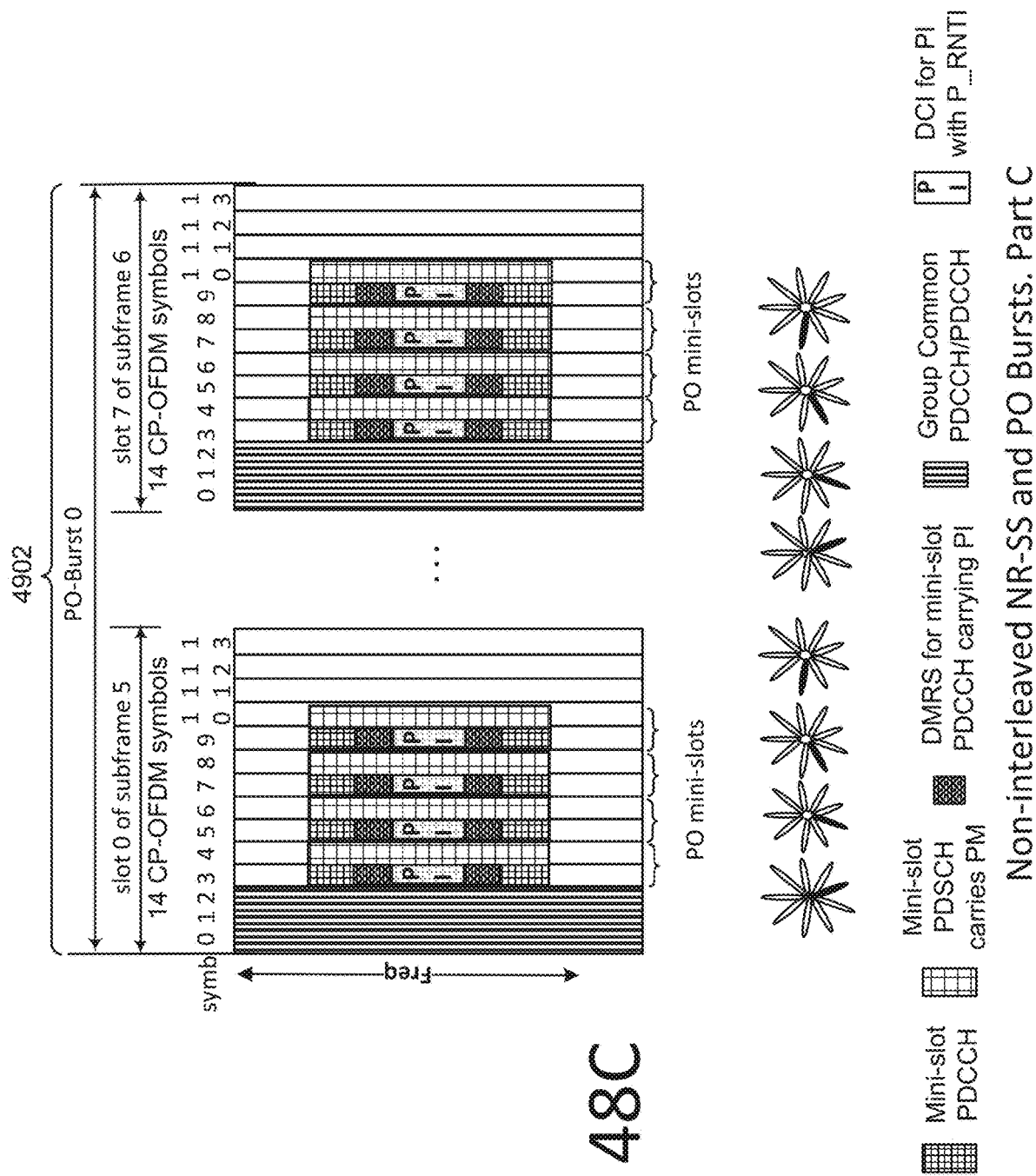

Contrary to Option 1, in Option 2, we illustrate the non-interleaved PO and NR-SS Bursts possibility. This option indicates that there is no overlapping between the occupied time resources used for realizing the NR-SS and PO sweeping over all the beams to cover the dedicated area. In our 120 kHz subcarrier spacing example, the NR-SS blocks are transmitted over the whole 64 beams followed by PO Burst Set which may be realized by one of the following alterations. First alteration is for non-SDMed PO Bursts as shown in FIGS. 48A to 48C which depict a single beam transmitted for each PI/PM. In this case, two consecutive subframes needs to be configured to accomplish paging 64 beams. Specifically, their slots carrier four mini-slots, with two OFDM symbols width, to leave enough resources for three OFDM symbols group-common PDCCH and uplink transmission and each mini-slot is dedicated to a single beam. On the other hand, in the second alternation, PO Bursts are SDMed to allow PI/PM to be transmitted over different beams to cover the sweeping areas in less number of realizations. For instance, with four mini-slots in each slot, two different beams can be configured simultaneously to finish sweeping the 64 beams in a single subframe instead of two in Alt 1.

Figure 49A:
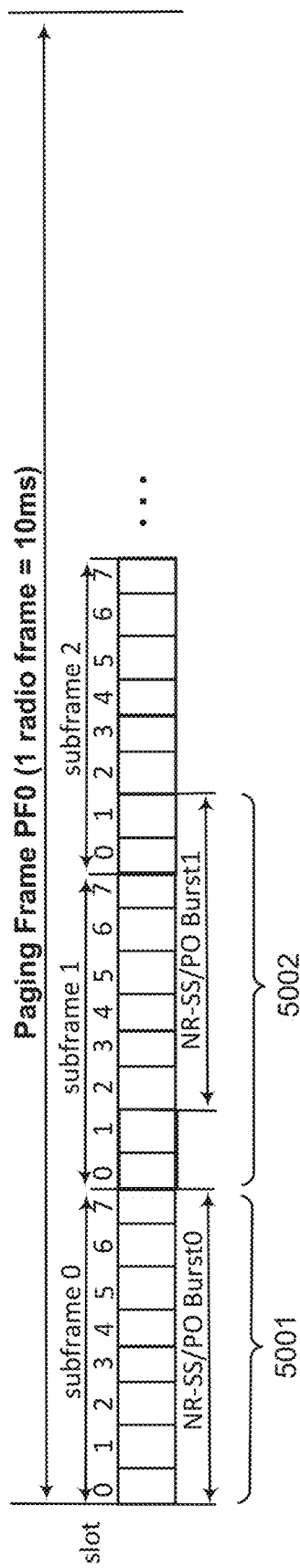
Figure 49B:
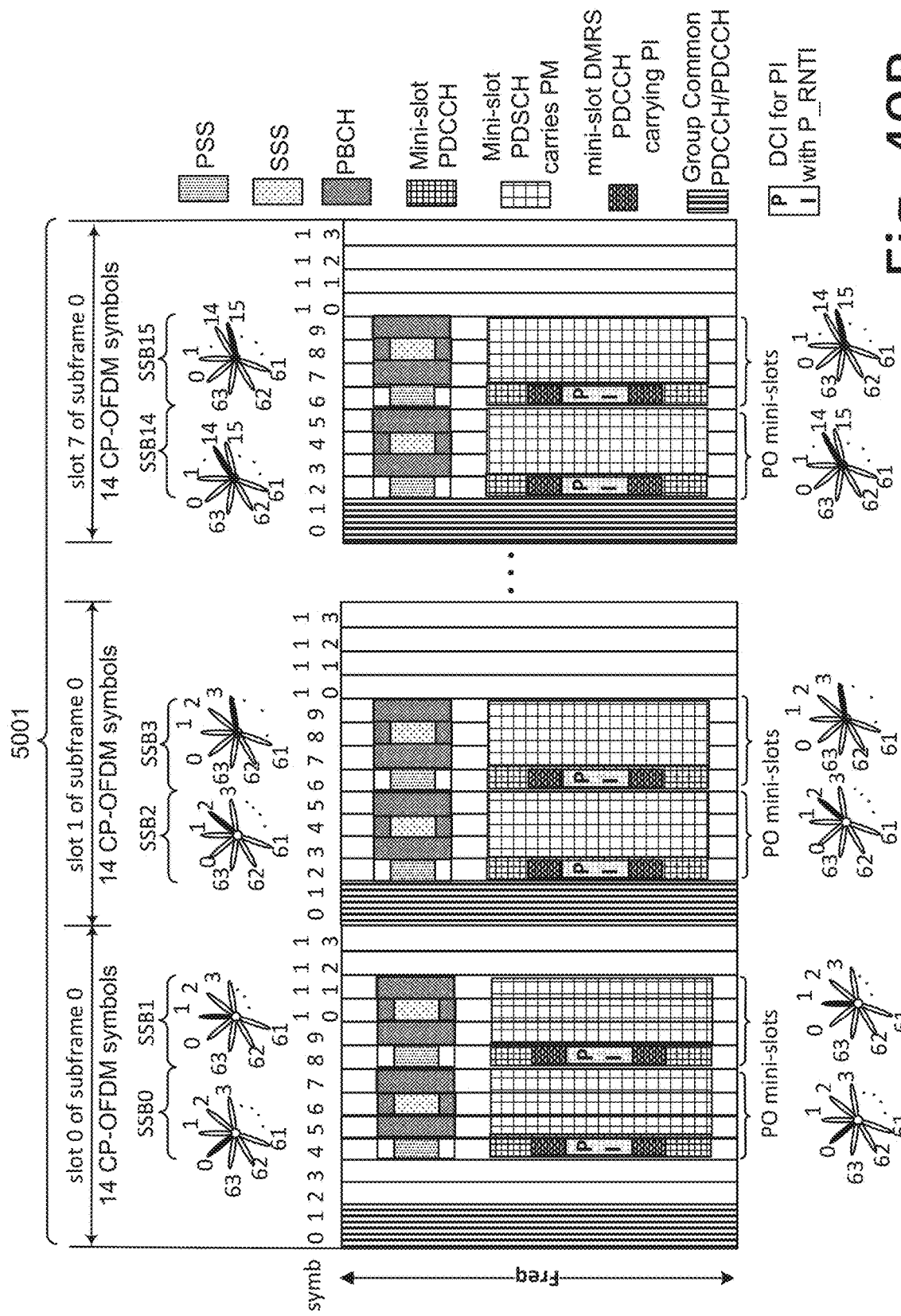
Figure 50:
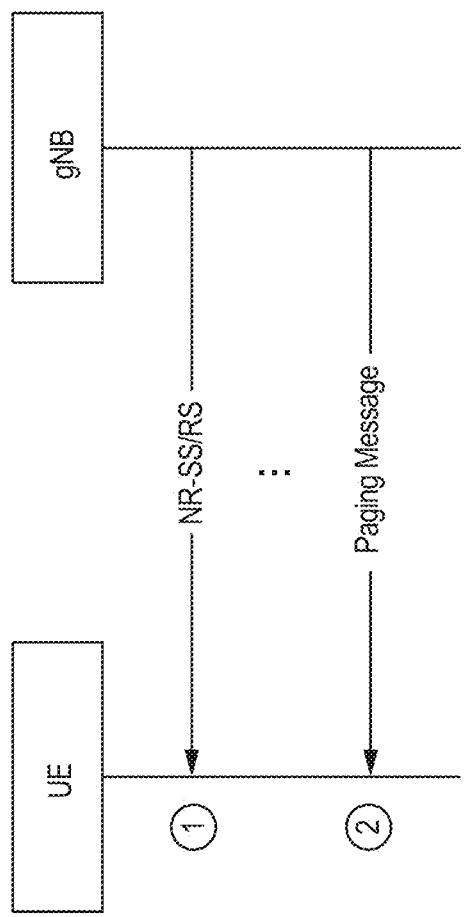
FIG. 50 illustrates an exemplary Open Loop UE-Based Paging Block Selection.
Figure 51:
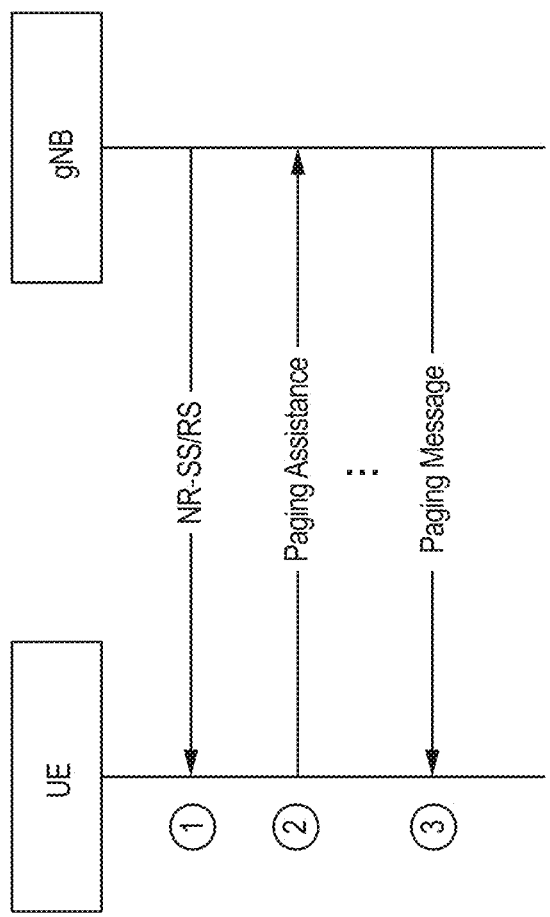
FIG. 51 illustrates an exemplary closed loop UE-based paging block selection.

In addition to the aforementioned options, in Option 3 the SS blocks are FDMed with PO Burst blocks. As shown in FIGS. 49A to 49C, for example, both NR-SS and PO Burst Sets may have an equal periodicity which is determined based on NR-SS Burst Set periodicity. Specifically, FIGS. 49A to 49C depict a case in which both PO and NR-SS Burst blocks occupy the same OFDM symbols. However, sweeping PO more frequent than SS may be realized by combining this option with Option 1 or 2. Also, depending on the network configurations, PO Burst blocks may be less frequent than the NR-SS block. Moreover, the PO mini-slot size may be configured to be less or equal to four OFDM symbols.

The paging process may be further speeded up to cover all desired area by using higher numerology for the mini-slot based PO Bursts than the one used for the NR-SS Bursts. Specifically, the wider subcarrier spacing is, e.g., shifting to higher numerology, the more slots can be packed within the subframe and more beams can be swept than in the lower numerology case. Therefore, to exploit such NR flexibility, the Options 1 and 2 in which SS blocks are TDMed with PO Burst blocks may be further extended and enhanced. Especially, the slots that contain the PO Burst blocks can be re-configured to operate on higher numerology than the remaining slots that do not contain PO Burst blocks. For example, in FIG. 47C, slots 0 and 1 of subframe 1 can replaced with four slots each has four PO mini-slots by shifting their subcarrier spacing from 120 to 240 kHz. In other word, adopting 120 kHz for the slots containing SS blocks while 240 kHz for those slots containing PO Burst blocks allows us to accomplish the whole beam sweeping in half the time needed if a single numerology is used for both SS blocks and PO Burst.

It is understood that the entities performing the steps illustrated herein, such as in FIGS. 50 through 56, may be logical entities. The steps may be stored in a memory of, and executing on a processor of, a device, server, or computer system such as those illustrated in FIG. 1B. Skipping steps, combining steps, or adding steps between exemplary methods, systems, frame structures, or the like disclosed herein is contemplated. For example, it is understood that the subject matter associated with the physical layer (e.g., FIG. 39A or FIG. 39B) may be integrated in the methods of FIGS. 50 through 56.

NR Paging Procedure

Figure 57:
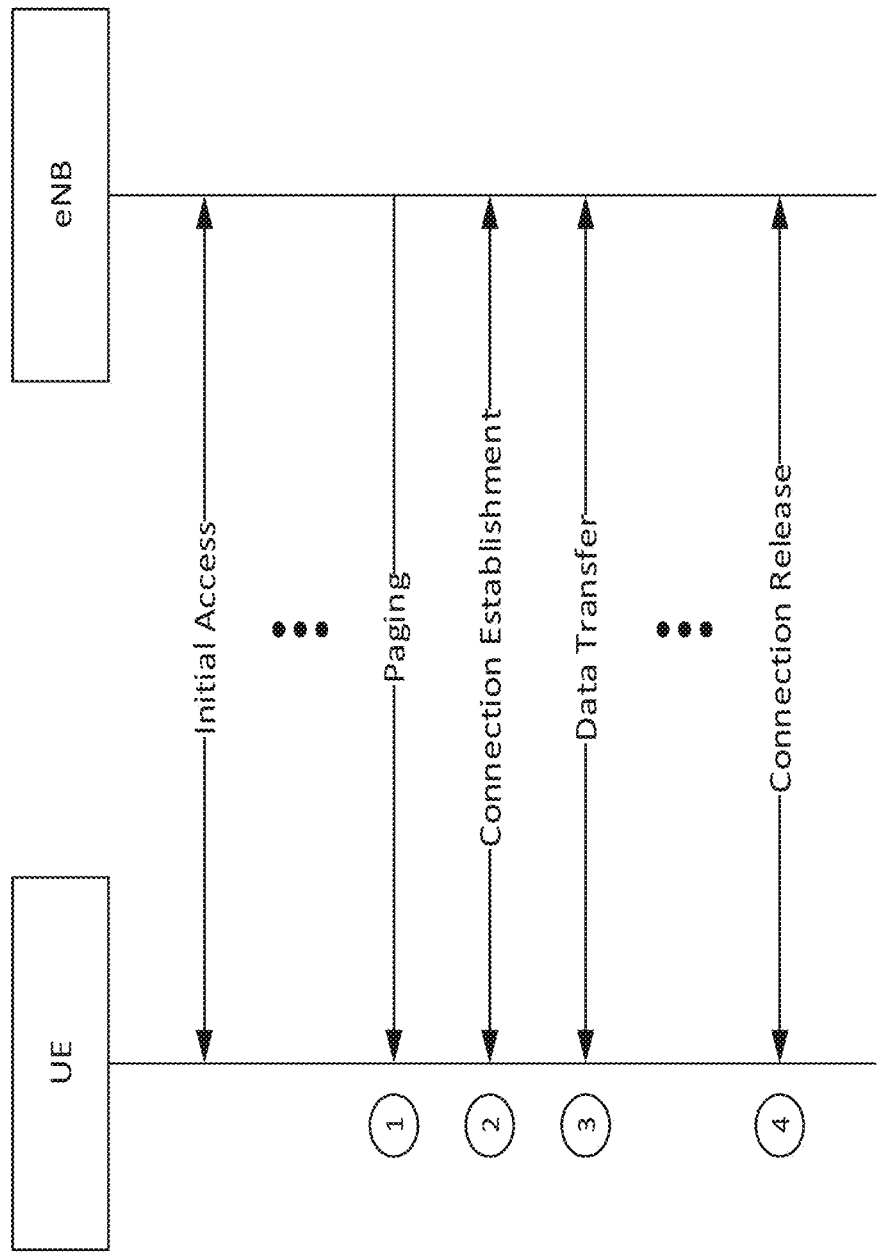
FIG. 57 illustrates an example NR paging method.

Exemplary signaling for the NR paging procedure is shown in FIG. 57. Before the UE can be paged, initial access signaling is performed. During initial access signaling, the UE may perform cell selection and registration with the network. At this time, the UE may perform beam pairing; e.g., determination of the "best" DL TX beam(s) and/or the "best" DL RX beam(s). The network may determine the "best" DL TX beam(s) implicitly; e.g., from the resource used to perform the random access procedure, or explicitly; e.g., signaling of the "best" DL TX beam(s) from the UE.

Following initial access, the UE may transition to an idle or inactive state; e.g., RRC_IDLE or RRC_INACTIVE.

In step 1 of FIG. 57, the UE monitors for paging messages during the POs. When the network determines a UE needs to be paged, it transmits an NR Paging message to the UE during its PO. If the UE does not respond to the page, the network may repeat the page in a subsequent PO. If the PO corresponds to a subset of paging blocks transmitted during the PF, the network may transmit the subsequent page using additional paging blocks; e.g., one or more paging blocks adjacent to the paging blocks of the original PO, all the paging blocks in the paging burst(s) that included the original PO, all the paging blocks in the PF. If the PO corresponds to a subset of paging blocks transmitted during the PF and if the UE is unable to receive one or more of the beams transmitted during its PO, on subsequent POs, the UE may monitor for paging messages during additional paging blocks; e.g., one or more paging blocks adjacent to the paging blocks of the original PO, all the paging blocks in the paging burst(s) that included the original PO, all the paging blocks in the PF. The UE may optionally notify the network of its inability to receive one or more of the beams transmitted during the PO.

In step 2, if the UE is paged during its PO; e.g., receives an NR Paging message with a paging record that includes its ID, the UE performs the connection establishment procedure. For UEs in an inactive state; e.g., RRC_INACTIVE, connection establishment may not be required if only a small data packet is required to be transferred.

In step 3, after successfully establishing a connection with the network, data transfer may commence.

In step 4, after completing the data transfer, the UE performs the connection release procedure and may transition back to an idle or inactive state; e.g., RRC_IDLE or RRC_INACTIVE.

Figure 58:
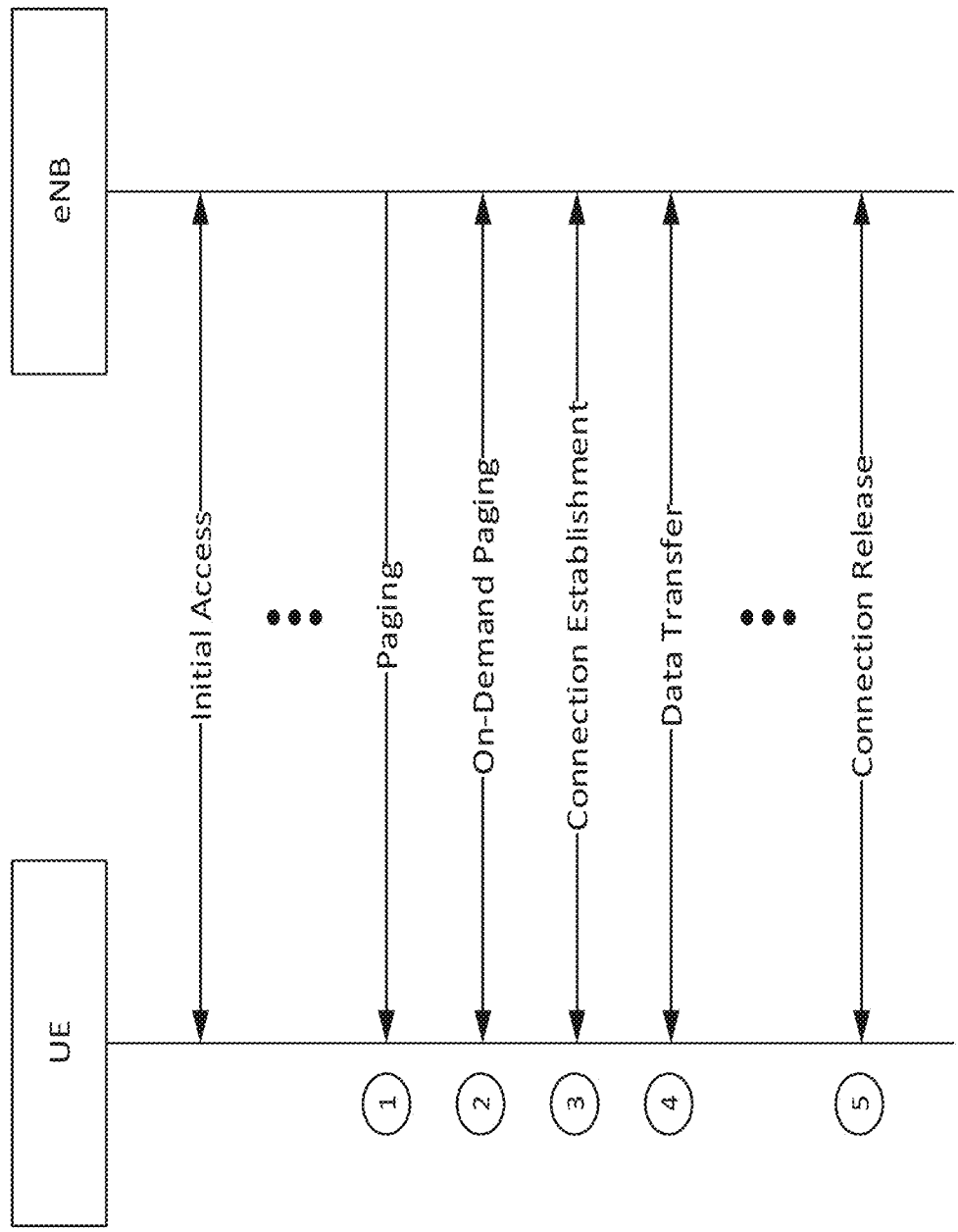
FIG. 58 illustrates an example NR paging method with on-demand paging.

Exemplary signaling for the NR paging procedure with on-demand paging is shown in FIG. 58.

In step 1 of FIG. 58, the UE monitors for paging messages during the POs. When the network determines a UE needs to be paged, it transmits an NR Paging message to the UE during its PO.

In step 2, the UE is unable to receive the beams transmitted during is PO and commences with the on-demand paging request procedure. The random access method may be used to signal the on-demand paging request. During this procedure, the UE may perform DL beam pairing; e.g., determination of the "best" DL TX beam(s) and/or the "best" DL RX beam(s). As part of this procedure, the network responds indicating to the UE that it had been paged.

In step 3, the UE performs the connection establishment procedure.

In step 4, after successfully establishing a connection with the network, data transfer may commence.

In step 5, after completing the data transfer, the UE performs the connection release procedure and may transition back to an idle or inactive state; e.g., RRC_IDLE or RRC_INACTIVE.

UE Paging Assistance—UE Assisted Paging Block Selection.

To improve the efficiency of the paging procedure (e.g., UE power consumption, number of physical resources used to transmit the paging message, etc.), a subset of the paging blocks in the PO may be used for transmission or reception of the paging message. For example, to reduce power consumption, the UE may monitor a subset of paging blocks for reception of the paging message. The subset of paging blocks monitored by the UE may be determined based on DL measurements performed by the UE, where the measurement configuration may be controlled by the network. The UE speed may also be used to determine the number of paging blocks that are monitored. For example, fixed or slow moving UEs may only monitor a single paging block (e.g., the paging block that corresponds to the "best" DL TX beam), but UEs with higher speeds may monitor multiple paging blocks (e.g., the paging block that corresponds to the "best" DL TX beam and adjacent paging blocks). The UE may provide feedback (e.g., paging assistance information) to the network to indicate the subset of paging blocks that it will monitor or prefers to monitor for paging. The network may configure the UE with criteria to control when paging assistance information is reported (e.g., periodic, event based, as part of the initial access procedure, when performing tracking/RAN area updates, etc.). Alternatively, higher layer signaling may be used to facilitate on-demand reporting of paging assistance information. The network may use the paging assistance information to configure the subset of paging blocks used for transmission of the paging message. Alternatively, the paging assistance information provided by the UE may be used to enable network-based selection of the subset of paging blocks used for paging. In this scenario, after selecting the subset of paging blocks, the network configures the UE to monitor the selected subset of paging blocks during subsequent POs. UL measurements performed by the network may also be used as an input to determine the subset of paging blocks to use for paging.

UE Paging Assistance—Open Loop UE-Based Paging Block Selection.

For open loop UE-based paging block selection, the UE may perform paging block selection to determine which paging blocks it will monitor for paging, but may not provide feedback to the network. Since the network is not aware of the subset of paging blocks the UE is monitoring, the network uses all paging blocks in the PO to transmit the paging message when paging the UE. Exemplary signaling for NR paging with open-loop UE-based paging block selection is shown FIG. 50. At step 1 of FIG. 50, the UE may perform paging block selection based on measurements of the NR-SS/RS. At step 2 of FIG. 50, the UE may monitor for paging during the selected paging block(s) of the PO. When the UE is paged, the network may transmit the Paging Message during all paging blocks of the PO.

UE Paging Assistance—Closed Loop UE-Based Paging Block Selection.

For closed loop UE-based paging block selection, the UE may perform paging block selection and may provide feedback to the network to indicate the subset of paging blocks it will monitor. During subsequent POs the network may only use the selected paging blocks to transmit the paging message when paging the UE. Exemplary signaling for NR paging with closed-loop UE-based paging block selection is shown FIG. 51. At step 1 of FIG. 51, the UE may perform paging block selection based on measurements of the NR-SS/RS. At step 2 of FIG. 51, the UE may transmit Paging Assistance to the network to indicate which paging blocks it will monitor for paging, where the Paging Assistance may be signaled using the mechanisms described herein (e.g., higher layer signaling, etc.). At step 3 of FIG. 51, the UE may monitor for paging during the selected paging block(s) of the PO. When the UE is paged, the network may transmit the Paging Message during the selected paging blocks of the PO.

UE Paging Assistance—Closed Loop Network-Based Paging Block Selection

Figure 52:
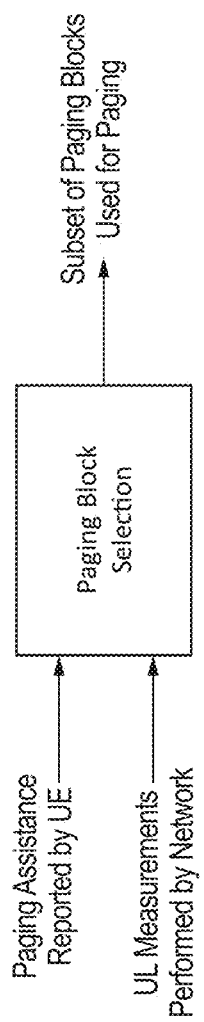
FIG. 52 illustrates an exemplary model for network-based paging block selection.
Figure 53:
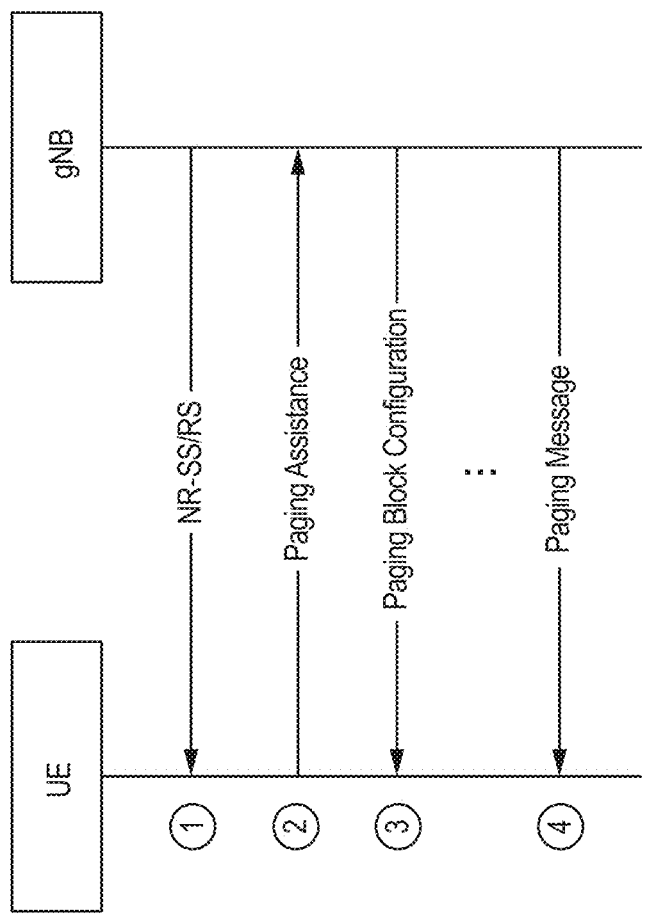
FIG. 53 illustrates an exemplary closed loop network-based paging block selection.

For closed loop network-based paging block selection, the network may determine the subset of paging blocks in the PO to be used for transmission and reception of the paging message. UE feedback provided to the network or UL measurements performed by the network may be used as inputs to the network-based paging block selection algorithm, as shown in FIG. 52. After performing paging block selection, the network may configure the UE to monitor the selected subset of paging blocks during subsequent POs and may only use the selected paging blocks to transmit the paging message when paging the UE. Exemplary signaling for NR paging with closed-loop network-based paging block selection is shown FIG. 53. At step 1 of FIG. 53, the UE may perform measurements of the NR-SS/RS to determine which paging blocks it prefers to monitor for paging during subsequent POs. At step 2 of FIG. 53, the UE may transmit the Paging Assistance to the network to indicate which paging blocks it prefers to monitor for paging during subsequent POs, where the Paging Assistance may be signaled using the mechanisms described herein (e.g., higher layer signaling, etc.) At step 3 of FIG. 53, the network may perform paging block selection using feedback provided by the UE or UL measurements, and may transmit a Paging Block Configuration message to the UE to configure or reconfigure the paging blocks to monitor for paging during subsequent POs. At step 4 of FIG. 53, the UE may monitor for paging during the selected paging block(s) of the PO. When the UE is paged, the network transmits the Paging Message during the selected paging blocks of the PO.

UE Paging Assistance—UE Assisted Response Driven Paging

Figure 54:
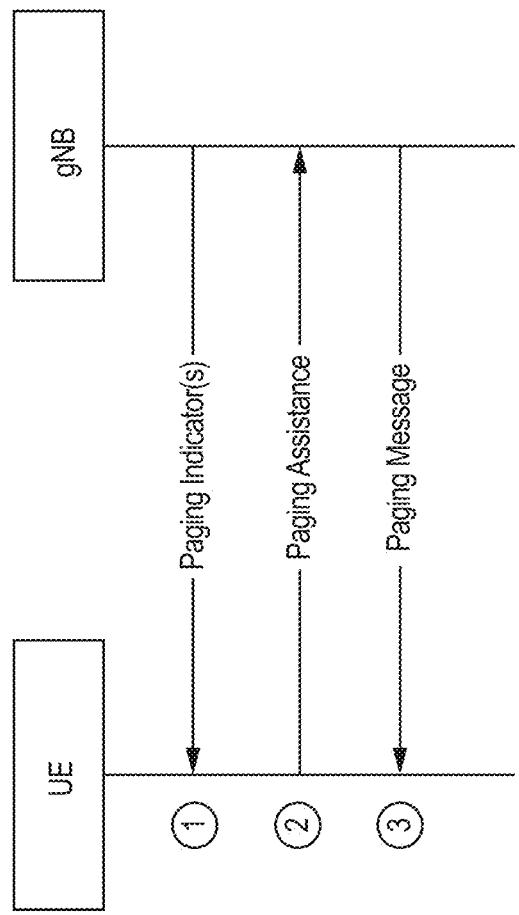
FIG. 54 illustrates an exemplary UE assisted response driven paging.

To improve the efficiency of the paging procedure (e.g., UE power consumption, number of physical resources used to transmit the paging message, etc.) a UE assisted response driven paging procedure may be used for transmission or reception of the Paging Message. Paging Indicators transmitted during the PO may be used to indicate to the UE that it should monitor for the Paging Message in a subsequent DL time resource(s) (e.g., slot(s), subframe(s), block(s), burst(s), etc.), where the subsequent DL time resource to monitor may be predetermined or signaled to the UE (e.g., via system information, Downlink Control Information (DCI), higher layer signaling, etc.). UE feedback provided to the network may be used to assist the network in determining the best DL TX beam(s) to use for transmission of the Paging Message. Exemplary signaling for the UE assisted response driven paging is shown in FIG. 54. The network that is used may be a gNB or TRP.

At step 1 of FIG. 54, the UE may monitor for PIs during its POs. To conserve power, the UE may monitor for PIs during a subset of the paging blocks that make up the UE's PO, where the subset of paging blocks monitored by the UE may correspond to the "best" DL TX beam(s). When the UE is paged, the network may transmit the PI(s) to the UE during all the paging blocks of the UE's PO (e.g., using all the DL TX beams), where the PIs may be signaled using the mechanisms described herein. At step 2 of FIG. 54, if paged, the UE may report paging assistance information that may be used by the network to optimize the transmission of the Paging Message (e.g., determine the best DL TX beam(s) to use for transmission of the Paging Message) where the paging assistance information may be signaled using the mechanisms described herein. To reduce UL signaling, the UE may be configured to only transmit the paging assistance information if it is different than what was previously reported (e.g., the best DL TX beam(s) has(have) changed). At step 3 of FIG. 54, if paged during step 2 of FIG. 54, the UE may monitor for the Paging Message using the DL resource(s) associated with the paging block(s) or DL TX beam(s) used to transmit the physical channel that signaled the PI(s) received by the UE during the PO. The network may transmit the Paging Message to the UE using the associated DL resource(s) and the "best" DL TX beam(s).

UE Paging Assistance—RACH Based UE Assisted Response Driven Paging

Figure 59:
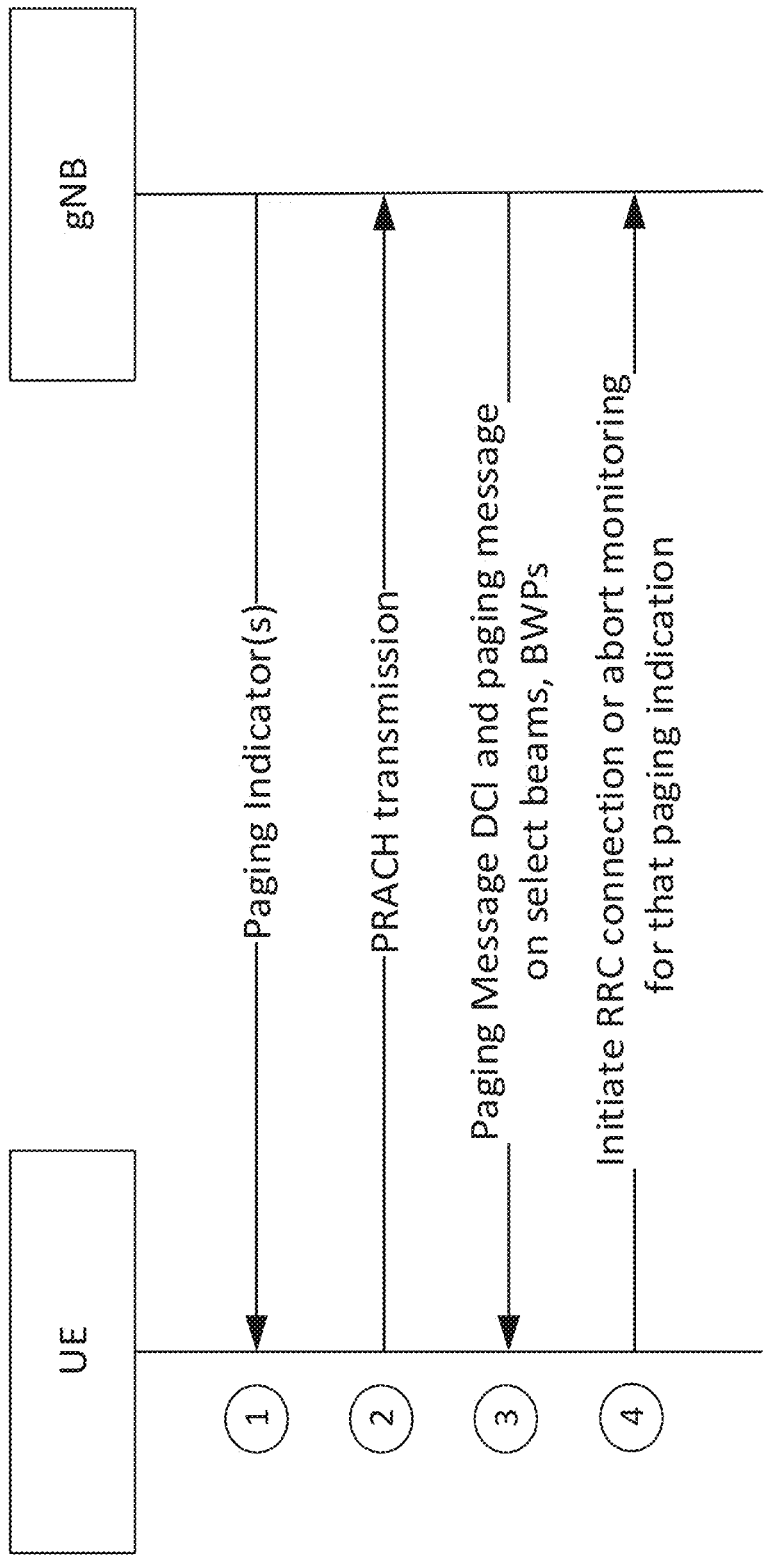
FIG. 59 shows an example procedure showing UE-assisted paging.
Figure 60A:
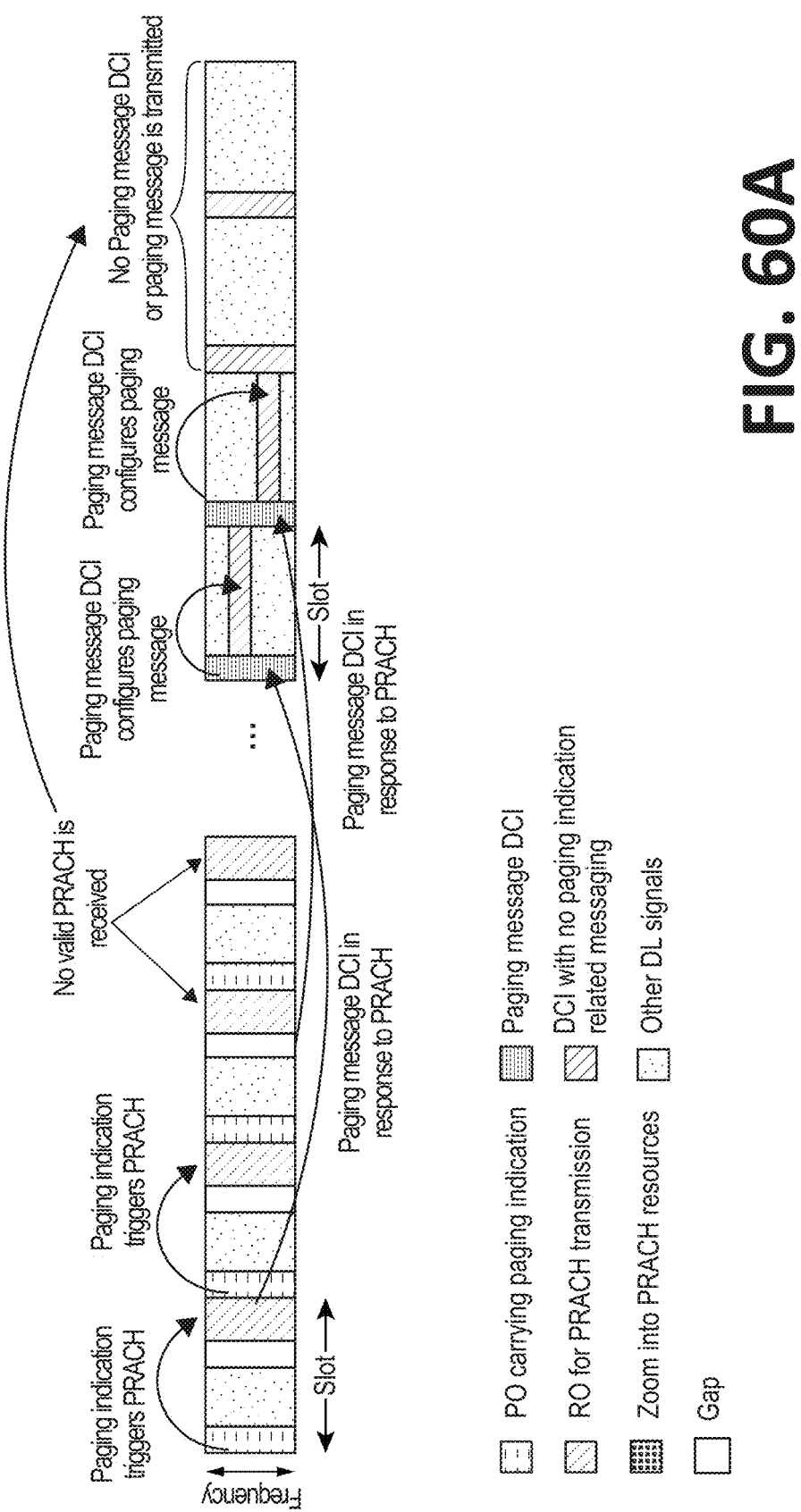
FIG. 60A shows an example configuration of paging indicators, paging message DCI and paging messages where PRACH resources are associated with each SSB.
Figure 60B:
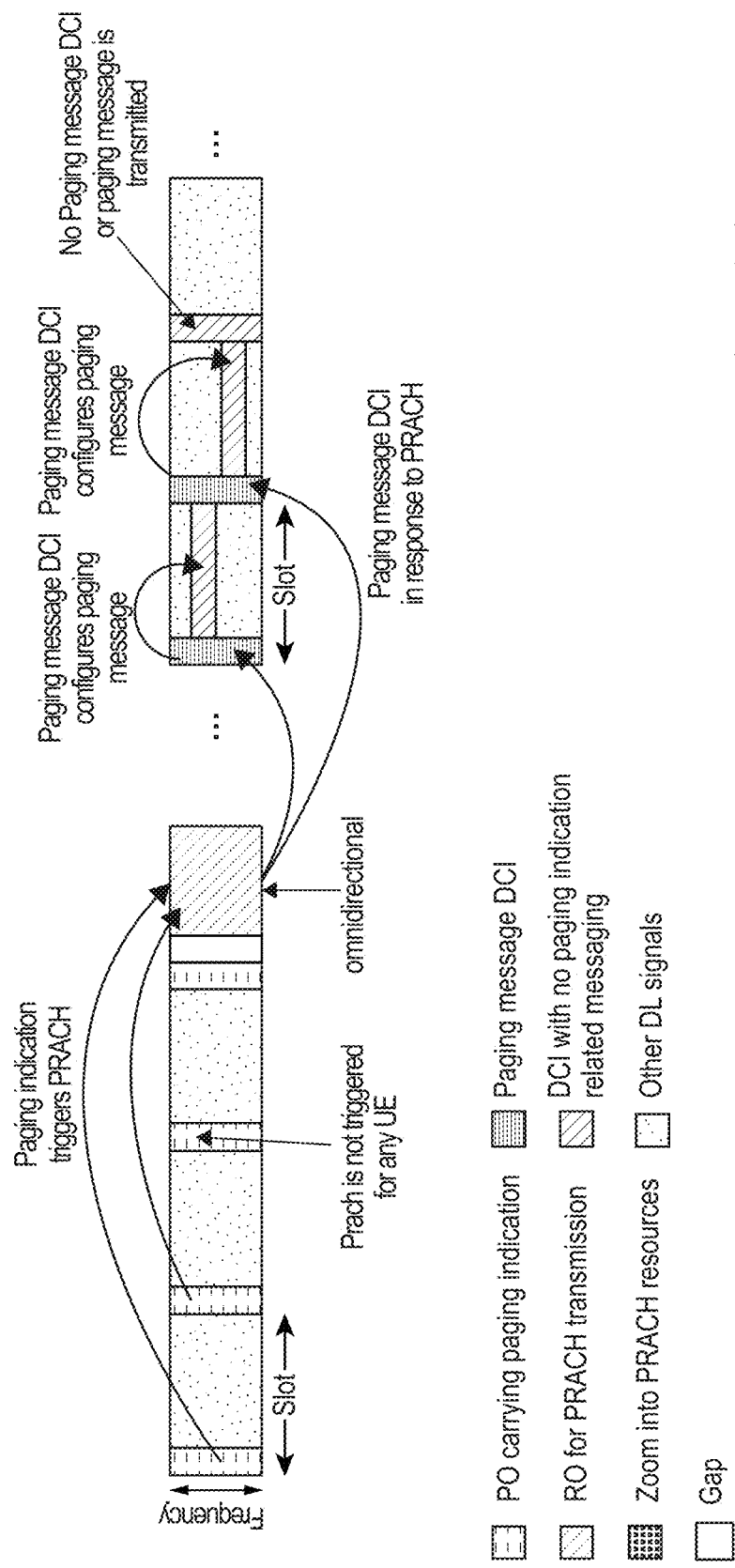
FIG. 60B shows an example configuration of paging indicators, paging message DCI and paging messages where a common set of PRACH resources are assigned for a set of SSBs.
Figures 60C, 60D:
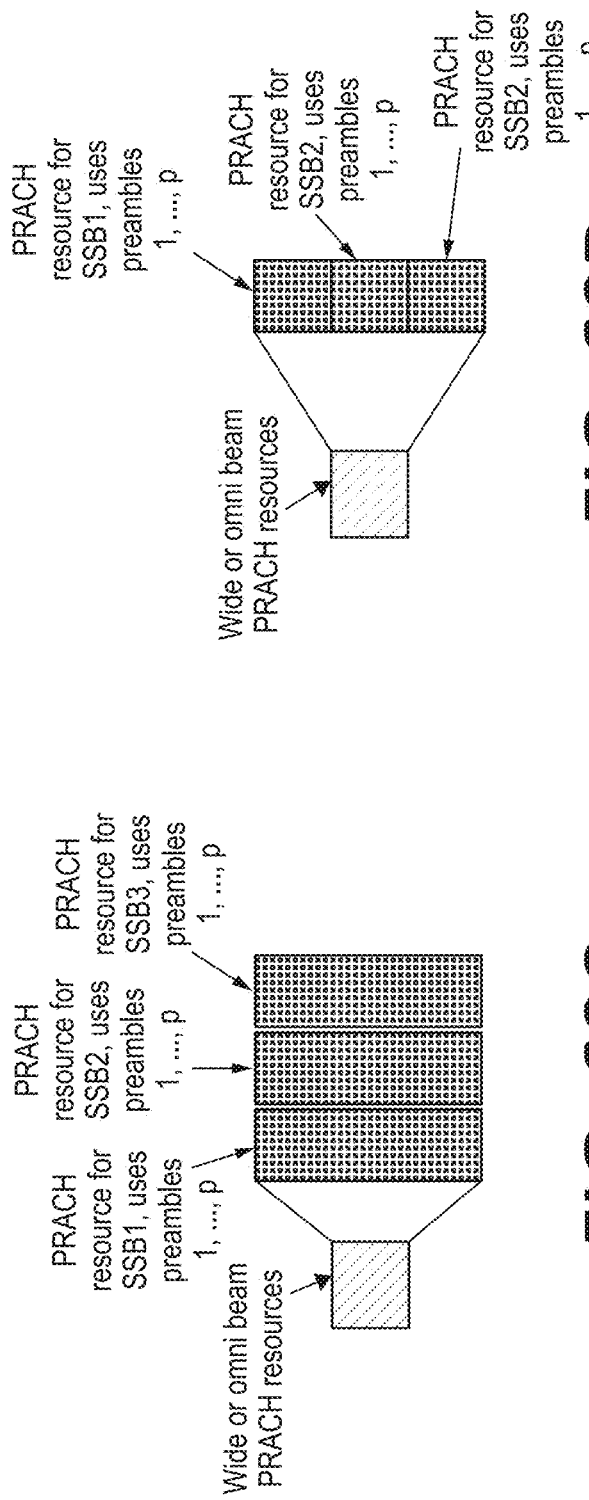
FIG. 60C shows an example configuration of paging indicators, paging message DCI and paging messages Zoom into wideband PRACH resources—TDM for PRACH resources for different SSBs.
FIG. 60D shows an example configuration of paging indicators, paging message DCI and paging messages Zoom into wideband PRACH resources—FDM for PRACH resources for different SSBs.
Figure 60E:
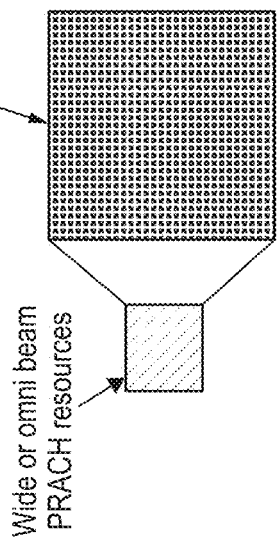
FIG. 60E shows an example configuration of paging indicators, paging message DCI and paging messages Zoom into wideband PRACH resources—common PRACH resources with different preambles denoting the SSBs.

NR may support a UE assisted response driven paging procedure. Conceptually, the gNB may send a paging indication on PDCCH that triggers a UE to transmit a preamble; gNB responds with paging message DCI that configures a paging message on PDSCH only to UEs that transmitted a preamble. This keeps the amount of overhead small as gNB may not need to send the paging message (which has significant payload due to size of the UE ID) across multiple BWPs and beams. The procedure is shown in FIG. 59. Configuration of paging indicator, paging message DCI and paging message. FIGS. 60A to 60E show an example configuration of paging indicator, paging message DCI and paging message. In FIG. 60A, PRACH resources are associated with each SSB. In FIG. 60B, a common set of PRACH resources are assigned for a set of SSBs. FIG. 60C is a zoomed view into wideband PRACH resources, such as TDM for PRACH resources for different SSBs. FIG. 60D is a zoomed view into wideband PRACH resources, such as FDM for PRACH resources for different SSBs. FIG. 60E is a zoomed view into wideband PRACH resources, such as common PRACH resources with different preambles denoting the SSBs.

In the example of FIGS. 60A to 60E, a gNB sends a paging indication. The paging indication may be sent through a DCI with identifiers applied to its PDCCH. For example, P-RNTI may be configured through the specification or SI, and a group common PDCCH with a GC-RNTI configured through SI.

A Paging Indication RNTI (PI-RNTI), for example, may be used as a unique identifier for paging indication. The PI-RNTI may be configured in the specification or through SI. The identifier (RNTI) may be a compressed form of the UE ID being paged so that a UE would decode its paging DCIs using the identifier derived from its ID such as the IMSI or S-TMSI.

For example, the identifier may be derived as UE-ID mod X where X may be configured in the system information or may be a function of the number of beams supported in the cell. As another example, the identifier may be obtained as PO mod X where PO=(T div N)*(UEID mod N). Here N is number of paging frames within UE's DRX cycle, T is the DRX cycle, UEID=IMSI mod 1024. X may be the number of SSBs covering a sweep in the UE's BWP or the total number of SSBs in the cell covering all directions and across BWPs. Alternatively, X may be configured through RMSI.

The paging indication may provide a variety of information to the UEs configured with a matching RNTI. For example, the paging indication may explicitly or implicitly indicate the possibility of being paged. If a common P-RNTI is used for both indication and paging DCI, explicit indication may be required to indicate whether a DCI is for paging indication or paging message. On the other hand, if different RNTIs are used (PI-RNTI for paging indication and P-RNTI for paging DCI), then it may be implicitly understood from successfully decoding the DCI.

The paging indication may trigger a preamble transmission on PRACH in a RACH opportunity (RO).

The paging indication may signal the resources for the RACH transmission. The RACH transmission may occur in at least two ways. First, for example, the RACH transmission may occur over dedicated PRACH time and frequency resources for the paging procedure. These PRACH resources may be dynamically configured by the paging indication. Second the RACH transmission may occur over PRACH resources configured through system information. These PRACH resources may be dedicated for UE-assisted paging or shared with other functionalities such as initial access, beam recovery, etc. In the latter case the total pool of available preambles may be partitioned between paging, initial access, etc.

The paging indication may indicate the pool of available RACH sequences for PRACH transmission.

The paging indication may indicate the rule according to which a UE may associate with a specific PRACH preamble. This may be indicated as an index into a table containing rules for the mapping.

The paging indication may configure the timing resources for the paging message DCI, e.g., the CORESETs of certain slots over which the paging message DCI may be transmitted.

UEs that are configured to receive the transmitted paging indication (using the correct P-RNTI or GC-RNTI) may respond with a preamble transmission.

The gNB may recognize the beams and BWPs on which the RACH preambles are received. Then the gNB may transmit a paging message DCI only on those beams and BWPs on which the preambles were received. This DCI may carry an RNTI such as the P-RNTI and may indicate resources for the paging message. The paging message may be transmitted on the same beam/BWP as the paging message DCI. Alternatively, the DCI may be encoded with a RA-RNTI as this is a response to the UE's preamble transmission.

The paging message may carry several pieces of information. For example, the paging message may carry UE IDs of UEs being paged. It may carry a timing advance for UEs whose preambles were detected by gNB. Note that many of these UEs may be false alerts depending on how the UEs are grouped within a RNTI. The paging message may carry a temporary C-RNTI or C-RNTI for the UEs whose preambles are detected by gNB. It may carry a UL grant to allow UE to transmit a message similar to Msg3 in the RACH procedure if temporary C-RNTI is used.

The paging may carry a compressed form of UE IDs of UE being paged. The compression reduces the overhead due to the large size of the paging message. In this case, the multiple UEs that receive the message may attempt RRC connection but the gNB may allow only the intended UEs to successful establish the RRC connection.

FIG. 61 shows an example of the fields for UE ID and the timing advance in the MAC PDU. Here the UE ID may be sent along with the timing advance, C-RNTI. An alternative is to send the C-RNTI, timing advance and paging record UE ID as an RRC message. Or the timing advance and C-RNTI may be part of MAC PDU whereas the UE ID may be part of the SDU.

Multiple UEs may respond with a RACH transmission but this procedure reduces the number of BWPs and beams over which the paging message is sent. The paging message DCI indicates the scheduled resources for the paging message. The UEs decode the paging message DCI and then the paging message and check for their UE ID in the message. If its UE ID is present in the message, the UE may respond to the paging. If its UE ID is not found in the message, the UE may ignore the paging.

Figure 62:
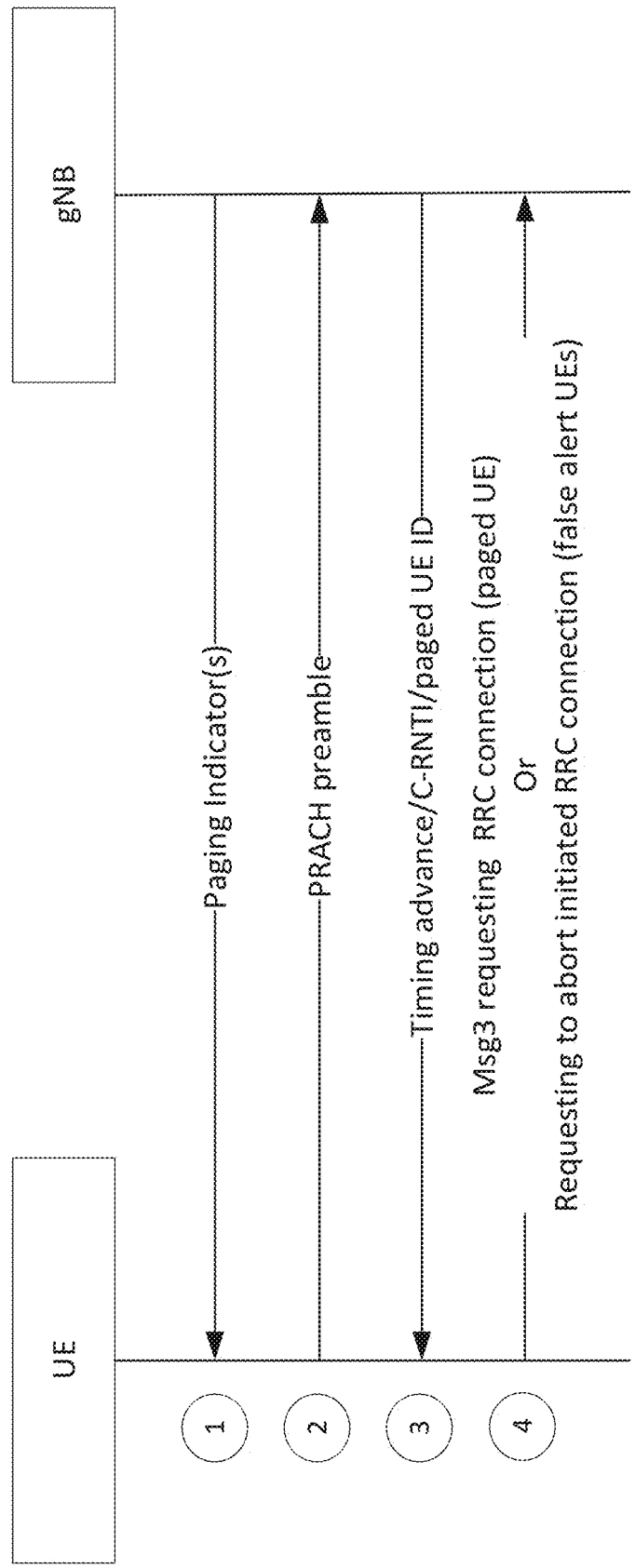
FIG. 62 shows an example of UE assisted paging where a gNB transmits the ID of UE being paged.

As discussed herein, the gNB may transmit the timing advance and C-RNTI or temporary C-RNTI in the paging message and an UL grant. Thus, the UE has enough information to obtain UL sync and transmit a request to the gNB to establish RRC connection. FIG. 62 shows the RACH procedure for this case.

If the gNB does not send the timing advance, the UE may attempt an initial access based RACH procedure for RRC connection.

Figure 63:
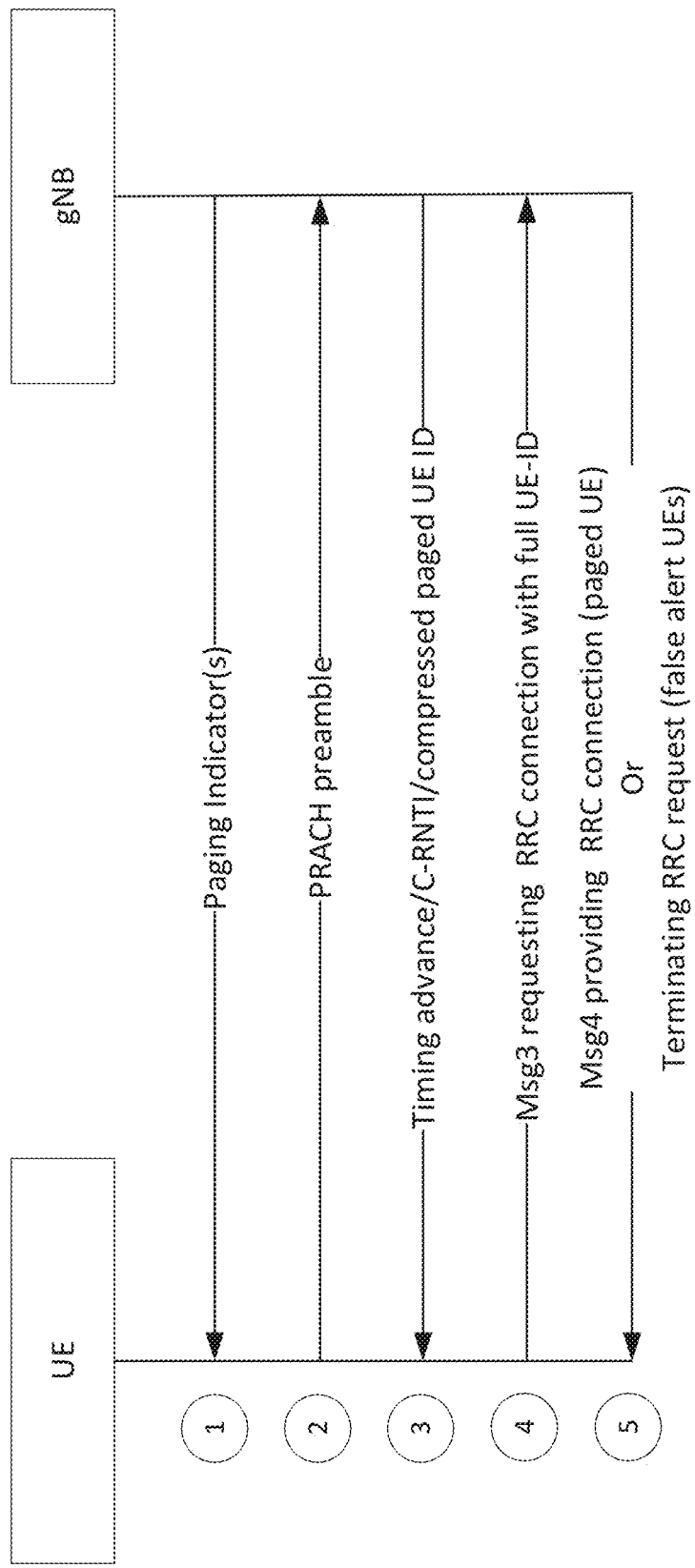
FIG. 63 shows an example of a UE assisted paging where a gNB transmits a compressed form of ID of UE being paged.

The gNB may use a compressed UE ID in the paging message to further reduce the signaling load in paging. The compressed UE ID goes to multiple UEs that responded to the paging indication on the respective beams/BWPs along with a C-RNTI/temporary C-RNTI, timing advance. These UEs may transmit a message similar to Msg3 in RACH procedure; this contains the UE ID. The gNB checks the received UE ID with its paging record. If a match is not found, it rejects the RRC connection. These steps are shown in FIG. 63. Msg4 may use RA-RNTI or the PI-RNTI in its message.

PRACH preambles may be configured for UEs to respond to a paging indication in a given PO for a given PI-RNTI. Every UE in the pool of UEs configured for a given PO and PI-RNTI may be mapped to one of the PRACH preambles. The concept is shown in FIGS. 64A and 64B for P=1 and P=3, respectively.

Figure 64B:
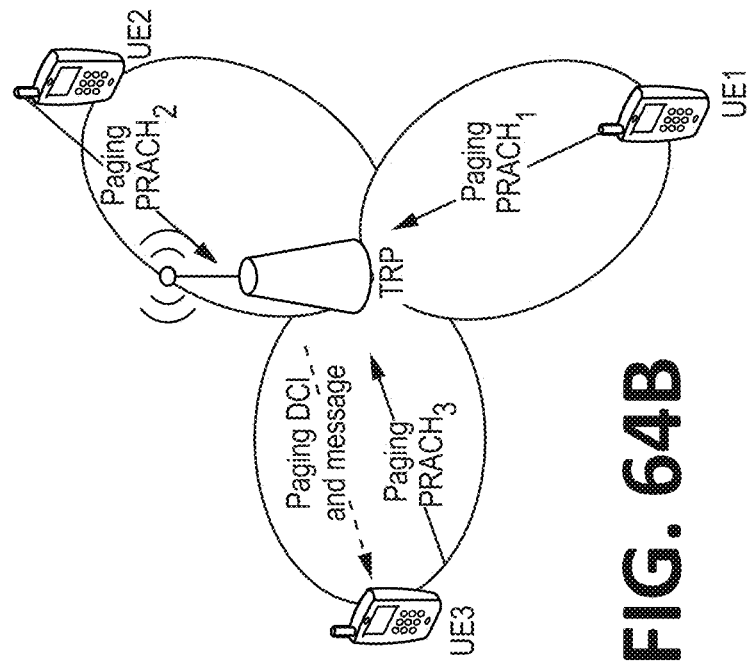
FIG. 64B shows an example preamble configuration when P=3.
Figure 64A:
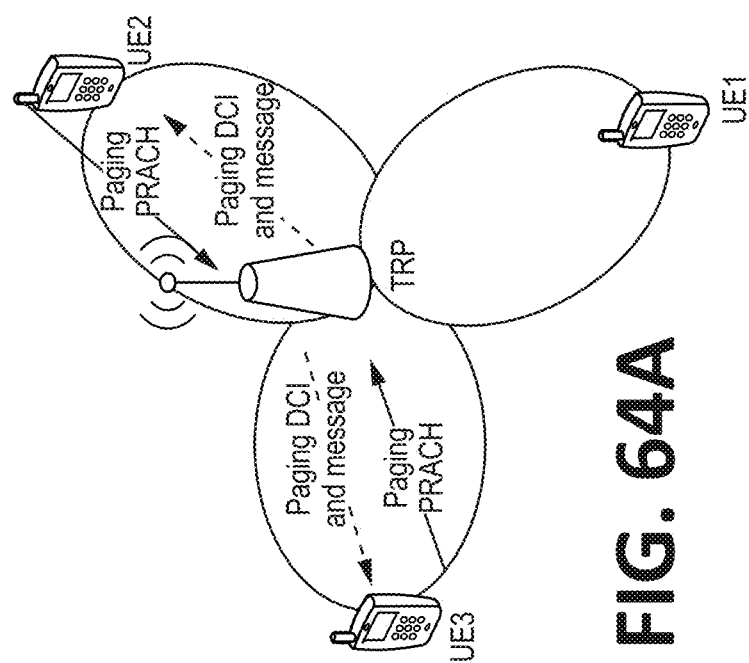
FIG. 64A shows an example preamble configuration when P=1.

P=1 in FIG. 64A where the gNB intends to page $UE_3$. All UEs may use a single RACH preamble. In response to a paging indicator sent on all the beams, the same paging preambles are sent by $UE_2$ and $UE_3$ on different beams. $UE_1$ has a different PI-RNTI and does not respond with the paging preamble. The gNB then sends the paging message DCI and paging message to $UE_2$ and $UE_3$.

P=3 in FIG. 64B. The gNB intends to page $UE_3$. In response to a paging indicator sent on all the beams, $UE_2$ sends preamble $PRACH_2$ and $UE_3$ sends preamble $PRACH_3$ on different beams. $UE_1$ has a different PI-RNTI and may not respond with the paging preamble. The gNB then sends the paging message DCI and paging message to $UE_3$ as it knows the association of $UE_3$'s ID to $PRACH_3$.

Multiple UEs are mapped to a RACH preamble as the number of UEs in the system far exceeds the number available preambles. The UEs may map to a preamble based on the UE-ID such as the S-TMSI or IMSI. For example, the L LSB bits of a UE map to an index into the list of preambles. If there are $2^L$ preambles for paging, all UEs having the same bit value in those L positions of the UE-ID may use preamble with index equal to integer value of the L LSB bits.

The L bits may not need to be confined to the LSB bits. The L bits mapping into the paging preamble index may vary over time. In one PRACH resource a UE's L LSB bits $(b_0, b_1 \ldots b_{L-1})$ are used to identify the preamble; however, in another PRACH resource bits $(b_L, b_{L+1} \ldots b2_{L-1})$ may be used. This time varying mapping ensures that if the PRACH response of two UEs collide on the same beam or BWP in a certain PRACH resource, in another PRACH resource, they may be assigned to different preambles and may not collide.

The concept is shown in FIG. 65 assuming that four paging PRACH preambles are configured in the system. The tables show different ways of mapping the preamble to UE ID. The bits $b_k$ in the UE ID may take a value of 0 or 1. The mapping may be a function of PO or the timing within a frame.

The gNB receives preambles to the paging indication on different beams, BWPs and preambles. It responds with a paging message DCI and paging message only to preambles that correspond to the UEs it intends to page. This response occurs on the beams and BWPs corresponding to which the paging preambles were received. This scheme further reduces the overhead due to the paging message as the gNB can limit its paging message DCI to the valid paging preambles.

Multiple UEs within a beam may map to the same preamble and PI-RNTI within a PO. When a paging indication arrives, they may transmit the same preamble in the same PRACH resource and collide. On collision, the gNB may fail to detect a preamble, in which case, a paging message is not received.

If no paging message is received, the UEs retransmit preambles in other PRACH resources with random timing backoff to avoid colliding, similar to random access in LTE. In this case, the PRACH resource may be identified with the correct PI-RNTI and PO occasion. So, it is desired that the preambles also be configured as a function of the PO and/or the PI-RNTI.

No all collisions are catastrophic. As long as the gNB detects one valid preamble on a beam, it may send the paging message on that beam. If the message contains the paged UE ID, all UEs tracking that PI-RNTI on the beam receive it and check to see if it matches with their ID.

If the UE-ID matches, the matched UE may perform the default RA procedure during which it gets its timing advance and establishes RRC connection, especially if the paging message does not contain the timing advance and UL grant for the UE. Similarly, the matched UE may continue to establish the RRC connection if timing advance/temporary C-RNTI, UL grant information are already available from the paging message DCI.

A preamble may be transmitted in at least two ways. First, for example, a preamble may be transmitted in a PRACH resource associated with the monitored SSB. In this case, each DL beam corresponding to SSB provides UL resources for transmitting a preamble. This was shown for example in FIG. 60A. In this configuration each beam may use the same set of P paging preambles. When a preamble p is received in a particular PRACH resource on a beam, the gNB recognizes the corresponding SSB monitored by that UE and responds with a paging message on that beam.

Second, a preamble may be transmitted in a PRACH resource that is configured to be wide band or omni directional. In this case, a pool of PRACH resources are allocated for UEs monitoring a set of SSBs. The paging indicator may sweep through a set of SSBs during a PO and the UEs in that PO respond in the wide band PRACH resource. This is shown in FIG. 60B.

The PRACH resources may be configured in a number of ways. For example, separate PRACH resources are configured for each SSB in the wideband beam. As the PRACH resources are dedicated to each SSB, P preambles may be associated with each SSB. FIG. 60C shows the PRACH resources for SSBs configured in TDM manner. FIG. 60D shows the PRACH resources for SSBs configured in FDM manner. A UE monitoring SSB1 may transmit preamble p in its PRACH resource and a UE monitoring SSB2 may also transmit preamble p in its PRACH resource but they will not collide as their resources are distinct and they will both be recognized by the gNB. The SI may indicate the PRACH resources for each SSB. Alternatively, a PI-RNTI that may be assigned to each SSB may be used to derive the PRACH resources.

PRACH resources may be shared between the UEs monitoring different SSBs. In this case, it is desirable to distribute the P preambles between the UEs monitoring the set of SSBs. The monitored SSBs are identified by their corresponding preambles at the gNB through an association with an SSB; so, on receiving preamble p, gNB knows the monitored SSB. FIG. 60E shows the distribution of preambles between the SSBs. The preamble-to-SSB mapping may be given explicitly in the SI or may be implicitly derived from other parameters. For example, the PI-RNTI may be based on the time and frequency location of the SSB and/or SSB index, and the preambles associated with an SSB may be derived from this PI-RNTI.

Figure 66:
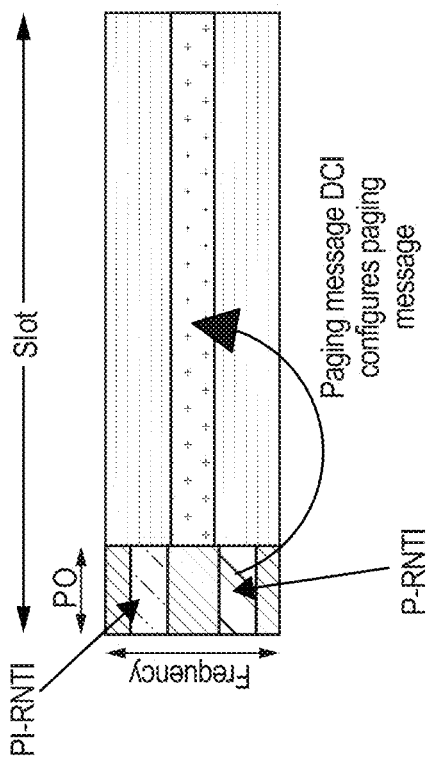
FIG. 66 shows an example paging indication and paging message DCIs in the same CORESET with different RNTI.

The paging indication and paging message DCI may be designed in at least three ways. First, a paging indication and paging message DCIs may use different RNTIs on their respective PDCCH and both may be signaled in the same PO as seen in FIG. 66. Here the paging indication is for $UE_1$ whereas the paging message DCI is for $UE_2$ (which already received a paging indication in the past).

Figure 67:
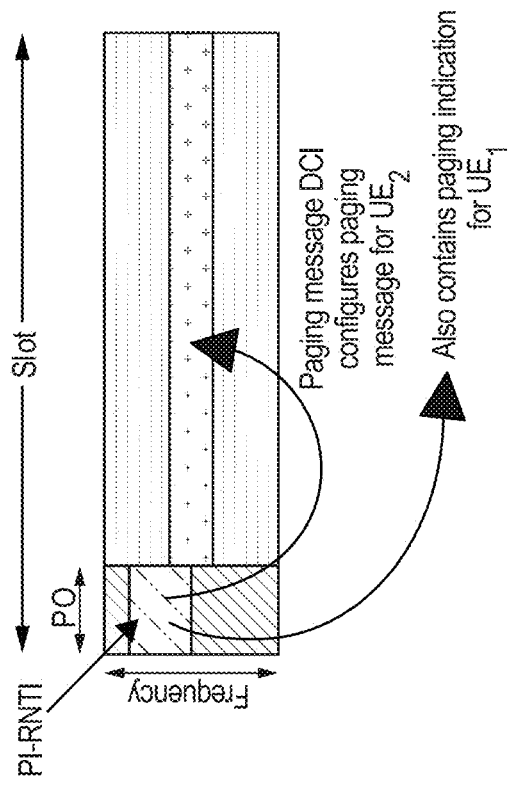
FIG. 67 shows a single PDCCH for paging indication and paging message for different UEs.

Second Paging indication and Paging DCI use same RNTI. For example, a single common DCI may be used for indication and paging message. Here the paging indication information may be for new UEs while the paging message related control information may be for UEs that completed a RACH transmission in response to prior indication. FIG. 67 shows an example.

Figure 68:
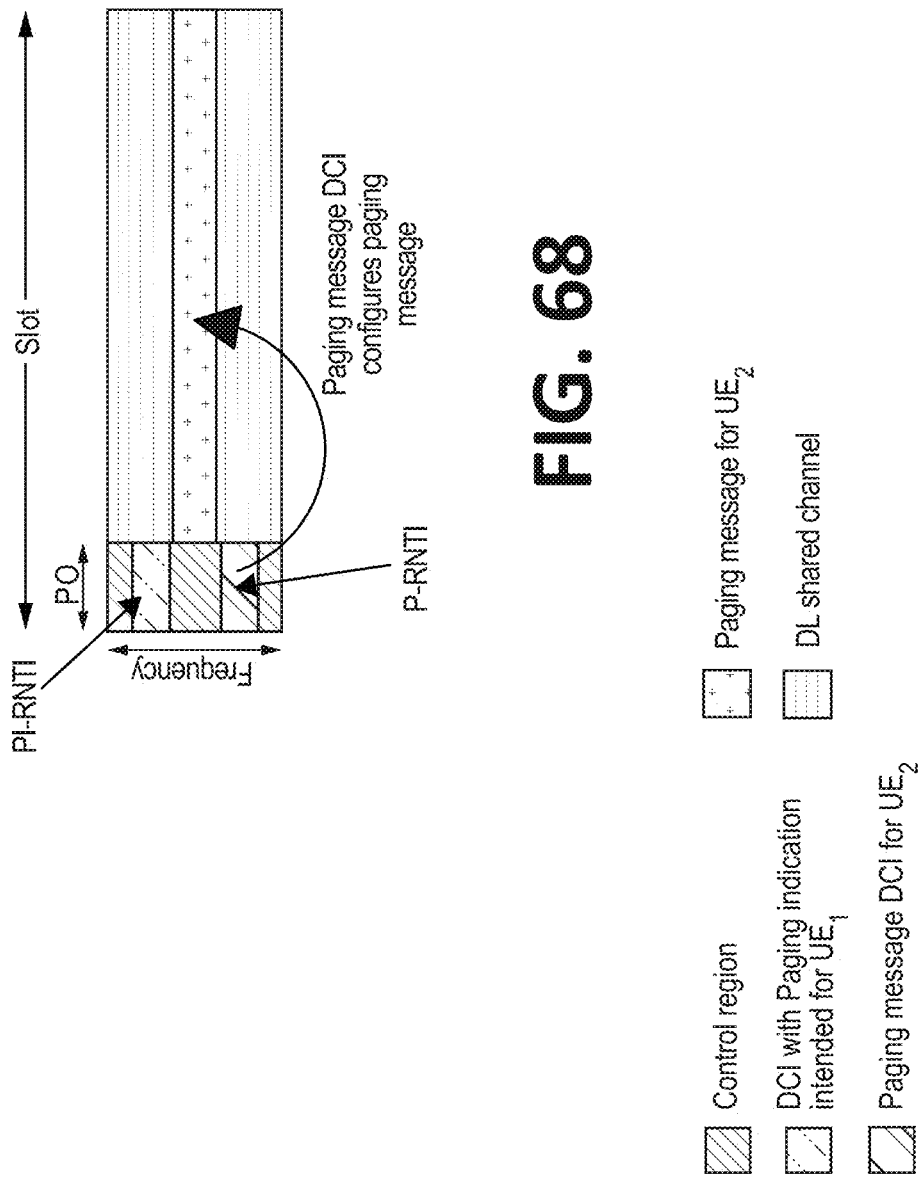
FIG. 68 shows a different PDCCH for paging indication and paging message DCI but same RNTI.

Alternatively, different PDCCHs may be used for paging indication and paging message, but they may be received in the same PO. The DCI may implicitly or explicitly convey their type, e.g., paging indication DCI or paging message DCI. FIG. 68 shows an example.

Figure 69A:
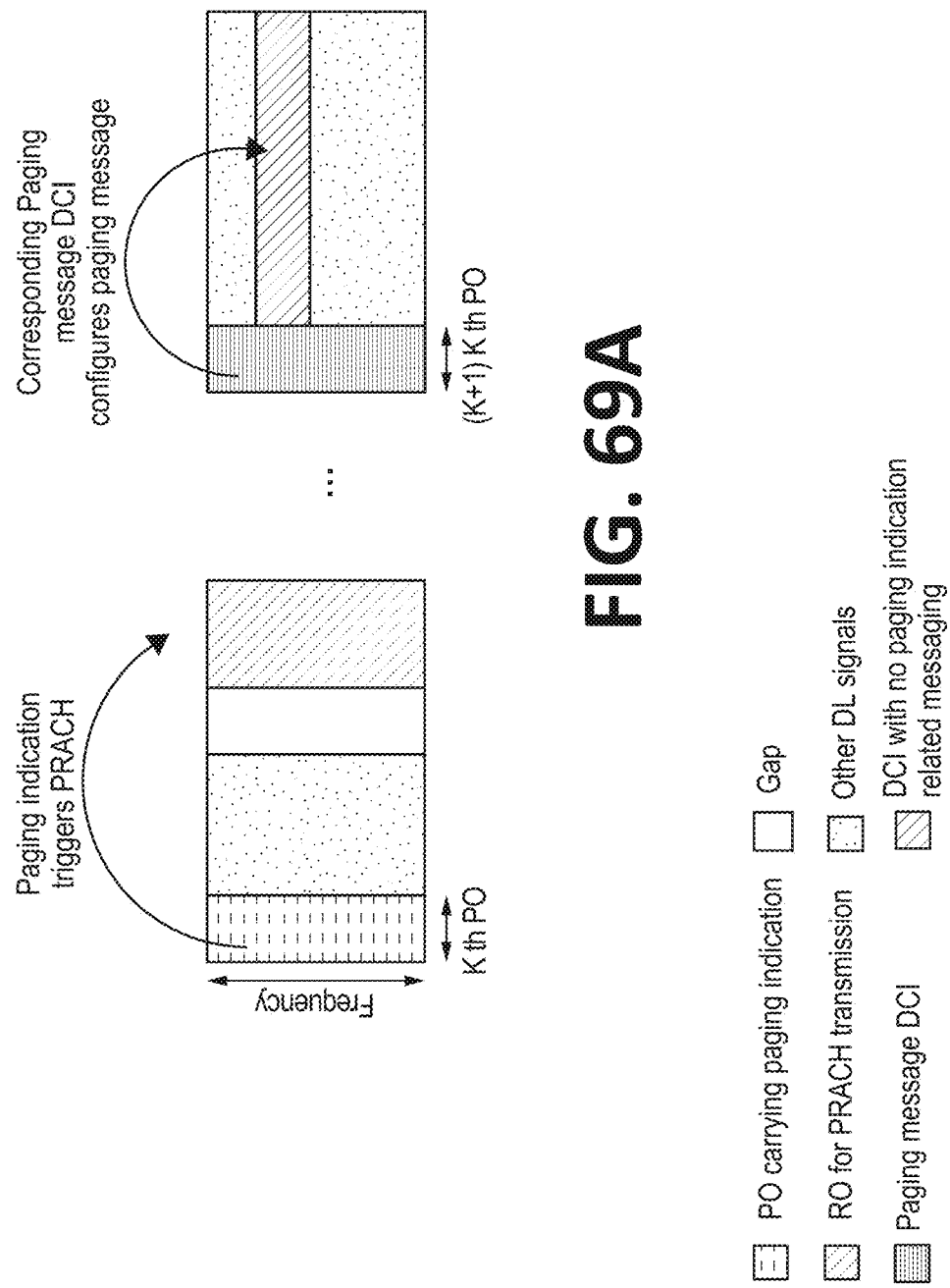
FIGS. 69A to 69C show an example paging message DCI configuration.

Third, the paging indication may be signaled in the POs while the paging message DCIs and paging message are signaled another means. For example, a paging message DCI for a UE may occur in a PO following the RO. This PO may be the one immediately after the RO as shown in FIG. 69A. As the timing relation between the indication and message DCI is fixed, the UE and gNB can unambiguously infer the correlation to the paging indication from the paging message DCI. Note that the UE's PO for the paging indication may occur at lower periodicity that the POs supported by the network. $UE_1$'s PO may carry its paging indication while $UE_2$'s PO configured for its paging indication may also carry the paging message DCI for $UE_1$.

Figure 69B:
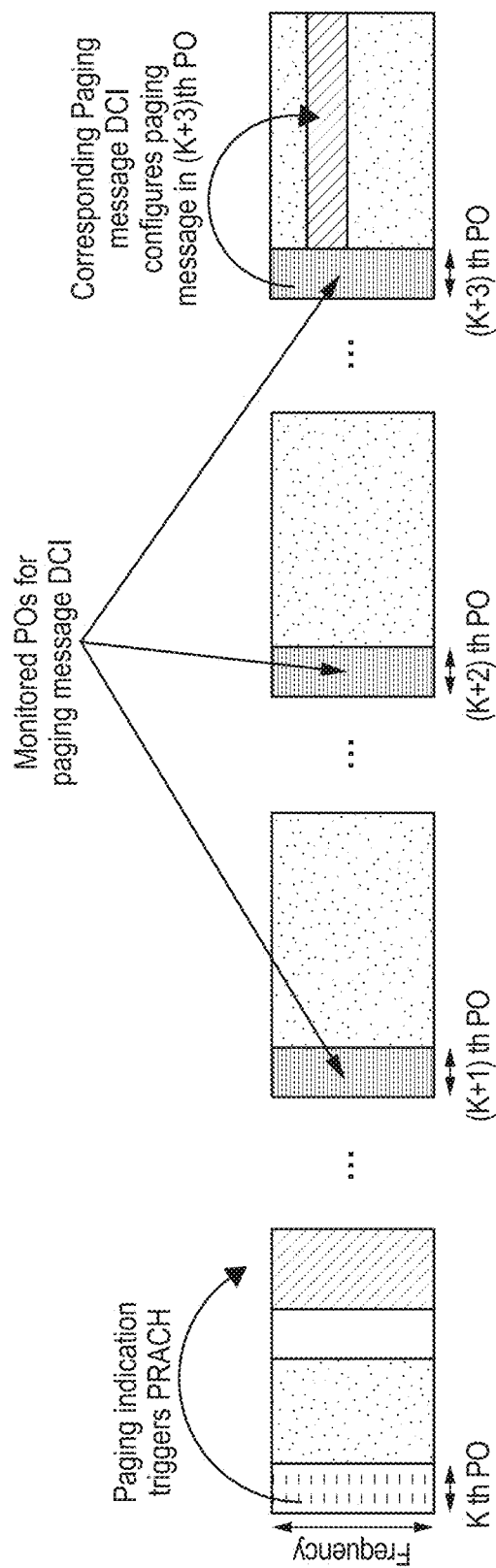

Alternatively, a paging message DCI may occur in one of F POs after the RO or the paging indication as shown in FIG. 69B. Here the UE monitors F POs for the paging message DCI associated with the paging indication. If it does not receive one, it aborts looking for the paging message DCI but may continue monitoring the PO for paging indication. In this case the paging message DCI may carry an explicit identifier for the paging indication that has triggered the paging message.

Figure 69C:
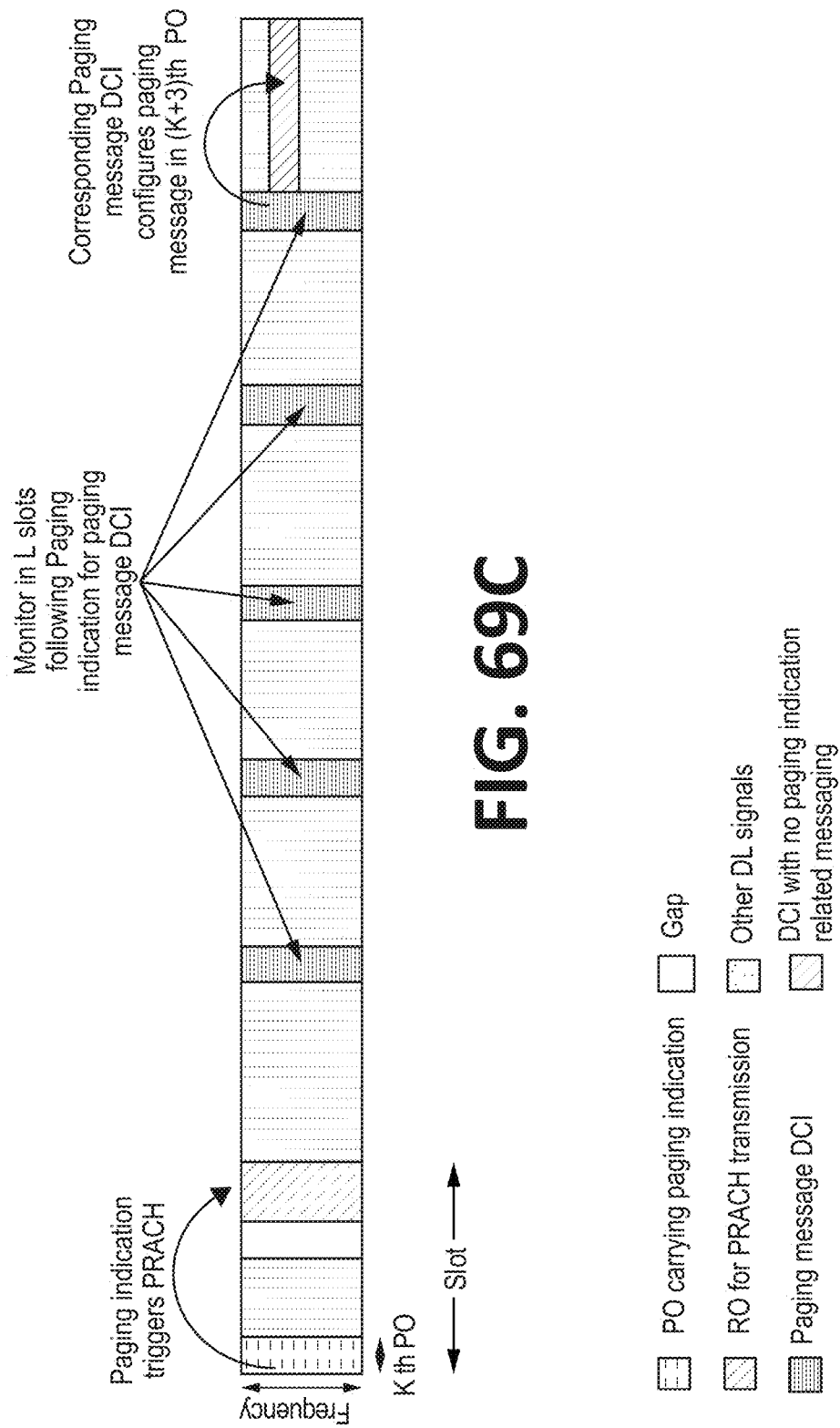

In another alternative, a paging message DCI may not be restricted to a PO. It may be transmitted in a common search space within a fixed time interval following the paging indication as seen in FIG. 69C. For example, the paging message DCI is signaled in the $s^{th}$ slot following the PO or paging message DCI occurs between the $s^{th}$ and the $(s+1)^{th}$ slot following the paging indication. Since the timing is not fixed between the Paging indication and the message DCI, the paging message DCI may carry an explicit identifier for the paging indication that has triggered the paging message.

Figure 56:
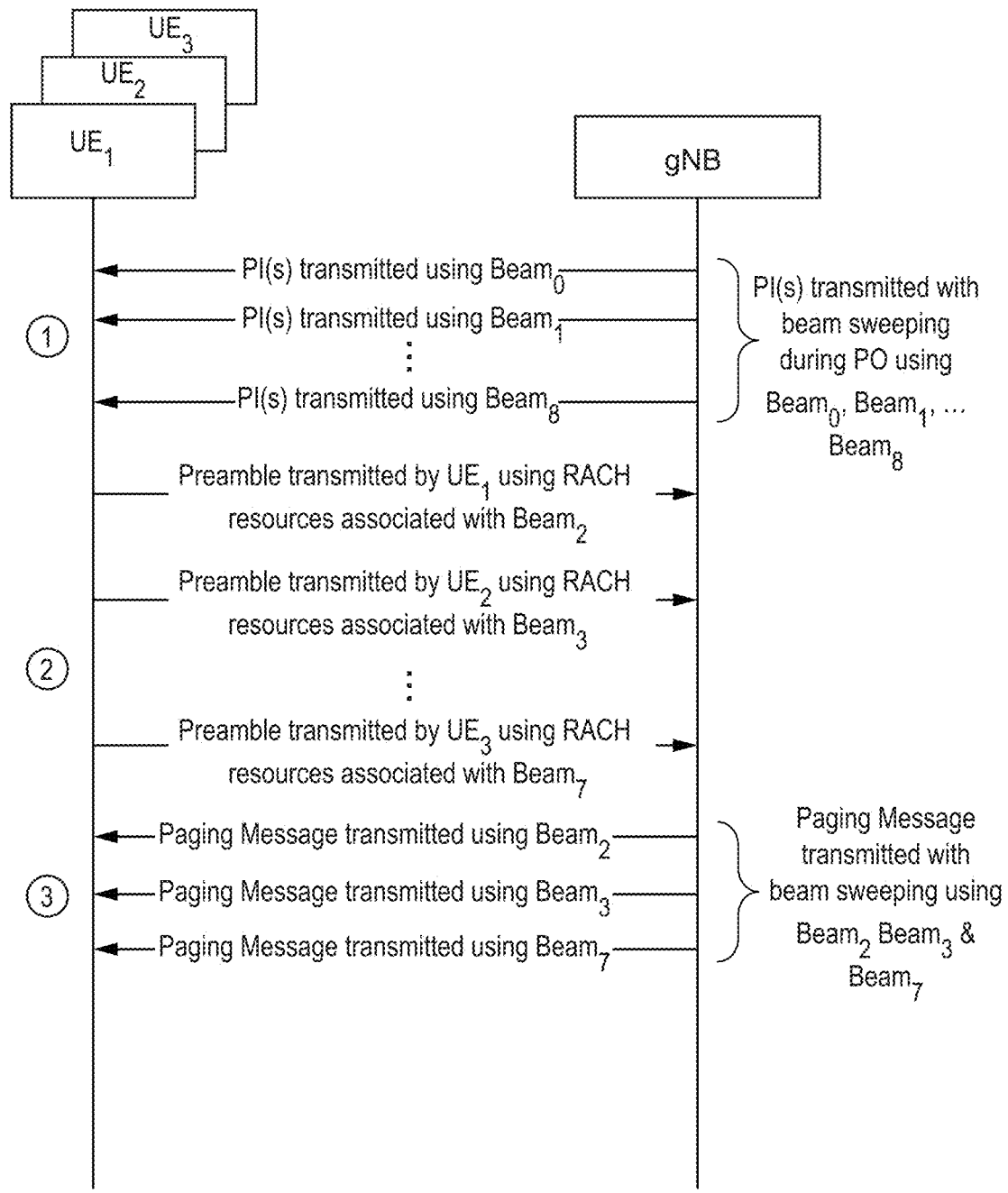
FIG. 56 is an illustration of the signaling for a RACH based UE assisted response drive paging procedure.

In FIG. 56, another example of the RACH based UE assisted response driven paging procedure is illustrated. In this example, the network is configured to perform beam sweeping using nine beams to provide coverage in the cell. We assume three UEs (UE1, UE2 and UE3) share the same PO, but are in different coverage areas of the cell. The signaling associated with the procedure is describes as follows:

In step 1 of FIG. 56, the UEs monitors for PIs during their POs. In this example, UE1, UE2 and UE3 have the same PO. To conserve power, the UEs may monitor for PIs during a subset of the paging blocks that make up their PO, where the subset of paging blocks monitored may correspond to the "best" DL TX beam(s). In this example, UE1 monitors Beam2, UE2 monitors Beam3 and UE3 monitors Beam7. When the UE is paged, the network transmits the PI(s) to the UE during all the paging blocks of the UE's PO; e.g., using all the DL TX beams.

In step 2, if paged, the UE reports paging assistance information that may be used by the network to optimize the transmission of the Paging Message; e.g., determine the best DL TX beam(s) to use for transmission of the Paging Message. In this example, the paging assistance is indicated by the transmission of a reserved preamble; e.g., the paging preamble, using RACH resources associated with the DL TX beam received by the UE. UE1 transmits the paging preamble using RACH resources associated with DL TX Beam2, UE2 transmits the paging preamble using RACH resources associated with DL TX Beam3 and UE3 transmits the paging preamble using RACH resources associated with DL TX Beam7

Figure 70A:
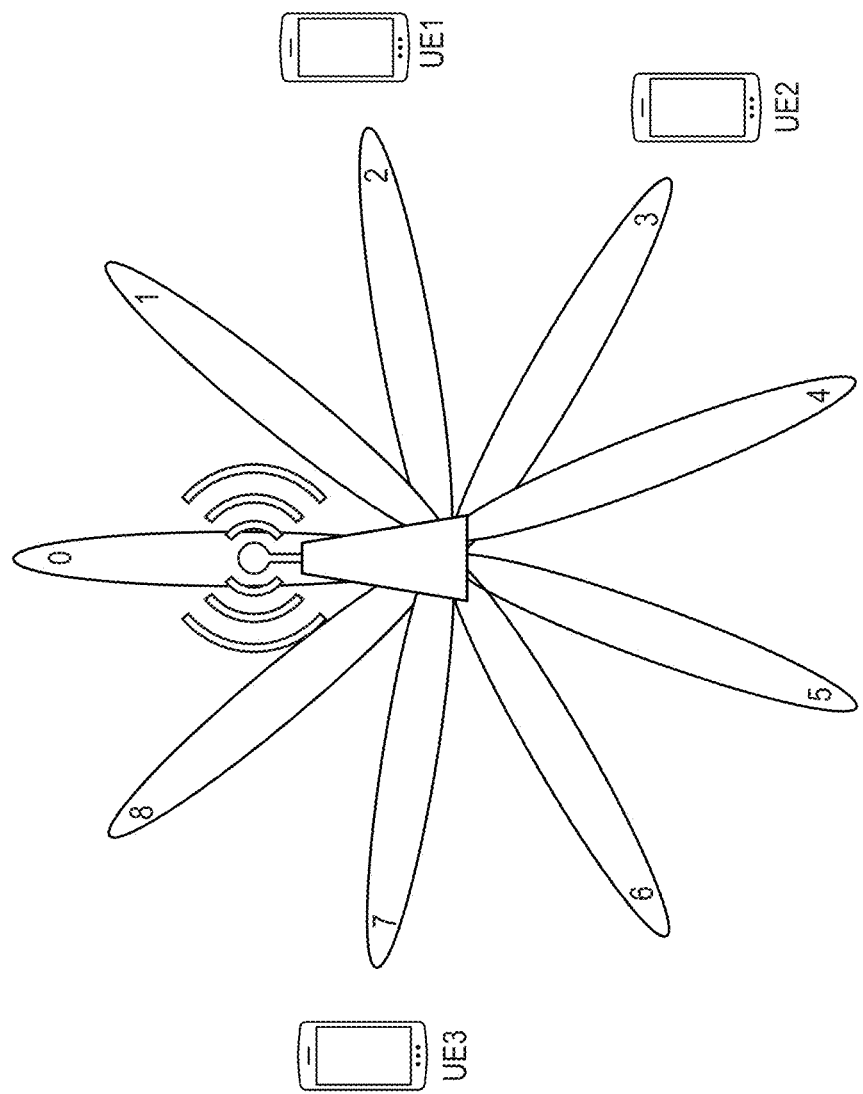
FIGS. 70A and 70B illustrate an example association between paging blocks and the DL resources used to transmit the paging message.
Figure 70B:
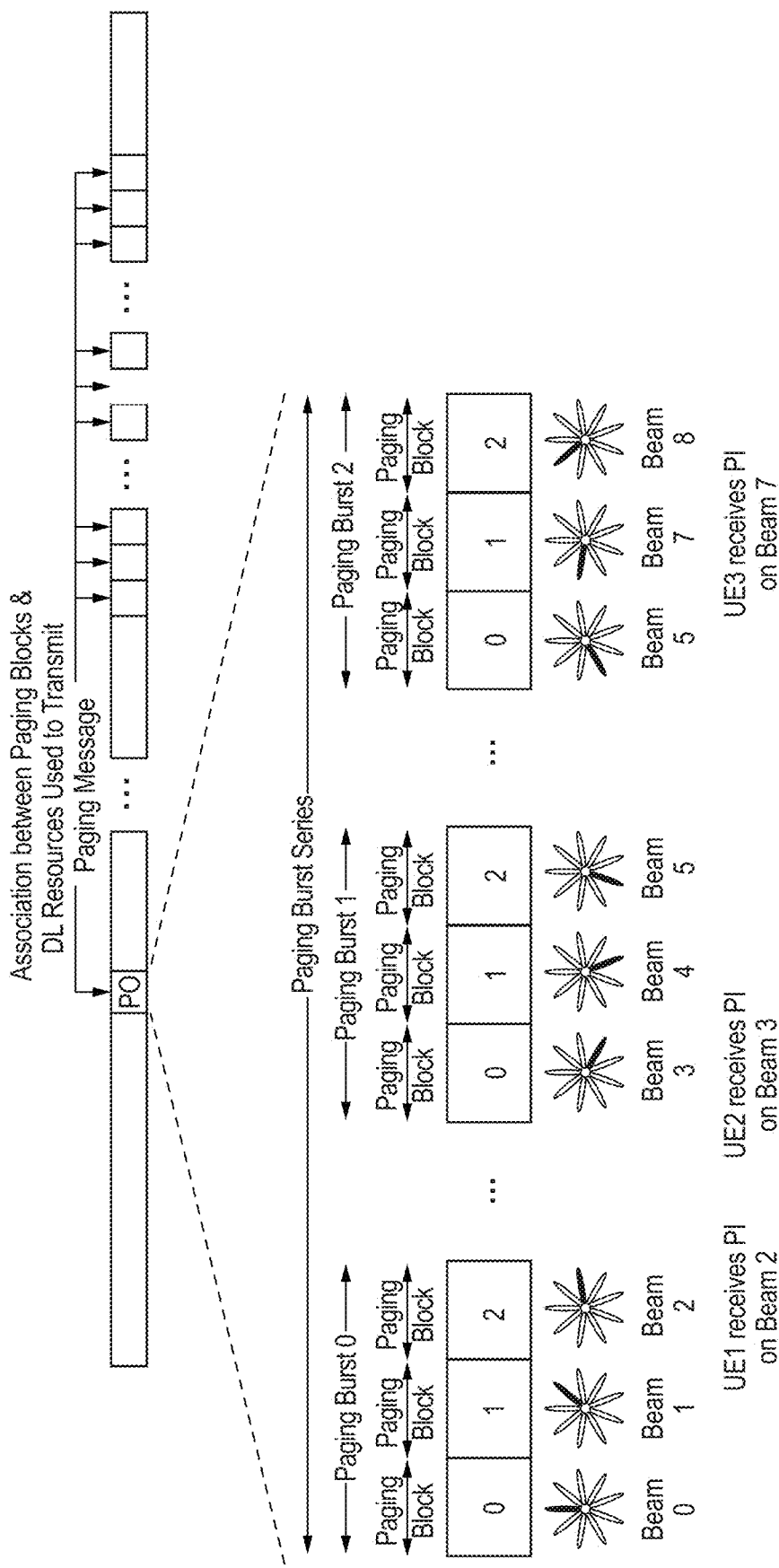

In step 3, if paged in step 1, the UE monitors for the Paging Message using the DL resource(s) associated with the paging block(s) and/or DL TX beam(s) used to transmit the physical channel that signaled the PI(s) received by the UE during the PO. In this example, UE1 monitors Beam2, UE2 monitors Beam3 and UE3 monitors Beam7 for the Paging Message as shown in FIGS. 70A and 70B. The DL resource(s) used to transmit the Paging Message may be composed of 1 or more OFDM symbols, which may correspond to one or more mini-slots, slots, subframes, etc.

Mechanisms for Signaling Paging Assistance Information—Higher Layer Signaling.

The paging assistance information may be signaled to the network using higher layer signaling such as an RRC message or a MAC CE. The higher layer signaling may be transmitted using a grant-based physical channel (e.g., NR-PUSCH). If the UE does not have an UL grant when the paging assistance information needs to be transmitted, the random access procedure may be used to obtain the grant for the NR-PUSCH, thereby allowing the paging assistance information to be signaled as part of the MSG3 transmission of the random access procedure. Alternatively, Semi-Persistent Scheduling (SPS) may be used to configure the grant for NR-PUSCH, where the SPS may be configured using dedicated signaling that may have occurred while the UE was in a "connected" state. In another example, the higher layer signaling may be transmitted using a grant-less physical channel, where the resources used for the grant-less transmission may be signaled to the UE via system information, dedicated signaling that may have occurred while the UE was in a "connected" state or DCI received during the UEs PO. An exemplary RRC Paging Assistance message is defined in Code Example 4. Table 24 provides descriptions associated with Paging Assistance, e.g., for Code Example 4 or Code Example 5.

Code Example 4
Exemplary NR-Paging Assistance Message

```
-- ASN1START
NR-PagingAsistance ::= SEQUENCE
{
ue-Identity PagingAssistanceUE-Identity OPTIONAL,
pagingBlockId SEQUENCE (SIZE (1..maxPagingBlocksMonitored))
OF PagingBlockId,
mobilityState ENUMERATED (Normal-mobility, Medium-mobility,
High-Mobility, Static, Nomadic} OPTIONAL
}
PagingAssistanceUE-Identity ::= CHOICE {
cnPagingUE-Identity,
ranPagingUE-Identity,
randomValue BIT STRING (SIZE (40)
}
CNPagingUE-Identity ::= CHOICE {
s-TMSI,
imsi IMSI,
}
RANPagingUE-Identity ::= CHOICE {
c-RNTI,
resumeIdentity BIT STRING (SIZE (40)
}
PagingBlockId ::= INTEGER (0..256)
maxPagingBlocksMonitored ::= 8
  -- ASN1STOP
```

Code Example 5
Alternate NR-PagingAssistance Message

```
-- ASN1START
NR-PagingAsistance ::= SEQUENCE
{
ue-Identity PagingAssistanceUE-Identity OPTIONAL,
pagingBlocksMonitored SEQUENCE (SIZE
(1..maxPagingBlocksMonitored))
OF PagingBlock,
mobilitystate ENUMERATED (Normal-mobility, Medium-mobility,
High-Mobility, Static, Nomadic} OPTIONAL
}
PagingAssistanceUE-Identity ::= CHOICE {
cnPagingUE-Identity,
ranPagingUE-Identity,
randomValue BIT STRING (SIZE (40)
}
CNPagingUE-Identity ::= CHOICE {
s-TMSI,
imsi IMSI,
}
RANPagingUE-Identity ::= CHOICE {
c-RNTI,
resumeIdentity BIT STRING (SIZE (40)
}
PagingBlock ::= Sequence {
pagingBlockId,
beam BeamId OPTIONAL
}
PagingBlockId ::= INTEGER (0..255)
BeamId ::= INTEGER (0..15)
  maxPagingBlocksMonitored ::= 8
```

TABLE 24

| Paging Assistance Field | Description |
| --- | --- |
| ue-Identity | UE identity included to facilitate optimizing the contents of the paging message; e.g., constructing the pagingRecordList such that it only includes the identities of UEs that may receive the beams transmitted during a given paging block. |
| pagingBlockId | ID of the of the paging block the UE will monitor or prefers to monitor for paging. |
| mobility State | The mobility state of the UE. |

For scenarios where multiple DL beams are transmitted during a paging block, the network may be able to infer which DL beam to use to page the UE based on the UL beam/resource that was used to receive the Paging Assistance information. Alternatively, if the UE is able to identify the beam(s) received during a paging block, the beam identity may be signaled as part of the paging assistance information. In one example, the beam ID(s) and the paging block ID(s) are included in NR Paging Assistance message. Alternatively, the beam ID(s) may be signaled without the paging block ID(s). An exemplary RRC Paging Assistance message that includes the paging block ID(s) and beam ID(s) is defined in Code Example 5.

Figure 71:
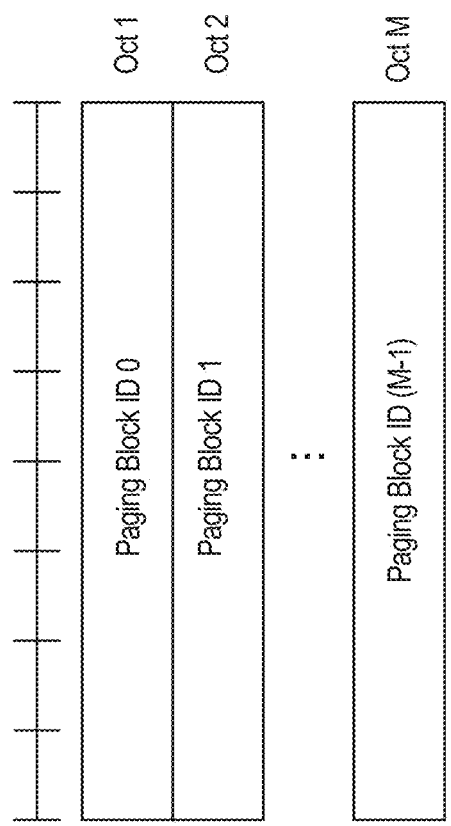
FIG. 71 illustrates an exemplary Paging Assistance MAC CE.
Figure 72:
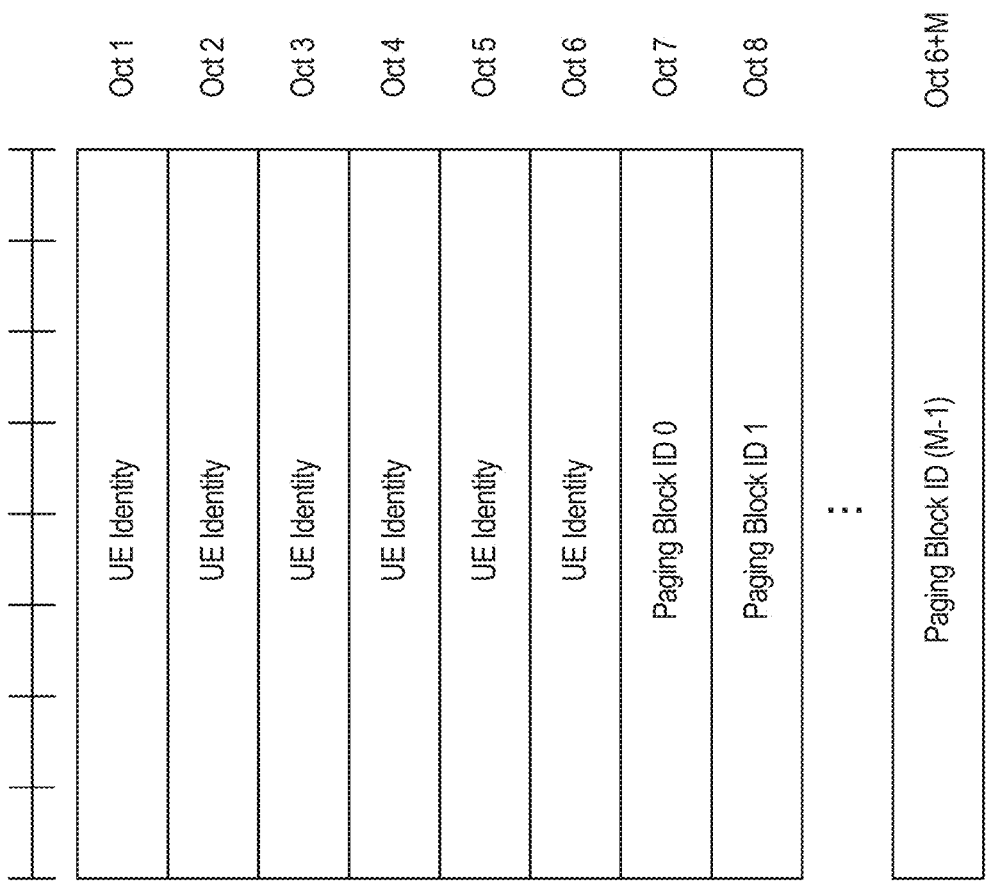
FIG. 72 illustrates an exemplary Alternate Paging Assistance MAC CE.

An exemplary Paging Assistance MAC CE is shown in FIG. 71. The disclosed MAC CE is of variable size, allowing it to include Paging Block IDs for a specified maximum number of paging blocks. Alternatively, the MAC CE may be defined with a fixed size and padding may be used when the number of paging blocks included is less than the maximum supported. The Paging Assistance MAC CE may include a Paging Block ID field, in which the UE will monitor or prefers to monitor for paging. An alternate Paging Assistance MAC CE that includes a field for the UE identity is shown in FIG. 72. The UE identity may be a CN identity such as the IMSI or S-TMSI, or a RAN identity such as the C-RNTI, ResumeIdentity or a random number. In the example shown in FIG. 72, 48 bits are reserved for the UE identity. If fewer bits are needed, zero-padding may be used or an alternate format with more or less bits used for the UE identity may be defined. Additional MAC CE formats that include beam ID(s), mobilityState, etc. may also be defined.

Mechanisms for Signaling Paging Assistance Information—Physical Layer Signaling. The paging assistance information may be signaled to the network using physical layer signaling such as the L1/L2 control signaling carried on the NR-PUCCH or NR-PUSCH.

Figure 73:
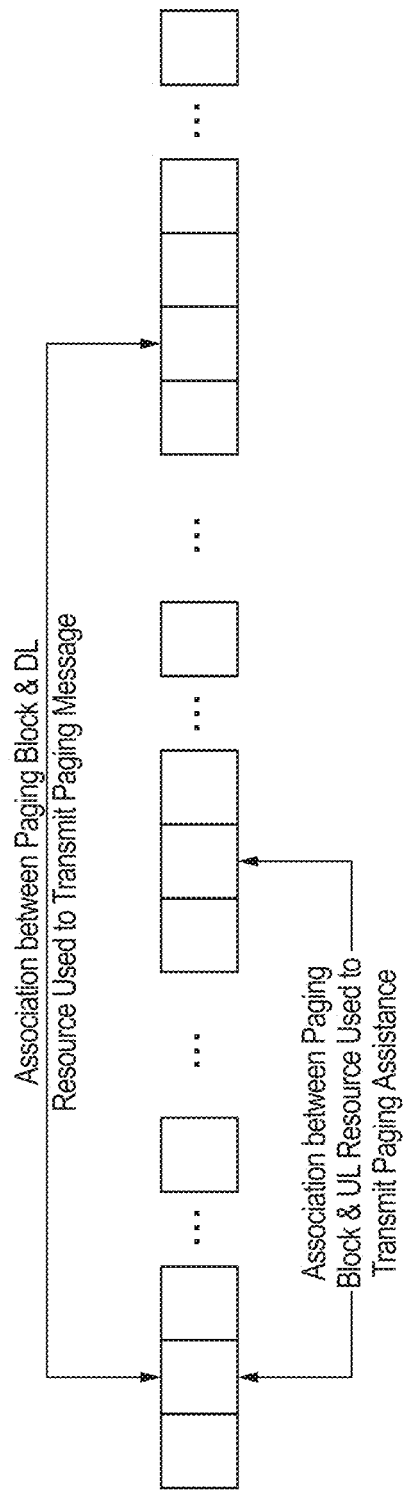
FIG. 73 illustrates an exemplary Association between Paging Block and UL Resources.
Figure 74:
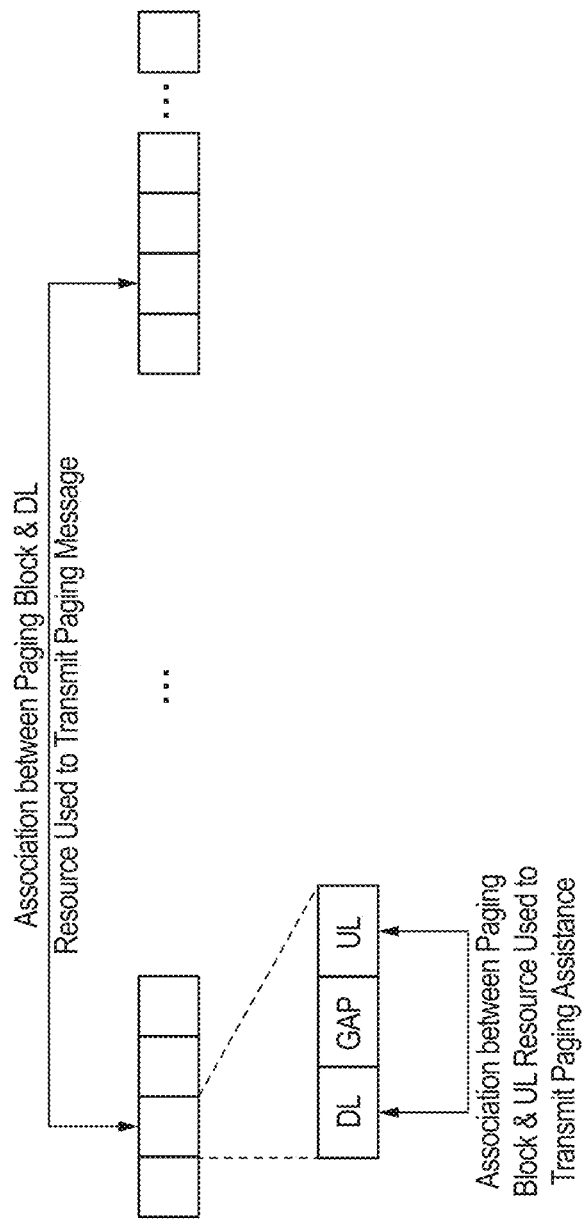
FIG. 74 illustrates an exemplary Alternate Association between Paging Block and UL Resources.

Mechanisms for Signaling Paging Assistance Information—Random Access with Reserved Preamble. The paging assistance information may be signaled to the network using the random access procedure with a reserved preamble. Which preamble(s) is(are) reserved for signaling the paging assistance information may be signaled to the UE as part of the SI. The random access resource used for transmission of the random access preamble may be associated with the paging block or DL Tx beam used to transmit the physical channel that signaled the PI(s) received by the UE during the PO, thereby allowing the network to determine the "best" DL Tx beam(s) to use for transmission of the paging message. Similarly, the DL resource used for transmission of the paging message may also be associated with the paging block. In one example, the paging blocks that make up the PO and the associated PRACH resources may correspond to different time resources (e.g., slots, subframes, blocks, or bursts), as shown FIG. 73. Alternatively, the paging blocks that make up the PO and the associated PRACH resource may correspond to the same time resources as shown in FIG. 74.

Paging Group

It is advantageous to reduce the number of paging messages a UE must monitor from UE power consumption perspective. Also, in UE assisted paging, since UL resources are used for feedback on location (with respect to beams) to gNB, it is advantageous to reduce the number of false responses. While PO distributes the UEs over time, other methods can provide additional benefits. Different techniques are described below.

For the non-UE assisted paging case (which is like LTE), the paging DCI serves as a paging indicator; for the non-UE assisted case, the terms 'paging indicator' and 'paging DCI' refer to the same DCI and can be used interchangeably. For the UE-assisted case, a paging indicator is followed by a RACH response; the gNB accordingly sends a paging DCI to schedule the paging message.

Bitmap Mapped to UE ID

Figure 75:
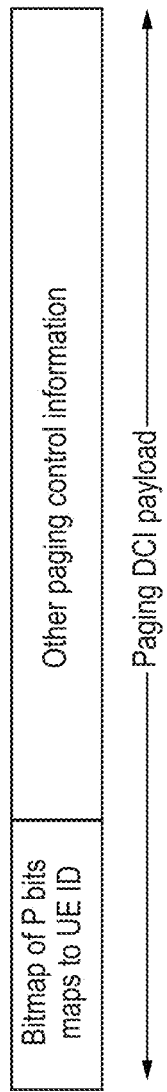
FIG. 75 is an illustration of a paging DCI payload that includes a paging bit-map that is used to indicate which UEs should respond to the paging.

The paging indication may occur with a single P-RNTI. However, the paging DCI may carry a bitmap of P bits indicating which UEs should respond to the paging as shown in FIG. 75. Here the bitmap is pre-pended to the paging control information that carries information on the paging indication such as the location of the paging message or trigger for RACH response in UE-assisted paging.

The P-bit bitmap may relate to the UE ID through a hash function; so, a single bitmap maps to multiple UE IDs. A simple example is one where the bitmap maps to the P LSBs of the UE ID. On receiving the paging indication, the UE checks the bitmap to see if it matches with its own ID. If it does, the UE proceeds to decode the paging message. In a UE-assisted paging system, if the UE detected a match with the bitmap in the paging indicator, it responds with a suitable preamble transmission. If the bitmap does not match with its ID, the UE ignores the paging message.

The size P of the bitmap may be specified in the specification. Alternatively, it may be configured in SI, such as the RMSI. This may override the default in the specification. This this gives the network more freedom to impact the UE behavior such as power consumption or RACH response in UE assisted paging.

In the extreme case, if P is equal to the length of the UE ID, the entire UE ID may be carried in the paging DCI corresponding to the case in which a single UE is being paged at a given time. In this case, no paging message is transmitted.

Bitmap Indicating Paged UE Group

Figure 76:
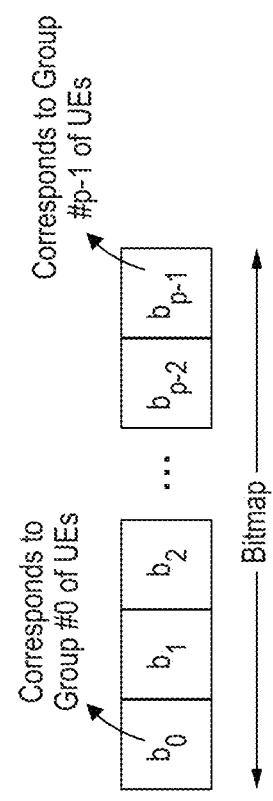
FIG. 76 is an illustration of a paging bit-map with P bits.

A P-bit bitmap may be transmitted in the paging indicator where each bit corresponds to a group of UEs as shown in FIG. 76. When the bit is set, the UEs in the corresponding group continue to monitor the paging message based on the scheduling information in the DCI (for the case of non-UE assisted paging) or UEs in the corresponding group send a PRACH preamble (for the case with UE assisted paging). A UE may be mapped to a group and a corresponding bit location in the bitmap based on a predetermined rule such as bit location=UE ID mod P. Multiple bits in the bitmap may be set to indicate paging message for UEs in the corresponding groups.

The size P of the bitmap may be specified in the specification. Alternatively, it may be configured in SI such as the RMSI; this may override the default in the specification.

Figures 77A, 77B:
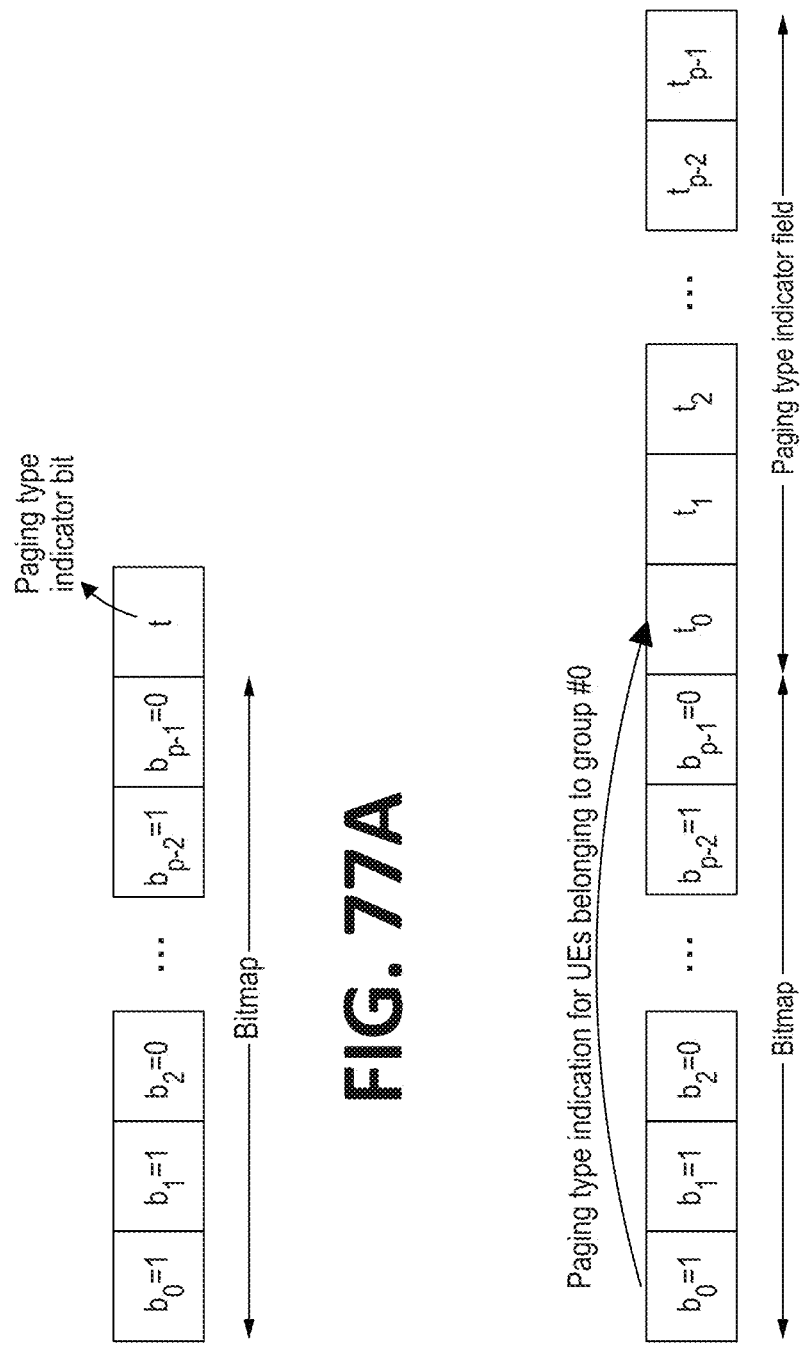
FIGS. 77A and 77B illustrates Paging Type indicator field that can be included in the paging bit-map.

The gNB may indicate the type of paging through a paging indicator field, e.g., whether the paging indication is followed by paging message (direct paging) or triggers PRACH response for UE-assisted paging. This indication may occur in one of the following ways:

The indication is common to all the UEs paged through the bitmap. So, a 1-bit paging type indicator bit 't' is transmitted in the paging indicator. FIG. 77A shows an example where UEs configured for paging (through bits b0, b1 and bp-2 which are set) are configured through the paging type indicator bit for the paging type.

A P-bit field of paging type indicator is configured for the P-bit bitmap. Each bit in the paging type indicator field configures the corresponding group of UEs in the bitmap. FIG. 77B shows an example where the paging type indicator bit ti configures the paging type for UEs corresponding to bi in the bitmap. The value of ti may be ignored if the corresponding bi=0. This solution allows each group of UEs to be configured with an independent type of paging.

P-RNTI for UE Groups

Similar schemes may be used with a single P-RNTI or with multiple P-RNTIs. In the case of multiple P-RNTIs, each PO carries multiple paging indicators scrambled with corresponding P-RNTIs. The bitmap used with a given P-RNTIi allows to subdivide the group of UEs, giving a finer granularity grouping.

Paging Preambles

Figure 78B:
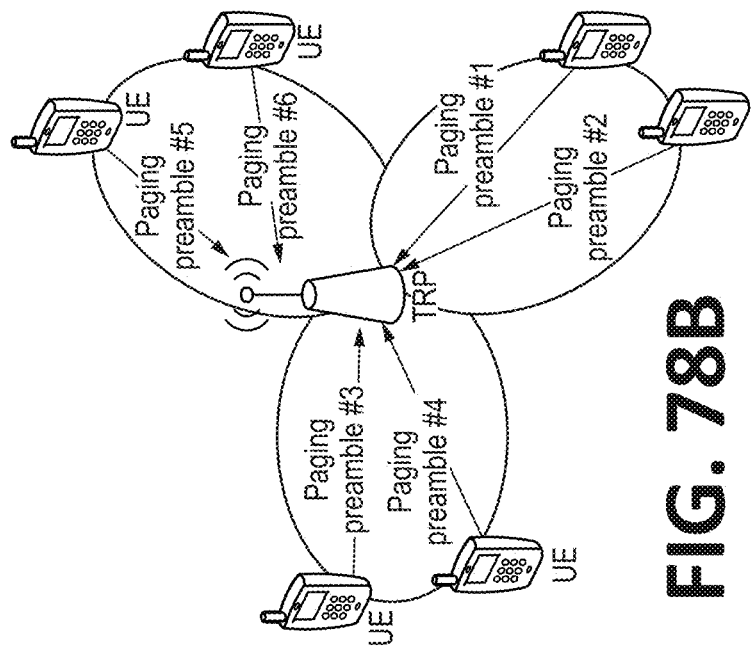
FIGS. 78A to 78C illustrate how the paging preambles may be assigned for UE-feedback assisted paging.
Figure 78A:
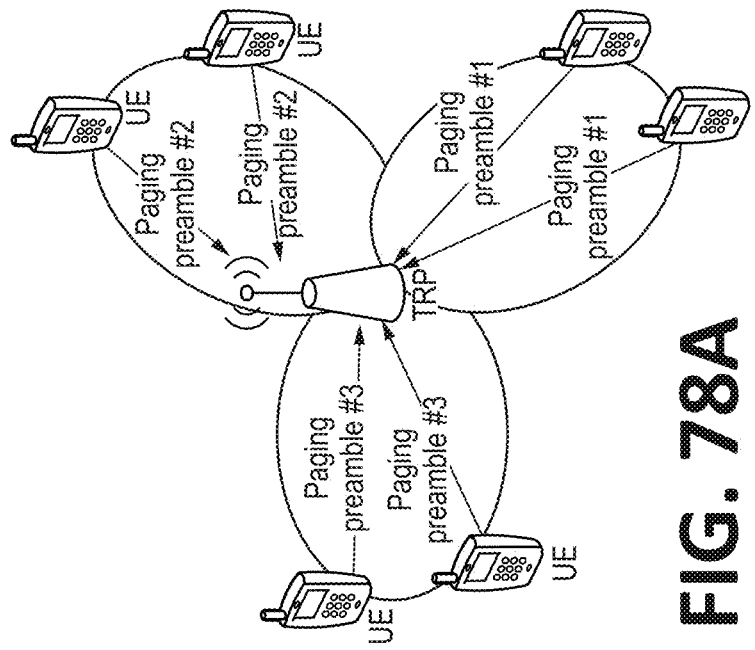

For the UE-feedback assisted paging, certain RACH preambles referred to as paging-preambles may be assigned to the UEs in one the following ways:

For example, one paging preamble is assigned to all UEs associated to an SSB. On receiving a paging indicator, the UEs that monitor that PO and are indicated as being possibly paged (such as through the bitmap), respond with the preamble in RACH resources associated with the SSB, where the association may be scheduled through the SI or dedicated signaling. The preamble is derived from the SSB index and may be distinct for each BWP. The preamble sequence root and cyclic prefix may be specified in the specification or configured through the SI such as the RMSI as a function of BWP and SSB index. This is a good solution for the case where multiple SSBs and BWPs may map to one RACH resource. FIG. 78A shows the concept where the beams use a single paging preamble each. When the gNB receives a paging preamble, it recognizes potential paged candidates on corresponding beams. The gNB may respond in that spatial direction with the paging message. In the event of collision between preambles sent by 2 or more UEs associated with the same SSB, the gNB may fail to detect the preambles. In this case, it may not transmit the paging DCI and message due to failed detection of the paging preamble. After a timeout, the gNB may resend the paging indicator.

In another example, multiple paging preambles are assigned to UEs associated with an SSB. The UEs may randomly select one paging preamble in response to the paging indicator. The preamble sequences are tied to the SSB index and BWP and may be predefined in the specification or provided by SI such as RMSI. The likelihood of detection error due to collision is reduced in this method. This is a good solution for the case where multiple SSBs and BWPs may map to one RACH resource FIG. 78B shows an example where the preambles do not collide in the beams as the UEs choose from a pool of preambles for each beam.

Figure 78C:
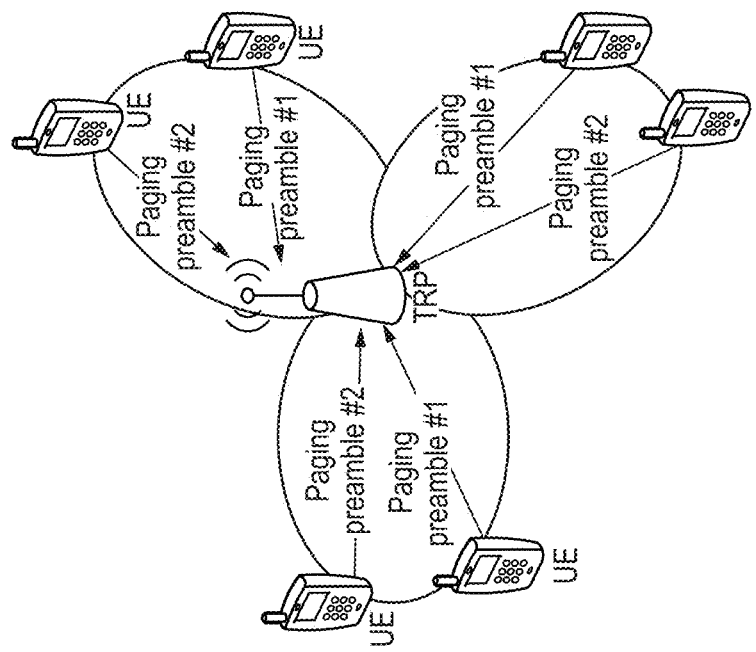

And in yet another example, multiple SSBs may use the same paging preamble pool. The RACH resources for the SSBs are different, thereby allowing the gNB to distinguish the beams corresponding to the RACH responses. FIG. 78C shows the concept where all the beams have the same pool of preambles for paging.

If the RACH resources are shared between the paging response and other procedures such as initial access and beam recovery/management, preambles may be reserved for paging so that the paging preambles do not collide with the preambles for other procedures.

If separate RACH resources are allocated for paging response, the paging preambles may be drawn from the pool of all available preamble sequences (roots and cyclic shifts).

The numerology for the PRACH preambles may be obtained in a number of ways. The numerology for the PRACH preambles may be, for example: configured by the RMSI; the same as that configured for initial access; or a default numerology fixed depending on carrier frequency and bandwidth.

Compressed Transmission of UE ID

In order to keep the paging message overhead small, a compressed form of the UE ID referred to as a paging index may be signaled in "Paging Design Considerations", R1-1716382, Qualcomm, 3GPP NR RAN1 AH3 WG1 NR, September 2017, Nagoya, Japan. In this case multiple UEs are mapped to the same paging index. So, when paged through a UE assisted or non-UE assisted technique, multiple UEs may respond to a given the paging message by attempting to establish an RRC connection. In reality, the paging message was intended for particular UEs, so most responses are false paging alerts.

The signaling following the paging message may be done through the following procedure. UEs mapped to the paging index transmit their preambles. gNB responds to the UEs with the paged UE's UE-ID. The paged UE recognizes its ID and transmits a message to establish an RRC connection. The UE that experiences false paging alert due to association with the compressed ID may fail to see a match with the paged UE ID from the gNB. So, the UEs may either not proceed with establishing RRC connection or they may respond with a termination request. As the UE assisted paging procedure involves considerable UL and DL signaling to resolve the paged UE, there is significant overhead in the network due to paging. One way to mitigate this problem is by taking advantage of the broadcast/multicast nature of paging, e.g., a UE receives multiple paging messages. The reception of multiple messages may occur simultaneously or successively due to one or more of the following:

UE Capability to Monitor Multiple Beam Pair Links

A UE may support multiple Rx beams and therefore receives paging message simultaneously on multiple beam pair links. Also, a UE can receive from different DL beams during a beam sweep of the paging message.

UE Capability to Monitor Multiple BWPs

If a UE monitors multiple BWs, it can receive the paging message simultaneously from different BWs. Alternatively, a UE may monitor the paging in a round robin fashion on different BWPs and receive the paging messages from those BWPs sequentially.

Figure 79:
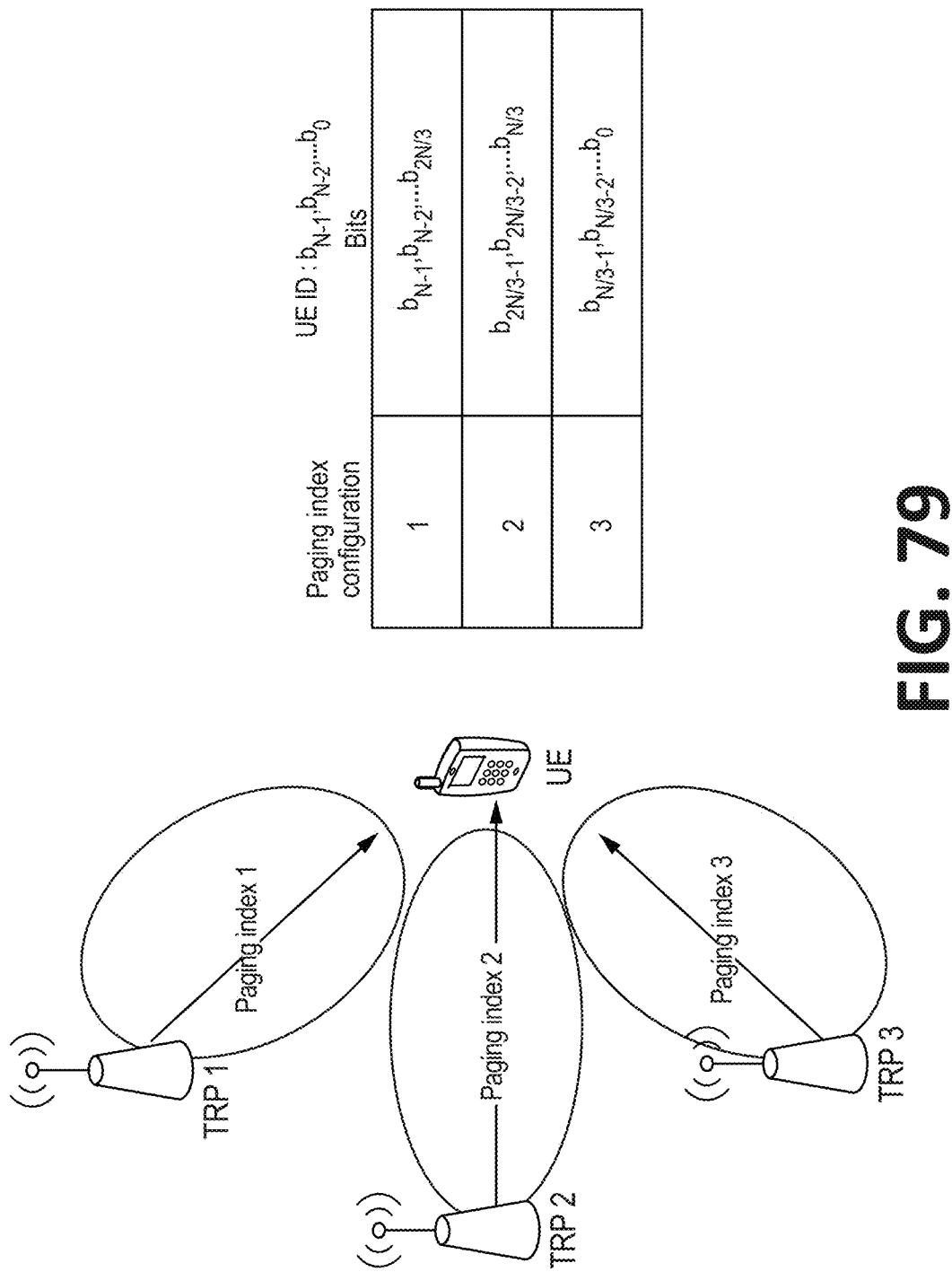
FIG. 79 shows an example of a UE ID Compression scheme: When UE receives the paging message from multiple beams with different paging indices, it reconstructs its ID. False alerts are reduced.

Paging messages may be transmitted on different beams and paging occasion and BWPs carry the same payload but different versions of compressed UE ID, e.g., a single UE ID maps to multiple paging indices. For a paged UE with N bit UE ID, a paging message may carry a paging index of M bits but different paging messages may carry different paging indices, e.g., bits of the paging indices are different. When a UE receives multiple paging messages, it may reconstruct part or all of its ID. This reduces the number of false alerts and the corresponding signaling overhead. The concept is shown in FIG. 79 where the UE can receive the paging indices for its ID on three beams. The beams carry paging indices that map to different segments of the UE ID (each segment corresponds to M=N/3 bits of the UE ID as seen in the table shown in FIG. 79). So, the UE can fully construct its UE ID from the paging indices and decide whether to establish the RRC connection or declare a false paging alert.

In order for the UE to identify the paging messages as different paging indices of the same UE ID, the paging index configuration (mapping rule used to map the UE ID to the paging index) may need to be signaled in the paging message either implicitly or explicitly. Also, the association of these paging indices to the same paging indication or paging DCI may be signaled either explicitly or implicitly.

Co-Existence of Non-UE Assisted and UE Assisted Paging Procedures

NR may support both UE-assistance based and non-UE assistance based paging procedures. For example, SI such as RMSI may indicate the default paging technique used using 1 bit. For 6 GHz and lower, non-UE assisted paging may be sufficient and may alone be supported.

Alternatively, the type of paging may be indicated dynamically either implicitly or explicitly. If PI-RNTI is used for UE-assisted paging and P-RNTI is used for non-UE assisted paging, this implicitly distinguishes the paging types. However, if either paging indication or paging message DCI of UE-assisted case uses the same RNTI as that of the non-UE assisted case and can occur in the same PO, then explicit indication through a single bit may be required.

UE Behavior on Reception of Multiple Paging Indication/Message DCI—

Figure 80B:
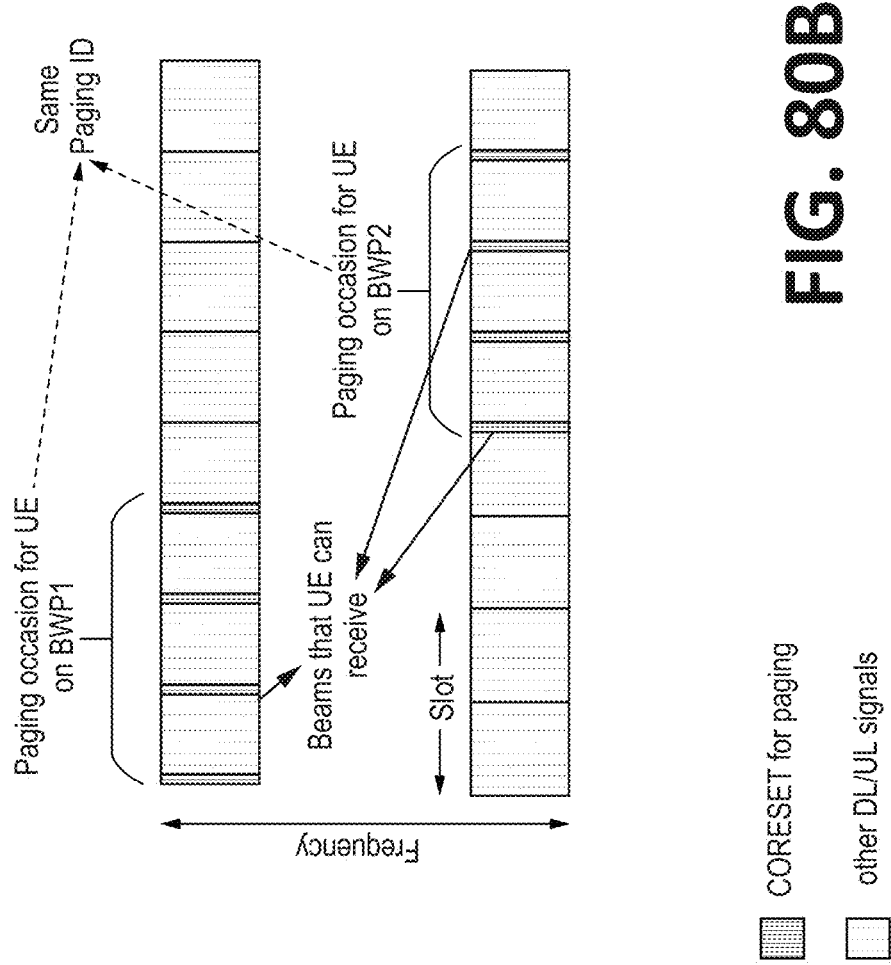
FIG. 80B shows an example UE receiving multiple paging indication/paging message DCIs in multi BWP configuration.

A UE may receive paging indication or paging DCI/message on from multiple POs and from multiple beams and BWPs. For example, the PO for the UE may be different on different beams or bandwidth part depending on the configuration. When paged on multiple beams or BWPs, the UE may receive multiple paging signals at the same time or within a window as shown in FIGS. 80A and 80B. The UE may need to be able to identify that the paging indication/messages correspond to the same paging attempt from the gNB. Otherwise the UE may interpret the multiple messages as different paging indications/messaging for different groups of UEs and excessive signaling may result. So, the multiple paging indications or paging message DCIs in one paging attempt may carry a paging identifier PID.

Upon receiving multiple paging indications or message DCIs, the UE may respond in at least three different ways. In both non-UE assisted and UE-assisted methods, the UE responds with a RACH transmission if it believes that it is being paged.

First, a UE may select a RACH resource on the beam/BWP with the highest signal strength (which may be obtained through measurement such as SSS signal strength.)

Figure 81A:
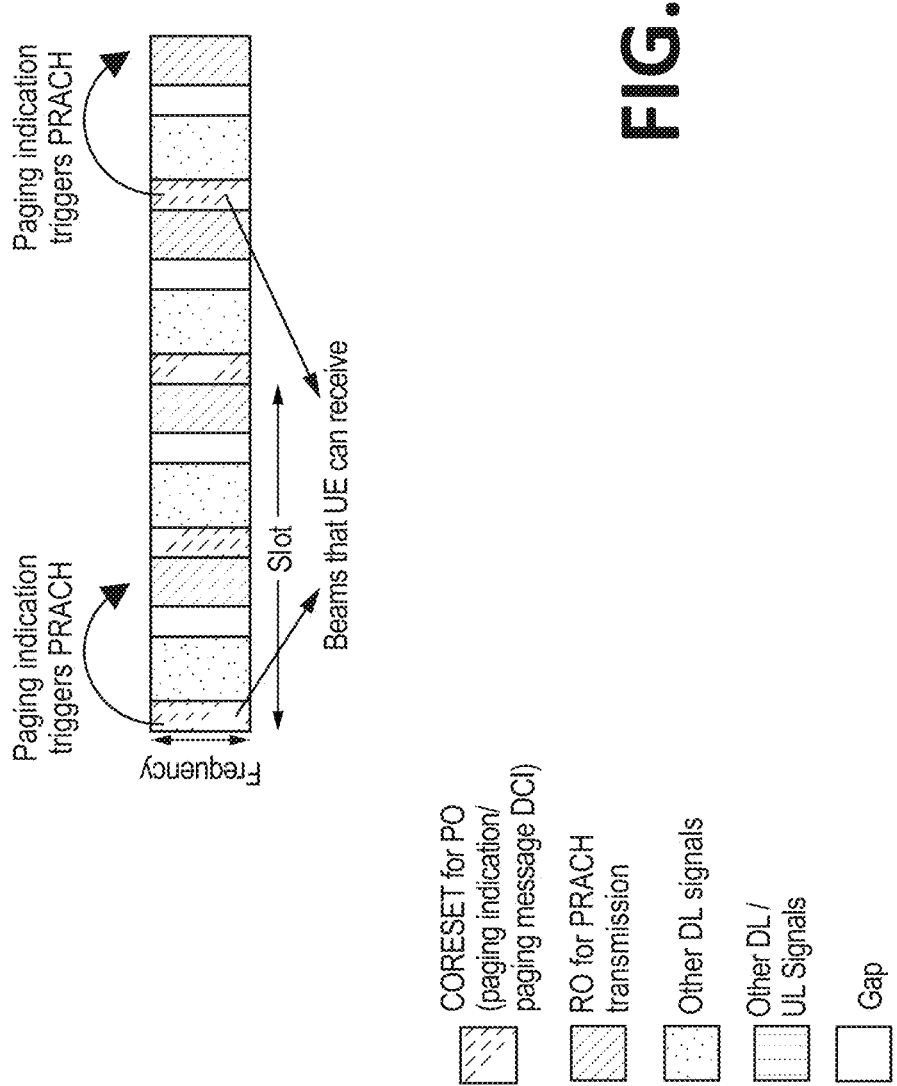
FIG. 81A shows an example UE sending a preamble in every RACH opportunity corresponding to the received paging indication/paging message in a multi beam case.
Figure 81B:
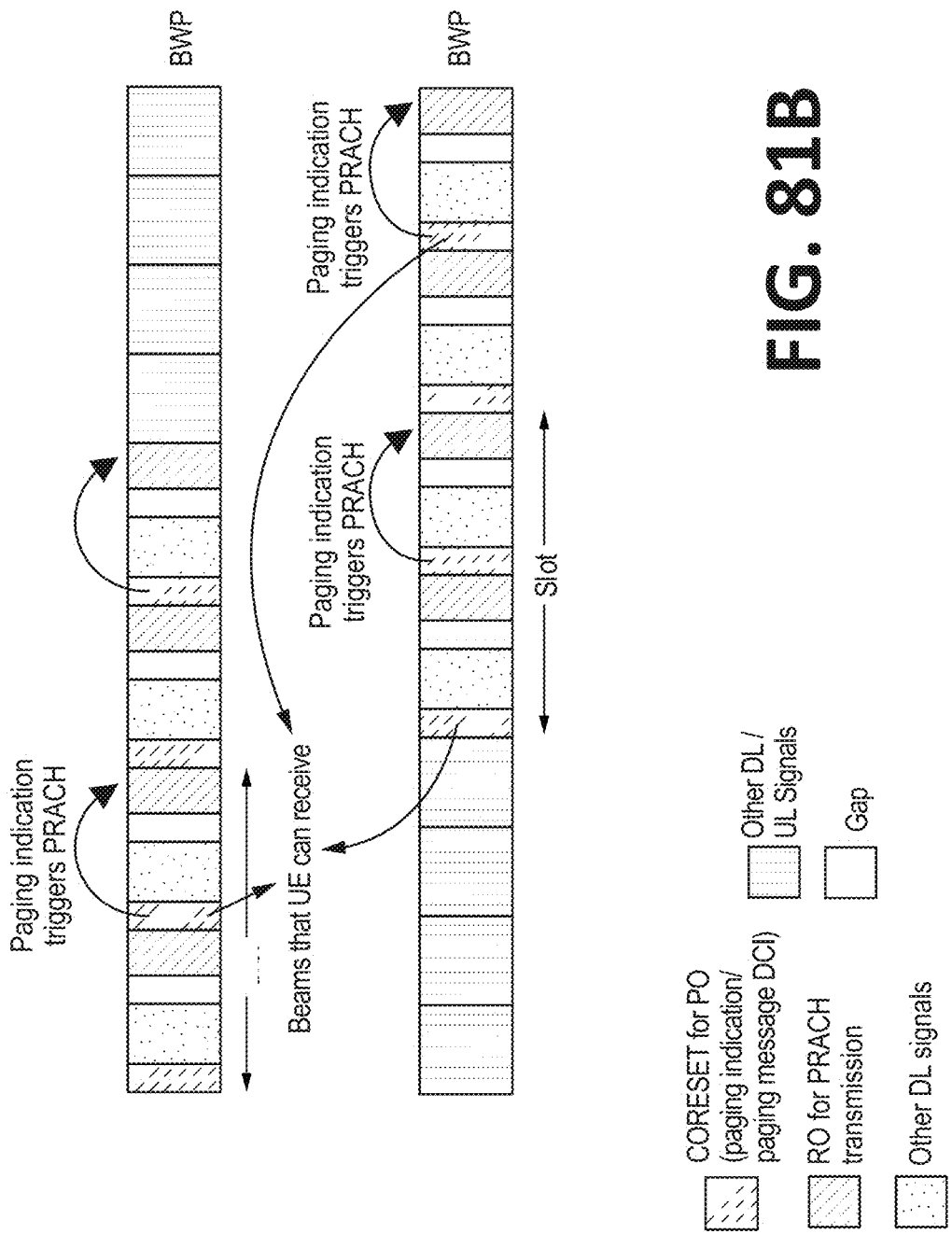
FIG. 81B shows an example UE sending a preamble in every RACH opportunity corresponding to the received paging indication/paging message in a multi BWP case.

Second, a UE may select a RACH resource on a beam/BWP which has minimum latency and passes an acceptable signal strength threshold Third, a UE may transmit multiple RACH preambles on different resources corresponding to different beams/BWPs for higher reliability and to indicate that it can receive on all those beams and BWPs. It may select up to B best beams/BWPs for transmitting the PRACH. This is shown in FIGS. 81A and 81B where each an UL RO is available for every DL beam and the UE transmits in the RO corresponding to the same BPL used for the paging CORESET.

In the UE-assisted case, the gNB may respond with the paging message DCI on beams where the RACH preambles were received.

Figure 82B:
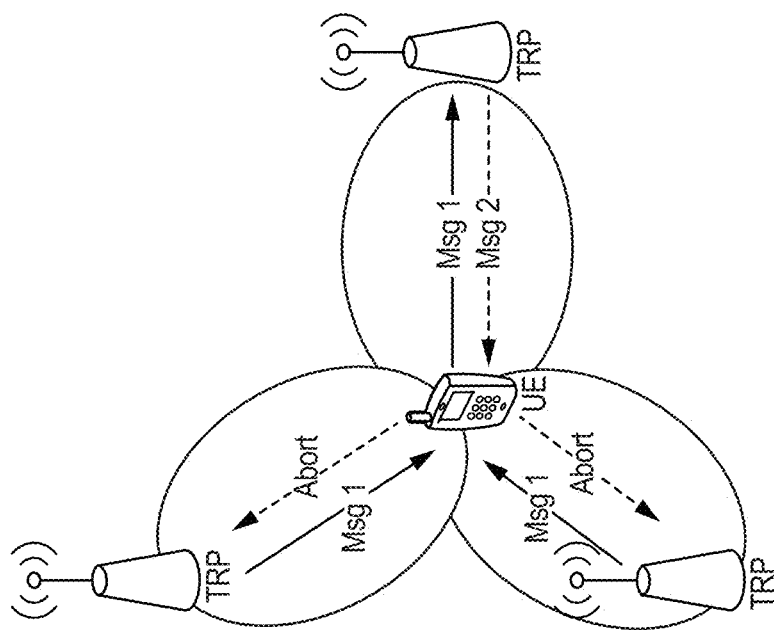
FIGS. 82A and 82B show an example procedure to handle multiple preambles from a UE.
Figure 82A:
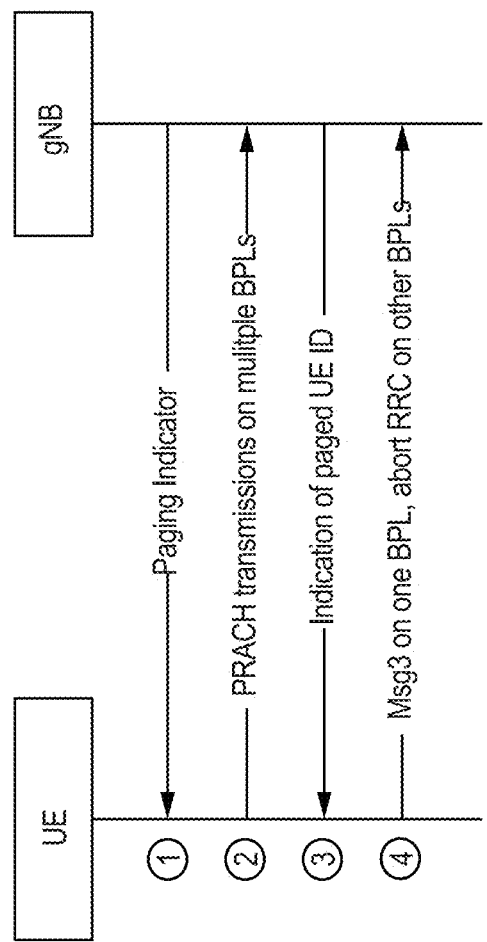

In the non-UE assisted case, the UE may initiate random access on multiple BPLs through the transmission of multiple preambles on different BPLs. The gNB may not know that multiple preambles were transmitted by the same UE. So, the gNB sends the paged UE ID indication in response to multiple preambles of that UE. The UE identifies the duplicates and responds with an Msg3-like message for establishing RRC connection only on one of the BPLs and aborts the attempted RRC connection on other links. This is shown in FIGS. 82A and 82B.

NR Paging Message

An exemplary NR Paging message is illustrated in Code Example 6.

```
Code Example 6
NR Paging Message

-- ASN1START
NR-Paging ::=                    SEQUENCE {
    pagingRecordList                 PagingRecordList              OPTIONAL,  -- Need ON
    systemInfoModification           ENUMERATED {true}             OPTIONAL,  -- Need ON
    etws-Indication                  ENUMERATED {true}             OPTIONAL,  -- Need ON
    cmas-Indication                  ENUMERATED {true}             OPTIONAL,  -- Need ON
    eab-ParamModification            ENUMERATED {true}             OPTIONAL,  -- Need ON
    redistributionIndication         ENUMERATED {true}             OPTIONAL,  -- Need ON
    systemInfoModification-eDRX      ENUMERATED {true}             OPTIONAL,  -- Need ON
}
PagingRecordList ::=             SEQUENCE (SIZE (1..maxPageRec)) OF PagingRecord
PagingRecord ::=                 SEQUENCE {
    ue-Identity                      PagingUE-Identity,
    cn-Domain                        ENUMERATED {ps, cs},
    ...
}
PagingUE-Identity                CHOICE {
    s-TMSI                           S-TMSI,
    imsi                             IMSI,
    ...
}
IMSI ::=                         SEQUENCE (SIZE (6..21)) OF IMSI-Digit
IMSI-Digit ::=                   INTEGER (0..9)
-- ASN1STOP
```

TABLE 25

NR-Paging Field Descriptions

| | |
|---|---|
| cmas-Indication | If present: indication of a CMAS notification. |
| cn-Domain | Indicates the origin of paging. |
| eab-ParamModification | If present: indication of an EAB parameters (SIB14) modification. |
| etws-Indication | If present: indication of an ETWS primary notification and/or ETWS secondary notification. |
| imsi | The International Mobile Subscriber Identity, a globally unique permanent subscriber identity. The first element contains the first IMSI digit, the second element contains the second IMSI digit and so on. |
| redistributionIndication | If present: indication to trigger E-UTRAN Inter-frequency Redistribution procedure |
| systemInfoModification | If present: indication of a BCCH modification other than SIB10, SIB11, SIB12 and SIB14. |
| systemInfoModification-eDRX | If present: indication of a BCCH modification other than SIB10, SIB11, SIB12 and SIB14 for UEs in extended DRX. This indication applies only to UEs having eDRX cycle longer than the BCCH modification period. |
| ue-Identity | Provides the NAS identity of the UE that is being paged. |

Figure 55A:
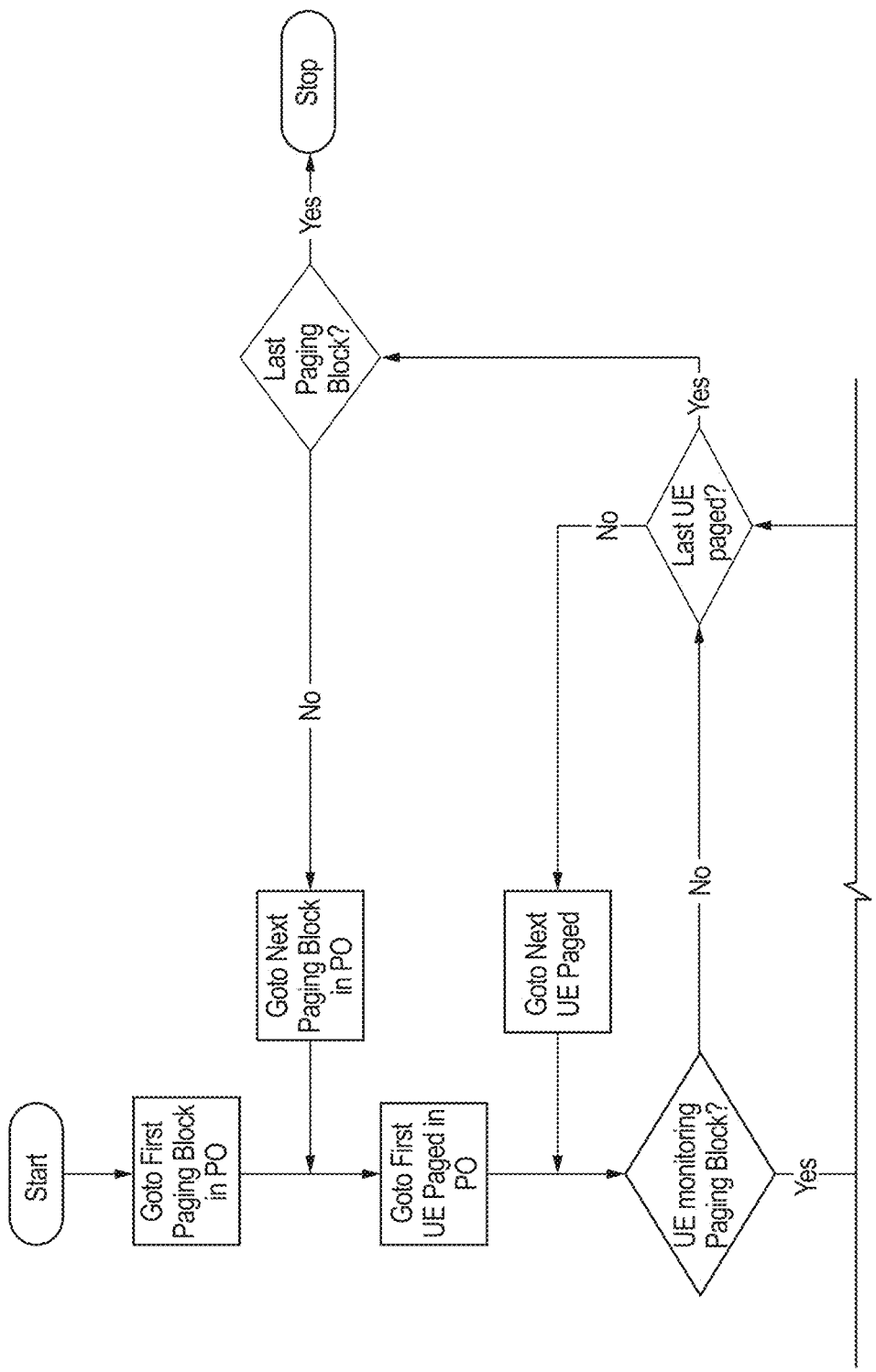
FIGS. 55A and 55B illustrates an exemplary algorithm for constructing NR paging message when UE paging assistance is reported.
Figure 55B:
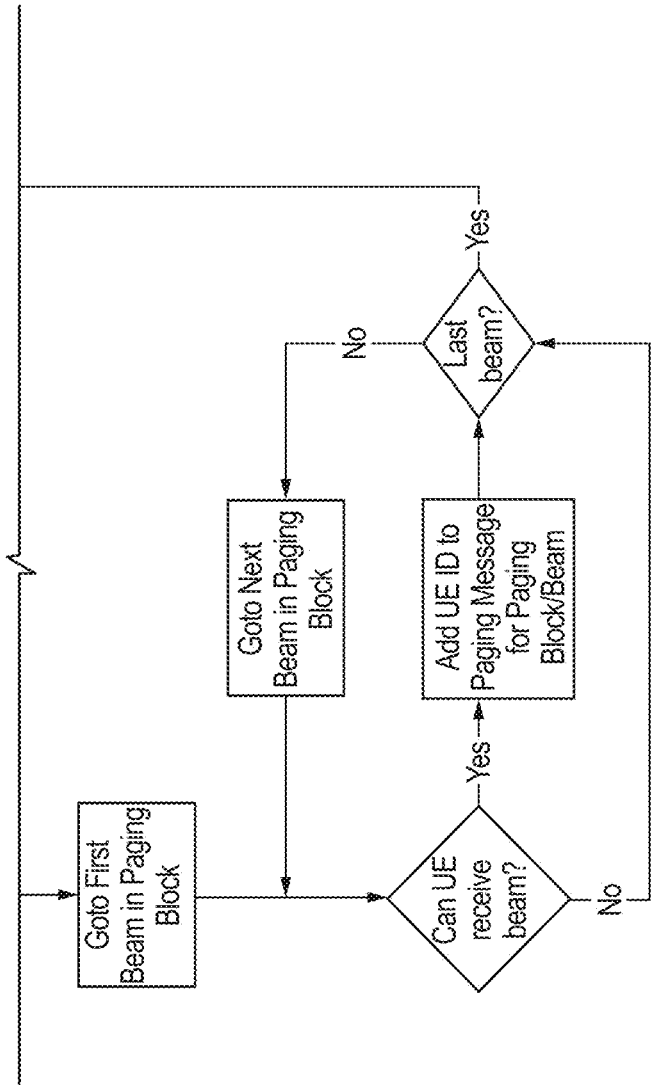

When UE paging assistance is reported, for a given PO, the network may construct different NR-Paging Messages such that the pagingRecordList field included in the NR-Paging message transmitted on a given DL TX beam only includes the identities of the UEs that may receive that beam. The mechanisms for signaling paging assistance information described herein may be used by the network to determine which DL TX beam(s) a UE may receive. FIG. 55 is an illustration of an algorithm that may be used by the network to determine which UE identities should be included in the NR-Paging message transmitted on a given DL TX beam. UEs that do not report paging assistance information may be paged using all paging blocks and beams in the PO.

UE Mapping to BWP

A UE may monitor one or more BWPs for paging indication depending on its capability. Upon power-up it may camp on cell by detecting a particular SSB. The SI associated with this SSB may direct a UE to certain BWPs to receive its paging—we call these BWPs "paging BWPs" (PBWP) and the set of PBWP assigned to a UE as its "PBWP set". Accordingly, the UE monitors one or more or all BWPs within its PBWP set depending on its capability. At least one of the BWPs in the PBWP for a UE may be of the minimum bandwidth that a UE may process in NR so that UEs of all capability can be supported in the network.

Figure 83:
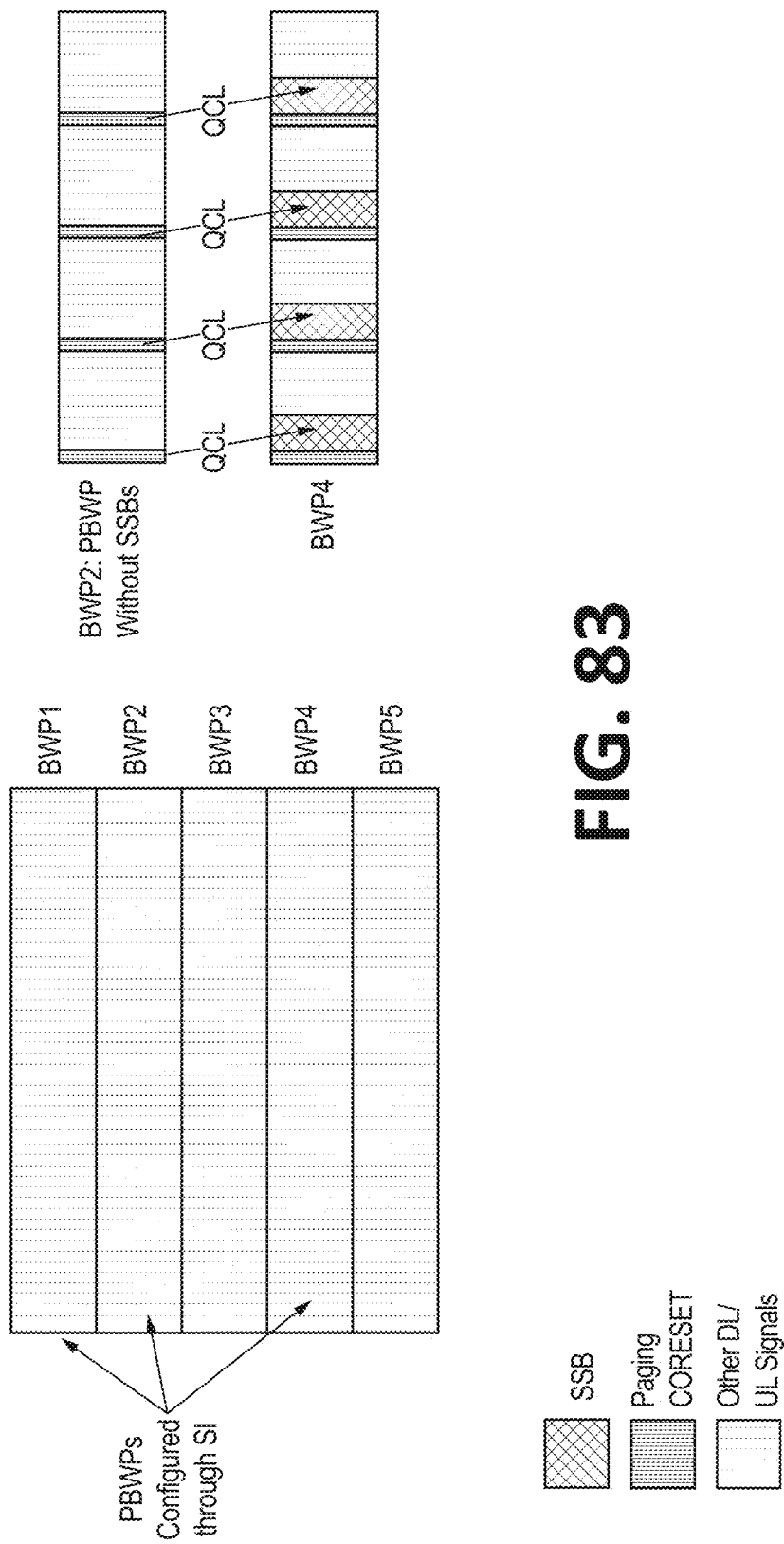
FIG. 83 shows an example PBWP configuration and QCL for BWP without SSB.

If a PBWP contains SSBs, the UE can assume QCL relation between the SSB and associated CORESET for paging. Similarly, it can assume the same BPL for DL paging CORESET and UL PRACH transmission. However, if a PBWP does not contains SSBs, the gNB may configure SI to indicate QCL between the SSB in another BWP (which can also be a PBWP) and the PBWP of interest so that UE is aware of how to point its beams for reception and transmission. An example is shown in FIG. 83 where there are five BWPs in a cell. Three BWPs (BWP1, BWP2 and BWP4) are designated as PBWPs. BWP2 does not carry synchronization signals; so SI configures QCL information between the paging CORESETs in BWP2 and SSBs in BWP4.

The gNB may page a UE in at least five ways. First, a gNB may page a UE on all BWPs. For example, this may be done when the gNB does not know on which BWP the UE is camping. This can result in excessive signaling.

Figure 84:
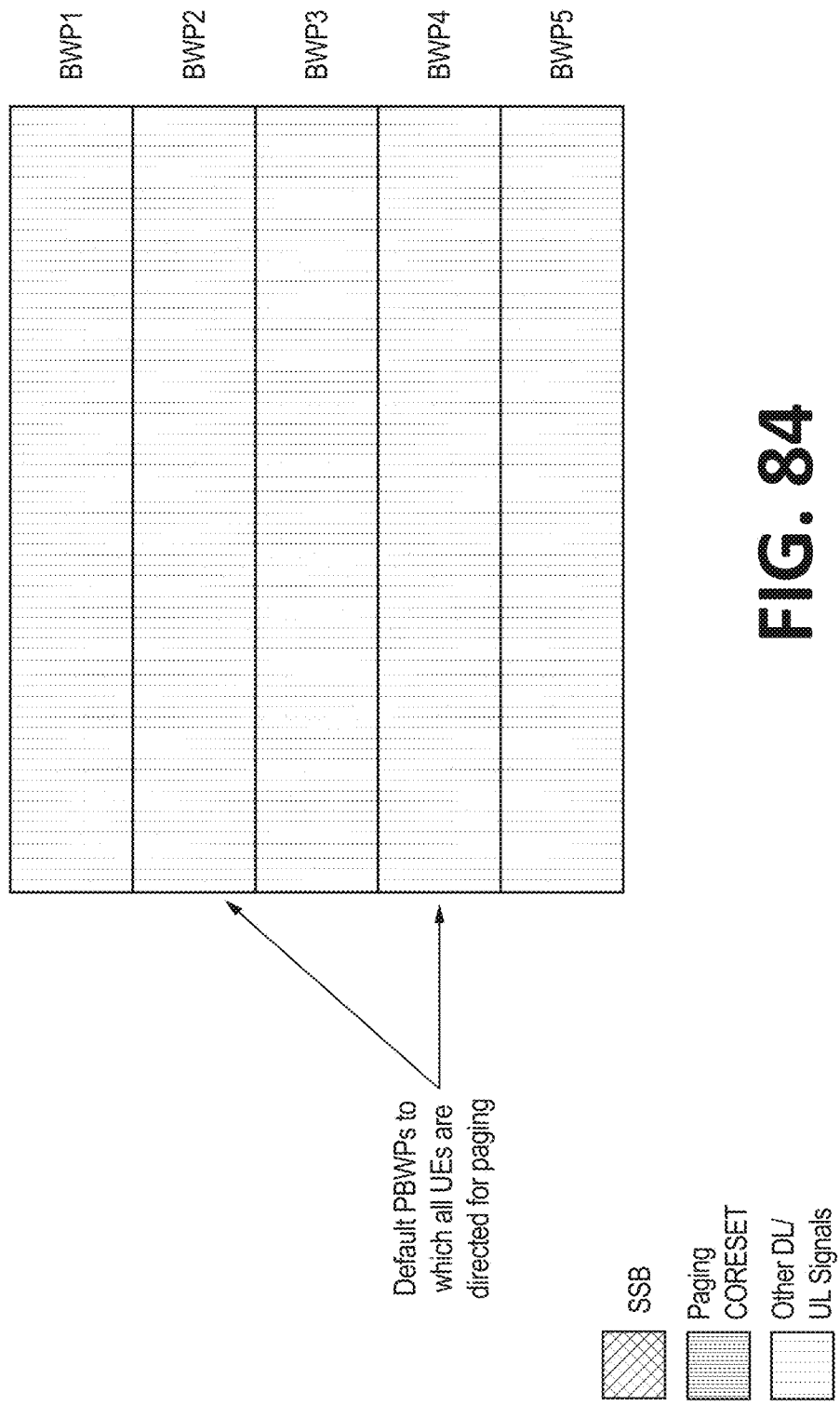
FIG. 84 shows an example default PBWP configuration.

Second, SI may point all UEs of certain numerology to a default PBWP set where all UEs are paged. This approach may result in significant paging signaling load with the selected PBWPs. FIG. 84 shows an example where BWP2 and BWP4 are default PBWPs and all UEs monitor for paging in those BWPs.

Figure 85:
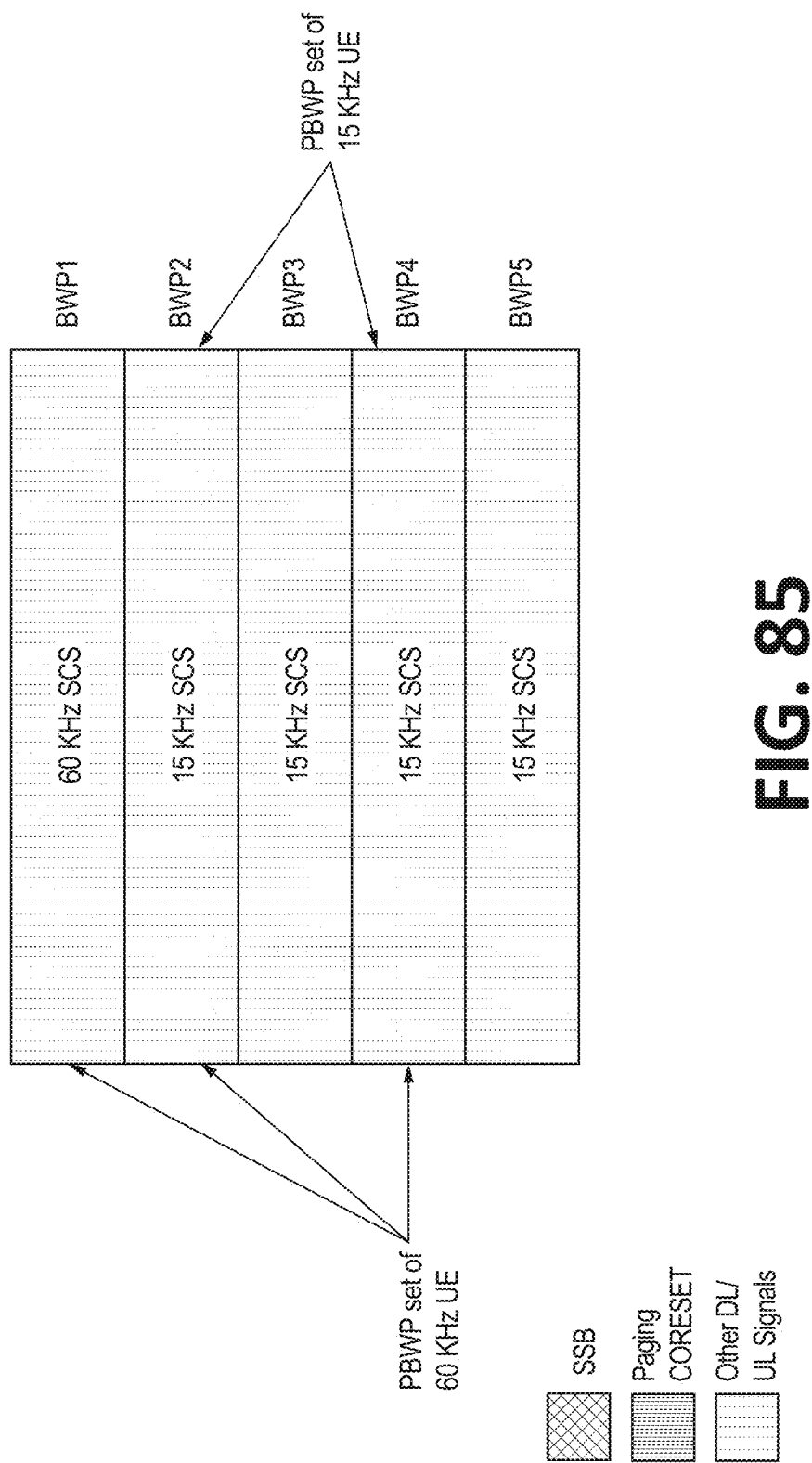
FIG. 85 shows an example UE assignment to PBWP depending on numerology and UE capability.

Third, SI may indicate a rule by which UEs are assigned a PBWP set. The rule is dependent on UE capabilities such as numerology, latency requirements, power constraints, etc. The UE identifies its PBWP set according to its capability and monitors that set for paging. The PO for the UE may be derived as a function of these capabilities. For example, the gNB may assign all UEs capable of processing 60 Hz SCS to 60 KHz PBWPs and all UEs capable of processing only 15 KHz SCS to 15 KHz PBWPs. Alternatively, it may assign UEs capable of processing 60 Hz SCS to PBWPs of 60 KHz or lower as shown in FIG. 85.

Fourth, from the network's point of view, a uniform distribution of UEs between different BWPs may be desired to balance the paging signaling load. The specification or the SI may provide a rule for mapping a UE ID to one of more BWPs. For example, the L LSBs of a UE may be used to determine its PBWP set. A simple example is to map a UE to BWP b=UEID mod nBWP where nBWP is the number of BWPs suitable for the UE and UEID is the UE's ID such as it IMSI or S-TIMSI—this maps a UE to a single PBWP in its PBWP set. However, if the UE experiences blocking or fading in this BWP, it may fail to receive the paging. It may be desirable to configure a larger PBWP set. For example, the UE may be mapped to PBWP set of $\{b_i\}$. $b_i$=UEID mod nBWP+i where i=0, 1, . . . , S−1. Here S is the size of the PBWP set.

Figure 86:
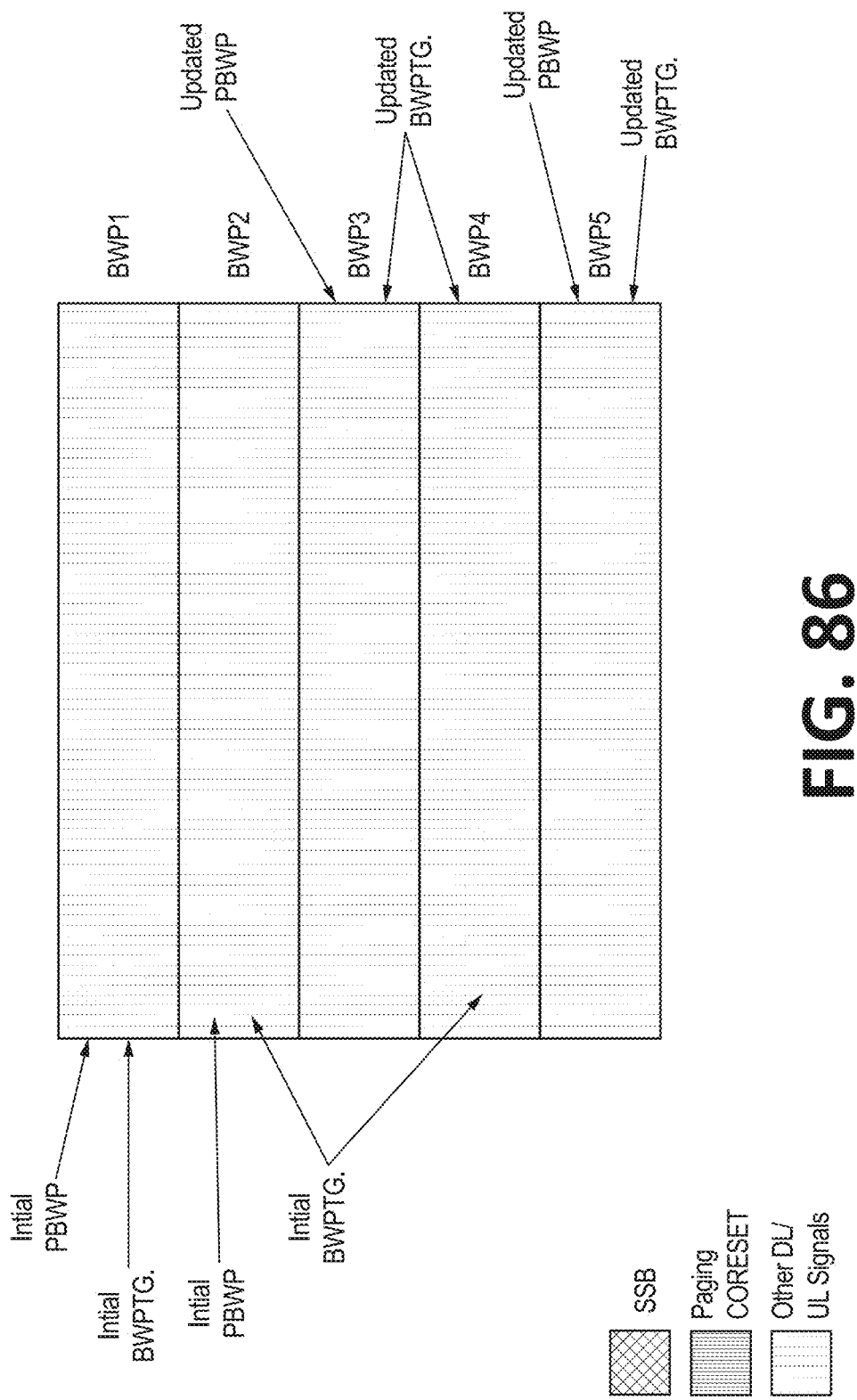
FIG. 86 shows example BWPTG updates when a UE experiences poor signal quality in initial PBWP.

Fifth, a UE may find that the signaling is of low quality in its PBWP set and may find other BWPs of better signal quality. We define a Bandwidth Part Tracking group (BWPTG) as a set of BWPs that a UE is configured to monitor for acceptable signal quality. The gNB configures the BWPTG for a UE based on signal measurements. If the UE finds one or more BWPs within its BWPTG below an acceptable threshold, it reports a BWPTG update to the network by indicating a set of new BWPs that are better suited for reception. The UE does this by establishing an RRC connection. The UE may send the message through higher layer signaling or through Msg2 or Msg4. The network may accordingly reconfigure the BWPTG for the UE. The UE's PBWP set is configured by gNB to be the whole or subset of the BWPTG. The concept is shown in FIG. 86 where the PBWP set is initially {BWP1, BWP2}. After a BWPTG update, the PBWP set is {BWP3, BWP5}.

For UE assisted paging, the PRACH preambles for a BWP may be configured in the SI for that BWP. So each BWP can have its own configuration, the UE may be assigned a different preamble according to the rules for each BWP. Alternatively, the SI in one BWP may configure the PRACH preambles for all the BWPs. The UE may be assigned the same preamble to use across all the BWPs.

When DCI is sent dynamically for switching BWP for a UE but the UE fail to decode the DCI, the UE may not be able to distinguish whether there is a data reception until gNB resends the DCI. Therefore, the UE starts at timer if there is no data reception or fails to decode a DCI. If UE fail to monitor the paging indication then, if timer has not expired before next PO then gNB resends the PI at next PO cycle; if timer has expired than UE may switch to default BWP and gNB may send the PI to the UE's default BWP.

Extensions to Paging Schemes

The following describes alternative schemes for defining a Paging Burst Series and NR-Paging Occasion (NR-PO).

T=NR DRX cycle period e.g., paging cycle. The Paging bust includes M paging blocks.

The Paging burst series includes L paging bursts. There are L*M paging blocks in a paging burst series. The Paging Burst Series (PBS) duration is the time interval duration of one paging burst series, denoted $T_{PBS}$.

Figure 87:
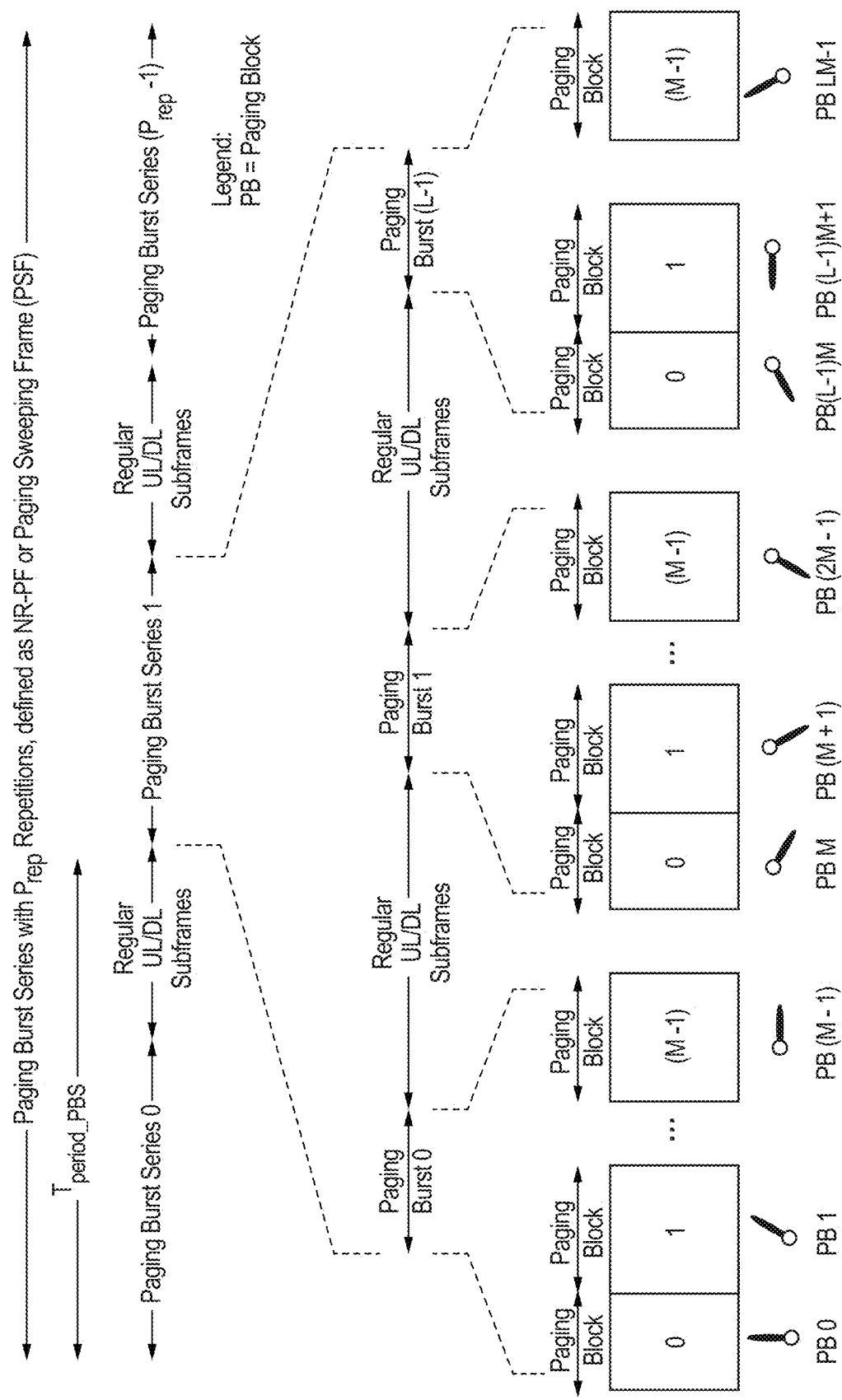
FIG. 87 illustrates an example NR-PF or Paging Sweeping Frame (PSF).
Figure 88:
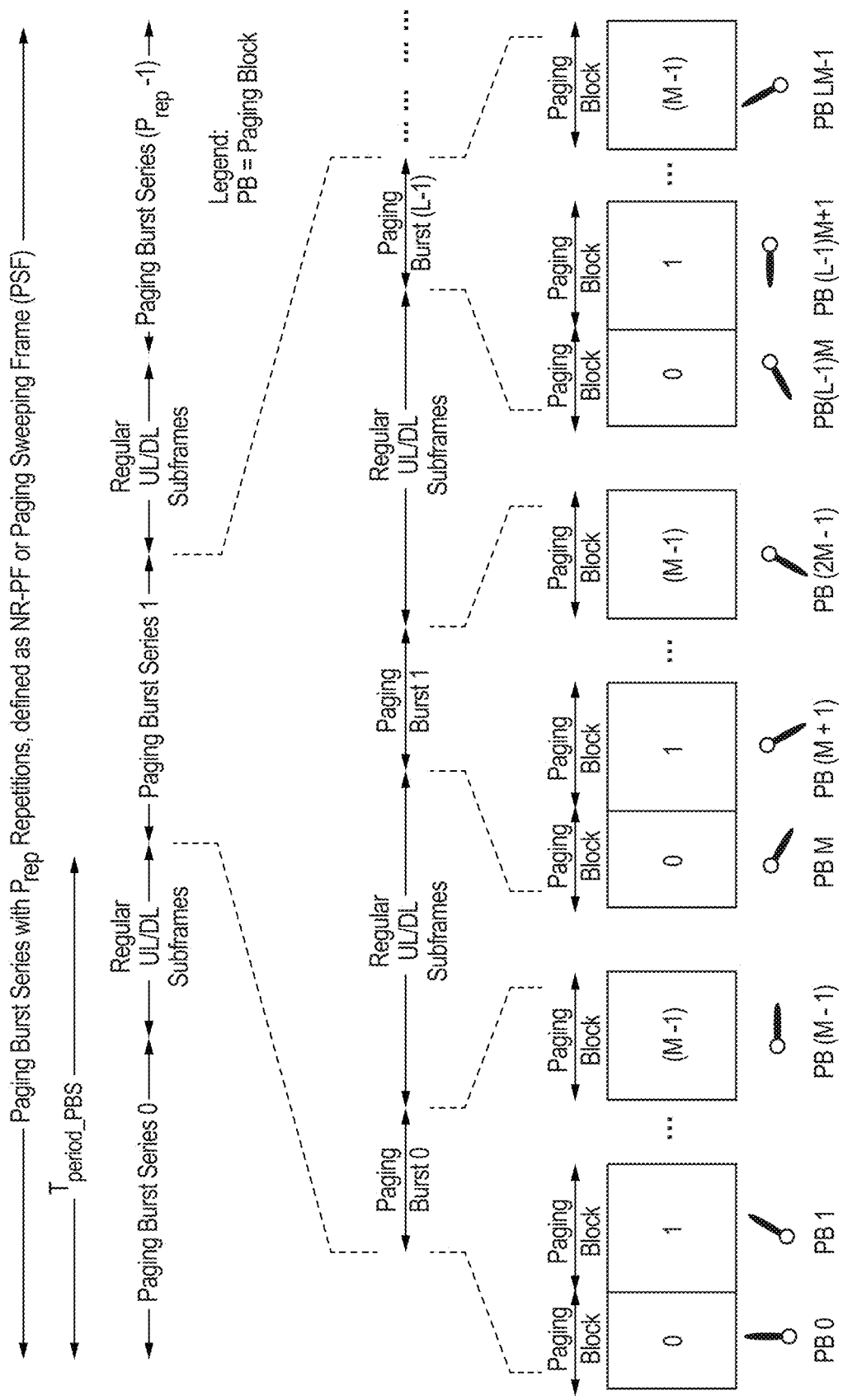
FIGS. 88 and 89 illustrate PBS repetition within a DRX Cycle.
Figure 89:
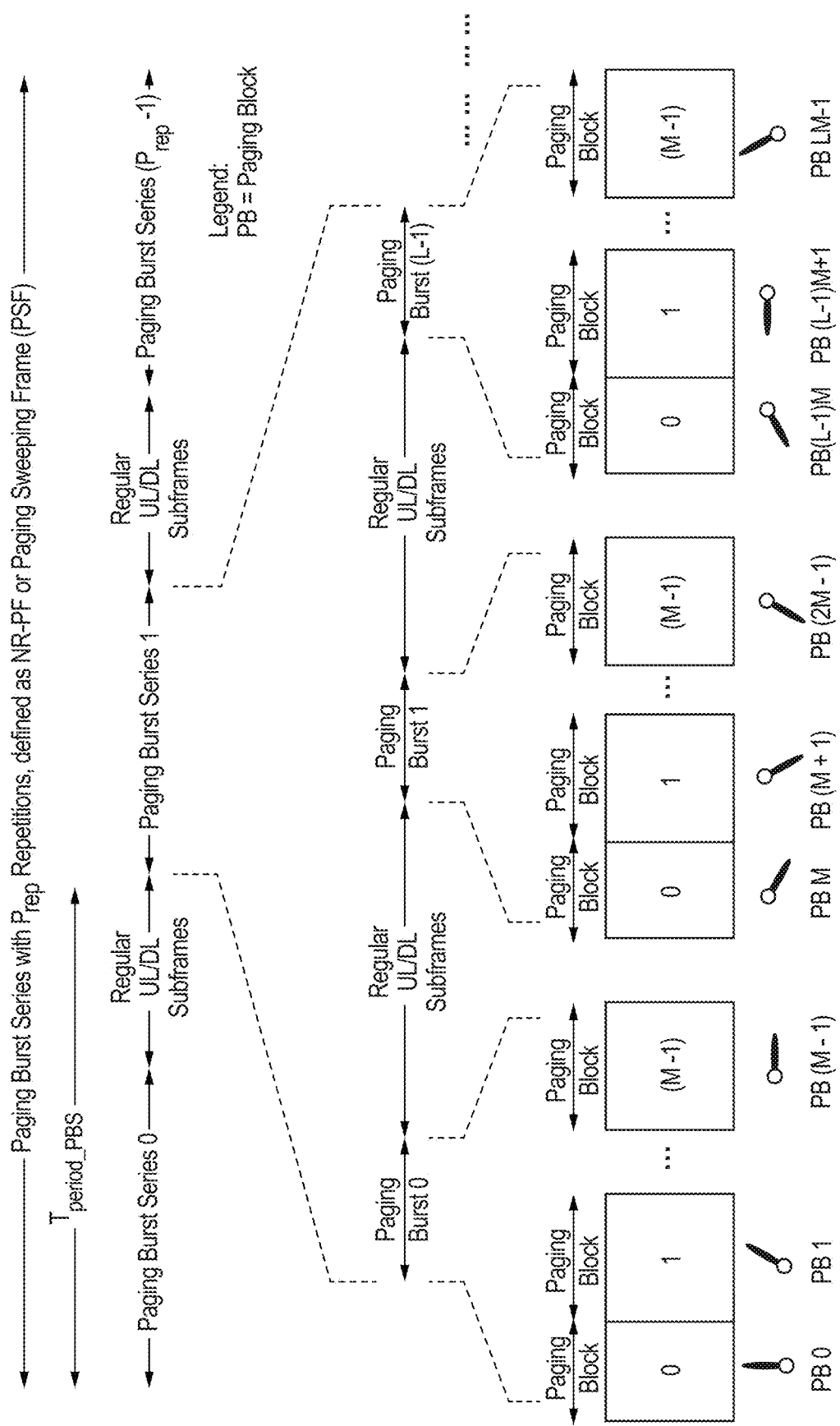

The parameter $P_{rep}$ is an integer number of consecutive PBSs with a PBS period $T_{period\_PBS}$ between PBSs over which each UE targeted for paging in a paging frame are paged at least once. The NR Paging Frame NR-PF or alternatively also named here Paging Sweeping Frame (PSF) is defined as $P_{rep}$ number of consecutives PBSs with a PBS period $T_{period\_PBS}$ between PBSs where $P_{rep}$ in an integer number greater or equal to 1. The parameter $T_{period\_PBS}$ may be expressed in terms of an integer number of paging block, or of paging burst or of paging burst series or in terms of an integer number of the time interval unit of a paging block, or paging burst or paging burst series. Alternatively, $T_{period\_PBS}$ may be expressed in terms of an integer number of radio frames. The time interval duration $T_{NR}$-$P_F$ of NR-PF is defined as $T_{NR-PF}$=$P_{rep}$*$T_{period\_PBS}$. The UE may be configured by the network with the parameters Prep and $T_{period\_PBS}$ through RRC signaling or MAC Control Element (CE) signaling. The paging Sweeping Frame concept is illustrated in FIGS. 87, 88, and 89. FIGS. 88 and 89 depict a first and second paging burst series within a DRX Cycle=T, which is within an NR SFN cycle.

A time unit called Paging Radio Frame Unit (PFRU) may be used to express the length of NR-PF or PSF expressed in terms of NR radio frames. A PRFU may be P System Radio Frames where P is an integer greater or equal to 1. Let's P-SFN denotes the NR Paging System radio Frame Number expressed in PRFU. P-SFN for example, P-SFN cycle maybe 1024 PFRU long.

T, the NR DRX cycle e.g., the paging cycle may be expressed as an integer number of consecutive PFRUs. Let's denotes J the number of paging block in $T_{period\_PBS}$. Each PRFU is $P_{rep}$*J paging block long. An NR DRX cycle e.g., the paging cycle includes T*$P_{rep}$*J paging blocks. The duration of NR DRX cycle is T*Prep*$T_{period\_PBS}$.

NR Paging occasion (NR-PO) may be defined as K Paging blocks within the NR-PF or equivalently within the PSF, where there may be paging transmission for e.g., P-RNTI transmitted on NR-PDCCH. K is an integer number greater or equal to 1. The starting paging block of NR-PO is the first paging block within the NR-PO K paging blocks.

Let's N denotes the number of NR-PF in a paging cycle or equivalently the number of PSF in a paging cycle, and Ns the number of PO in a NR-PF or PSF.

Let's denote i_s the index pointing to a NR-PO in PSF. NR-PF and NR-PO may be calculated as described herein.

Option 1: Each NR-PF has Prep PBS and each PBS has one NR-PO.

The eNB and/or UE may calculate the UE's PFs according to the following relation:

NR-PF=P-SFN mod $T$=($T$ div $N$)*(UE_ID mod $N$)
where $N$=min($T$,$nB$)

and i_s=floor(UE_ID/$N$)mod $Ns$.

The number of NR_POs in a PSF is equal to the number of repetition Prep of PBS in an NR_PF or PSF. Possible values of Prep may be predefined by specification. For illustration purpose, let's assume Potential values for $P_{rep}$ are $P_{rep0}$, $P_{rep1}$, $P_{rep2}$ with $P_{rep0}=1<P_{rep1}<P_{rep2}$, Table 26 provides an example of potential paging parameters.

TABLE 26

Potential Paging Parameters

| Parameter | Description | Values |
|---|---|---|
| T | DRX cycle | {32, 64, 128, 256, 512} in Paging radio Frame Unit (PRFU) |
| nB | # of NR-POs in a DRX cycle | {Prep2*T, Prep1*T, T, T/2, T/4, T/8, T/16, T/32} |
| N | # of NR-PF e.g., paging sweeping frame (PSF) in a DRX cycle | min(T, nB) |
| Ns | # of NR-POs in a paging sweeping frame | max(1, nB/T) |

Figure 90:
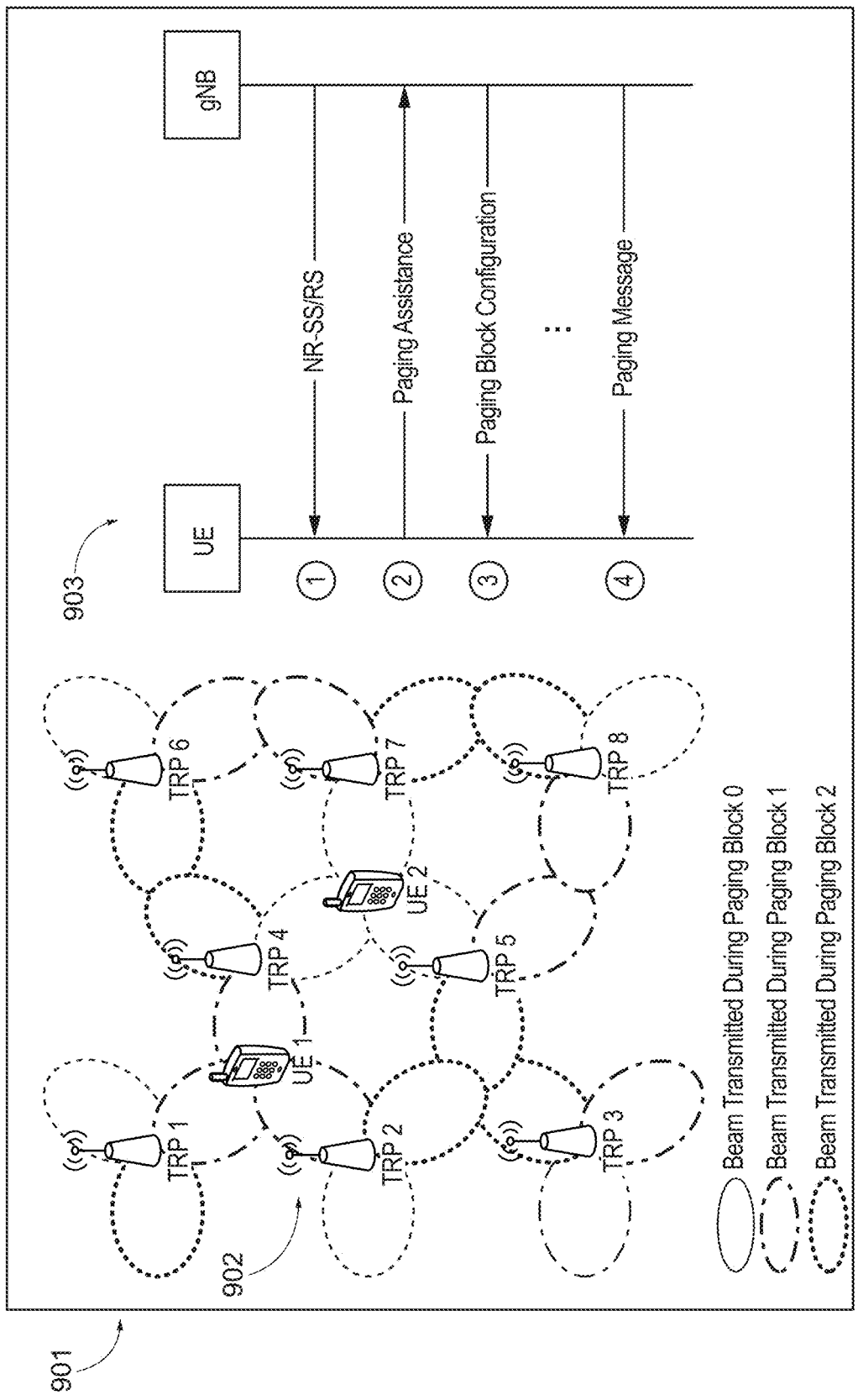
FIG. 90 illustrates an exemplary display (e.g., graphical user interface) that may be generated based on the methods and systems of mobility signaling load reduction.

Option 1a: K=L*M
The NR-PO length in terms of paging block is same as that of PBS.
  Option 1b: K<L*M
The NR-PO length is shorter than that of PBS. For example, the NR-POs may not overlap and the PBS length in term of paging blocks is multiple of NR-PO length. Alternatively, the NR-POs may overlap.
Determination of the Starting Paging Block of NR-PO
The determination of starting paging block may be divided in to two steps, where step 1 is a training phase. The UE calculates the paging frame as NR-PF=P-SFN mod T=(T div N)*(UE_ID mod N) and NR-PO as PO with the index is =floor(UE ID/N) mod Ns. By default, the UE assumes the starting paging block if the first paging block of the K=L*M paging blocks pointed to by the index is e.g., the starting paging block is the first paging block in the PBS pointed to by the index i_s. In this step, the UE assumed the PO lengths is same as that of the PBS e.g., L*M.
In step 1, the UE monitors the full PBS for paging detection e.g., for detection of paging indication on NR-PDCCH. The UE memorizes, the identity for example the index or indexes of the paging block group (K paging block) where the UE is paged. The first paging block of the K paging block where the UE actually detects it is being paged is the starting paging block of the UE NR-PO. The UE also memorizes the beam configuration information including the index of the beams, eNB DL Tx beams and UE DL Rx beam where the UE is paged.
In step 1, the UE sets the PO as the K paging blocks where the UE detects its paging.
Step 2 is refinement of the NR-PO starting paging block. The UE calculates the paging frame as NR-PF=P-SFN mod T=(T div N)*(UE_ID mod N). For example, the UE uses as PO the NR-PO from the Step 1. Alternatively, the UE calculates the new NR-PO as the union of k1 paging blocks before the NR-PO paging blocks from Step 1, the NR-PO from Step 1 and k2 paging blocks following NR-PO paging blocks from step, k1 and k2 and integers and configurable by the network.
Alternatively, each PBS may have more than one NR PO.
NR Framework for Common Control Channel Signaling
For NR, the mechanisms described in connection with NR channel design may be used for common control signaling.
FIG. 90 illustrates an exemplary display (e.g., graphical user interface) that may be generated based on the methods and systems of mobility signaling load reduction, as discussed herein. Display interface 901 (e.g., touch screen display) may provide text in block 902 associated with of mobility signaling load reduction, such as RRC related parameters, method flow, and RRC associated current conditions. Progress of any of the steps (e.g., sent messages or success of steps) discussed herein may be displayed in block 902. In addition, graphical output 902 may be displayed on display interface 901. Graphical output 903 may be the topology of the devices implementing the methods and systems of mobility signaling load reduction, a graphical output of the progress of any method or systems discussed herein, or the like.

What is claimed:

1. A first apparatus comprising a processor, a memory, and communication circuitry, the first apparatus being capable of connecting to a communications network via its communication circuitry, the first apparatus further comprising computer-executable instructions stored in the memory of the first apparatus which, when executed by the processor of the first apparatus, cause the first apparatus to:
  detect, from a second apparatus, one or more swept downlink beams,
  wherein each swept downlink beam comprises a first number of synchronization signal blocks;
  select a first synchronization signal block from the first number of synchronization signal blocks of each detected swept downlink beam;
  receive, from the second apparatus, a paging configuration via system information, the paging configuration indicating a paging occasion comprising the first number of paging blocks including a first paging block,
  wherein there is a one to one mapping between the first number of paging blocks and the first number of synchronization signal blocks,
  wherein the first apparatus is configured to identify a first paging block associated with the first synchronization signal block by referring to the one to one mapping based on indications being informed to the first apparatus via system information;
  monitor, based on the paging configuration, for paging indication transmitted as a paging control information in the first paging block associated with the first synchronization signal block,
  wherein the paging indication indicates control resource set for the paging control information and the control resource set indicates quasi co-location of the paging indication with the first synchronization signal block; and
  receive, based on the paging indication, a paging message.

2. The first apparatus of claim 1 wherein, the quasi co-location is a spatial quasi-colocation between the first synchronization signal block and the paging indication.

3. The first apparatus of claim 1 wherein, the quasi-colocation is sharing a demodulation reference signals port between a physical broadcast channel in the first synchronization signal block and a physical downlink control channel, where the physical downlink control channel carries the paging indication in the paging occasion.

4. The first apparatus of claim 1 wherein, the quasi-colocation is sharing a demodulation reference signals port between a physical broadcast channel in the first synchronization signal block and a physical downlink control channel, where the physical downlink control channel comprises a downlink assignment for the paging message.

5. The first apparatus of claim 1, wherein the control resource set is configured for both RMSI (Remaining Minimum System Information) and the paging control information.

6. The first apparatus of claim 5, wherein the association is informed via the RMSI.

7. The first apparatus of claim 1, wherein the computer-executable instructions cause the first apparatus to receive a system information modification indicator transmitted in the paging control information in the first synchronization signal block.

8. A second apparatus comprising a processor, a memory, and communication circuitry, the second apparatus being capable of connecting to a communications network via its communication circuitry, the second apparatus further comprising computer-executable instructions stored in the memory of the second apparatus which, when executed by the processor of the second apparatus, cause the second apparatus to:

transmit, to a first apparatus, one or more swept downlink beams,
wherein one of the one or more swept downlink beams comprises a first number of synchronization signal blocks including a first synchronization signal;
transmit, to the first apparatus, configuration information for measurements of signals contained within the one or more swept downlink beams and causing the first apparatus to perform a measurement based on the configuration information for measurements and select, based on the measurement, the first synchronization signal block from the first number of synchronization signal blocks;
transmit, to the first apparatus, a paging configuration via system information, the paging configuration indicating a paging occasion comprising the first number of paging blocks including a first paging block,
wherein there is a one to one mapping between the first number of paging blocks and the first number of synchronization signal blocks,
wherein the first apparatus is configured to identify a first paging block associated with the first synchronization signal block by referring to the one to one mapping based on indications being informed to the first apparatus via system information;
transmit, based on the paging configuration, a paging indication transmitted as a paging control information in the first paging block associated with the first synchronization signal block,
wherein the paging indication indicates control resource set for the paging control information and the control resource set indicates quasi co-location of the paging indication with the first synchronization signal block; and
transmit, based on the paging indication, a paging message.

9. The second apparatus of claim 8 wherein the quasi-colocation is sharing a demodulation reference signals port between a physical broadcast channel in the first synchronization signal block and a physical downlink control channel, where the physical downlink control channel carries the paging indication in the paging occasion.

10. The second apparatus of claim 8 wherein, the quasi-colocation is sharing a demodulation reference signals port between a physical broadcast channel in the first synchronization signal block and a physical downlink control channel, where the physical downlink control channel comprises a downlink assignment for the paging message.

11. The second apparatus of claim 8, wherein the control resource set is configured for both RMSI (Remaining Minimum System Information) and the paging control information.

12. The second apparatus of claim 11, wherein the association is informed via the RMSI.

13. The second apparatus of claim 8, wherein the computer-executable instructions cause the second apparatus to transmit a system information modification indicator transmitted in the paging control information in the first synchronization signal block.

14. A method for a second apparatus communicating with a first apparatus, the method comprising:

transmitting, to the first apparatus, one or more swept downlink beams,
wherein one of the one or more swept downlink beams comprises a first number of synchronization signal blocks including a first synchronization signal;
transmitting, to the first apparatus, configuration information for measurements of signals contained within the one or more swept downlink beams and causing the first apparatus to perform a measurement based on the configuration information for measurements and select, based on the measurement, the first synchronization signal block from the first number of synchronization signal blocks;
transmitting, to the first apparatus, a paging configuration via system information, the paging configuration indicating a paging occasion comprising the first number of paging blocks including a first paging block,
wherein there is a one to one mapping between the first number of paging blocks and the first number of synchronization signal blocks,
wherein the first apparatus is configured to identify a first paging block associated with the first synchronization signal block by referring to the one to one mapping based on indications being informed to the first apparatus via system information;
transmitting, based on the paging configuration, a paging indication transmitted as a paging control information in the first paging block associated with the first synchronization signal block,
wherein the paging indication indicates control resource set for the paging control information and the control resource set indicates quasi co-location of the paging indication with the first synchronization signal block; and
transmitting, based on the paging indication, a paging message.

15. The method of claim 14 wherein the quasi-colocation is sharing a demodulation reference signals port between a physical broadcast channel in the first synchronization signal block and a physical downlink control channel, where the physical downlink control channel carries the paging indication in the paging occasion.

16. The method of claim 14 wherein, the quasi-colocation is sharing a demodulation reference signals port between a physical broadcast channel in the first synchronization signal block and a physical downlink control channel, where the physical downlink control channel comprises a downlink assignment for the paging message.

17. The method of claim 14, wherein the control resource set is configured for both RMSI (Remaining Minimum System Information) and the paging control information.

18. The method of claim 17, wherein the association is informed via the RMSI.

19. The method of claim 14, wherein the method further comprising:

transmitting a system information modification indicator transmitted in the paging control information in the first synchronization signal block.

\* \* \* \* \*